US012479909B2

United States Patent
Zhong et al.

(10) Patent No.: US 12,479,909 B2
(45) Date of Patent: Nov. 25, 2025

(54) ALBUMIN BINDING ANTIBODIES AND USE THEREOF

(71) Applicant: Anwita Biosciences, Inc., San Carlos, CA (US)

(72) Inventors: Ziyang Zhong, Belmont, CA (US); Fan Ye, Mountain View, CA (US); Matthew Siegel, Menlo Park, CA (US); Jianing Huang, San Mateo, CA (US); Eric Liao, San Francisco, CA (US); Ella Li, San Francisco, CA (US)

(73) Assignee: ANWITA BIOSCIENCES, INC., San Carlos, CA (US)

( * ) Notice: Subject to any disclaimer, the term of this patent is extended or adjusted under 35 U.S.C. 154(b) by 1094 days.

(21) Appl. No.: 17/432,488

(22) PCT Filed: Feb. 21, 2020

(86) PCT No.: PCT/US2020/019215
§ 371 (c)(1),
(2) Date: Aug. 20, 2021

(87) PCT Pub. No.: WO2020/172528
PCT Pub. Date: Aug. 27, 2020

(65) Prior Publication Data
US 2022/0195021 A1 Jun. 23, 2022

Related U.S. Application Data

(60) Provisional application No. 62/809,475, filed on Feb. 22, 2019.

(51) Int. Cl.
*C07K 16/18* (2006.01)
*C07K 14/76* (2006.01)

(52) U.S. Cl.
CPC ........... *C07K 16/18* (2013.01); *C07K 14/76* (2013.01); *C07K 2317/22* (2013.01); *C07K 2317/24* (2013.01); *C07K 2317/569* (2013.01); *C07K 2317/92* (2013.01); *C07K 2319/00* (2013.01)

(58) Field of Classification Search
None
See application file for complete search history.

(56) References Cited

U.S. PATENT DOCUMENTS

| | | | | |
|---|---|---|---|---|
| 11,692,020 B2 * | 7/2023 | Zhong | ............... | C07K 16/18 424/85.2 |
| 12,215,130 B2 * | 2/2025 | Zhong | ............... | A61P 37/00 |
| 12,240,879 B2 * | 3/2025 | Zhong | ............... | C07K 14/54 |
| 2010/0150939 A1 | 6/2010 | Blanchetot et al. | | |
| 2015/0093336 A1 | 4/2015 | Ginderachter et al. | | |
| 2015/0158929 A1 | 6/2015 | Schellenberger et al. | | |
| 2016/0207991 A1 | 7/2016 | Bloom et al. | | |
| 2017/0107302 A1 | 4/2017 | Silence et al. | | |
| 2017/0362339 A1 | 12/2017 | Liu et al. | | |
| 2018/0326060 A1 | 11/2018 | Wesche et al. | | |
| 2019/0031749 A1 | 1/2019 | Dubridge et al. | | |
| 2021/0230242 A1 | 7/2021 | Zhong et al. | | |
| 2021/0340272 A1 | 11/2021 | Zhong et al. | | |

FOREIGN PATENT DOCUMENTS

| | | | | |
|---|---|---|---|---|
| EP | 2692736 A1 | 2/2014 | | |
| WO | 2011006915 A2 | 1/2011 | | |
| WO | 2012022703 A2 | 2/2012 | | |
| WO | WO-2013110531 A1 * | 8/2013 | ............. | C07K 16/22 |
| WO | 2016187594 A1 | 11/2016 | | |
| WO | 2017080850 A1 | 5/2017 | | |
| WO | WO-2018104444 A1 * | 6/2018 | ......... | A61K 39/3955 |
| WO | WO-2019068677 A1 * | 4/2019 | ............. | A61P 31/04 |
| WO | 2019246003 A1 | 12/2019 | | |

OTHER PUBLICATIONS

Kontermann. Strategies to Extend Plasma Half-Lives of Recombinant Antibodies 2009; 23 (2): 93-109. (Year: 2009).*
Janeway CA Jr, Travers P, Walport M, et al. Immunobiology: The Immune System in Health and Disease. 5th edition. New York: Garland Science; 2001. (Year: 2001).*
Rabia et al. Understanding and overcoming trade-offs between antibody affinity, specificity, stability and solubility. Biochem Eng J Sep. 15, 2018; 137: 365-374. (Year: 2018).*
Scott et al. Antibody therapy of cancer. Nat Rev Cancer. Mar. 22, 2012;12(4):278-87. (Year: 2012).*
Bannas et al. Nanobodies and Nanobody-Based Human Heavy Chain Antibodies as Antitumor Therapeutics. Front Immunol, 2017; 8(1603):1-13. (Year: 2017).*
Huang et al. A novel strategy to produce high level and high purity of bioactive IL15 fusion proteins from mammalian cells. Protein Express Purific, 2018; 148:30-39. (Year: 2018).*
Chen et al. Fusion protein linkers: Property, design and functionality. Adv Drug Deliv Rev; 65(10):1357-1369. (Year: 2013).*
Bannas et al. Nanobodies and Nanobody-Based Human Heavy Chain Antibodies as Antitumor Therapeutics. Front Immunol; 8(1603):1-13. (Year: 2017).*
Huang et al. A novel strategy to produce high level and high purity of bioactive IL15 fusion proteins from mammalian cells. Protein Express Purific; 148:30-39. (Year: 2018).*
Liu et al., "An engineered IL-21 with half-life extension enhances anti-tumor immunity as a monotherapy or in combination with PD-1 or TIGIT blockade," Int. Immunopharmacol. 2021, 101, 108307.

(Continued)

*Primary Examiner* — Daniel E Kolker
*Assistant Examiner* — Maureen Varina Driscoll
(74) *Attorney, Agent, or Firm* — Lin Yu, Esq.; Juniv LLP

(57) ABSTRACT

The present disclosure provides anti-albumin constructs each comprising an antialbumin single-domain antibody (sdAb) moiety. The anti-albumin constructs can further comprise a therapeutic agent, such as an antigen binding moiety or a cytokine. The present disclosure also provides methods of making and using the anti-albumin constructs.

30 Claims, 4 Drawing Sheets
Specification includes a Sequence Listing.

(56) References Cited

OTHER PUBLICATIONS

Adams et al., "Extending the half-life of a fab fragment through generation of a humanized anti-human serum albumin Fv domain: An investigation into the correlation between affinity and serum half-life," MAbs 2016, 8, 1336-46.

Dennis et al., "Albumin binding as a general strategy for improving the pharmacokinetics of proteins," J. Biol. Chem. 2002, 277, 35035-43.

Hassanzadeh-Ghassabeh et al., "Nanobodies and their potential applications," Nanomedicine (Lond) 2013, 8, 1013-26.

Hudson et al., "Engineered antibodies," Nat. Med. 2003, 9, 129-34.

Nilvebrant and Hober, "The albumin-binding domain as a scaffold for protein engineering," Comput. Struct. Biotechnol. 2013, 6, e201303009.

Nygren et al., "Analysis and use of the serum albumin binding domains of streptococcal protein G," J. Mol. Recogn. 1988, 1, 69-74.

Walker et al., "Anti-serum albumin domain antibodies in the development of highly potent, efficacious and long-acting interferon," Protein Eng. Des. Sel. 2010, 23, 271-8.

\* cited by examiner

ALBUMIN BINDING ANTIBODIES AND USE THEREOF

CROSS REFERENCE TO RELATED APPLICATION

This application is a National Stage of International Application No. PCT/US2020/019215, filed Feb. 21, 2020; which claims the benefit of U.S. Provisional Application No. 62/809,475, filed Feb. 22, 2019; the disclosure of each of which is incorporated herein by reference in its entirety.

FIELD OF THE DISCLOSURE

The present disclosure relates to an anti-albumin construct comprising an anti-albumin single-domain antibody (sdAb) moiety, and methods of making and use thereof.

REFERENCE TO A SEQUENCE LISTING

The present specification is being filed with a Sequence Listing in Computer Readable Form (CRF), which is entitled 216A003WO01_SEQLIST_ST25.txt of 117,812 bytes in size and created Feb. 21, 2020; the content of which is incorporated herein by reference in its entirety.

BACKGROUND OF THE DISCLOSURE

The utility of many therapeutics, particularly biologicals such as peptides, polypeptides and polynucleotides, has limitations due to inadequate serum half-lives. Due to the inadequate serum half-lives, some therapeutics cannot achieve their desired efficacies. And some therapeutics must be administered at high frequencies and/or higher doses in order to maintain the serum levels necessary for therapeutic effects. Frequent systemic administration of such therapeutics is often associated with undesirable side effects. For example, frequent systemic injections represent a considerable discomfort to patients, pose a high risk of administration related infections, and may require hospitalization or frequent visits to the hospital, particularly when the therapeutics are to be administered intravenously. Moreover, in long term treatments, daily intravenous injections can lead to considerable side effects, such as tissue scarring, and vascular pathologies caused by the repeated puncturing of vessels. Similar problems are known for all frequent systemic administrations of therapeutics, such as, for example, the administration of insulin to diabetic patients or interferon drugs in multiple sclerosis patients. All these factors lead to a decrease in patients' compliance and increased costs for the health system. Accordingly, there is a need for developing therapeutics with extended serum half-lives.

BRIEF SUMMARY OF THE DISCLOSURE

The present disclosure provides an anti-albumin construct comprising a first polypeptide moiety comprising an anti-albumin single-domain antibody (sdAb) moiety that binds to an albumin, wherein the sdAb moiety comprises a CDR1 comprising the amino acid sequence of SEQ ID NO: 10, 13, 16, 19, 22, 25, 28, 31, 34, 116, 118, 121, 124, 129, 132, 135, or 138, or a variant thereof comprising up to about 3 amino acid substitutions; a CDR2 comprising the amino acid sequence of SEQ ID NO: 11, 14, 17, 20, 23, 26, 29, 32, 35, 119, 122, 125, 127, 130, 133, 136, or 139, or a variant thereof comprising up to about 3 amino acid substitutions; and a CDR3 comprising the amino acid sequence of SEQ ID NO: 12, 15, 18, 21, 24, 27, 30, 33, 36, 117, 120, 123, 126, 128, 131, 134, 137, or 140, or a variant thereof comprising up to about 3 amino acid substitutions.

The present disclosure also provides an anti-albumin construct comprising a first polypeptide moiety comprising an anti-albumin sdAb moiety that binds to an albumin, wherein the sdAb moiety comprises a CDR1 comprising the amino acid sequence of SEQ ID NO: 10, 13, 16, 19, 22, 25, 28, 31, 34, 116, 118, 121, 124, 129, 132, 135, or 138; a CDR2 comprising the amino acid sequence of SEQ ID NO: 11, 14, 17, 20, 23, 26, 29, 32, 35, 119, 122, 125, 127, 130, 133, 136, or 139; and a CDR3 comprising the amino acid sequence of SEQ ID NO: 12, 15, 18, 21, 24, 27, 30, 33, 36, 117, 120, 123, 126, 128, 131, 134, 137, or 140; or a variant thereof comprising up to about 3 amino acid substitutions in the CDR regions.

The present disclosure further provides an anti-albumin construct comprising a first polypeptide moiety comprising an anti-albumin sdAb moiety that binds to an albumin, wherein the sdAb moiety comprises a heavy chain variable domain having the amino acid sequence of any one of SEQ ID NOs: 1-9, 45-53, 99-101, 103-115, 149, and 150.

The present disclosure additionally provides an anti-albumin construct comprising a first polypeptide moiety comprising an anti-albumin sdAb moiety that binds to an albumin, wherein the sdAb moiety comprises a heavy chain variable domain having the amino acid sequence of any one of SEQ ID NOs: 1-9, 45-53, and 105-115.

The present disclosure provides an isolated anti-albumin construct comprising a first polypeptide moiety comprising an anti-albumin sdAb moiety that binds to an albumin, wherein the sdAb moiety comprises a CDR1, a CDR2, and a CDR3, respectively comprising the amino acid sequence of a CDR1, a CDR2, and a CDR3 within a heavy chain variable domain having the sequence set forth in any one of SEQ ID NOs: 1-9, 45-53, 99-101, 103-115, 149, and 150.

The present disclosure provides an isolated anti-albumin construct comprising a first polypeptide moiety comprising an anti-albumin sdAb moiety that binds to an albumin, wherein the sdAb moiety comprises a CDR1, a CDR2, and a CDR3, respectively comprising the amino acid sequence of a CDR1, a CDR2, and a CDR3 within a heavy chain variable domain having the sequence set forth in any one of SEQ ID NOs: 1-9, 45-53, and 105-115.

In certain embodiments, according to any one of the constructs described above, the sdAb moiety comprises a $V_H H$ domain comprising the amino acid sequence of any one of SEQ ID NOs: 1-9, 45-53, 99-101, 103-115, 149, and 150, or a variant thereof having at least about 80% sequence identity to any one of SEQ ID NOs: 1-9, 45-53, 99-101, 103-115, 149, and 150. In certain embodiments, the sdAb moiety comprises a $V_H H$ domain comprising the amino acid sequence of any one of SEQ ID NOs: 1-9, 45-53, 99-101, 103-115, 149, and 150, or a variant thereof comprising up to about 3 amino acid substitutions in the $V_H M$ domain.

In certain embodiments, according to any one of the constructs described above, the sdAb moiety comprises a $V_H H$ domain comprising the amino acid sequence of any one of SEQ ID NOs: 1-9, 45-53, and 105-115, or a variant thereof having at least about 80% sequence identity to any one of SEQ ID NOs: 1-9, 45-53, and 105-115. In certain embodiments, the sdAb moiety comprises a $V_H H$ domain comprising the amino acid sequence of any one of SEQ ID NOs: 1-9, 45-53, and 105-115, or a variant thereof comprising up to about 3 amino acid substitutions in the $V_H H$ domain.

The present disclosure provides an isolated anti-albumin construct comprising a first polypeptide comprising an anti-albumin sdAb moiety that binds to an albumin, wherein the sdAb moiety comprises a CDR1 comprising the amino acid sequence of any one of SEQ ID NOs: 10, 13, 16, 19, 22, 25, 28, 31, and 34, or a variant thereof comprising up to about 3 amino acid substitutions; a CDR2 comprising the amino acid sequence of any one of SEQ ID NOs: 11, 14, 17, 20, 23, 26, 29, 32, and 35, or a variant thereof comprising up to about 3 amino acid substitutions; and a CDR3 comprising the amino acid sequence of any one of SEQ ID NOs: 12, 15, 18, 21, 24, 27, 30, 33, and 36, or a variant thereof comprising up to about 3 amino acid substitutions.

In certain embodiments, according to any one of the constructs described above, the sdAb moiety comprises a CDR1 comprising the amino acid sequence of any one of SEQ ID NOs: 10, 13, 16, 19, 22, 25, 28, 31, and 34; a CDR2 comprising the amino acid sequence of any one of SEQ ID NOs: 11, 14, 17, 20, 23, 26, 29, 32, and 35; and a CDR3 comprising the amino acid sequence of any one of SEQ ID NOs: 12, 15, 18, 21, 24, 27, 30, 33, and 36; or a variant thereof comprising up to about 3 amino acid substitutions in the CDR regions.

In certain embodiments, according to any one of the constructs described above, the sdAb moiety comprises: (1) a CDR1 comprising the amino acid sequence of SEQ ID NO: 10, or a variant thereof comprising up to about 3 amino acid substitutions; a CDR2 comprising the amino acid sequence of SEQ ID NO: 11, or a variant thereof comprising up to about 3 amino acid substitutions; and a CDR3 comprising the amino acid sequence of SEQ ID NO: 12, or a variant thereof comprising up to about 3 amino acid substitutions; (2) a CDR1 comprising the amino acid sequence of SEQ ID NO: 13, or a variant thereof comprising up to about 3 amino acid substitutions; a CDR2 comprising the amino acid sequence of SEQ ID NO: 14, or a variant thereof comprising up to about 3 amino acid substitutions; and a CDR3 comprising the amino acid sequence of SEQ ID NO: 15, or a variant thereof comprising up to about 3 amino acid substitutions; (3) a CDR1 comprising the amino acid sequence of SEQ ID NO: 16, or a variant thereof comprising up to about 3 amino acid substitutions; a CDR2 comprising the amino acid sequence of SEQ ID NO: 17, or a variant thereof comprising up to about 3 amino acid substitutions; and a CDR3 comprising the amino acid sequence of SEQ ID NO: 18, or a variant thereof comprising up to about 3 amino acid substitutions; (4) a CDR1 comprising the amino acid sequence of SEQ ID NO: 19, or a variant thereof comprising up to about 3 amino acid substitutions; a CDR2 comprising the amino acid sequence of SEQ ID NO: 20, or a variant thereof comprising up to about 3 amino acid substitutions; and a CDR3 comprising the amino acid sequence of SEQ ID NO: 21, or a variant thereof comprising up to about 3 amino acid substitutions; (5) a CDR1 comprising the amino acid sequence of SEQ ID NO: 22, or a variant thereof comprising up to about 3 amino acid substitutions; a CDR2 comprising the amino acid sequence of SEQ ID NO: 23, or a variant thereof comprising up to about 3 amino acid substitutions; and a CDR3 comprising the amino acid sequence of SEQ ID NO: 24, or a variant thereof comprising up to about 3 amino acid substitutions; (6) a CDR1 comprising the amino acid sequence of SEQ ID NO: 25, or a variant thereof comprising up to about 3 amino acid substitutions; a CDR2 comprising the amino acid sequence of SEQ ID NO: 26, or a variant thereof comprising up to about 3 amino acid substitutions; and a CDR3 comprising the amino acid sequence of SEQ ID NO: 27, or a variant thereof comprising up to about 3 amino acid substitutions; (7) a CDR1 comprising the amino acid sequence of SEQ ID NO: 28, or a variant thereof comprising up to about 3 amino acid substitutions; a CDR2 comprising the amino acid sequence of SEQ ID NO: 29, or a variant thereof comprising up to about 3 amino acid substitutions; and a CDR3 comprising the amino acid sequence of SEQ ID NO: 30, or a variant thereof comprising up to about 3 amino acid substitutions; (8) a CDR1 comprising the amino acid sequence of SEQ ID NO: 31, or a variant thereof comprising up to about 3 amino acid substitutions; a CDR2 comprising the amino acid sequence of SEQ ID NO: 32, or a variant thereof comprising up to about 3 amino acid substitutions; and a CDR3 comprising the amino acid sequence of SEQ ID NO: 33, or a variant thereof comprising up to about 3 amino acid substitutions; or (9) a CDR1 comprising the amino acid sequence of SEQ ID NO: 34, or a variant thereof comprising up to about 3 amino acid substitutions; a CDR2 comprising the amino acid sequence of SEQ ID NO: 35, or a variant thereof comprising up to about 3 amino acid substitutions; and a CDR3 comprising the amino acid sequence of SEQ ID NO: 36, or a variant thereof comprising up to about 3 amino acid substitutions.

In certain embodiments, according to any one of the constructs described above, the sdAb moiety comprises: (1) a CDR1 comprising the amino acid sequence of SEQ ID NO: 10, a CDR2 comprising the amino acid sequence of SEQ ID NO: 11, and a CDR3 comprising the amino acid sequence of SEQ ID NO: 12; or a variant thereof comprising up to about 3 amino acid substitutions in the CDR regions; (2) a CDR1 comprising the amino acid sequence of SEQ ID NO: 13, a CDR2 comprising the amino acid sequence of SEQ ID NO: 14, and a CDR3 comprising the amino acid sequence of SEQ ID NO: 15; or a variant thereof comprising up to about 3 amino acid substitutions in the CDR regions; (3) a CDR1 comprising the amino acid sequence of SEQ ID NO: 16, a CDR2 comprising the amino acid sequence of SEQ ID NO: 17, and a CDR3 comprising the amino acid sequence of SEQ ID NO: 18; or a variant thereof comprising up to about 3 amino acid substitutions in the CDR regions; (4) a CDR1 comprising the amino acid sequence of SEQ ID NO: 19, a CDR2 comprising the amino acid sequence of SEQ ID NO: 20, and a CDR3 comprising the amino acid sequence of SEQ ID NO: 21; or a variant thereof comprising up to about 3 amino acid substitutions in the CDR regions; (5) a CDR1 comprising the amino acid sequence of SEQ ID NO: 22, a CDR2 comprising the amino acid sequence of SEQ ID NO: 23, and a CDR3 comprising the amino acid sequence of SEQ ID NO: 24; or a variant thereof comprising up to about 3 amino acid substitutions in the CDR regions; (6) a CDR1 comprising the amino acid sequence of SEQ ID NO: 25, a CDR2 comprising the amino acid sequence of SEQ ID NO: 26, and a CDR3 comprising the amino acid sequence of SEQ ID NO: 27; or a variant thereof comprising up to about 3 amino acid substitutions in the CDR regions; (7) a CDR1 comprising the amino acid sequence of SEQ ID NO: 28, a CDR2 comprising the amino acid sequence of SEQ ID NO: 29, and a CDR3 comprising the amino acid sequence of SEQ ID NO: 30; or a variant thereof comprising up to about 3 amino acid substitutions in the CDR regions; (8) a CDR1 comprising the amino acid sequence of SEQ ID NO: 31, a CDR2 comprising the amino acid sequence of SEQ ID NO: 32, and a CDR3 comprising the amino acid sequence of SEQ ID NO: 33; or a variant thereof comprising up to about 3 amino acid substitutions in the CDR regions; or (9) a CDR1 comprising the amino acid sequence of SEQ ID NO: 34, a CDR2 comprising the amino acid sequence of SEQ ID NO: 35, and a CDR3 comprising the amino acid sequence of SEQ ID NO: 36; or a variant thereof comprising up to about 3 amino acid substitutions in the CDR regions.

The present disclosure provides an anti-albumin construct comprising a first polypeptide comprising an anti-albumin sdAb moiety that binds to an albumin, wherein the sdAb moiety comprises a heavy chain variable domain having the amino acid sequence of any one of SEQ ID NOs: 1-9 and 45-53.

The present disclosure provides an isolated anti-albumin construct comprising a first polypeptide comprising an anti-albumin sdAb moiety that binds to an albumin, wherein the sdAb moiety comprises a CDR1, a CDR2, and a CDR3, respectively comprising the amino acid sequence of a CDR1, a CDR2, and a CDR3 within a heavy chain variable domain having the sequence set forth in any one of SEQ ID NOs: 1-9 and 45-53.

In certain embodiments, according to any one of the constructs described above, the sdAb moiety comprises a $V_HM$ domain comprising the amino acid sequence of any one of SEQ ID NOs: 1-9 and 45-53, or a variant thereof having at least about 80% sequence identity to any one of SEQ ID NOs: 1-9 and 45-53. In certain embodiments, the sdAb moiety comprises a $V_HH$ domain comprising the amino acid sequence of any one of SEQ ID NOs: 1-9 and 45-53, or a variant thereof comprising up to about 3 amino acid substitutions in the $V_HH$ domain.

The present disclosure provides an anti-albumin construct comprising a first polypeptide moiety comprising an anti-albumin sdAb moiety that binds to an albumin, wherein the sdAb moiety comprises a CDR1 comprising the amino acid sequence of SEQ ID NO: 116, 118, 121, 124, 129, 132, 135, or 138, or a variant thereof comprising up to about 3 amino acid substitutions; a CDR2 comprising the amino acid sequence of SEQ ID NO: 35, 119, 122, 125, 127, 130, 133, 136, or 139, or a variant thereof comprising up to about 3 amino acid substitutions; and a CDR3 comprising the amino acid sequence of SEQ ID NO: 117, 120, 123, 126, 128, 131, 134, 137, or 140, or a variant thereof comprising up to about 3 amino acid substitutions.

In certain embodiments, according to any one of the constructs described herein, the sdAb moiety comprises a CDR1 comprising the amino acid sequence of SEQ ID NO: 116, 118, 121, 124, 129, 132, 135, or 138; a CDR2 comprising the amino acid sequence of SEQ ID NO: 35, 119, 122, 125, 127, 130, 133, 136, or 139; and a CDR3 comprising the amino acid sequence of SEQ ID NO: 117, 120, 123, 126, 128, 131, 134, 137, or 140; or a variant thereof comprising up to about 3 amino acid substitutions in the CDR regions.

In certain embodiments, according to any one of the constructs described herein, the sdAb moiety comprises: (1) a CDR1 comprising the amino acid sequence of SEQ ID NO: 116, or a variant thereof comprising up to about 3 amino acid substitutions; a CDR2 comprising the amino acid sequence of SEQ ID NO: 35, or a variant thereof comprising up to about 3 amino acid substitutions; and a CDR3 comprising the amino acid sequence of SEQ ID NO: 117, or a variant thereof comprising up to about 3 amino acid substitutions; (2) a CDR1 comprising the amino acid sequence of SEQ ID NO: 118, or a variant thereof comprising up to about 3 amino acid substitutions; a CDR2 comprising the amino acid sequence of SEQ ID NO: 119, or a variant thereof comprising up to about 3 amino acid substitutions; and a CDR3 comprising the amino acid sequence of SEQ ID NO: 120, or a variant thereof comprising up to about 3 amino acid substitutions; (3) a CDR1 comprising the amino acid sequence of SEQ ID NO: 121, or a variant thereof comprising up to about 3 amino acid substitutions; a CDR2 comprising the amino acid sequence of SEQ ID NO: 122, or a variant thereof comprising up to about 3 amino acid substitutions; and a CDR3 comprising the amino acid sequence of SEQ ID NO: 123, or a variant thereof comprising up to about 3 amino acid substitutions; (4) a CDR1 comprising the amino acid sequence of SEQ ID NO: 124, or a variant thereof comprising up to about 3 amino acid substitutions; a CDR2 comprising the amino acid sequence of SEQ ID NO: 125, or a variant thereof comprising up to about 3 amino acid substitutions; and a CDR3 comprising the amino acid sequence of SEQ ID NO: 126, or a variant thereof comprising up to about 3 amino acid substitutions; (5) a CDR1 comprising the amino acid sequence of SEQ ID NO: 121, or a variant thereof comprising up to about 3 amino acid substitutions; a CDR2 comprising the amino acid sequence of SEQ ID NO: 127, or a variant thereof comprising up to about 3 amino acid substitutions; and a CDR3 comprising the amino acid sequence of SEQ ID NO: 128, or a variant thereof comprising up to about 3 amino acid substitutions; (6) a CDR1 comprising the amino acid sequence of SEQ ID NO: 129, or a variant thereof comprising up to about 3 amino acid substitutions; a CDR2 comprising the amino acid sequence of SEQ ID NO: 130, or a variant thereof comprising up to about 3 amino acid substitutions; and a CDR3 comprising the amino acid sequence of SEQ ID NO: 131, or a variant thereof comprising up to about 3 amino acid substitutions; (7) a CDR1 comprising the amino acid sequence of SEQ ID NO: 132, or a variant thereof comprising up to about 3 amino acid substitutions; a CDR2 comprising the amino acid sequence of SEQ ID NO: 133, or a variant thereof comprising up to about 3 amino acid substitutions; and a CDR3 comprising the amino acid sequence of SEQ ID NO: 134, or a variant thereof comprising up to about 3 amino acid substitutions; (8) a CDR1 comprising the amino acid sequence of SEQ ID NO: 135, or a variant thereof comprising up to about 3 amino acid substitutions; a CDR2 comprising the amino acid sequence of SEQ ID NO: 136, or a variant thereof comprising up to about 3 amino acid substitutions; and a CDR3 comprising the amino acid sequence of SEQ ID NO: 137, or a variant thereof comprising up to about 3 amino acid substitutions; or (9) a CDR1 comprising the amino acid sequence of SEQ ID NO: 138, or a variant thereof comprising up to about 3 amino acid substitutions; a CDR2 comprising the amino acid sequence of SEQ ID NO: 139, or a variant thereof comprising up to about 3 amino acid substitutions; and a CDR3 comprising the amino acid sequence of SEQ ID NO: 140, or a variant thereof comprising up to about 3 amino acid substitutions.

In certain embodiments, according to any one of the constructs described herein, the sdAb moiety comprises: (1) a CDR1 comprising the amino acid sequence of SEQ ID NO: 116, a CDR2 comprising the amino acid sequence of SEQ ID NO: 35, and a CDR3 comprising the amino acid sequence of SEQ ID NO: 117; or a variant thereof comprising up to about 3 amino acid substitutions in the CDR regions; (2) a CDR1 comprising the amino acid sequence of SEQ ID NO: 118, a CDR2 comprising the amino acid sequence of SEQ ID NO: 119, and a CDR3 comprising the amino acid sequence of SEQ ID NO: 120; or a variant thereof comprising up to about 3 amino acid substitutions in the CDR regions; (3) a CDR1 comprising the amino acid sequence of SEQ ID NO: 121, a CDR2 comprising the amino acid sequence of SEQ ID NO: 122, and a CDR3 comprising the amino acid sequence of SEQ ID NO: 123; or a variant thereof comprising up to about 3 amino acid substitutions in the CDR regions; (4) a CDR1 comprising the amino acid sequence of SEQ ID NO: 124, a CDR2 comprising the amino acid sequence of SEQ ID NO: 125, and a CDR3 comprising the amino acid sequence of SEQ ID NO: 126; or a variant thereof comprising up to about 3 amino acid substitutions in the CDR regions; (5) a CDR1 comprising the amino acid sequence of SEQ ID NO: 121, a CDR2 comprising the amino acid sequence of SEQ ID NO: 127, and a CDR3 comprising the amino acid sequence of SEQ ID NO: 128; or a variant thereof comprising up to about 3 amino acid substitutions in the CDR regions; (6) a CDR1 comprising the amino acid sequence of SEQ ID NO: 129, a CDR2 comprising the amino acid sequence of SEQ ID NO: 130, and a CDR3 comprising the amino acid sequence of SEQ ID NO: 131; or a variant thereof comprising up to about 3 amino acid substitutions in the CDR regions; (7) a CDR1 comprising the amino acid sequence of SEQ ID NO: 132, a CDR2 comprising the amino acid sequence of SEQ ID NO: 133, and a CDR3 comprising the amino acid sequence of SEQ ID NO: 134; or a variant thereof comprising up to about 3 amino acid substitutions in the CDR regions; (8) a CDR1 comprising the amino acid sequence of SEQ ID NO: 135, a CDR2 comprising the amino acid sequence of SEQ ID NO: 136, and a CDR3 comprising the amino acid sequence of SEQ ID NO: 137; or a variant thereof comprising up to about 3 amino acid substitutions in the CDR regions; or (9) a CDR1 comprising the amino acid sequence of SEQ ID NO: 138, a CDR2 comprising the amino acid sequence of SEQ ID NO: 139, and a CDR3 comprising the amino acid sequence of SEQ ID NO: 140; or a variant thereof comprising up to about 3 amino acid substitutions in the CDR regions.

The present disclosure provides an anti-albumin construct comprising a first polypeptide moiety comprising an anti-albumin sdAb moiety that binds to an albumin, wherein the sdAb moiety comprises a heavy chain variable domain having the amino acid sequence of any one of SEQ ID NOs: 99-101, 103-115, 149, and 150.

The present disclosure provides an anti-albumin construct comprising a first polypeptide moiety comprising an anti-albumin sdAb moiety that binds to an albumin, wherein the sdAb moiety comprises a heavy chain variable domain having the amino acid sequence of any one of SEQ ID NOs: 105-115.

The present disclosure provides an isolated anti-albumin construct comprising a first polypeptide moiety comprising an anti-albumin sdAb moiety that binds to an albumin, wherein the sdAb moiety comprises a CDR1, a CDR2, a CDR3, respectively comprising the amino acid sequence of a CDR1, a CDR2, and a CDR3 within a heavy chain variable domain having the sequence set forth in any one of SEQ ID NOs: 99-101, 103-115, 149, and 150.

The present disclosure provides an isolated anti-albumin construct comprising a first polypeptide moiety comprising an anti-albumin sdAb moiety that binds to an albumin, wherein the sdAb moiety comprises a CDR1, a CDR2, a CDR3, respectively comprising the amino acid sequence of a CDR1, a CDR2, and a CDR3 within a heavy chain variable domain having the sequence set forth in any one of SEQ ID NOs: 105-115.

In certain embodiments, according to any one of the constructs described herein, the sdAb moiety comprises a $V_H H$ domain comprising the amino acid sequence of any one of SEQ ID NOs: 99-101, 103-115, 149, and 150, or a variant thereof having at least about 80% sequence identity to any one of SEQ ID NOs: 99-101, 103-115, 149, and 150. In certain embodiments, the sdAb moiety comprises a $V_H H$ domain comprising the amino acid sequence of any one of SEQ ID NOs: 99-101, 103-115, 149, and 150, or a variant thereof comprising up to about 3 amino acid substitutions in the $V_H H$ domain.

In certain embodiments, according to any one of the constructs described herein, the sdAb moiety comprises a $V_H H$ domain comprising the amino acid sequence of any one of SEQ ID NOs: 105-115, or a variant thereof having at least about 80% sequence identity to any one of SEQ ID NOs: 105-115. In certain embodiments, the sdAb moiety comprises a $V_H H$ domain comprising the amino acid sequence of any one of SEQ ID NOs: 105-115, or a variant thereof comprising up to about 3 amino acid substitutions in the $V_H H$ domain.

In certain embodiments, according to any one of the constructs described above, the albumin is a human serum albumin (HSA), a rhesus serum albumin (RhSA), a cynomolgous monkey serum albumin (CySA), or a murine serum albumin (MuSA). In certain embodiments, the albumin is a human serum albumin.

In certain embodiments, according to any one of the constructs described above, the construct binds to an albumin with a $K_D$ ranging from about $10^{-6}$ M to about $10^{-10}$ M. In certain embodiments, the construct binds to an albumin with a $K_D$ ranging from about $10^{-6}$ M to about $10^{-8}$ M.

In certain embodiments, according to any one of the constructs described above, the construct binds to an albumin with a $K_D$ ranging from about $10^{-6}$ M to about $10^{-10}$ M at a pH of about 7. In certain embodiments, the construct binds to an albumin with a $K_D$ ranging from about $10^{-6}$ M to about $10^{-8}$ M at a pH of about 7.

In certain embodiments, according to any one of the constructs described above, the construct binds to an albumin with a $K_D$ ranging from about $10^{-6}$ M to about $10^{-10}$ M at a pH of about 5.5. In certain embodiments, the construct binds to an albumin with a $K_D$ ranging from about $10^{-6}$ M to about $10^{-8}$ M at a pH of about 5.5.

In certain embodiments, according to any one of the constructs described above, the sdAb moiety that binds to the albumin is camelid, chimeric, human, partially humanized, or fully humanized.

In certain embodiments, according to any one of the constructs described above, the construct further comprises a second polypeptide fused to the first polypeptide. In certain embodiments, the second polypeptide is fused to the amino-terminus (N-terminus) of the first polypeptide. In certain embodiments, the second polypeptide is fused to the carboxy-terminus (C-terminus) of the first polypeptide. In certain embodiments, the second polypeptide is fused to the first polypeptide via a first linker. In certain embodiments, the first linker is cleavable. In certain embodiments, the first linker is non-cleavable. In certain embodiments, the construct further comprises a third polypeptide fused to the first and/or the second polypeptide. In certain embodiments, the third polypeptide is fused to the first or the second polypeptide via a second linker. In certain embodiments, the second linker is cleavable. In certain embodiments, the second linker is non-cleavable. In certain embodiments, the second and/or the third polypeptide comprises an antigen binding moiety. In certain embodiments, the antigen binding moiety binds to a tumor antigen. In certain embodiments, the tumor antigen is selected from the group consisting of mesothelin ("MSLN"), GPA33, Her-2, EGFR, and CD20. In certain embodiments, the tumor antigen is selected from the group consisting of CEA, MUC16, MUC1, AFP, EPCAM, CD19, CD21, CD22, CD30, CD33, CD37, CD45, PSMA, and BCMA. In certain embodiments, the second and/or the third polypeptide comprises a cytokine. In certain embodiments, the cytokine is selected from the group consisting of IL-21, IL-7, IL-15, IL-15 bound to IL-15Rα or fragment thereof, IL-33, and IL-22.

In certain embodiments, according to any one of the constructs described above, the construct further comprises a signaling peptide.

In certain embodiments, according to any one of the constructs described above, the second polypeptide and/or third polypeptide in the construct has a serum half-life of at least 3-fold greater than that of the second polypeptide and/or third polypeptide in the absence of the anti-albumin sdAb moiety.

The present disclosure provides a pharmaceutical composition comprising any one of the constructs described above.

The present disclosure provides a method of treating a disease or condition in an individual, comprising administering to the individual an effective amount of any one of the constructs or compositions described above. In certain embodiments, the individual is a human.

DETAILED DESCRIPTION OF THE DISCLOSURE

Figure 1:
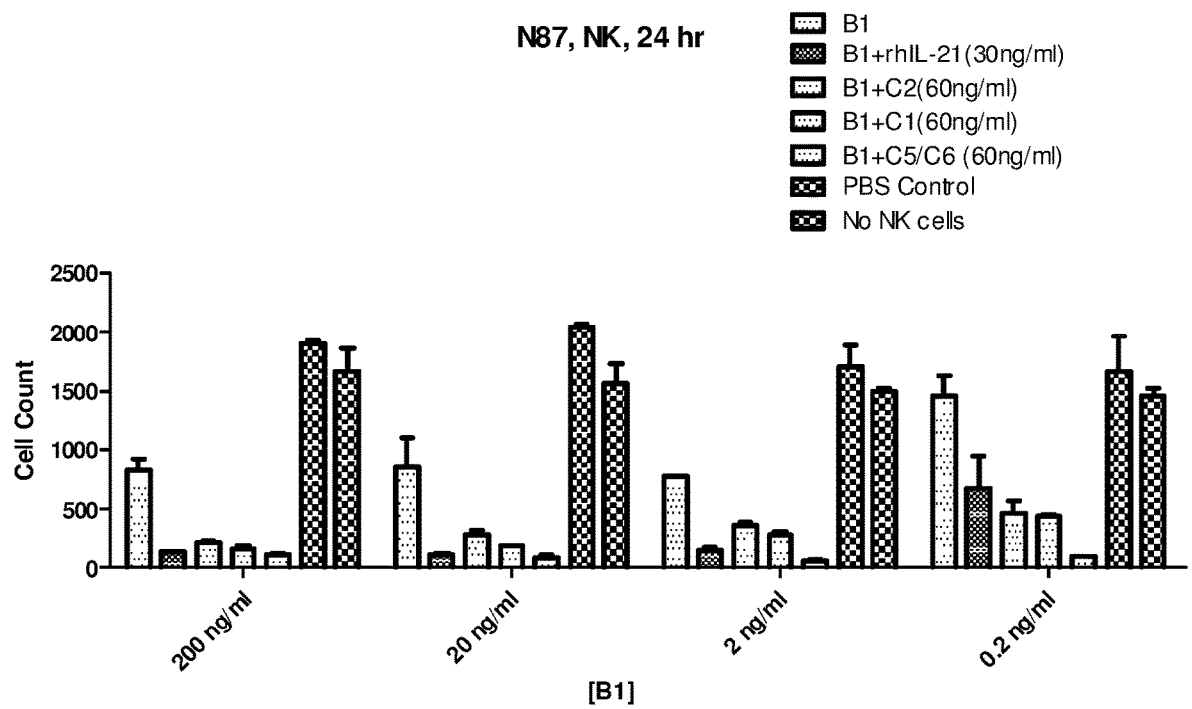
FIG. 1 shows ADCC activities of NK cells against N87 cells in the presence of (i) recombinant human IL-21 (rhIL-21) (30 ng/mL); (ii) mouse IL-21-anti-HSA construct C1 (SEQ ID NO: 99) (60 ng/mL); (iii) human IL-21-anti-HSA construct C2 (SEQ ID NO: 100) (60 ng/mL); or (iv) rhIL-15 C5 (SEQ ID NO: 102)/hIL-15Rα-anti-HSA construct C6 (SEQ ID NO: 103) combination (60 ng/mL); and in the presence of anti-mesothelin antibody B1 at 0.2, 2, 20, or 200 ng/mL, where antibody B1 comprises a CDR1 of SEQ ID NO: 92, a CDR2 of SEQ ID NO: 93, and a CDR3 of SEQ ID NO: 94.

The present disclosure is related to an anti-albumin construct that comprises an anti-albumin sdAb, a method of making and use thereof for treating a disease or condition.

Accordingly, one aspect of the present disclosure provides an anti-albumin construct comprising an anti-albumin sdAb moiety. In certain embodiments, the anti-albumin construct comprises a second polypeptide. In certain embodiments, the second polypeptide comprises a therapeutic agent, such as a cytokine or an antigen binding moiety that binds to a tumor antigen.

Also provided are compositions (such as pharmaceutical compositions), kits, and articles of manufacture, each of which comprises the anti-albumin construct described herein; methods of making thereof, and methods of treating a disease or condition (such as cancer) using the anti-albumin construct described herein.

Furthermore, provided are compositions, kits, and articles of manufacture, each of which comprises a bispecific antibody described herein and methods of making and use thereof.

I. Definitions

To facilitate understanding of the disclosure set forth herein, a number of terms are defined below.

Generally, the nomenclature used herein and the laboratory procedures in biochemistry, biology, molecular biology, cell biology, immunology, and pharmacology described herein are those well-known and commonly employed in the art. Unless defined otherwise, all technical and scientific terms used herein generally have the same meaning as commonly understood by one of ordinary skill in the art to which this disclosure belongs.

The terms "anti-albumin construct" and "anti-albumin protein" are used interchangeably herein in reference to, for example, a polypeptide that binds specifically to an albumin.

An "isolated" antibody or construct is one that has been identified, separated, and/or recovered from a component of its production environment (e.g., natural or recombinant). Preferably, the isolated antibody or construct is free of association with substantially all other components from its production environment. Contaminant components of its production environment, such as those resulting from recombinant transfected cells, are materials that would typically interfere with research, diagnostic, or therapeutic uses for the antibody or construct, and may include enzymes, hormones, and other proteinaceous or non-proteinaceous solutes. In preferred embodiments, the antibody or construct is purified: (1) to greater than 95% by weight of antibody or construct, in certain embodiments, to greater than 99% by weight; (2) to a degree sufficient to obtain at least 15 residues of N-terminal or internal amino acid sequence by use of a spinning cup sequenator; or (3) to homogeneity by SDS-PAGE under non-reducing or reducing conditions using Coomassie blue or silver stain. An isolated antibody or construct includes the antibody in situ within recombinant cells since at least one component of the antibody's natural environment is not present. Ordinarily, however, an isolated antibody or construct is prepared by at least one purification step.

A full-length antibody comprises two heavy chains and two light chains. The variable regions of the light and heavy chains are responsible for antigen binding. The variable domains of the heavy chain and light chain may be referred to as "$V_H$" and "$V_L$," respectively. The variable regions in both chains generally contain three highly variable loops called the complementarity determining regions (CDRs) (light chain (LC) CDRs, including LC-CDR1, LC-CDR2, and LC-CDR3, and heavy chain (HC) CDRs, including HC-CDR1, HC-CDR2, and HC-CDR3). CDR boundaries for the antibodies and antigen-binding fragments disclosed herein may be defined or identified by the conventions of Kabat, Chothia, or Al-Lazikani (Al-Lazikani 1997; Chothia 1985; Chothia 1987; Chothia 1989; Kabat 1987; Kabat 1991). The three CDRs of the heavy or light chains are interposed between flanking stretches known as framework regions (FRs), which are more highly conserved than the CDRs and form a scaffold to support the hypervariable loops. The constant regions of the heavy and light chains are not involved in antigen binding but exhibit various effector functions. Antibodies are assigned to classes based on the amino acid sequence of the constant region of their heavy chain. The five major classes or isotypes of antibodies are IgA, IgD, IgE, IgG, and IgM, which are characterized by the presence of α, δ, ε, γ, and μ heavy chains, respectively. Several of the major antibody classes are divided into subclasses such as IgG1 (γ1 heavy chain), IgG2 (γ2 heavy chain), IgG3 (γ3 heavy chain), IgG4 (γ4 heavy chain), IgA1 (α1 heavy chain), or IgA2 (α2 heavy chain).

The terms "full-length antibody," "intact antibody," or "whole antibody" are used interchangeably to refer to an antibody in its substantially intact form, as opposed to an antibody fragment. Specifically, full-length 4-chain antibodies include those with heavy and light chains including an Fc region. Full-length heavy-chain only antibodies include the heavy chain variable domain (such as $V_HH$) and an Fc region. The constant domains may be native sequence constant domains (e.g., human native sequence constant domains) or amino acid sequence variants thereof. In some cases, the intact antibody may have one or more effector functions.

The term "variable region" or "variable domain" of an antibody refers to the amino-terminal domains of the heavy or light chain of the antibody. The variable domains of the heavy chain and light chain may be referred to as "$V_H$" and "$V_L$," respectively. These domains are generally the most variable parts of the antibody (relative to other antibodies of the same class) and contain the antigen binding sites. Heavy-chain only antibodies from the camelid species have a single heavy chain variable region, which is referred to as "$V_HH$." $V_HH$ is thus a special type of $V_H$.

The term "antigen-binding fragment" as used herein refers to an antibody fragment including, for example, a diabody, a Fab, a Fab', a F(ab')$_2$, an Fv fragment, a disulfide stabilized Fv fragment (dsFv), a (dsFv)$_2$, a bispecific dsFv (dsFv-dsFv'), a disulfide stabilized diabody (ds diabody), a single-chain Fv (scFv), an scFv dimer (bivalent diabody), a multispecific antibody formed from a portion of an antibody comprising one or more CDRs, a camelized single domain antibody, a nanobody, a domain antibody, a bivalent domain antibody, or any other antibody fragment that binds to an antigen but does not comprise a complete antibody structure. An antigen-binding fragment is capable of binding to the same antigen to which the parent antibody or a parent antibody fragment (e.g., a parent scFv) binds. In certain embodiments, an antigen-binding fragment comprises one or more CDRs from a particular human antibody grafted to a framework region from one or more different human antibodies.

The term "Fv" refers to the minimum antibody fragment that contains a complete antigen-recognition and -binding site. This fragment consists of a dimer of one heavy-chain variable region domain and one light-chain variable region domain in tight and non-covalent association. From the folding of these two domains emanate six hypervariable loops (3 loops each from the heavy and light chain) that contribute the amino acid residues for antigen binding and confer antigen binding specificity to the antibody. However, even a single variable domain (or half of an Fv comprising only three CDRs specific for an antigen) has the ability to recognize and bind the antigen, although at a lower affinity than the entire binding site.

The term "single-chain Fv," "sFv," or "scFv" refers to an antibody fragment that comprises the $V_H$ and $V_L$ antibody domains connected into a single polypeptide chain. In certain embodiments, the scFv polypeptide further comprises a polypeptide linker between the $V_H$ and $V_L$ domains that enables the scFv to form the desired structure for antigen binding. See Plückthun in *The Pharmacology of Monoclonal Antibodies*, vol. 113, Rosenburg and Moore eds., Springer-Verlag, New York, pp. 269-315 (1994).

The term "heavy chain-only antibody" or "HCAb" refers to a functional antibody, which comprises heavy chains, but lacks the light chains usually found in a 4-chain antibody. Camelid animals (such as camels, llamas, or alpacas) are known to produce HCAbs.

The term "single-domain antibody," "single domain antibody," or "sdAb" refers to a single antigen-binding polypeptide having three complementary determining regions (CDRs). The sdAb alone is capable of binding to the antigen without pairing with a corresponding CDR-containing polypeptide. In some cases, single-domain antibodies are engineered from camelid HCAbs, and their heavy chain variable domains are referred herein as "$V_HHs$" (Variable domain of the heavy chain of the Heavy chain antibody). A camelid sdAb is one of the smallest known antigen-binding antibody fragments. See, e.g., Hamers-Casterman et al., *Nature* 363: 446-448 (1993); Greenberg et al., *Nature* 374:168-173 (1995); Hassanzadeh-Ghassabeh et al., *Nanomedicine (Lond.)* 8:1013-1026 (2013). A basic $V_HH$ has the following structure from the N-terminus to the C-terminus: FR1-CDR1-FR2-CDR2-FR3-CDR3-FR4, in which FR1 to FR4 refer to framework regions 1 to 4, respectively, and in which CDR1 to CDR3 refer to the complementarity determining regions 1 to 3, respectively.

The term "hypervariable region," "HVR," or "HV" refers to the regions of an antibody variable domain, which are hypervariable in sequence and/or form structurally defined loops. Generally, a single-domain antibody comprises three HVRs (or CDRs): HVR1 (or CDR1), HVR2 (or CDR2), and HVR3 (or CDR3). HVR3 (or CDR3) displays the most diversity of the three HVRs and is believed to play a unique role in conferring fine specificity to antibodies. See, e.g., Hamers-Casterman et al., *Nature* 363:446-448 (1993); Sheriff et al., *Nature Struct. Biol.* 3:733-736 (1996).

The term "CDR" or "complementarity determining region" is intended to mean the non-contiguous antigen combining sites found within the variable region of both heavy and light chain polypeptides. These particular regions have been described by Kabat et al., *J. Biol. Chem.* 252: 6609-6616 (1977); Kabat et al., U.S. Dept. of Health and Human Services, "Sequences of proteins of immunological interest" (1991); Chothia et al., *J. Mol. Biol.* 196:901-917 (1987); Al-Lazikani B. et al., *J. Mol. Biol.* 273:927-948 (1997); MacCallum et al., *J. Mol. Biol.* 262:732-745 (1996); Abhinandan and Martin, *Mol. Immunol.* 45:3832-3839 (2008); Lefranc et al., *Dev. Comp. Immunol.* 27:55-77 (2003); and Honegger and Plückthun, *J. Mol. Biol.* 309:657-

670 (2001); where the definitions include overlapping or subsets of amino acid residues when compared against each other. Nevertheless, application of either definition to refer to a CDR of an antibody or grafted antibodies or variants thereof is intended to be within the scope of the term as defined and used herein. The amino acid residues which encompass the CDRs as defined by each of the above cited references are set forth below in Table 1 as a comparison. CDR prediction algorithms and interfaces are known in the art, including, for example, Abhinandan and Martin, *Mol. Immunol.* 45: 3832-3839 (2008); Ehrenmann et al., *Nucleic Acids Res.* 38:D301-D307 (2010); and Adolf-Bryfogle et al., *Nucleic Acids Res.* 43:D432-D438 (2015).

TABLE 1

CDR Definitions

| | Kabat[1] | Chothia[2] | MacCallum[3] | IMGT[4] | AHo[5] |
|---|---|---|---|---|---|
| $V_H$ CDR1 | 31-35 | 26-32 | 30-35 | 27-38 | 25-40 |
| $V_H$ CDR2 | 50-65 | 53-55 | 47-58 | 56-65 | 58-77 |
| $V_H$ CDR3 | 95-102 | 96-101 | 93-101 | 105-117 | 109-137 |
| $V_L$ CDR1 | 24-34 | 26-32 | 30-36 | 27-38 | 25-40 |
| $V_L$ CDR2 | 50-56 | 50-52 | 46-55 | 56-65 | 58-77 |
| $V_L$ CDR3 | 89-97 | 91-96 | 89-96 | 105-117 | 109-137 |

[1] Residue numbering follows the nomenclature of Kabat et al., supra
[2] Residue numbering follows the nomenclature of Chothia et al., supra
[3] Residue numbering follows the nomenclature of MacCallum et al., supra
[4] Residue numbering follows the nomenclature of Lefranc et al., supra
[5] Residue numbering follows the nomenclature of Honegger and Plückthun, supra The expression "variable-domain residue-numbering as in Kabat" or "amino-acid-position numbering as in Kabat," and variations thereof, refers to the numbering system used for heavy-chain variable domains or light-chain variable domains of the compilation of antibodies in Kabat et al., supra. Using this numbering system, the actual linear amino acid sequence may contain fewer or additional amino acids corresponding to a shortening of, or insertion into, a FR or HVR of the variable domain. For example, a heavy-chain variable domain may include a single amino acid insert (residue 52a according to Kabat) after residue 52 of H2 and inserted residues (e.g., residues 82a, 82b, and 82c. etc. according to Kabat) after heavy-chain FR residue 82. The Kabat numbering of residues may be determined for a given antibody by alignment at regions of homology of the sequence of the antibody with a "standard" Kabat numbered sequence.

Unless indicated otherwise herein, the numbering of the residues in an immunoglobulin heavy chain is that of the EU index as in Kabat et al., supra. The "EU index as in Kabat" refers to the residue numbering of the human IgG1 EU antibody.

"Framework" or "FR" residues are those variable-domain residues other than the CDR residues as herein defined.

"Humanized" forms of a non-human (e.g., rodent) antibody are chimeric antibodies, each of which contains a minimal sequence derived from the non-human antibody. For the most part, a humanized antibody is a human immunoglobulin (a recipient antibody), in which residues from a hypervariable region (HVR) of the recipient are replaced by residues from a hypervariable region of a non-human species (donor antibody), such as a mouse, rat, rabbit, or non-human primate, having the desired antibody specificity and affinity. In certain embodiments, certain framework region (FR) residues of the human immunoglobulin are replaced by corresponding non-human residues. In certain embodiments, a humanized antibody can comprise residues that are not found in the recipient antibody or the donor antibody. In certain embodiments, a humanized antibody comprises substantially all of at least one (e.g., two) variable domains, in each of which all or substantially all of the hypervariable loops correspond to those of a non-human immunoglobulin and all or substantially all of the FRs are those of a human immunoglobulin sequence. In certain embodiments, the humanized antibody further comprises at least a portion of an immunoglobulin constant region (Fc), e.g., a human immunoglobulin Fc. See Jones et al., *Nature* 321:522-525 (1986); Riechmann et al., *Nature* 332:323-329 (1988); Presta, *Curr. Op. Struct. Biol.* 2:593-596 (1992).

The term "percent (%) amino acid sequence identity" refers to a percentage of amino acid residues in a candidate antibody or construct that are identical to the amino acid residues in an antibody or construct being compared. In certain embodiments, a % amino acid sequence identity value is determined using the sequence comparison computer program MUSCLE. Edgar, *Nucleic Acids Res.* 32:1792-1797 (2004); Edgar, *BMC Bioinformatics* 5:113 (2004).

The term "constant domain" refers to the portion of an immunoglobulin molecule having a more conserved amino acid sequence relative to the other portion of the immunoglobulin, the variable domain, which contains the antigen-binding site. The constant domain contains the $C_H1$, $C_H2$ and $C_H3$ domains (collectively, $C_H$) of the heavy chain and the $C_L$ domain of the light chain.

The light chains of an antibody (immunoglobulin) from any mammalian species are assigned to one of two distinct types: kappa ("κ") and lambda ("λ"), based on the amino acid sequences of its constant domains.

The $C_H1$ domain of a human IgG Fc region, also referred to as the "C1" of "H1" domain, usually extends from about amino acid 118 to about amino acid 215 based on the EU numbering system.

The term "hinge region" refers to a region in an IgG corresponding to Glu216 to Pro230 of a human IgG1, based on the EU numbering system. Burton, *Molec. Immunol.* 22:161-206 (1985).

The $C_H2$ domain of a human IgG Fc region, also referred to as "C2" of "H2" domain, usually extends from about amino acid 231 to about amino acid 340 based on the EU numbering system.

The $C_H3$ domain of a human IgG Fc region, also referred to as "C3" or "H3" domain, comprises residues between C-terminal and a CH2 domain in an Fc region, i.e., from about amino acid 341 to the C-terminal end of an antibody sequence, typically at amino acid 446 or 447 of an IgG, based on the EU numbering system.

The term "Fc region" or "fragment crystallizable region" refers to a C-terminal region of an immunoglobulin heavy chain. A human IgG heavy-chain Fc region usually stretches from Cys226 or Pro230 to C-terminus based on the EU numbering system. In certain embodiments, the C-terminal lysine of an Fc region is removed. Suitable native-sequence Fc regions for use in an antibody or construct described herein include the Fc regions of human IgG1, IgG2, IgG2A, IgG2B, IgG3, and IgG4.

The term "Fc receptor" or "FcR" refers to a receptor that binds to the Fc region of an antibody. In certain embodiments, the FcR is a human FcR. In certain embodiments, the FcR is a native human FcR. In certain embodiments, the FcR is one that binds to an IgG antibody (e.g., a gamma receptor). Ravetch and Kinet, *Annu. Rev. Immunol.* 9:457-492 (1991); Capel et al., *Immunomethods* 4:25-34 (1994); de Haas et al., *J. Lab. Clin. Med.* 126:330-341 (1995). In certain embodiments, the FcR is an FcγRI receptor, FcγRIIA receptor (an "activating receptor"), FcγRIIB receptor (an "inhibiting receptor") FcγRII receptor, or FcγRIII receptor; or an allelic variant or alternatively spliced form thereof. An activating receptor FcγRIIA contains an immunoreceptor tyrosine-based activation motif (ITAM) in its cytoplasmic domain. An inhibiting receptor FcγRIIB contains an immunoreceptor tyrosine-based inhibition motif (ITIM) in its cytoplasmic domain. See Daëron, *Annu. Rev. Immunol.* 15:203-234 (1997).

As used herein, a first antibody or fragment thereof "competes" for binding to a target antigen with a second antibody or fragment thereof when the first antibody or fragment thereof inhibits the target antigen binding of the second antibody of fragment thereof by at least about 50%, at least about 55%, at least about 60%, at least about 65%, at least about 70%, at least about 75%, at least about 80%, at least about 85%, at least about 90%, at least about 95%, at least about 98%, or at least about 99% in the presence of an equimolar concentration of the first antibody or fragment thereof, or vice versa. A high throughput process for "binning" antibodies based upon their cross-competition is described in WO 03/48731.

As used herein, the term "cytokine" is understood to mean any protein or peptide, analog or functional fragment thereof, which is capable of stimulating or inducing a cytocidal immune response against a preselected cell-type, for example, a cancer cell or a virally-infected cell, in a mammal. Accordingly, it is contemplated that a variety of cytokines can be incorporated into this disclosure. Useful cytokines include, for example, tumor necrosis factors (TNFs), interleukins (ILs), lymphokines (Ls), colony stimulating factors (CSFs), interferons (IFNs) including species variants, and truncated analogs thereof which are capable of stimulating or inducing such cytocidal immune responses. Useful tumor necrosis factors include, for example, TNFα. Useful lymphokines include, for example, LT. Useful colony stimulating factors include, for example, GM-CSF and M-CSF. Useful interleukins include, for example, IL-2, IL-4, IL-5, IL-7, IL-12, IL-15, IL-18, IL-21, IL22, and IL-33. Useful interferons, include, for example, IFN-α, IFN-β, and IFN-γ. The term "cytokine" is also understood to encompass any variant of a wildtype cytokine (such as IL-21, IL-7, and IL-15) that comprises modification and maintains at least a significant portion (such as at least about 50%) of any of its desired function.

The term "subject" refers to an animal, including, but not limited to, a primate (e.g., human), cow, pig, sheep, goat, horse, dog, cat, rabbit, rat, or mouse. The terms "subject," "individual," and "patient" are used interchangeably herein in reference, for example, to a mammalian subject, such as a human. In one embodiment, the subject is a human.

The terms "treat," "treating," and "treatment" are meant to include alleviating or abrogating a disorder, disease, or condition, or one or more of the symptoms associated with the disorder, disease, or condition; or alleviating or eradicating the cause(s) of the disorder, disease, or condition itself.

The terms "prevent," "preventing," and "prevention" are meant to include a method of delaying and/or precluding the onset of a disorder, disease, or condition, and/or its attendant symptoms; barring a subject from acquiring a disorder, disease, or condition; or reducing a subject's risk of acquiring a disorder, disease, or condition.

The terms "alleviate" and "alleviating" refer to easing or reducing one or more symptoms (e.g., pain) of a disorder, disease, or condition. The terms can also refer to reducing adverse effects associated with an active ingredient. Sometimes, the beneficial effects that a subject derives from a prophylactic or therapeutic agent do not result in a cure of the disorder, disease, or condition.

The term "contacting" or "contact" is meant to refer to bringing together of a therapeutic agent and cell or tissue such that a physiological and/or chemical effect takes place as a result of such contact. Contacting can take place in vitro, ex vivo, or in vivo. In one embodiment, a therapeutic agent is contacted with a cell in cell culture (in vitro) to determine the effect of the therapeutic agent on the cell. In another embodiment, the contacting of a therapeutic agent with a cell or tissue includes the administration of a therapeutic agent to a subject having the cell or tissue to be contacted.

The term "therapeutically effective amount" or "effective amount" is meant to include the amount of a compound that, when administered, is sufficient to prevent development of, or alleviate to some extent, one or more of the symptoms of the disorder, disease, or condition being treated. The term "therapeutically effective amount" or "effective amount" also refers to the amount of a compound that is sufficient to elicit a biological or medical response of a biological molecule (e.g., a protein, enzyme, RNA, or DNA), cell, tissue, system, animal, or human, which is being sought by a researcher, veterinarian, medical doctor, or clinician.

The term "$IC_{50}$" or "$EC_{50}$" refers to an amount, concentration, or dosage of a compound that is required for 50% inhibition of a maximal response in an assay that measures such a response.

The term "pharmaceutically acceptable carrier," "pharmaceutically acceptable excipient," "physiologically acceptable carrier," or "physiologically acceptable excipient" refers to a pharmaceutically acceptable material, composition, or vehicle, such as a liquid or solid filler, diluent, solvent, or encapsulating material. In one embodiment, each component is "pharmaceutically acceptable" in the sense of being compatible with the other ingredients of a pharmaceutical formulation, and suitable for use in contact with the tissue or organ of a subject (e.g., a human or an animal) without excessive toxicity, irritation, allergic response, immunogenicity, or other problems or complications, and commensurate with a reasonable benefit/risk ratio. See, e.g., *Remington: The Science and Practice of Pharmacy.* 22nd ed.; Allen Ed.; Pharmaceutical Press: London, 2012; *Handbook of Pharmaceutical Excipients,* 8th ed.; Sheskey et al., Eds.; Pharmaceutical Press: London, 2017; *Handbook of Pharmaceutical Additives,* 3rd ed.; Ash and Ash Eds.; Synapse Information Resources: 2007; *Pharmaceutical Preformulation and Formulation,* 2nd ed.; Gibson Ed.; Drugs and the *Pharmaceutical Sciences* 199; Informa Healthcare: New York, N.Y., 2009.

The term "about" or "approximately" means an acceptable error for a particular value as determined by one of ordinary skill in the art, which depends in part on how the value is measured or determined. In certain embodiments, the term "about" or "approximately" means within 1, 2, or 3 standard deviations. In certain embodiments, the term "about" or "approximately" means within 25%, 20%, 15%, 10%, 9%, 8%, 7%, 6%, 5%, 4%, 3%, 2%, 1%, 0.5%, or 0.05% of a given value or range.

In the context of cancer, the term "treating" includes any or all of: inhibiting growth of cancer cells, inhibiting replication of cancer cells, lessening of overall tumor burden and ameliorating one or more symptoms associated with the disease.

II. Anti-Albumin Constructs

In one embodiment, there is provided an anti-albumin construct comprising a single-domain antibody (sdAb) moiety that specifically binds to an albumin.

In another embodiment, there is provided an isolated anti-albumin construct comprising an sdAb moiety that specifically binds to an albumin.

In certain embodiments, an anti-albumin construct provided herein binds to an albumin with a $K_D$ ranging from about $10^{-6}$ M to about $10^{-10}$ M or from about $10^{-6}$ M to about $10^{-8}$ M.

In certain embodiments, an anti-albumin construct provided herein binds to an albumin with a $K_D$ ranging from about $10^{-5}$ M to about $10^{-6}$ M, from about $10^{-6}$ M to about $10^{-7}$ M, from about $10^{-7}$ M to about $10^{-8}$ M, from about $10^{-8}$ M to about $10^{-9}$ M, from about $10^{-9}$ M to about $10^{-10}$ M, from about $10^{-10}$ M to about $10^{-11}$ M, from about $10^{-11}$ M to about $10^{-12}$ M, from about $10^{-6}$ M to about $10^{-10}$ M, from about $10^{-6}$ M to about $10^{-12}$ M, from about $10^{-6}$ M to about $10^{-8}$ M, from about $10^{-8}$ M to about $10^{-12}$ M, from about $10^{-9}$ M to about $10^{-12}$ M, from about $10^{-10}$ M to about $10^{-12}$ M, from about $10^{-5}$ M to about $10^{-11}$ M, from about $10^{-7}$ M to about $10^{-11}$ M, from about $10^{-8}$ M to about $10^{-11}$ M, from about $10^{-9}$ M to about $10^{-11}$ M, from about $10^{-5}$ M to about $10^{-10}$ M, from about $10^{-7}$ M to about $10^{-10}$ M, from about $10^{-8}$ M to about $10^{-10}$ M, from about $10^{-5}$ M to about $10^{-9}$ M, from about $10^{-7}$ M to about $10^{-9}$ M, from about $10^{-5}$ M to about $10^{-8}$ M, or from about $10^{-6}$ M to about $10^{-8}$ M.

In certain embodiments, an anti-albumin construct provided herein binds to an albumin with a $K_D$ ranging from about $10^{-6}$ M to about $10^{-10}$ M or from about $10^{-6}$ M to about $10^{-8}$ M at a pH of about 7.

In certain embodiments, an anti-albumin construct provided herein binds to an albumin with a $K_D$ ranging from about $10^{-5}$ M to about $10^{-6}$ M, from about $10^{-6}$ M to about $10^{-7}$ M, from about $10^{-7}$ M to about $10^{-8}$ M, from about $10^{-8}$ M to about $10^{-9}$ M, from about $10^{-9}$ M to about $10^{-10}$ M, from about $10^{-10}$ M to about $10^{-11}$ M, from about $10^{-11}$ M to about $10^{-12}$ M, from about $10^{-6}$ M to about $10^{-10}$ M, from about $10^{-6}$ M to about $10^{-12}$ M, from about $10^{-6}$ M to about $10^{-8}$ M, from about $10^{-8}$ M to about $10^{-12}$ M, from about $10^{-9}$ M to about $10^{-12}$ M, from about $10^{-10}$ M to about $10^{-12}$ M, from about $10^{-5}$ M to about $10^{-11}$ M, from about $10^{-7}$ M to about $10^{-11}$ M, from about $10^{-8}$ M to about $10^{-11}$ M, from about $10^{-9}$ M to about $10^{-11}$ M, from about $10^{-5}$ M to about $10^{-10}$ M, from about $10^{-7}$ M to about $10^{-10}$ M, from about $10^{-8}$ M to about $10^{-10}$ M, from about $10^{-5}$ M to about $10^{-9}$ M, from about $10^{-7}$ M to about $10^{-9}$ M, from about $10^{-5}$ M to about $10^{-8}$ M, or from about $10^{-6}$ M to about $10^{-8}$ M at a pH of about 7.

In certain embodiments, an anti-albumin construct provided herein binds to an albumin with a $K_D$ ranging from about $10^{-6}$ M to about $10^{-10}$ M or from about $10^{-6}$ M to about $10^{-8}$ M at a pH of about 5.5.

In certain embodiments, an anti-albumin construct provided herein binds to an albumin with a $K_D$ ranging from about $10^{-5}$ M to about $10^{-6}$ M, from about $10^{-6}$ M to about $10^{-7}$ M, from about $10^{-7}$ M to about $10^{-8}$ M, from about $10^{-8}$ M to about $10^{-9}$ M, from about $10^{-9}$ M to about $10^{-10}$ M, from about $10^{-10}$ M to about $10^{-11}$ M, from about $10^{-11}$ M to about $10^{-12}$ M, from about $10^{-6}$ M to about $10^{-10}$ M, from about $10^{-6}$ M to about $10^{-12}$ M, from about $10^{-6}$ M to about $10^{-8}$ M, from about $10^{-8}$ M to about $10^{-12}$ M, from about $10^{-9}$ M to about $10^{-12}$ M, from about $10^{-10}$ M to about $10^{-12}$ M, from about $10^{-5}$ M to about $10^{-11}$ M, from about $10^{-7}$ M to about $10^{-11}$ M, from about $10^{-8}$ M to about $10^{-11}$ M, from about $10^{-9}$ M to about $10^{-11}$ M, from about $10^{-5}$ M to about $10^{-10}$ M from about $10^{-7}$ M to about $10^{-10}$ M, from about $10^{-8}$ M to about $10^{-10}$ M, from about $10^{-5}$ M to about $10^{-9}$ M, from about $10^{-7}$ M to about $10^{-9}$ M, from about $10^{-5}$ M to about $10^{-8}$ M, or from about $10^{-6}$ M to about $10^{-8}$ M at a pH of about 5.5.

The $K_D$ of an anti-albumin construct provided herein binding to an albumin can be determined by a method known in the art, including, but not limited to, ELISA, radioligand binding assay (RIA), surface plasmon resonance (SPR) technique, affinity chromatography, fluorescence energy resonance transfer (FRET), and isothermal titration calorimetry (ITC).

In certain embodiments, the $K_{on}$ of an anti-albumin construct provided herein binding to an albumin is ranging from about $10^2$ to about $10^4$ $M^{-1}$ $s^{-1}$, from about $10^4$ to about $10^6$ $M^{-1}$ $s^{-1}$, from about $10^6$ to about $10^7$ $M^{-1}$ $s^{-1}$, from about $10^2$ to about $10^7$ $M^{-1}$ $s^{-1}$, from about $10^3$ to about $10^7$ $M^{-1}$ $s^{-1}$, from about $10^4$ to about $10^7$ $M^{-1}$ $s^{-1}$, from about $10^5$ to about $10^7$ $M^{-1}$ $s^{-1}$, from about $10^3$ to about $10^6$ $M^{-1}$ $s^{-1}$, or from about $10^4$ to about $10^6 M^{-1}$ $s^{-1}$.

In certain embodiments, the $K_{off}$ of an anti-albumin construct provided herein binding to an albumin is ranging from about 1 to about $10^{-2}$ $s^{-1}$, from about $10^{-2}$ to about $10^{-4}$ $s^{-1}$, from about $10^{-4}$ to about $10^{-5}$ $s^{-1}$, from about $10^{-5}$ to about $10^{-6}$ $s^{-1}$, from about 1 to about $10^{-6}$ $s^{-1}$, from about $10^{-2}$ to about $10^{-6}$ $s^{-1}$, from about $10^{-3}$ to about $10^{-6}$ $s^{-1}$, from about $10^{-4}$ to about $10^{-6}$ $s^{-1}$, from about $10^{-2}$ to about $10^{-5}$ $s^{-1}$, or from about $10^{-3}$ to about $10^{-5}$ $s^{-1}$.

In certain embodiments, the $K_{on}$ of an anti-albumin construct provided herein binding to an albumin is ranging from about $10^2$ to about $10^4$ $M^{-1}$ $s^{-1}$, from about $10^4$ to about $10^6$ $M^{-1}$ $s^{-1}$, from about $10^6$ to about $10^7$ $M^{-1}$ $s^{-1}$, from about $10^2$ to about $10^7$ $M^{-1}$ $s^{-1}$, from about $10^3$ to about $10^7$ $M^{-1}$ $s^{-1}$, from about $10^4$ to about $10^7$ $M^{-1}$ $s^{-1}$, from about $10^5$ to about $10^7$ $M^{-1}$ $s^{-1}$, from about $10^3$ to about $10^6$ $M^{-1}$ $s^{-1}$, or from about $10^4$ to about $10^6$ $M^{-1}$ $s^{-1}$ at a pH of about 7.

In certain embodiments, the $K_{off}$ of an anti-albumin construct provided herein binding to an albumin is ranging from about 1 to about $10^{-2}$ $s^{-1}$, from about $10^{-2}$ to about $10^4$ $s^{-1}$, from about $10^{-4}$ to about $10^{-5}$ $s^{-1}$, from about $10^{-5}$ to about $10^{-6}$ $s^1$, from about 1 to about $10^{-6}$ $s^{-1}$, from about $10^{-2}$ to about $10^{-6}$ $s^{-1}$, from about $10^{-3}$ to about $10^{-6}$ $s^{-1}$, from about $10^{-4}$ to about $10^{-6}$ $s^{-1}$, from about $10^{-2}$ to about $10^{-5}$ $s^{-1}$, or from about $10^{-3}$ to about $10^{-5}$ $s^{-1}$ at a pH of about 7.

In certain embodiments, the $K_{on}$ of an anti-albumin construct provided herein binding to an albumin is ranging from about $10^2$ to about $10^4$ $M^{-1}$ $s^{-1}$, from about $10^4$ to about $10^6$ $M^{-1}$ $s^{-1}$, from about $10^6$ to about $10^7$ $M^{-1}$ $s^{-1}$, from about $10^2$ to about $10^7$ $M^{-1}$ $s^{-1}$, from about $10^3$ to about $10^7$ $M^{-1}$ $s^{-1}$, from about $10^4$ to about $10^7$ $M^{-1}$ $s^{-1}$, from about $10^5$ to about $10^7$ $M^{-1}$ $s^{-1}$, from about $10^3$ to about $10^6$ $M^{-1}$ $s^{-1}$, or from about $10^4$ to about $10^6$ $M^{-1}$ $s^{-1}$ at a pH of about 5.5.

In certain embodiments, the $K_{off}$ of an anti-albumin construct provided herein binding to an albumin is ranging from about 1 to about $10^{-2}$ $s^{-1}$, from about $10^{-2}$ to about $10^4$ $s^{-1}$, from about $10^{-4}$ to about $10^{-5}$ $s^{-1}$, from about $10^{-5}$ to about $10^{-6}$ $s^{-1}$, from about 1 to about $10^{-6}$ $s^{-1}$, from about $10^{-2}$ to about $10^{-6}$ $s^{-1}$, from about $10^{-3}$ to about $10^{-6}$ $s^{-1}$, from about $10^{-4}$ to about $10^{-6}$ $s^{-1}$, from about $10^{-2}$ to about $10^{-5}$ $s^{-1}$, or from about $10^{-3}$ to about $10^{-5}$ $s^{-1}$ at a pH of about 5.5.

In yet another embodiment, there is provided an anti-albumin construct comprising an anti-albumin sdAb moiety that binds to an albumin competitively with any one of the anti-albumin sdAb constructs described herein. In certain embodiments, the competitive binding is determined using an ELISA assay.

In one embodiment, there is provided an anti-albumin construct comprising an anti-albumin sdAb moiety that specifically binds to an albumin competitively with an anti-albumin sdAb construct comprising the amino acid sequence of any one of SEQ ID NOs: 1-9, 45-53, 99-101, 103-115, 149, and 150.

In another embodiment, there is provided an anti-albumin construct comprising an anti-albumin sdAb moiety that specifically binds to an albumin competitively with an anti-albumin sdAb construct comprising the amino acid sequence of any one of SEQ ID NOs: 1-9, 45-53, and 105-115.

In yet another embodiment, there is provided an anti-albumin construct comprising an anti-albumin sdAb moiety that specifically binds to an albumin competitively with an anti-albumin sdAb construct comprising a CDR1 comprising the amino acid sequence of SEQ ID NO: 10, 13, 16, 19, 22, 25, 28, 31, 34, 116, 118, 121, 124, 129, 132, 135, or 138; a CDR2 comprising the amino acid sequence of SEQ ID NO: 11, 14, 17, 20, 23, 26, 29, 32, 35, 119, 122, 125, 127, 130, 133, 136, or 139; and a CDR3 comprising the amino acid sequence of SEQ ID NO: 12, 15, 18, 21, 24, 27, 30, 33, 36, 117, 120, 123, 126, 128, 131, 134, 137, or 140.

In yet another embodiment, there is provided an anti-albumin construct comprising an anti-albumin sdAb moiety that specifically binds to an albumin competitively with an anti-albumin sdAb construct comprising the amino acid sequence of any one of SEQ ID NOs: 1-9 and 45-53.

In yet another embodiment, there is provided an anti-albumin construct comprising an anti-albumin sdAb moiety that specifically binds to an albumin competitively with an anti-albumin sdAb construct comprising a CDR1 comprising the amino acid sequence of SEQ ID NO: 10, 13, 16, 19, 22, 25, 28, 31, or 34; a CDR2 comprising the amino acid sequence of SEQ ID NO: 11, 14, 17, 20, 23, 26, 29, 32, or 35; and a CDR3 comprising the amino acid sequence of SEQ ID NO: 12, 15, 18, 21, 24, 27, 30, 33, or 36.

In yet another embodiment, there is provided an anti-albumin construct comprising an anti-albumin sdAb moiety that specifically binds to an albumin competitively with an anti-albumin sdAb construct comprising the amino acid sequence of any one of SEQ ID NOs: 105-115.

In yet another embodiment, there is provided an anti-albumin construct comprising an anti-albumin sdAb moiety that specifically binds to an albumin competitively with an anti-albumin sdAb construct comprising a CDR1 comprising the amino acid sequence of SEQ ID NO: 116, 118, 121, 124, 129, 132, 135, or 138; a CDR2 comprising the amino acid sequence of SEQ ID NO: 35, 119, 122, 125, 127, 130, 133, 136, or 139; and a CDR3 comprising the amino acid sequence of SEQ ID NO: 117, 120, 123, 126, 128, 131, 134, 137, or 140.

A. Anti-Albumin Single-Domain Antibody Moiety

An sdAb differs from a conventional 4-chain antibody by having a single monomeric antibody variable domain, such as a heavy chain variable domain ($V_HH$), which can exhibit a high affinity to an antigen without the aid of a light chain. A camelid $V_HH$ is known as the smallest functional antigen-binding fragment with a molecular weight of approximately 15 kDa.

In one embodiment, there is provided an anti-albumin sdAb moiety comprises a CDR1 comprising the amino acid sequence of SEQ ID NO: 10, 13, 16, 19, 22, 25, 28, 31, 34, 116, 118, 121, 124, 129, 132, 135, or 138, or a variant thereof comprising up to about 3, in one embodiment, 1, 2, or 3, amino acid substitutions; a CDR2 comprising the amino acid sequence of SEQ ID NO: 11, 14, 17, 20, 23, 26, 29, 32, 35, 119, 122, 125, 127, 130, 133, 136, or 139, or a variant thereof comprising up to about 3, in one embodiment, 1, 2, or 3, amino acid substitutions; and a CDR3 comprising the amino acid sequence of SEQ ID NO: 12, 15, 18, 21, 24, 27, 30, 33, 36, 117, 120, 123, 126, 128, 131, 134, 137, or 140, or a variant thereof comprising up to about 3, in one embodiment, 1, 2, or 3, amino acid substitutions.

In another embodiment, there is provided an anti-albumin sdAb moiety comprising a CDR1 comprising the amino acid sequence of SEQ ID NO: 10, 13, 16, 19, 22, 25, 28, 31, 34, 116, 118, 121, 124, 129, 132, 135, or 138; a CDR2 comprising the amino acid sequence of SEQ ID NO: 11, 14, 17, 20, 23, 26, 29, 32, 35, 119, 122, 125, 127, 130, 133, 136, or 139; and a CDR3 comprising the amino acid sequence of SEQ ID NO: 12, 15, 18, 21, 24, 27, 30, 33, 36, 117, 120, 123, 126, 128, 131, 134, 137, or 140; or a variant thereof comprising up to about 3, in one embodiment, 1, 2, or 3, amino acid substitutions in the CDR regions. In certain embodiments, the amino acid substitution(s) is in CDR1 and/or CDR2.

In yet another embodiment, there is provided an anti-albumin sdAb moiety comprising a CDR1 comprising the amino acid sequence of SEQ ID NO: 10, 13, 16, 19, 22, 25, 28, 31, 34, 116, 118, 121, 124, 129, 132, 135, or 138; a CDR2 comprising the amino acid sequence of SEQ ID NO: 11, 14, 17, 20, 23, 26, 29, 32, 35, 119, 122, 125, 127, 130, 133, 136, or 139; and a CDR3 comprising the amino acid sequence of SEQ ID NO: 12, 15, 18, 21, 24, 27, 30, 33, 36, 117, 120, 123, 126, 128, 131, 134, 137, or 140.

In yet another embodiment, there is provided an anti-albumin sdAb moiety comprising a CDR1 comprising the amino acid sequence of any one of SEQ ID NOs: 10, 13, 16, 19, 22, 25, 28, 31, and 34, or a variant thereof comprising up to about 3 (such as 1, 2, or 3) amino acid substitutions; a CDR2 comprising the amino acid sequence of any one of SEQ ID NOs: 11, 14, 17, 20, 23, 26, 29, 32, and 35, or a variant thereof comprising up to about 3 (such as 1, 2, or 3) amino acid substitutions; and a CDR3 comprising the amino acid sequence of any one of SEQ ID NOs: 12, 15, 18, 21, 24, 27, 30, 33, and 36, or a variant thereof comprising up to about 3 (such as 1, 2, or 3) amino acid substitutions.

In yet another embodiment, there is provided an anti-albumin sdAb moiety comprising a CDR1 comprising the amino acid sequence of any one of SEQ ID NOs: 10, 13, 16, 19, 22, 25, 28, 31, and 34; a CDR2 comprising the amino acid sequence of any one of SEQ ID NOs: 11, 14, 17, 20, 23, 26, 29, 32, and 35; and a CDR3 comprising the amino acid sequence of any one of SEQ ID NOs: 12, 15, 18, 21, 24, 27, 30, 33, and 36; or a variant thereof comprising up to about 3 (such as 1, 2, or 3) amino acid substitutions in the CDR regions. In certain embodiments, the amino acid substitution(s) is in CDR1 and/or CDR2.

In yet another embodiment, there is provided an anti-albumin sdAb moiety comprising a CDR1 comprising the amino acid sequence of any one of SEQ ID NOs: 10, 13, 16, 19, 22, 25, 28, 31, and 34; a CDR2 comprising the amino acid sequence of any one of SEQ ID NOs: 11, 14, 17, 20, 23, 26, 29, 32, and 35; and a CDR3 comprising the amino acid sequence of any one of SEQ ID NOs: 12, 15, 18, 21, 24, 27, 30, 33, and 36.

In one embodiment, there is provided an anti-albumin sdAb moiety comprising a CDR1 comprising the amino acid sequence of SEQ ID NO: 10, or a variant thereof comprising up to about 3 (such as 1, 2, or 3) amino acid substitutions;

a CDR2 comprising the amino acid sequence of SEQ ID NO: 11, or a variant thereof comprising up to about 3 (such as 1, 2, or 3) amino acid substitutions; and a CDR3 comprising the amino acid sequence of SEQ ID NO: 12, or a variant thereof comprising up to about 3 (such as 1, 2, or 3) amino acid substitutions.

In another embodiment, there is provided an anti-albumin sdAb moiety comprising a CDR1 comprising the amino acid sequence of SEQ ID NO: 10; a CDR2 comprising the amino acid sequence of SEQ ID NO: 11; and a CDR3 comprising the amino acid sequence of SEQ ID NO: 12; or a variant thereof comprising up to about 3 (such as 1, 2, or 3) amino acid substitutions in the CDR regions. In certain embodiments, the amino acid substitution(s) is in CDR1 and/or CDR2.

In yet another embodiment, there is provided an anti-albumin sdAb moiety comprising a CDR1 comprising the amino acid sequence of SEQ ID NO: 10; a CDR2 comprising the amino acid sequence of SEQ ID NO: 11; and a CDR3 comprising the amino acid sequence of SEQ ID NO: 12.

In one embodiment, there is provided an anti-albumin sdAb moiety comprising a CDR1 comprising the amino acid sequence of SEQ ID NO: 13, or a variant thereof comprising up to about 3 (such as 1, 2, or 3) amino acid substitutions; a CDR2 comprising the amino acid sequence of SEQ ID NO: 14, or a variant thereof comprising up to about 3 (such as 1, 2, or 3) amino acid substitutions; and a CDR3 comprising the amino acid sequence of SEQ ID NO: 15, or a variant thereof comprising up to about 3 (such as 1, 2, or 3) amino acid substitutions.

In another embodiment, there is provided an anti-albumin sdAb moiety comprising a CDR1 comprising the amino acid sequence of SEQ ID NO: 13; a CDR2 comprising the amino acid sequence of SEQ ID NO: 14; and a CDR3 comprising the amino acid sequence of SEQ ID NO: 15; or a variant thereof comprising up to about 3 (such as 1, 2, or 3) amino acid substitutions in the CDR regions. In certain embodiments, the amino acid substitution(s) is in CDR1 and/or CDR2.

In yet another embodiment, there is provided an anti-albumin sdAb moiety comprising a CDR1 comprising the amino acid sequence of SEQ ID NO: 13; a CDR2 comprising the amino acid sequence of SEQ ID NO: 14; and a CDR3 comprising the amino acid sequence of SEQ ID NO: 15.

In one embodiment, there is provided an anti-albumin sdAb moiety comprising a CDR1 comprising the amino acid sequence of SEQ ID NO: 16, or a variant thereof comprising up to about 3 (such as 1, 2, or 3) amino acid substitutions; a CDR2 comprising the amino acid sequence of SEQ ID NO: 17, or a variant thereof comprising up to about 3 (such as 1, 2, or 3) amino acid substitutions; and a CDR3 comprising the amino acid sequence of SEQ ID NO: 18, or a variant thereof comprising up to about 3 (such as 1, 2, or 3) amino acid substitutions.

In another embodiment, there is provided an anti-albumin sdAb moiety comprising a CDR1 comprising the amino acid sequence of SEQ ID NO: 16; a CDR2 comprising the amino acid sequence of SEQ ID NO: 17; and a CDR3 comprising the amino acid sequence of SEQ ID NO: 18; or a variant thereof comprising up to about 3 (such as 1, 2, or 3) amino acid substitutions in the CDR regions. In certain embodiments, the amino acid substitution(s) is in CDR1 and/or CDR2.

In yet another embodiment, there is provided an anti-albumin sdAb moiety comprising a CDR1 comprising the amino acid sequence of SEQ ID NO: 16; a CDR2 comprising the amino acid sequence of SEQ ID NO: 17; and a CDR3 comprising the amino acid sequence of SEQ ID NO: 18.

In one embodiment, there is provided an anti-albumin sdAb moiety comprising a CDR1 comprising the amino acid sequence of SEQ ID NO: 19, or a variant thereof comprising up to about 3 (such as 1, 2, or 3) amino acid substitutions; a CDR2 comprising the amino acid sequence of SEQ ID NO: 20, or a variant thereof comprising up to about 3 (such as 1, 2, or 3) amino acid substitutions; and a CDR3 comprising the amino acid sequence of SEQ ID NO: 21, or a variant thereof comprising up to about 3 (such as 1, 2, or 3) amino acid substitutions.

In another embodiment, there is provided an anti-albumin sdAb moiety comprising a CDR1 comprising the amino acid sequence of SEQ ID NO: 19; a CDR2 comprising the amino acid sequence of SEQ ID NO: 20; and a CDR3 comprising the amino acid sequence of SEQ ID NO: 21; or a variant thereof comprising up to about 3 (such as 1, 2, or 3) amino acid substitutions in the CDR regions. In certain embodiments, the amino acid substitution(s) is in CDR1 and/or CDR2.

In yet another embodiment, there is provided an anti-albumin sdAb moiety comprising a CDR1 comprising the amino acid sequence of SEQ ID NO: 19; a CDR2 comprising the amino acid sequence of SEQ ID NO: 20; and a CDR3 comprising the amino acid sequence of SEQ ID NO: 21.

In one embodiment, there is provided an anti-albumin sdAb moiety comprising a CDR1 comprising the amino acid sequence of SEQ ID NO: 22, or a variant thereof comprising up to about 3 (such as 1, 2, or 3) amino acid substitutions; a CDR2 comprising the amino acid sequence of SEQ ID NO: 23, or a variant thereof comprising up to about 3 (such as 1, 2, or 3) amino acid substitutions; and a CDR3 comprising the amino acid sequence of SEQ ID NO: 24, or a variant thereof comprising up to about 3 (such as 1, 2, or 3) amino acid substitutions.

In another embodiment, there is provided an anti-albumin sdAb moiety comprising a CDR1 comprising the amino acid sequence of SEQ ID NO: 22; a CDR2 comprising the amino acid sequence of SEQ ID NO: 23; and a CDR3 comprising the amino acid sequence of SEQ ID NO: 24; or a variant thereof comprising up to about 3 (such as 1, 2, or 3) amino acid substitutions in the CDR regions. In certain embodiments, the amino acid substitution(s) is in CDR1 and/or CDR2.

In yet another embodiment, there is provided an anti-albumin sdAb moiety comprising a CDR1 comprising the amino acid sequence of SEQ ID NO: 22; a CDR2 comprising the amino acid sequence of SEQ ID NO: 23; and a CDR3 comprising the amino acid sequence of SEQ ID NO: 24.

In one embodiment, there is provided an anti-albumin sdAb moiety comprising a CDR1 comprising the amino acid sequence of SEQ ID NO: 25, or a variant thereof comprising up to about 3 (such as 1, 2, or 3) amino acid substitutions; a CDR2 comprising the amino acid sequence of SEQ ID NO: 26, or a variant thereof comprising up to about 3 (such as 1, 2, or 3) amino acid substitutions; and a CDR3 comprising the amino acid sequence of SEQ ID NO: 27, or a variant thereof comprising up to about 3 (such as 1, 2, or 3) amino acid substitutions.

In another embodiment, there is provided an anti-albumin sdAb moiety comprising a CDR1 comprising the amino acid sequence of SEQ ID NO: 25; a CDR2 comprising the amino acid sequence of SEQ ID NO: 26; and a CDR3 comprising the amino acid sequence of SEQ ID NO: 27; or a variant thereof comprising up to about 3 (such as 1, 2, or 3) amino acid substitutions in the CDR regions. In certain embodiments, the amino acid substitution(s) is in CDR1 and/or CDR2.

In yet another embodiment, there is provided an anti-albumin sdAb moiety comprising a CDR1 comprising the amino acid sequence of SEQ ID NO: 25; a CDR2 comprising the amino acid sequence of SEQ ID NO: 26; and a CDR3 comprising the amino acid sequence of SEQ ID NO: 27.

In one embodiment, there is provided an anti-albumin sdAb moiety comprising a CDR1 comprising the amino acid sequence of SEQ ID NO: 28, or a variant thereof comprising up to about 3 (such as 1, 2, or 3) amino acid substitutions; a CDR2 comprising the amino acid sequence of SEQ ID NO: 29, or a variant thereof comprising up to about 3 (such as 1, 2, or 3) amino acid substitutions; and a CDR3 comprising the amino acid sequence of SEQ ID NO: 30, or a variant thereof comprising up to about 3 (such as 1, 2, or 3) amino acid substitutions.

In another embodiment, there is provided an anti-albumin sdAb moiety comprising a CDR1 comprising the amino acid sequence of SEQ ID NO: 28; a CDR2 comprising the amino acid sequence of SEQ ID NO: 29; and a CDR3 comprising the amino acid sequence of SEQ ID NO: 30; or a variant thereof comprising up to about 3 (such as 1, 2, or 3) amino acid substitutions in the CDR regions. In certain embodiments, the amino acid substitution(s) is in CDR1 and/or CDR2.

In yet another embodiment, there is provided an anti-albumin sdAb moiety comprising a CDR1 comprising the amino acid sequence of SEQ ID NO: 28; a CDR2 comprising the amino acid sequence of SEQ ID NO: 29; and a CDR3 comprising the amino acid sequence of SEQ ID NO: 30.

In one embodiment, there is provided an anti-albumin sdAb moiety comprising a CDR1 comprising the amino acid sequence of SEQ ID NO: 31, or a variant thereof comprising up to about 3 (such as 1, 2, or 3) amino acid substitutions; a CDR2 comprising the amino acid sequence of SEQ ID NO: 32, or a variant thereof comprising up to about 3 (such as 1, 2, or 3) amino acid substitutions; and a CDR3 comprising the amino acid sequence of SEQ ID NO: 33, or a variant thereof comprising up to about 3 (such as 1, 2, or 3) amino acid substitutions.

In another embodiment, there is provided an anti-albumin sdAb moiety comprising a CDR1 comprising the amino acid sequence of SEQ ID NO: 31; a CDR2 comprising the amino acid sequence of SEQ ID NO: 32; and a CDR3 comprising the amino acid sequence of SEQ ID NO: 33; or a variant thereof comprising up to about 3 (such as 1, 2, or 3) amino acid substitutions in the CDR regions. In certain embodiments, the amino acid substitution(s) is in CDR1 and/or CDR2.

In yet another embodiment, there is provided an anti-albumin sdAb moiety comprising a CDR1 comprising the amino acid sequence of SEQ ID NO: 31; a CDR2 comprising the amino acid sequence of SEQ ID NO: 32; and a CDR3 comprising the amino acid sequence of SEQ ID NO: 33.

In one embodiment, there is provided an anti-albumin sdAb moiety comprising a CDR1 comprising the amino acid sequence of SEQ ID NO: 34, or a variant thereof comprising up to about 3 (such as 1, 2, or 3) amino acid substitutions; a CDR2 comprising the amino acid sequence of SEQ ID NO: 35, or a variant thereof comprising up to about 3 (such as 1, 2, or 3) amino acid substitutions; and a CDR3 comprising the amino acid sequence of SEQ ID NO: 36, or a variant thereof comprising up to about 3 (such as 1, 2, or 3) amino acid substitutions.

In another embodiment, there is provided an anti-albumin sdAb moiety comprising a CDR1 comprising the amino acid sequence of SEQ ID NO: 34; a CDR2 comprising the amino acid sequence of SEQ ID NO: 35; and a CDR3 comprising the amino acid sequence of SEQ ID NO: 36; or a variant thereof comprising up to about 3 (such as 1, 2, or 3) amino acid substitutions in the CDR regions. In certain embodiments, the amino acid substitution(s) is in CDR1 and/or CDR2.

In yet another embodiment, there is provided an anti-albumin sdAb moiety comprising a CDR1 comprising the amino acid sequence of SEQ ID NO: 34; a CDR2 comprising the amino acid sequence of SEQ ID NO: 35; and a CDR3 comprising the amino acid sequence of SEQ ID NO: 36.

In yet another embodiment, there is provided an anti-albumin sdAb moiety comprising a CDR1 comprising the amino acid sequence of SEQ ID NO: 116, 118, 121, 124, 129, 132, 135, or 138, or a variant thereof comprising up to about 3, in one embodiment, 1, 2, or 3, amino acid substitutions; a CDR2 comprising the amino acid sequence of SEQ ID NO: 35, 119, 122, 125, 127, 130, 133, 136, or 139, or a variant thereof comprising up to about 3, in one embodiment, 1, 2, or 3, amino acid substitutions; and a CDR3 comprising the amino acid sequence of SEQ ID NO: 117, 120, 123, 126, 128, 131, 134, 137, or 140, or a variant thereof comprising up to about 3, in one embodiment, 1, 2, or 3, amino acid substitutions.

In yet another embodiment, there is provided an anti-albumin sdAb moiety comprising a CDR1 comprising the amino acid sequence of SEQ ID NO: 116, 118, 121, 124, 129, 132, 135, or 138; a CDR2 comprising the amino acid sequence of SEQ ID NO: 35, 119, 122, 125, 127, 130, 133, 136, or 139; and a CDR3 comprising the amino acid sequence of SEQ ID NO: 117, 120, 123, 126, 128, 131, 134, 137, or 140; or a variant thereof comprising up to about 3, in one embodiment, 1, 2, or 3, amino acid substitutions in the CDR regions. In certain embodiments, the amino acid substitution(s) is in CDR1 and/or CDR2.

In yet another embodiment, there is provided an anti-albumin sdAb moiety comprising a CDR1 comprising the amino acid sequence of SEQ ID NO: 116, 118, 121, 124, 129, 132, 135, or 138; a CDR2 comprising the amino acid sequence of SEQ ID NO: 35, 119, 122, 125, 127, 130, 133, 136, or 139; and a CDR3 comprising the amino acid sequence of SEQ ID NO: 117, 120, 123, 126, 128, 131, 134, 137, or 140.

In one embodiment, there is provided an anti-albumin sdAb moiety comprising a CDR1 comprising the amino acid sequence of SEQ ID NO: 116, or a variant thereof comprising up to about 3, in one embodiment, 1, 2, or 3, amino acid substitutions; a CDR2 comprising the amino acid sequence of SEQ ID NO: 35, or a variant thereof comprising up to about 3, in one embodiment, 1, 2, or 3, amino acid substitutions; and a CDR3 comprising the amino acid sequence of SEQ ID NO: 117, or a variant thereof comprising up to about 3, in one embodiment, 1, 2, or 3, amino acid substitutions.

In another embodiment, there is provided an anti-albumin sdAb moiety comprising a CDR1 comprising the amino acid sequence of SEQ ID NO: 116; a CDR2 comprising the amino acid sequence of SEQ ID NO: 35; and a CDR3 comprising the amino acid sequence of SEQ ID NO: 117; or a variant thereof comprising up to about 3, in one embodiment, 1, 2, or 3, amino acid substitutions in the CDR regions. In certain embodiments, the amino acid substitution(s) is in CDR1 and/or CDR2.

In yet another embodiment, there is provided an anti-albumin sdAb moiety comprising a CDR1 comprising the amino acid sequence of SEQ ID NO: 116; a CDR2 comprising the amino acid sequence of SEQ ID NO: 35; and a CDR3 comprising the amino acid sequence of SEQ ID NO: 117.

In one embodiment, there is provided an anti-albumin sdAb moiety comprising a CDR1 comprising the amino acid sequence of SEQ ID NO: 118, or a variant thereof comprising up to about 3, in one embodiment, 1, 2, or 3, amino acid substitutions; a CDR2 comprising the amino acid sequence of SEQ ID NO: 119, or a variant thereof comprising up to about 3, in one embodiment, 1, 2, or 3, amino acid substitutions; and a CDR3 comprising the amino acid sequence of SEQ ID NO: 120, or a variant thereof comprising up to about 3, in one embodiment, 1, 2, or 3, amino acid substitutions.

In another embodiment, there is provided an anti-albumin sdAb moiety comprising a CDR1 comprising the amino acid sequence of SEQ ID NO: 118; a CDR2 comprising the amino acid sequence of SEQ ID NO: 119; and a CDR3 comprising the amino acid sequence of SEQ ID NO: 120; or a variant thereof comprising up to about 3, in one embodiment, 1, 2, or 3, amino acid substitutions in the CDR regions. In certain embodiments, the amino acid substitution(s) is in CDR1 and/or CDR2.

In yet another embodiment, there is provided an anti-albumin sdAb moiety comprising a CDR1 comprising the amino acid sequence of SEQ ID NO: 118; a CDR2 comprising the amino acid sequence of SEQ ID NO: 119; and a CDR3 comprising the amino acid sequence of SEQ ID NO: 120.

In one embodiment, there is provided an anti-albumin sdAb moiety comprising a CDR1 comprising the amino acid sequence of SEQ ID NO: 121, or a variant thereof comprising up to about 3, in one embodiment, 1, 2, or 3, amino acid substitutions; a CDR2 comprising the amino acid sequence of SEQ ID NO: 122, or a variant thereof comprising up to about 3, in one embodiment, 1, 2, or 3, amino acid substitutions; and a CDR3 comprising the amino acid sequence of SEQ ID NO: 123, or a variant thereof comprising up to about 3, in one embodiment, 1, 2, or 3, amino acid substitutions.

In another embodiment, there is provided an anti-albumin sdAb moiety comprising a CDR1 comprising the amino acid sequence of SEQ ID NO: 121; a CDR2 comprising the amino acid sequence of SEQ ID NO: 122; and a CDR3 comprising the amino acid sequence of SEQ ID NO: 123; or a variant thereof comprising up to about 3, in one embodiment, 1, 2, or 3, amino acid substitutions in the CDR regions. In certain embodiments, the amino acid substitution(s) is in CDR1 and/or CDR2.

In yet another embodiment, there is provided an anti-albumin sdAb moiety comprising a CDR1 comprising the amino acid sequence of SEQ ID NO: 121; a CDR2 comprising the amino acid sequence of SEQ ID NO: 122; and a CDR3 comprising the amino acid sequence of SEQ ID NO: 123.

In one embodiment, there is provided an anti-albumin sdAb moiety comprising a CDR1 comprising the amino acid sequence of SEQ ID NO: 124, or a variant thereof comprising up to about 3, in one embodiment, 1, 2, or 3, amino acid substitutions; a CDR2 comprising the amino acid sequence of SEQ ID NO: 125, or a variant thereof comprising up to about 3, in one embodiment, 1, 2, or 3, amino acid substitutions; and a CDR3 comprising the amino acid sequence of SEQ ID NO: 126, or a variant thereof comprising up to about 3, in one embodiment, 1, 2, or 3, amino acid substitutions.

In another embodiment, there is provided an anti-albumin sdAb moiety comprising a CDR1 comprising the amino acid sequence of SEQ ID NO: 124; a CDR2 comprising the amino acid sequence of SEQ ID NO: 125; and a CDR3 comprising the amino acid sequence of SEQ ID NO: 126; or a variant thereof comprising up to about 3, in one embodiment, 1, 2, or 3, amino acid substitutions in the CDR regions. In certain embodiments, the amino acid substitution(s) is in CDR1 and/or CDR2.

In yet another embodiment, there is provided an anti-albumin sdAb moiety comprising a CDR1 comprising the amino acid sequence of SEQ ID NO: 124; a CDR2 comprising the amino acid sequence of SEQ ID NO: 125; and a CDR3 comprising the amino acid sequence of SEQ ID NO: 126.

In one embodiment, there is provided an anti-albumin sdAb moiety comprising a CDR1 comprising the amino acid sequence of SEQ ID NO: 121, or a variant thereof comprising up to about 3, in one embodiment, 1, 2, or 3, amino acid substitutions; a CDR2 comprising the amino acid sequence of SEQ ID NO: 127, or a variant thereof comprising up to about 3, in one embodiment, 1, 2, or 3, amino acid substitutions; and a CDR3 comprising the amino acid sequence of SEQ ID NO: 128, or a variant thereof comprising up to about 3, in one embodiment, 1, 2, or 3, amino acid substitutions.

In another embodiment, there is provided an anti-albumin sdAb moiety comprising a CDR1 comprising the amino acid sequence of SEQ ID NO: 121; a CDR2 comprising the amino acid sequence of SEQ ID NO: 127; and a CDR3 comprising the amino acid sequence of SEQ ID NO: 128; or a variant thereof comprising up to about 3, in one embodiment, 1, 2, or 3, amino acid substitutions in the CDR regions. In certain embodiments, the amino acid substitution(s) is in CDR1 and/or CDR2.

In yet another embodiment, there is provided an anti-albumin sdAb moiety comprising a CDR1 comprising the amino acid sequence of SEQ ID NO: 121; a CDR2 comprising the amino acid sequence of SEQ ID NO: 127; and a CDR3 comprising the amino acid sequence of SEQ ID NO: 128.

In one embodiment, there is provided an anti-albumin sdAb moiety comprising a CDR1 comprising the amino acid sequence of SEQ ID NO: 121, or a variant thereof comprising up to about 3, in one embodiment, 1, 2, or 3, amino acid substitutions; a CDR2 comprising the amino acid sequence of SEQ ID NO: 122 or 127, or a variant thereof comprising up to about 3, in one embodiment, 1, 2, or 3, amino acid substitutions; and a CDR3 comprising the amino acid sequence of SEQ ID NO: 123 or 128, or a variant thereof comprising up to about 3, in one embodiment, 1, 2, or 3, amino acid substitutions.

In another embodiment, there is provided an anti-albumin sdAb moiety comprising a CDR1 comprising the amino acid sequence of SEQ ID NO: 121; a CDR2 comprising the amino acid sequence of SEQ ID NO: 122 or 127; and a CDR3 comprising the amino acid sequence of SEQ ID NO: 123 or 128; or a variant thereof comprising up to about 3, in one embodiment, 1, 2, or 3, amino acid substitutions in the CDR regions. In certain embodiments, the amino acid substitution(s) is in CDR1 and/or CDR2.

In yet another embodiment, there is provided an anti-albumin sdAb moiety comprising a CDR1 comprising the amino acid sequence of SEQ ID NO: 121; a CDR2 comprising the amino acid sequence of SEQ ID NO: 122 or 127; and a CDR3 comprising the amino acid sequence of SEQ ID NO: 123 or 128.

In one embodiment, there is provided an anti-albumin sdAb moiety comprising a CDR1 comprising the amino acid sequence of SEQ ID NO: 129, or a variant thereof comprising up to about 3, in one embodiment, 1, 2, or 3, amino acid substitutions; a CDR2 comprising the amino acid sequence of SEQ ID NO: 130, or a variant thereof comprising up to about 3, in one embodiment, 1, 2, or 3, amino acid substitutions; and a CDR3 comprising the amino acid sequence of SEQ ID NO: 131, or a variant thereof comprising up to about 3, in one embodiment, 1, 2, or 3, amino acid substitutions.

In another embodiment, there is provided an anti-albumin sdAb moiety comprising a CDR1 comprising the amino acid sequence of SEQ ID NO: 129; a CDR2 comprising the amino acid sequence of SEQ ID NO: 130; and a CDR3 comprising the amino acid sequence of SEQ ID NO: 131; or a variant thereof comprising up to about 3, in one embodiment, 1, 2, or 3, amino acid substitutions in the CDR regions. In certain embodiments, the amino acid substitution(s) is in CDR1 and/or CDR2.

In yet another embodiment, there is provided an anti-albumin sdAb moiety comprising a CDR1 comprising the amino acid sequence of SEQ ID NO: 129; a CDR2 comprising the amino acid sequence of SEQ ID NO: 130; and a CDR3 comprising the amino acid sequence of SEQ ID NO: 131.

In one embodiment, there is provided an anti-albumin sdAb moiety comprising a CDR1 comprising the amino acid sequence of SEQ ID NO: 132, or a variant thereof comprising up to about 3, in one embodiment, 1, 2, or 3, amino acid substitutions; a CDR2 comprising the amino acid sequence of SEQ ID NO: 133, or a variant thereof comprising up to about 3, in one embodiment, 1, 2, or 3, amino acid substitutions; and a CDR3 comprising the amino acid sequence of SEQ ID NO: 134, or a variant thereof comprising up to about 3, in one embodiment, 1, 2, or 3, amino acid substitutions.

In another embodiment, there is provided an anti-albumin sdAb moiety comprising a CDR1 comprising the amino acid sequence of SEQ ID NO: 132; a CDR2 comprising the amino acid sequence of SEQ ID NO: 133; and a CDR3 comprising the amino acid sequence of SEQ ID NO: 134; or a variant thereof comprising up to about 3, in one embodiment, 1, 2, or 3, amino acid substitutions in the CDR regions. In certain embodiments, the amino acid substitution(s) is in CDR1 and/or CDR2.

In yet another embodiment, there is provided an anti-albumin sdAb moiety comprising a CDR1 comprising the amino acid sequence of SEQ ID NO: 132; a CDR2 comprising the amino acid sequence of SEQ ID NO: 133; and a CDR3 comprising the amino acid sequence of SEQ ID NO: 134.

In one embodiment, there is provided an anti-albumin sdAb moiety comprising a CDR1 comprising the amino acid sequence of SEQ ID NO: 135, or a variant thereof comprising up to about 3, in one embodiment, 1, 2, or 3, amino acid substitutions; a CDR2 comprising the amino acid sequence of SEQ ID NO: 136, or a variant thereof comprising up to about 3, in one embodiment, 1, 2, or 3, amino acid substitutions; and a CDR3 comprising the amino acid sequence of SEQ ID NO: 137, or a variant thereof comprising up to about 3, in one embodiment, 1, 2, or 3, amino acid substitutions.

In another embodiment, there is provided an anti-albumin sdAb moiety comprising a CDR1 comprising the amino acid sequence of SEQ ID NO: 135; a CDR2 comprising the amino acid sequence of SEQ ID NO: 136; and a CDR3 comprising the amino acid sequence of SEQ ID NO: 137; or a variant thereof comprising up to about 3, in one embodiment, 1, 2, or 3, amino acid substitutions in the CDR regions. In certain embodiments, the amino acid substitution(s) is in CDR1 and/or CDR2.

In yet another embodiment, there is provided an anti-albumin sdAb moiety comprising a CDR1 comprising the amino acid sequence of SEQ ID NO: 135; a CDR2 comprising the amino acid sequence of SEQ ID NO: 136; and a CDR3 comprising the amino acid sequence of SEQ ID NO: 137.

In one embodiment, there is provided an anti-albumin sdAb moiety comprising a CDR1 comprising the amino acid sequence of SEQ ID NO: 138, or a variant thereof comprising up to about 3, in one embodiment, 1, 2, or 3, amino acid substitutions; a CDR2 comprising the amino acid sequence of SEQ ID NO: 139, or a variant thereof comprising up to about 3, in one embodiment, 1, 2, or 3, amino acid substitutions; and a CDR3 comprising the amino acid sequence of SEQ ID NO: 140, or a variant thereof comprising up to about 3, in one embodiment, 1, 2, or 3, amino acid substitutions.

In another embodiment, there is provided an anti-albumin sdAb moiety comprising a CDR1 comprising the amino acid sequence of SEQ ID NO: 138; a CDR2 comprising the amino acid sequence of SEQ ID NO: 139; and a CDR3 comprising the amino acid sequence of SEQ ID NO: 140; or a variant thereof comprising up to about 3, in one embodiment, 1, 2, or 3, amino acid substitutions in the CDR regions. In certain embodiments, the amino acid substitution(s) is in CDR1 and/or CDR2.

In yet another embodiment, there is provided an anti-albumin sdAb moiety comprising a CDR1 comprising the amino acid sequence of SEQ ID NO: 138; a CDR2 comprising the amino acid sequence of SEQ ID NO: 139; and a CDR3 comprising the amino acid sequence of SEQ ID NO: 140.

In one embodiment, there is provided an anti-albumin sdAb moiety comprising a $V_HH$ domain comprising the amino acid sequence of any one of SEQ ID NOs: 1-9, 45-53, 99-101, 103-115, 149, and 150, or a variant thereof having at least about 80%, at least about 85%, at least about 90%, at least about 91%, at least about 92%, at least about 93%, at least about 94%, at least about 95%, at least about 96%, at least about 97%, at least about 98%, or at least about 99% sequence identity to any one of SEQ ID NOs: 1-9, 45-53, 99-101, 103-115, 149, and 150.

In another embodiment, there is provided an anti-albumin sdAb moiety comprising a $V_HH$ domain comprising the amino acid sequence of any one of SEQ ID NOs: 1-9, 45-53, 99-101, 103-115, 149, and 150, or a variant thereof comprising up to about 3, in one embodiment, 1, 2, or 3, amino acid substitutions in the $V_HH$ domain.

In yet another embodiment, there is provided an anti-albumin sdAb moiety comprising a $V_HH$ domain comprising the amino acid sequence of any one of SEQ ID NOs: 1-9, 45-53, and 105-115, or a variant thereof having at least about 80%, at least about 85%, at least about 90%, at least about 91%, at least about 92%, at least about 93%, at least about 94%, at least about 95%, at least about 96%, at least about 97%, at least about 98%, or at least about 99% sequence identity to any one of SEQ ID NOs: 1-9, 45-53, and 105-115.

In yet another embodiment, there is provided an anti-albumin sdAb moiety comprising a $V_HH$ domain comprising the amino acid sequence of any one of SEQ ID NOs: 1-9, 45-53, and 105-115, or a variant thereof comprising up to about 3, in one embodiment, 1, 2, or 3, amino acid substitutions in the $V_HH$ domain.

In yet another embodiment, there is provided an anti-albumin sdAb moiety comprising a $V_HH$ domain comprising the amino acid sequence of any one of SEQ ID NOs: 1-9 and 45-53, or a variant thereof having at least about 80% (such as at least 80%, 85%, 90%, 91%, 92%, 93%, 94%, 95%, 96%, 97%, 98%, or 99%) sequence identity to any one of SEQ ID NOs: 1-9 and 45-53.

In yet another embodiment, there is provided an anti-albumin sdAb moiety comprising a V$_H$H domain comprising the amino acid sequence of any one of SEQ ID NOs: 1-9 and 45-53, or a variant thereof comprising up to about 3 (such as 1, 2, or 3) amino acid substitutions in the V$_H$H domain.

In one embodiment, the anti-albumin sdAb moiety comprising a V$_H$H domain comprising the amino acid sequence of any one of SEQ ID NOs: 1-9 and 45-53, or a variant thereof comprises amino acid substitution(s) in CDRs, such as the CDR1, and/or the CDR2, and/or the CDR3 of any one of SEQ ID NOs: 1-9 and 45-53.

In another embodiment, the anti-albumin sdAb moiety comprising a V$_H$H domain comprising the amino acid sequence of any one of SEQ ID NOs: 1-9 and 45-53, or a variant thereof comprises CDR1, CDR2, and CDR3 of any one of SEQ ID NOs: 1-9 and 45-53, and the amino acid substitution(s) is in FRs, such as the FR1, and/or the FR2, and/or the FR3, and/or the FR4 of any one of SEQ ID NOs: 1-9 and 45-53.

In yet another embodiment, the anti-albumin sdAb moiety comprising a V$_H$H domain comprising the amino acid sequence of any one of SEQ ID NOs: 1-9 and 45-53, or a variant thereof comprises amino acid substitutions in both CDRs and FRs.

In yet another embodiment, there is provided an anti-albumin sdAb moiety comprising a V$_H$H domain comprising the amino acid sequence of any one of SEQ ID NOs: 1-9 and 45-53.

In yet another embodiment, there is provided an anti-albumin sdAb moiety comprising CDR1. CDR2, and CDR3 of any one of SEQ ID NO: 1-9 and 45-53.

In yet another embodiment, there is provided an anti-albumin sdAb moiety comprising a V$_H$H domain comprising the amino acid sequence of any one of SEQ ID NOs: 105-115, or a variant thereof having at least about 80%, at least about 85%, at least about 90%, at least about 91%, at least about 92%, at least about 93%, at least about 94%, at least about 95%, at least about 96%, at least about 97%, at least about 98%, or at least about 99% sequence identity to any one of SEQ ID NOs: 105-115.

In yet another embodiment, there is provided an anti-albumin sdAb moiety comprising a V$_H$H domain comprising the amino acid sequence of any one of SEQ ID NOs: 105-115, or a variant thereof comprising up to about 3, in one embodiment, 1, 2, or 3, amino acid substitutions in the V$_H$H domain.

In one embodiment, the anti-albumin sdAb moiety comprising a V$_H$H domain comprising the amino acid sequence of any one of SEQ ID NOs: 105-115, or a variant thereof comprises amino acid substitution(s) in CDRs, such as the CDR1, and/or the CDR2, and/or the CDR3 of any one of SEQ ID NOs: 105-115.

In another embodiment, the anti-albumin sdAb moiety comprising a V$_H$H domain comprising the amino acid sequence of any one of SEQ ID NOs: 105-115, or a variant thereof comprises CDR1, CDR2, and CDR3 of any one of SEQ ID NOs: 105-115, and the amino acid substitution(s) is in FRs, such as the FR1, and/or the FR2, and/or the FR3, and/or the FR4 of any one of SEQ ID NOs: 105-115.

In yet another embodiment, the anti-albumin sdAb moiety comprising a V$_H$H domain comprising the amino acid sequence of any one of SEQ ID NOs: 105-115, or a variant thereof comprises amino acid substitutions in both CDRs and FRs.

In yet another embodiment, there is provided an anti-albumin sdAb moiety comprising a V$_H$H domain comprising the amino acid sequence of any one of SEQ ID NOs: 105-115.

In still another embodiment, there is provided an anti-albumin sdAb moiety comprising CDR1. CDR2, and CDR3 of any one of SEQ ID NO: 105-115.

In certain embodiments, the anti-albumin sdAb moiety is camelid, chimeric, human, partially humanized, or fully humanized.

Single-Domain Antibodies

In one embodiment, an anti-albumin construct described herein is an anti-albumin sdAb.

Exemplary sdAbs include, but are not limited to, heavy chain variable domains from heavy-chain only antibodies (e.g., V$_H$H (the variable domain of the heavy chain of a heavy chain antibody) in Camelidae or V$_{NAR}$ (the variable domain of a shark new antigen receptor) in a cartilaginous fish), single domains (such as V$_H$ or V$_L$) derived from conventional 4-chain antibodies, humanized heavy-chain only antibodies, and human single-domain antibodies produced by transgenic mice or rats expressing human heavy chain segments.

In certain embodiments, an sdAb described herein is derived from a mouse, rat, human, camel, llama, lamprey, fish, shark, goat, rabbit, or bovine.

In certain embodiments, an sdAb described herein is derived from a naturally occurring single-domain antigen binding molecule known as heavy chain antibody devoid of light chains, which is also known as a heavy chain-only antibody or "HCAb." See, e.g., WO 94/04678 and Hamers-Casterman et al., *Nature* 363:446-448 (1993). For clarity, the variable domain derived from a heavy chain molecule naturally devoid of light chain is known herein as a V$_H$H to distinguish it from the conventional V$_H$ of a four-chain immunoglobulin. In certain embodiments, a V$_H$H is derived from an antibody raised in a Camelidae species, for example, a camel, llama, vicuna, dromedary, alpaca, or guanaco.

In certain embodiments, an sdAb described herein is derived from the variable region of an immunoglobulin found in a cartilaginous fish. In certain embodiments, an sdAb described herein is derived from the immunoglobulin isotype known as a Novel Antigen Receptor (NAR) found in the serum of shark. Methods of producing a single domain antibody derived from a variable region of a NAR ("Ig-NARs") are described in WO 03/014161 and Streltsov, *Protein Sci.* 14:2901-2909 (2005).

In certain embodiments, an sdAb described herein is recombinant, CDR-grafted, humanized, camelized, de-immunized, or in vitro generated (e.g., selected by phage display). In certain embodiments, the amino acid sequence of the framework regions of the sdAb is altered by "camelization" of specific amino acid residues in the framework regions. Camelization refers to the replacement or substitution of one or more amino acid residues in the amino acid sequence of a (naturally occurring) V$_H$ domain from a conventional 4-chain antibody by one or more of the amino acid residues that occur at the corresponding position(s) in a V$_H$H domain of a heavy chain antibody. Such "camelizing" substitutions are preferably inserted at amino acid positions that form and/or are present at the V$_H$—V$_L$ interface and/or at the so-called Camelidae hallmark residues as defined herein. See, e.g., WO 94/04678, Davies and Riechmann, *FEBS Lett.* 339:285-290 (1994); Davies and Riechmann, *Protein Engin.* 9:531-537 (1996); Riechmann, *J. Mol.*

Biol. 259:957-969 (1996); and Riechmann and Muyldermans, *J. Immunol. Methods* 231:25-38 (1999).

In certain embodiments, an sdAb described herein is a human sdAb produced by a transgenic mouse or rat expressing a human heavy chain segment. See, e.g., US 2009/0307787A1, US 2015/0289489A1, US2010/0122358A1, U.S. Pat. No. 8,754,287, and WO 2004/049794. In certain embodiments, an sdAb described herein is affinity-matured.

In certain embodiments, an sdAb described herein comprising a naturally occurring $V_HH$ domain against a particular antigen or target is obtained from a naïve or immune library of Camelid $V_HH$ sequences. See, e.g., WO 99/37681, WO 01/90190, WO 03/025020, and WO 03/035694. In certain embodiments, an improved synthetic or semi-synthetic library derived from a naïve or immune $V_HH$ library is used, for example, a $V_HH$ library obtained from a naïve or immune $V_HH$ library by techniques such as random mutagenesis and/or CDR shuffling. See, e.g., WO 00/43507.

In certain embodiments, an sdAb described herein is generated from a conventional 4-chain antibody. See, e.g., EP 0 368 684; WO 06/030220; WO 06/003388; Ward et al., *Nature* 341:544-546 (1989); and Holt et al., *Trends Biotechnol.* 21:484-490 (2003).

Because of the unique properties of an sdAb, using a $V_HH$ domain as a single antigen-binding protein or domain (i.e., as a part of a larger protein, polypeptide, or construct) offers a number of significant advantages over a conventional $V_H$ and $V_L$, scFv, and a conventional antibody fragment (such as Fab or (Fab')$_2$): 1) only a single domain is required to bind to an antigen with a high affinity, eliminating the need to have a second domain and to assure that these two domains are present in the correct spatial conformation and configuration (e.g., no need to pair a heavy chain and light chain during folding or no need to use a specially designed linker such as one for scFv); 2) a $V_HH$ domain or sdAb can be expressed from a single gene, eliminating the need for post-translational folding or modifications; 3) a $V_HH$ domain or sdAb can be easily engineered into multivalent and/or multispecific formats (such as an anti-albumin construct those described herein); 4) a $V_HH$ domain or sdAb is highly soluble, thus reducing its tendency to aggregate (as compared with, e.g., a mouse-derived "dAb" described by Ward et al., Nature 341:544-546 (1989)); 5) a $V_HH$ domain or sdAb is highly stable against heat, pH, or a protease; 6) a $V_HH$ domain or sdAb is readily and relatively inexpensive to prepare or produce even in a large scale, such as using microbial fermentation, eliminating the need to use mammalian expression system (as required by production of, for example, a conventional antibody fragment); 7) a $V_HH$ domain or sdAb is relatively small (approximately 15 kDa or 10 times smaller than a conventional IgG) as compared to a conventional 4-chain antibody and an antigen-binding fragment thereof, and thus has a high(er) tissue penetration ability, e.g., for solid tumors and dense tissues; and 8) a $V_HH$ domain or sdAb can exhibit a so-called "cavity-binding property" (due to its extended CDR3 loop compared to that of a conventional $V_H$ domain) and can therefore get access to a target or epitope that is not accessible to a conventional 4-chain antibody or antigen-binding fragment thereof. For example, it has been shown that a $V_HH$ domain or sdAb can inhibit an enzyme. See, e.g., WO 1997/049805; Transue et al., *Proteins* 32:515-522 (1998); Lauwereys et al., *EMBO J.* 17:3512-3520 (1998).

Albumin

An albumin (e.g., a human serum albumin or an HSA) has been used to increase the serum half-life of biological drugs. See, e.g., Dennis et al., *J. Biol. Chem.* 277:35035-35043 (2002); Adams et al., *MABS* 8:1336-1346 (2016). For example, an HSA has been utilized. An HSA is the most abundant protein in blood and widely distributed in tissues and has a non-acute function. It has a half-life of 19 days. Therefore, in one embodiment, an albumin (e.g., an HSA) is used herein to increase the half-life of a drug (such as an anti-albumin construct described herein).

In certain embodiments, the albumin is selected from the group consisting of an HSA, a rhesus serum albumin (RhSA), a cynomolgous monkey serum albumin (CySA), and a murine serum albumin (MuSA). In certain embodiments, the albumin is an HSA.

A few isoforms of an HSA are listed in Table 2 below. See UniProtKB-P02768 (ALBU_HUMAN). In certain embodiments, an anti-albumin construct provided herein binds to SEQ ID NO: 54, 55, 56, or 57.

TABLE 2

| Isoforms of Human Serine Albumin | |
|---|---|
| Type | Amino Acid Sequence |
| Isoform 1 | MKWVTFISLLFLFSSAYSRG VFRRDAHKSEVAHRFKDLGE ENFKALVLIAFAQYLQQCPF EDHVKLVNEVTEFAKTCVAD ESAENCDKSLHTLFGDKLCT VATLRETYGEMADCCAKQEP ERNECFLQHKDDNPNLPRLV RPEVDVMCTAFHDNEETFLK KYLYEIARRHPYFYAPELLF FAKRYKAAFTECCQAADKAA CLLPKLDELRDEGKASSAKQ RLKCASLQKFGERAFKAWAV ARLSQRFPKAEFAEVSKLVT DLTKVHTECCHGDLLECADD RADLAKYICENQDSISSKLK ECCEKPLLEKSHCIAEVEND EMPADLPSLAADFVESKDVC KNYAEAKDVFLGMFLYEYAR RHPDYSVVLLLRLAKTYETT LEKCCAAADPHECYAKVFDE FKPLVEEPQNLIKQNCELFE QLGEYKFQNALLVRYTKKVP QVSTPTLVEVSRNLGKVGSK CCKHPEAKRMPCAEDYLSVV LNQLCVLHEKTPVSDRVTKC CTESLVNRRPCFSALEVDET YVPKEFNAETFTFHADICTL SEKERQIKKQTALVELVKHK PKATKEQLKAVMDDFAAFVE KCCKADDKETCFAEEGKKLV AASQAALGL (SEQ ID NO: 54) |
| Isoform 2 | MKWVTFISLLFLFSSAYSRG VFRRDAHKSEVAHRFKDLGE ENFKAWAVARLSQRFPKAEF AEVSKLVTDLTKVHTECCHG DLLECADDRADLAKYICENQ DSISSKLKECCEKPLLEKSH CIAEVENDEMPADLPSLAAD FVESKDVCKNYAEAKDVFLG MFLYEYARRHPDYSVVLLLR LAKTYETTLEKCCAAADPHE CYAKVFDEFKPLVEEPQNLI KQNCELFEQLGEYKFQNALL VRYTKKVPQVSTPTLVEVSR NLGKVGSKCCKHPEAKRMPC AEDYLSVVLNQLCVLHEKTP VSDRVTKCCTESLVNRRPCF SALEVDETYVPKEFNAETFT FHADICTLSEKERQIKKQTA LVELVKHKPKATKEQLKAVM DDFAAFVEKCCKADDKETCF AEEGKKLVAASQAALGL (SEQ ID NO: 55) |

TABLE 2-continued

Isoforms of Human Serine Albumin

| Type | Amino Acid Sequence |
|---|---|
| Isoform 3 | MKWVTFISLLFLFSSAYSRG VFRRDAHKSEVAHRFKDLGE ENFKALVLIAFAQYLQQCPF EDHVKLVNEVTEFAKTCVAD ESAENCDKSLHTLFGDKLCT VATLRETYGEMADCCAKQEP ERNECFLQHKDDNPNLPRLV RPEVDVMCTAFHDNEETFLK KYLYETTLEKCCAAADPHEC YAKVFDEFKPLVEEPQNLIK QNCELFEQLGEYKFQNALLV RYTKKVPQVSTPTLVEVSRN LGKVGSKCCKHPEAKRMPCA EDYLSVVLNQLCVLHEKTPV SDRVTKCCTESLVNRRPCFS ALEVDETYVPKEFNAETFTF HADICTLSEKERQIKKQTAL VELVKHKPKATKEQLKAVMD DFAAFVEKCCKADDKETCFA EEGKKLVAASQAALGL (SEQ ID NO: 56) |
| Mature HSA | DAHKSEVAHRFKDLGEENFK ALVLIAFAQYLQQCPFEDHV KLVNEVTEFAKTCVADESAE NCDKSLHTLFGDKLCTVATL RETYGEMADCCAKQEPERNE CFLQHKDDNPNLPRLVRPEV DVMCTAFHDNEETFLKKYLY EIARRHPYFYAPELLFFAKR YKAAFTECCQAADKAACLLP KLDELRDEGKASSAKQGLKC ASLQKFGERAFKAWAVARLS QRFPKAEFAEVSKLVTDLTK VHTECCHGDLLECADDRADL AKYICENQDSISSKLKECCE KPLLEKSHCIAEVENDEMPA DLPSLAADFVGSKDVCKNYA EAKDVFLGMFLYEYARRHPD YSVVLLLRLAKTYETTLEKC CAAADPHECYAKVFDEFKPL VEEPQNLIKQNCELFEQLGE YKFQNALLVRYTKKVPQVST PTLVEVSRNLGKVGSKCCKH PEAKRMPCAEDCLSVFLNQL CVLHEKTPVSDRVTKCCTES LVNGRPCFSALEVDETYVPK EFNAETFTFHADICTLSEKE RQIKKQTALVELVKHKPKAT KEQLKAVMDDFAAFVEKCCK ADDKETCFAEEGKKLVAASQ AALGL (SEQ ID NO: 57) |

In certain embodiments, an HSA is at least 90% identical to the amino acid sequence of SEQ ID NO: 54, 55, 56, or 57. In certain embodiments, an HSA is at least about 95%, at least about 96%, at least about 97%, at least about 98%, or at least about 99% identical to the amino acid sequence of SEQ ID NO: 54, 55, 56, or 57. In certain embodiments, an HSA has no more than 10 amino acid differences from SEQ ID NO: 54, 55, 56, or 57. In certain embodiments, an HSA has no more than 5, 4, 3, 2, or 1 amino acid difference(s) from SEQ ID NO: 54, 55, 56, or 57. In certain embodiments, an HSA differs from SEQ ID NO: 54, 55, 56, or 57 by having, for example, conserved mutations or mutations in non-conserved regions and has substantially the same biological function as the HSA of SEQ ID NO: 54, 55, 56, or 57.

In certain embodiments, an anti-albumin construct described herein binds to any one of the albumins described above. In certain embodiments, the anti-albumin construct binds to an albumin of SEQ ID NO: 54, 55, 56, or 57.

Chimeric or Humanized Antibodies

In certain embodiments, an anti-albumin sdAb moiety described herein is a chimeric antibody. Certain chimeric antibodies are described, e.g., in U.S. Pat. No. 4,816,567; and Morrison et al., *Proc. Natl. Acad. Sci. U.S.A.* 81:6851-6855 (1984). In one embodiment, a chimeric antibody comprises a non-human variable region (e.g., a variable region derived from a camelid species, such as llama) and a human constant region. In another embodiment, a chimeric antibody is a "class switched" antibody, in which the class or subclass has been changed from that of its parent antibody. A chimeric antibody encompasses antigen-binding fragments thereof.

In certain embodiments, a chimeric antibody is a humanized antibody. Typically, a non-human antibody is humanized to reduce immunogenicity to humans, while retaining the specificity and affinity of the parental non-human antibody. Generally, a humanized antibody comprises one or more variable domains, in which HVRs, e.g., CDRs, (or portions thereof) are derived from a non-human antibody, and FRs (or portions thereof) are derived from human antibody sequences. A humanized antibody optionally also comprises at least a portion of a human constant region. In certain embodiments, some FR residues in a humanized antibody are substituted with corresponding residues from a non-human antibody (e.g., the antibody from which the HVR residues are derived), e.g., to restore or improve antibody specificity or affinity.

Humanized antibodies and methods of making them are reviewed, e.g., in Almagro and Fransson, *Front. Biosci.* 13:1619-1633 (2008). Human framework regions that can be used for humanization include, but are not limited to, framework regions selected using the "best-fit" method; framework regions derived from the consensus sequence of human antibodies of a particular subgroup of light or heavy chain variable regions; human mature (somatically mutated) framework regions or human germline framework regions; and framework regions derived from screening FR libraries.

In certain embodiments, the anti-albumin sdAbs are modified, such as humanized, without diminishing the native affinity of the domain for an antigen and while reducing its immunogenicity with respect to a heterologous species. For example, the amino acid residues of the antibody variable domain ($V_HH$) of a llama antibody can be determined, and one or more of the camelid amino acids, for example, in the framework regions, are replaced by their human counterparts as found in the human consensus sequence, without that polypeptide losing its typical characters, i.e., the humanization does not significantly affect the antigen binding capacity of the resulting polypeptide. Humanization of camelid single-domain antibodies requires the introduction and mutagenesis of a limited amount of amino acids in a single polypeptide chain. This is contrast to humanization of scFv, Fab', (Fab')$_2$, and IgG, which requires the introduction of amino acid changes in two chains, the light and the heavy chain and the preservation of the assembly of both chains.

SdAbs comprising a $V_HH$ domain can be humanized to have human-like sequences. In certain embodiments, the FR regions of the $V_HH$ domain used herein comprise at least about any one of 50%, 60%, 70%, 80%, 90%, 95% or more of amino acid sequence homology to human VH framework regions. One exemplary class of humanized $V_HH$ domains is characterized in that the $V_HH$s carry an amino acid from the group consisting of glycine, alanine, valine, leucine, isoleucine, proline, phenylalanine, tyrosine, tryptophan, methionine, serine, threonine, asparagine, or glutamine at position 45, such as, for example, L45 and a tryptophan at position 103, according to the Kabat numbering. As such, polypeptides belonging to this class show a high amino acid sequence homology to human VH framework regions and said polypeptides might be administered to a human directly without expectation of an unwanted immune response therefrom, and without the burden of further humanization.

Another exemplary class of humanized camelid single-domain antibodies has been described in WO 03/035694 and contains hydrophobic FR2 residues typically found in conventional antibodies of the human origin or from other species, but compensating this loss in hydrophilicity by a charged arginine residue on position 103 that substitutes the conserved tryptophan residue present in $V_H$ from double-chain antibodies. As such, peptides belonging to these two classes show a high amino acid sequence homology to human $V_H$ framework regions and said peptides might be administered to a human directly without expectation of an unwanted immune response therefrom, and without the burden of further humanization.

Human Domain Antibodies

In certain embodiments, the anti-albumin sdAb moiety provided herein is a human antibody (known as human domain antibody or human DAb). Human antibodies can be produced using various techniques known in the art. See, e.g., Chen, *Mol. Immunol.* 47:912-21 (2010). Transgenic mice or rats capable of producing fully human single-domain antibodies (or DAb) are known in the art. See, e.g., US 2009/0307787A1, U.S. Pat. No. 8,754,287, US 2015/0289489A1, US 2010/0122358A1, and WO 2004/049794.

Human antibodies (e.g., human DAbs) may be prepared by administering an immunogen to a transgenic animal that has been modified to produce intact human antibodies or intact antibodies with human variable regions in response to antigenic challenge. Such animals typically contain all or a portion of the human immunoglobulin loci, which replace the endogenous immunoglobulin loci, or which are present extrachromosomally or integrated randomly into the animal's chromosomes. In such transgenic mice, the endogenous immunoglobulin loci have generally been inactivated. For review of methods for obtaining human antibodies from transgenic animals, see Lonberg, Nat. Biotech. 23:1117-1125 (2005). Human variable regions from intact antibodies generated by such animals may be further modified, e.g., by combining with a different human constant region.

Human antibodies (e.g., human DAbs) can also be made by hybridoma-based methods. Human myeloma and mouse-human heteromyeloma cell lines for the production of human monoclonal antibodies are known in the art.

Human antibodies (e.g., human DAbs) may also be generated by isolating Fv clone variable domain sequences selected from human-derived phage display libraries. Such variable domain sequences may then be combined with a desired human constant domain. Techniques for selecting human antibodies from antibody libraries are described below.

One technique for obtaining $V_H H$ sequences directed against a particular antigen or target involves suitably immunizing a transgenic mammal that is capable of expressing heavy chain antibodies (i.e., so as to raise an immune response and/or heavy chain antibodies directed against said antigen or target), obtaining a suitable biological sample from said transgenic mammal that contains (nucleic acid sequences encoding) said $V_H H$ sequences (such as a blood sample, serum sample or sample of B-cells), and then generating $V_H H$ sequences directed against said antigen or target, starting from said sample, using any suitable technique known per se (such as any of the methods described herein or a hybridoma technique). For example, for this purpose, the heavy chain antibody-expressing mice and the further methods and techniques described in WO 02/085945, WO 04/049794, and WO 06/008548 and Janssens et al., *Proc. Natl. Acad. Sci. U.S.A.* 103:15130-15135 (2006) can be used. For example, such heavy chain antibody expressing mice can express heavy chain antibodies with any suitable (single) variable domain, such as (single) variable domains from natural sources (e.g., human (single) variable domains, camelid (single) variable domains, or shark (single) variable domains), as well as, for example, synthetic or semi-synthetic (single) variable domains.

Library-Derived Antibodies

Antibodies of the present disclosure may be isolated by screening combinatorial libraries for antibodies with the desired activity or activities. For example, a variety of methods are known in the art for generating phage display libraries and screening such libraries for antibodies possessing the desired binding characteristics. Methods for constructing single-domain antibody libraries have been described, for example, see U.S. Pat. No. 7,371,849.

In certain phage display methods, repertoires of $V_H$ and $V_L$ genes are separately cloned by polymerase chain reaction (PCR) and recombined randomly in phage libraries, which can then be screened for antigen-binding phage as described in Winter et al., *Ann. Rev. Immunol.* 12:433-455 (1994). Repertoires of $V_H H$ genes can be similarly cloned by PCR, recombined randomly in phage libraries, and screened for an antigen-binding phage. Phages typically display antibody fragments, either as scFv fragments or as Fab fragments. Libraries from immunized sources provide high-affinity antibodies to the immunogen without the requirement of constructing hybridomas. Alternatively, the naive repertoire can be cloned (e.g., from human) to provide a single source of antibodies to a wide range of non-self and also self-antigens without any immunization as described by Griffiths et al., *EMBO J.* 12:725-734 (1993). Finally, naive libraries can also be made synthetically by cloning unrearranged V-gene segments from stem cells, and using PCR primers containing random sequence to encode the highly variable CDR3 regions and to accomplish rearrangement in vitro, as described by Hoogenboom and Winter, *J. Mol. Biol.* 227:381-388 (1992).

Antibodies or antibody fragments isolated from human antibody libraries are considered human antibodies or human antibody fragments herein.

Biological Activities

1. Serum Half-Life

In certain embodiments, the biological activity of an anti-albumin sdAb moiety described herein is determined by its ability to extend serum half-life of the anti-albumin construct comprising the anti-albumin sdAb moiety. In certain embodiments, the anti-albumin construct has a half-life of at least about 15 days, about 14 days, about 13 days, about 12 days, about 11 days, about 10 days, about 9 days, about 8 days, about 7 days, about 6 days, about 5 days, about 4 days, about 3 days, about 2 days, about 24 hrs, about 24 hrs, about 20 hrs, about 18 hrs, about 16 hrs, about 14 hrs, about 12 hrs, about 10 hrs, about 8 hrs, about 6 hrs, about 4 hrs, about 3 hrs, about 2 hrs, or about 1 hr when administered to an individual. The anti-albumin construct can be administered via various routes, for example, intravenously, orally, subcutaneously or intraperitoneously.

In certain embodiments, the serum half-life of the anti-albumin construct is longer (such as at least about 20%, 30%, 40%, 50%, 60%, 70%, 80%, or 90% longer) than that of a reference construct. In certain embodiments, the serum half-life of the anti-albumin construct is at least 1-fold, 2-fold, 3-fold, 4-fold, 5-fold, 6-fold, 7-fold, 8-fold, 9-fold, 10-fold, 12-fold, 15-fold, 20-fold, 25-fold, 30-fold, 35-fold, 40-fold, 45-fold, or 50-fold of that of the reference construct. In certain embodiments, the reference construct does not have the anti-albumin sdAb moiety but comprises the same other functional moiety or moieties as the anti-albumin construct.

2. Stability

In certain embodiments, the biological activity of an anti-albumin sdAb moiety described herein can be determined by its ability to improve the stability of the anti-albumin construct comprising the anti-albumin sdAb moiety. In certain embodiments, the anti-albumin construct has a higher stability than a reference construct. In certain embodiments, the reference construct does not have the anti-albumin sdAb moiety but comprises the same other functional moiety or moieties as the anti-albumin construct.

In certain embodiments, the stability comprises a thermal stability.

In certain embodiments, the stability is assessed by the extent to which the anti-albumin construct retains an acceptable degree of chemical structure or biological function after storage under defined conditions. In certain embodiments, the anti-albumin construct has a high stability even if it does not maintain 100% of its chemical structure or biological function after storage for a defined amount of time. In certain embodiments, maintenance of about 90%, about 95%, about 96%, about 97%, about 98% or about 99% of structure or function of an anti-albumin construct as described herein after storage for a defined amount of time may be regarded as having a high stability.

Stability can be measured, inter alia, by determining the percentage of native (non-aggregated or degraded) anti-albumin construct that remains in the formulation (liquid or reconstituted) after storage for a defined amount of time at a defined temperature. The percentage of native anti-albumin construct can be determined by, inter alia, size exclusion chromatography (e.g., size exclusion high performance liquid chromatography (SE-HPLC)), such that native means non-aggregated and non-degraded. In certain embodiments, at least about 90% (such as at least about 90%, 91%, 92%, 93%, 94%, 95%, 96%, 97%, 98%, 99%, or 100%) of the native form of the anti-albumin construct can be detected in the formulation after storage for a defined amount of time at a given temperature. In certain embodiments, at least about 90% (such as at least about 90%, 91%, 92%, 93%, 94%, 95%, 96%, 97%, 98%. 99% or 100%) of the native form of the anti-albumin construct can be detected in the formulation after at least about 6 hrs, at least about 8 hrs, at least about 10 hrs, at least about 12 hrs, at least about 14 hrs, at least about 16 hrs, at least about 18 hrs, at least about 20 hrs, at least about 22 hrs, at least about 24 hrs, at least about 26 hrs, at least about 28 hrs, at least about 30 hrs, at least about 32 hrs, at least about 34 hrs, at least about 36 hrs, at least about 38 hrs, at least about 40 hrs, at least about 42 hrs, at least about 44 hrs, at least about 46 hrs, or at least about 48 hrs under room temperature (about 25° C.).

Stability can be measured, inter alia, by determining the percentage of the anti-albumin construct that forms in an aggregate within the formulation (liquid or reconstituted) after storage for a defined amount of time at a defined temperature, wherein stability is inversely proportional to the percent aggregate that is formed. The percentage of the aggregated anti-albumin construct can be determined by, inter alia, size exclusion chromatography (e.g., size exclusion high performance liquid chromatography (SE-HPLC)). In certain embodiments, there is less than about 10% (preferably less than about 5%) of the anti-albumin construct present as an aggregate in the formulation after storage for a defined amount of time at a given temperature. In certain embodiments, the anti-albumin construct descried herein has substantially no aggregation, for example, at most about 6%, 5%, 4%, 3%, 2%, 1%, 0.5%, or 0.1% of the anti-albumin construct can be detected in an aggregate in the formulation after storage for a defined amount of time at a given temperature, for example, after at least about 6 hrs, at least about 8 hrs, at least about 10 hrs, at least about 12 hrs, at least about 14 hrs, at least about 16 hrs, at least about 18 hrs, at least about 20 hrs, at least about 22 hrs, at least about 24 hrs, at least about 26 hrs, at least about 28 hrs, at least about 30 hrs, at least about 32 hrs, at least about 34 hrs, at least about 36 hrs, at least about 38 hrs, at least about 40 hrs, at least about 42 hrs, at least about 44 hrs, at least about 46 hrs, or at least about 48 hrs under room temperature (about 25° C.).

Measuring the binding affinity of the anti-albumin construct to its target(s) may also be used to assess stability. For example, an anti-albumin construct of the present disclosure may be regarded as stable if, after storage at, e.g., room temperature (about 25° C.) for a defined amount of time (e.g., 6 hrs, 12 hrs, 24 hrs, 36 hrs, or 48 hrs), the antigen-binding domain has an affinity that is at least 50%, 55%, 60%, 65%, 70%, 75%, 80%, 85%, 90%, 95%, or even more of the binding affinity of the antibody prior to said storage. Binding affinity may be determined by any method, such as e.g., ELISA or plasmon resonance. The binding of the anti-albumin construct to such a cell may be measured directly, such as via FACS analysis.

3. Clinical Properties

In certain embodiments, the biological activity of an anti-albumin sdAb moiety described herein is determined by its ability to improve the clinical property or properties of the anti-albumin construct comprising the anti-albumin sdAb moiety. In certain embodiments, the anti-albumin construct described herein has improved clinical properties relative to a reference construct. In certain embodiments, the reference construct does not have the anti-albumin sdAb moiety but comprises the same other functional moiety or moieties as the anti-albumin construct. In certain embodiments, the anti-albumin construct exhibits improved cytotoxicity activity as compared to the reference construct. In certain embodiments, the anti-albumin construct exhibits higher anti-tumor effects (such as reducing tumor burden and/or improving survival) as compared to the reference construct.

a) Cytotoxicity

Cytotoxicity (such as ADCC activity) of an anti-albumin construct described herein against a cell can be tested with many assays. For example, cancer cell line expressing the antigen that can be recognized by the anti-albumin construct and effector cells (e.g., PBMC cells) are mixed together in a 96-well plate. Varying concentrations of the anti-albumin construct are added. After incubation, an $EC_{50}$ (representing ADCC activity) can be determined.

In certain embodiments, the anti-albumin construct exhibits improved ADCC activity against a cell as compared to the reference construct. In certain embodiments, the $EC_{50}$ of the anti-albumin construct specific for the cell is no more than about 50%, 40%, 30%, 20%, 10%, or less than the reference construct. In certain embodiments, the cell is a tumor cell.

b) Treating Cancer

In certain embodiments, the anti-albumin construct treats a cancer (for example, by inhibiting tumor growth) in an individual. In certain embodiments, the anti-albumin construct exhibited an enhanced anti-tumor effect against a cancer as compared to a reference construct. For example, in certain embodiments, the administration of the anti-albumin construct results in a reduced tumor burden (such as at least about 10%, 20%, 30%, 40%, or 50% less tumor volume) as compared to the reference construct. In certain embodiments, the cancer is a solid tumor. In certain embodiments, the cancer is a liquid tumor.

B. Constructs Each Comprising an Anti-Albumin sdAb Moiety

In certain embodiments, the anti-albumin construct comprises a first polypeptide comprising an anti-albumin sdAb moiety and a second polypeptide.

Anti-Albumin Fusion Protein

In certain embodiments, the anti-albumin construct comprises a second polypeptide fused to the first polypeptide that comprises an anti-albumin sdAb moiety.

In certain embodiments, the second polypeptide comprises an antigen binding moiety. In certain embodiments, the antigen binding moiety binds to a tumor antigen. In certain embodiments, the tumor is a solid tumor. In certain embodiments, the tumor is a liquid tumor. In certain embodiments, the tumor is cancer selected from the group consisting of mesothelioma, lung cancer, breast cancer, ovarian cancer, pancreatic cancer, lymphoma, leukemia, head and neck cancer, liver cancer, esophageal cancer, gastric cancer, and colorectal cancer. In certain embodiments, the cancer expresses a high level of the tumor antigen. For example, in certain embodiments, the cancer expresses a level of at least 2-fold, 5-fold, 10-fold, 20-fold, 30-fold, 40-fold, or 50-fold of that of a reference tissue. In certain embodiments, the reference tissue is a tissue that does not comprise a cancer cell in the same individual.

In certain embodiments, the tumor antigen is selected from the group consisting of mesothelin ("MSLN"), GPA33, Her-2, EGFR, and CD20. In certain embodiments, the tumor antigen is selected from the group consisting of CEA, MUC16, MUC1, AFP, EPCAM, CD19, CD21, CD22, CD30, CD33, CD37, CD45, PSMA, and BCMA.

In certain embodiments, the tumor antigen is mesothelin. In certain embodiments, the antigen binding moiety comprises a single chain antibody comprising a heavy chain variable region (anti-MSLN $V_H$), wherein the anti-MSLN $V_H$ comprises a CDR1, a CDR2, and a CDR3, wherein: a) the CDR1 comprising the amino acid sequence of SEQ ID NO: 92, the CDR2 comprising the amino acid sequence of SEQ ID NO: 93, and the CDR3 comprising the amino acid sequence of SEQ ID: NO: 94, or a variant thereof comprising up to a total of 3, 2, or 1 amino acid substitutions in the CDRs; or b) the CDR1 comprising the amino acid sequence of SEQ ID NO: 95, the CDR2 comprising the amino acid sequence of SEQ ID NO: 96, and the CDR3 comprising the amino acid sequence of GRY, or a variant thereof comprising up to a total of 3, 2, or 1 amino acid substitutions in the CDRs.

In certain embodiments, the antigen is an immune checkpoint protein. In certain embodiments, the immune checkpoint protein is selected from the group consisting of PD-L1, CTLA4, PD-L2, PD-1, CD47, TIGIT, GITR, TIM3, LAG3, CD27, 4-1BB, and B7H4.

In certain embodiments, the antigen binding moiety is an antibody or an antigen binding fragment thereof. In certain embodiments, the antibodies or antigen binding fragments thereof provided herein can immunospecifically bind to a polypeptide, a polypeptide fragment, or an epitope of an antigen expressed on a cancer cell. In one embodiment, the antibodies bind to a human cancer antigen. In certain embodiments, the antibodies or antigen binding fragments thereof provided herein bind to the extracellular domain (ECD) of a cancer antigen. In certain embodiments, the antibodies bind to an epitope in the ECD of a cancer antigen. In certain embodiments, the cancer antigen is expressed on a solid tumor cancer cell.

Antibodies that bind to a cancer antigen provided herein can be, but are not limited to, synthetic antibodies, monoclonal antibodies, recombinantly produced antibodies, multispecific antibodies (including bi-specific antibodies), human antibodies, humanized antibodies, chimeric antibodies, intrabodies, single-chain Fvs (scFv) (e.g., including monospecific and bispecific), camelized antibodies or their humanized variants, Fab fragments, F(ab') fragments, disulfide-linked Fvs (sdFv), anti-idiotypic (anti-Id) antibodies, and epitope-binding fragments thereof.

In certain embodiments, antibodies provided herein include immunoglobulin molecules and immunologically active portions of immunoglobulin molecules, i.e., molecules that contain an antigen binding site that immunospecifically binds to a cancer antigen (e.g., a solid tumor cancer antigen). An immunoglobulin molecule provided herein can be of any type (e.g., IgG, IgE, IgM, IgD, IgA, or IgY), class (e.g., IgG1, IgG2, IgG3, IgG4, IgA1, or IgA2), or subclass of the immunoglobulin molecule. In a specific embodiment, an antibody provided herein is an IgG antibody, such as an IgG1 antibody.

Variants and derivatives of an antibody including antibody fragments that retain the ability to specifically bind to an epitope of a cancer antigen are also included in the present disclosure. Exemplary fragments include Fab fragments; Fab'; F(ab')$_2$; a bispecific Fab; a single chain Fab chain comprising a variable region, also known as a sFv; a disulfide-linked Fv or dsFv; a camelized VH; a bispecific sFv; a diabody; and a triabody. Derivatives of antibodies also include one or more CDR sequences of an antibody combining site. The CDR sequences may be linked together on a scaffold when two or more CDR sequences are present. In certain embodiments, an antibody provided herein comprises a single-chain Fv ("scFv"). Various techniques have been developed for producing antibody fragments as briefly described in the above section.

In certain embodiments, the antigen binding moiety is a single variable domain antibody (sdAb) (such as a $V_HH$ antibody) that binds to a tumor antigen. Certain types of organisms, the camelids and cartilaginous fish, possess high affinity single V-like domains mounted on an Fc equivalent domain structure as part of their immune system. Woolven et al., *Immunogenetics* 50:98-101 (1999); and Streltsov et al., *Proc. Natl. Acad. Sci. U.S.A.* 101:12444-12449 (2004). The V-like domains (called $V_HH$ in camelids and V-NAR in sharks) typically display long surface loops, which allow penetration of cavities of target antigens. They also stabilize isolated VH domains by masking hydrophobic surface patches.

In certain embodiments, the second polypeptide comprises a cytokine, growth factor, or protein hormone.

In certain embodiments, the second polypeptide comprises a cytokine. In certain embodiments, the cytokine is selected from the group consisting of IL-21, IL-7, IL-15, IL-15 bound to IL-15Rα or fragment thereof, IL-33, and IL-22. In certain embodiments, the second polypeptide comprises an IL-21. In certain embodiments, the IL-21 is a human IL-21. In certain embodiments, the IL-21 comprises an amino acid sequence of SEQ ID NO: 97 or 98, or a variant thereof comprising at least 80% (such as at least about any of 80%, 85%, 90%, 91%, 92%, 93%, 94%, 95%, 96%, 97%, 98%, or 99%) identity to SEQ ID NO: 97 or 98. In certain embodiments, the IL-21 is a variant lacking about 1 to about 10 amino acids between S124 and S133 in the amino acid sequence of SEQ ID NO: 97.

In certain embodiments, the IL-21 is a mutein comprising a substitution at position R5, R9, K73, or R76 in the amino acid sequence of SEQ ID NO: 97 with one of the twenty natural amino acids other than R, R, K, and R, respectively. In certain embodiments, the IL-21 is a mutein comprising a substitution at position R5 in the amino acid sequence of SEQ ID NO: 97 with one of the twenty natural amino acids other than R. In certain embodiments, the IL-21 is a mutein comprising a substitution at position R9 in the amino acid sequence of SEQ ID NO: 97 with one of the twenty natural amino acids other than R. In certain embodiments, the IL-21 is a mutein comprising a substitution at position K73 in the amino acid sequence of SEQ ID NO: 97 with one of the twenty natural amino acids other than K. In certain embodiments, the IL-21 is a mutein comprising a substitution at position R76 in the amino acid sequence of SEQ ID NO: 97 with one of the twenty natural amino acids other than R.

In certain embodiments, the IL-21 is a mutein comprising two, three, or four substitutions at positions R5. R9, K73, and/or R76 in the amino acid sequence of SEQ ID NO: 97, each independently with one of twenty natural amino acids other than R, R, K, and R, respectively. In certain embodiments, the IL-21 is a mutein comprising substitutions at positions R5 and R9 in the amino acid sequence of SEQ ID NO: 97, each independently with one of twenty natural amino acids other than R. In certain embodiments, the IL-21 is a mutein comprising substitutions at positions R5 and K73 in the amino acid sequence of SEQ ID NO: 97, each independently with one of twenty natural amino acids other than R and K, respectively. In certain embodiments, the IL-21 is a mutein comprising substitutions at positions R5 and R76 in the amino acid sequence of SEQ ID NO: 97, each independently with one of twenty natural amino acids other than R. In certain embodiments, the IL-21 is a mutein comprising substitutions at positions R9 and K73 in the amino acid sequence of SEQ ID NO: 97, each independently with one of twenty natural amino acids other than R and K, respectively. In certain embodiments, the IL-21 is a mutein comprising substitutions at positions R9 and R76 in the amino acid sequence of SEQ ID NO: 97, each independently with one of twenty natural amino acids other than R. In certain embodiments, the IL-21 is a mutein comprising substitutions at positions K73 and R76 in the amino acid sequence of SEQ ID NO: 97, each independently with one of twenty natural amino acids other than K and R, respectively. In certain embodiments, the IL-21 is a mutein comprising substitutions at positions R5, R9, and K73 in the amino acid sequence of SEQ ID NO: 97, each independently with one of twenty natural amino acids other than R, R, and K, respectively. In certain embodiments, the IL-21 is a mutein comprising substitutions at positions R5, R9, and R76 in the amino acid sequence of SEQ ID NO: 97, each independently with one of twenty natural amino acids other than R. In certain embodiments, the IL-21 is a mutein comprising substitutions at positions R5, K73, and R76 in the amino acid sequence of SEQ ID NO: 97, each independently with one of twenty natural amino acids other than R, K, and R, respectively. In certain embodiments, the IL-21 is a mutein comprising substitutions at positions R9, K73, and R76 in the amino acid sequence of SEQ ID NO: 97, each independently with one of twenty natural amino acids other than R, K, and R, respectively. In certain embodiments, the IL-21 is a mutein comprising substitutions at positions R5, R9, K73, and R76 in the amino acid sequence of SEQ ID NO: 97, each independently with one of twenty natural amino acids other than R, R, K, and R, respectively.

In certain embodiments, the IL-21 is a mutein comprising a substitution of R5A, R5E, R5N, R9A, R9E, R9N, K73A, K73E, K73N, R76A, R76E, or R76N in the amino acid sequence of SEQ ID NO: 97. In certain embodiments, the IL-21 is a mutein comprising a substitution of R5A, R5E, or R5N in the amino acid sequence of SEQ ID NO: 97. In certain embodiments, the IL-21 is a mutein comprising a substitution of R9A, R9E, or R9N in the amino acid sequence of SEQ ID NO: 97. In certain embodiments, the IL-21 is a mutein comprising a substitution of K73A, K73E, or K73N in the amino acid sequence of SEQ ID NO: 97. In certain embodiments, the IL-21 is a mutein comprising a substitution of R76A, R76E, or R76N in the amino acid sequence of SEQ ID NO: 97.

In certain embodiments, the IL-21 is a mutein comprising a substitution of R5A, R5E, R9A, R9E, K73A, K73E, R76A, or R76E in the amino acid sequence of SEQ ID NO: 97. In certain embodiments, the IL-21 is a mutein comprising a substitution of R5A or R5E in the amino acid sequence of SEQ ID NO: 97. In certain embodiments, the IL-21 is a mutein comprising a substitution of R9A or R9E in the amino acid sequence of SEQ ID NO: 97. In certain embodiments, the IL-21 is a mutein comprising a substitution of K73A or K73E in the amino acid sequence of SEQ ID NO: 97. In certain embodiments, the IL-21 is a mutein comprising a substitution of R76A or R76E in the amino acid sequence of SEQ ID NO: 97.

In certain embodiments, the IL-21 is a mutein comprising substitutions of (i) R5N and (ii) M7S or M7T in the amino acid sequence of SEQ ID NO: 97. In certain embodiments, the IL-21 is a mutein comprising substitutions of (i) R9N and (ii) R11S or R11T in the amino acid sequence of SEQ ID NO: 97. In certain embodiments, the IL-21 is a mutein comprising substitutions of (i) K73N and (ii) K75S or K75T in the amino acid sequence of SEQ ID NO: 97. In certain embodiments, the IL-21 is a mutein comprising substitutions of (i) R76N and (ii) P78S or P78T in the amino acid sequence of SEQ ID NO: 97.

In certain embodiments, the IL-21 has the amino acid sequence of any one of SEQ ID NOs: 97, 98, and 151 to 167. In certain embodiments, the IL-21 has the amino acid sequence of SEQ ID NO: 97. In certain embodiments, the IL-21 has the amino acid sequence of SEQ ID NO: 98. In certain embodiments, the IL-21 has the amino acid sequence of SEQ ID NO: 151. In certain embodiments, the IL-21 has the amino acid sequence of SEQ ID NO: 152. In certain embodiments, the IL-21 has the amino acid sequence of SEQ ID NO: 153. In certain embodiments, the IL-21 has the amino acid sequence of SEQ ID NO: 154. In certain embodiments, the IL-21 has the amino acid sequence of SEQ ID NO: 155. In certain embodiments, the IL-21 has the amino acid sequence of SEQ ID NO: 156. In certain embodiments, the IL-21 has the amino acid sequence of SEQ ID NO: 157. In certain embodiments, the IL-21 has the amino acid sequence of SEQ ID NO: 158. In certain embodiments, the IL-21 has the amino acid sequence of SEQ ID NO: 159. In certain embodiments, the IL-21 has the amino acid sequence of SEQ ID NO: 160. In certain embodiments, the IL-21 has the amino acid sequence of SEQ ID NO: 161. In certain embodiments, the IL-21 has the amino acid sequence of SEQ ID NO: 162. In certain embodiments, the IL-21 has the amino acid sequence of SEQ ID NO: 163. In certain embodiments, the IL-21 has the amino acid sequence of SEQ ID NO: 164. In certain embodiments, the IL-21 has the amino acid sequence of SEQ ID NO: 165. In certain embodiments, the IL-21 has the amino acid sequence of SEQ ID NO: 166. In certain embodiments, the IL-21 has the amino acid sequence of SEQ ID NO: 167.

Additional IL-21 sequences include those described in US 2019/0046611 A1, the disclosure of which is incorporated herein by reference in its entirety.

In one embodiment, the IL-21 is glycosylated. In another embodiment, the IL-21 is N-glycosylated.

In certain embodiments, the N-glycosylated IL-21 comprises an N-glycosylation site having the amino acid sequence of NXT or NXS, wherein each X is independently A, C, D, E, F, G, H, I, K, L, M, N, Q, R, S, T, V, W, or Y. In certain embodiments, the N-glycosylated IL-21 comprises an N-glycosylation site having the amino acid sequence of NXT or NXS, wherein each X is independently H, K, L, or M.

In certain embodiments, the N-glycosylated IL-21 comprises an N-glycosylation site having the amino acid sequence of NHT, NHS, NKT, NKS, NLT, NLS, NMT, or NMS. In certain embodiments, the N-glycosylated IL-21 comprises an N-glycosylation site having the amino acid sequence of NHT or NHS. In certain embodiments, the N-glycosylated IL-21 comprises an N-glycosylation site having the amino acid sequence of NKT or NKS. In certain embodiments, the N-glycosylated IL-21 comprises an N-glycosylation site having the amino acid sequence of NLT or NLS. In certain embodiments, the N-glycosylated IL-21 comprises an N-glycosylation site having the amino acid sequence of NMT or NMS.

In one embodiment, the N-glycosylated IL-21 comprises an N-glycosylation site having the amino acid sequence of NHT or NHS starting at position 5 in the amino acid sequence of SEQ ID NO: 97. In another embodiment, the N-glycosylated IL-21 comprises an N-glycosylation site having the amino acid sequence of NMT or NMS starting at position 9 in the amino acid sequence of SEQ ID NO: 97. In yet another embodiment, the N-glycosylated IL-21 comprises an N-glycosylation site having the amino acid sequence of NLT or NLS starting at position 73 in the amino acid sequence of SEQ ID NO: 97. In yet another embodiment, the N-glycosylated IL-21 comprises an N-glycosylation site having the amino acid sequence of NKT or NKS starting at position 76 in the amino acid sequence of SEQ ID NO: 97.

In one embodiment, the N-glycosylated IL-21 comprises an amino acid substitution R5N, wherein the asparagine at position 5 is N-glycosylated. In another embodiment, the N-glycosylated IL-21 comprises an amino acid substitution R9N, wherein the asparagine at position 9 is N-glycosylated. In yet another embodiment, the N-glycosylated IL-21 comprises an amino acid substitution K73N, wherein the asparagine at position 73 is N-glycosylated. In still another embodiment, the N-glycosylated IL-21 comprises an amino acid substitution R76N, wherein the asparagine at position 76 is N-glycosylated. In certain embodiments, the N-glycosylated IL-21 has the amino acid sequence of any one of SEQ ID NOs: 160 to 167.

In one embodiment, the N-glycosylated IL-21 has one glycan. In another embodiment, the N-glycosylated IL-21 has one glycan attached to the nitrogen in the side chain of an asparagine residue.

In one embodiment, the N-glycosylated IL-21 has two glycans. In another embodiment, the N-glycosylated IL-21 has two glycans, of which at least one glycan is attached to the nitrogen in the side chain of an asparagine residue. In yet another embodiment, the N-glycosylated IL-21 has two glycans, each of which is attached to the nitrogen in the side chain of an asparagine residue.

In one embodiment, the N-glycosylated IL-21 has three glycans. In one embodiment, the glycan is an N-glycan.

In one embodiment, the N-glycan on the N-glycosylated IL-21 is oligomannose-type. In another embodiment, the N-glycan on the N-glycosylated IL-21 is complex-type. In another embodiment, the N-glycan on the N-glycosylated IL-21 is hydride-type.

In one embodiment, the N-glycan on the N-glycosylated IL-21 is biantennary complex-type. In another embodiment, the N-glycan on the N-glycosylated IL-21 is triantennary complex-type. In yet another embodiment, the N-glycan on the N-glycosylated IL-21 is tetraantennary complex-type.

In one embodiment, the N-glycan on the N-glycosylated IL-21 is one of the glycans described in Szabo et al., *J. Proteome. Res.* 2018, 17, 1559-1574, the disclosure of which is incorporated herein by reference in its entirety.

In certain embodiments, the IL-21 further includes one or more additional substitutions, deletions, and/or insertions; and/or one or more additional post-translational modifications.

In certain embodiments, a fusion protein provided herein has a dissociation constant to a human IL-21Rα of SEQ ID NO: 167, ranging from about 1 pM to about 200 nM, from about 10 pM to about 100 nM, from about 20 pM to about 50 nM, or from about 50 pM to about 20 nM.

In certain embodiments, the second polypeptide is fused to the N-terminus of the first polypeptide that comprises the anti-albumin sdAb moiety. In certain embodiments, the second polypeptide is fused to the C-terminus of the first polypeptide. In certain embodiments, the second polypeptide is fused to both the N- and C-termini of the first polypeptide. In certain embodiments, the first polypeptide is fused to both the N- and C-termini of the second polypeptide.

In certain embodiments, the second polypeptide is fused to the first polypeptide via a first linker. In certain embodiments, the first linker is a peptide linker. In certain embodiments, the first linker is cleavable. In certain embodiments, the first linker is a matrix metalloprotease, legumain, matriptase, or urokinase sensitive. In certain embodiments, the first linker is selected from the group consisting of SEQ ID NOs: 73-91. In certain embodiments, the first linker is non-cleavable. In certain embodiments, the first linker is selected from the group consisting of GSG and SEQ IDs: 58-72.

In certain embodiments, the anti-albumin construct comprises a) a first polypeptide comprising the anti-albumin sdAb moiety; b) a second polypeptide, wherein the second peptide is fused to the first polypeptide ("second peptide-ALBM"); and c) a third polypeptide fused to the second peptide-ALBM.

In certain embodiments, the anti-albumin construct comprises a) a first polypeptide comprising the anti-albumin sdAb moiety; b) a second polypeptide comprising a cytokine, wherein the second polypeptide is fused to the first polypeptide ("cytokine-ALBM"); and c) a third polypeptide fused to the cytokine-ALBM. In certain embodiments, the cytokine is selected from the group consisting of IL-21, IL-7, IL-15, IL-15 bound to IL-15Rα or fragment thereof, IL-33, and IL-22. In certain embodiments, the third polypeptide comprises an antigen binding moiety. In certain embodiments, the antigen is a tumor antigen. In certain embodiments, the antigen is selected from the group consisting of mesothelin ("MSLN"), GPA33, Her-2, EGFR, and CD20. In certain embodiments, the tumor antigen is selected from the group consisting of CEA, MUC16, MUC1, AFP, EPCAM, CD19, CD21, CD22, CD30, CD33, CD37, CD45, PSMA, and BCMA. In certain embodiments, the third polypeptide comprises a second cytokine. In certain embodiments, the first cytokine and the second cytokine are each independently selected from the group consisting of IL-7, IL-15, IL-15 bound to IL-15Rα or fragment thereof, and IL-21.

In certain embodiments, the anti-albumin construct comprises a) a first polypeptide comprising the anti-albumin sdAb moiety; b) a second polypeptide comprising an antigen binding moiety, wherein the second polypeptide is fused to the first polypeptide ("ABM-ALBM"); and c) a third polypeptide fused to the ABM-ALBM. In certain embodiments, the antigen is a tumor antigen. In certain embodiments, the antigen is selected from the group consisting of mesothelin ("MSLN"), GPA33, Her-2, EGFR, and CD20. In certain embodiments, the tumor antigen is selected from the group consisting of CEA, MUC16, MUC1, AFP, EPCAM, CD19, CD21, CD22, CD30, CD33, CD37, CD45, PSMA, and BCMA. In certain embodiments, the third polypeptide comprises a second antigen binding moiety. In certain embodiments, the second antigen is a tumor antigen. In certain embodiments, the third polypeptide comprises an imaging agent. In certain embodiments, the third polypeptide comprises a cytokine. In certain embodiments, the cytokine is selected from the group consisting of IL-21, IL-7, IL-15, IL-15 bound to IL-15Rα or fragment thereof, IL-33, and IL-22.

In certain embodiments, the second polypeptide is fused to the N-terminus of the first polypeptide. In certain embodiments, the second polypeptide is fused to the C-terminus of the first polypeptide. In certain embodiments, the second polypeptide is fused to both the N- and C-termini of the first polypeptide. In certain embodiments, the first polypeptide is fused to both the N- and C-termini of the second polypeptide. In certain embodiments, the second polypeptide is fused to the first polypeptide via a first linker as described herein. In certain embodiments, the third polypeptide is fused to the N-terminus of the second peptide-ALBM. In certain embodiments, the third polypeptide is fused to the C-terminus of the second peptide-ALBM. In certain embodiments, the third polypeptide is fused to both the N- and C-termini of the second peptide-ALBM. In certain embodiments, the second peptide-ALBM is fused to both the N- and C-termini of the third polypeptide. In certain embodiments, the third polypeptide is fused to the second peptide-ALBM via a second linker. In certain embodiments, the second linker is a peptide linker. In certain embodiments, the first linker is uncleavable and the second linker is cleavable. In certain embodiments, both the first linker and the second linker are uncleavable. In certain embodiments, both the first linker and the second linker are cleavable. In certain embodiments, the first linker and/or the second linker is a matrix metalloprotease, legumain, matriptase, or urokinase sensitive. In certain embodiments, the first linker and/or the second linker is each independently selected from the group consisting of SEQ ID NOs: 73-91. In certain embodiments, the first linker and/or the second linker is each independently selected from the group consisting of SEQ IDs: 58-72. In certain embodiments, the first linker and/or the second linker is each independently selected from the group consisting of SEQ IDs: 58-91.

In certain embodiments, the construct further comprises a signaling peptide.

In one embodiment, provided herein is a fusion protein comprising an interleukin-21 domain, a $V_H H$ single domain antibody domain, and optionally a peptide linker; wherein the C-terminus of the interleukin-21 domain is connected to the N-terminus of the $V_H H$ single domain antibody domain directly or via the peptide linker.

In another embodiment, provided herein is a fusion protein comprising one interleukin-21 domain having the amino acid sequence of any one of SEQ ID NOs: 97, 98, and 151 to 168; one $V_H H$ single domain antibody domain having the amino acid sequence of SEQ ID NOs: 1 to 9, 45 to 53, and 105 to 115; and optionally one peptide linker having the amino acid sequence of GSG or one of SEQ ID NOs: 58 to 73; wherein the C-terminus of the interleukin-21 domain is connected to the N-terminus of the $V_H H$ single domain antibody domain directly or via the peptide linker.

Linkers

The anti-albumin constructs described above may comprise one or more linkers (such as a first linker and a second linker as described above).

In certain embodiments, the first linker and/or the second linker is/are a peptide linker. The length, the degree of flexibility, and/or other properties of the peptide linker(s) used in the anti-albumin construct may have some influence on properties, including, but not limited to, the affinity, specificity, or avidity for one or more particular antigens or epitopes. For example, longer peptide linkers may be selected to ensure that two adjacent domains do not sterically interfere with one another. In some embodiment, a peptide linker comprises flexible residues (such as glycine and serine) so that the adjacent domains are free to move relative to each other. For example, a glycine-serine doublet can be a suitable peptide linker.

The peptide linker can be of any suitable length. In certain embodiments, the peptide linker is at least about any of 1, 2, 3, 4, 5, 6, 7, 8, 9, 10, 11, 12, 13, 14, 15, 16, 17, 18, 19, 20.25, 30, 35, 40, 50, 75, 100 or more amino acids long. In certain embodiments, the peptide linker is no more than about any of 100, 75, 50, 40, 35, 30, 25, 20, 19, 18, 17, 16, 15, 14, 13, 12, 11, 10, 9, 8, 7, 6, 5 or fewer amino acids long. In certain embodiments, the length of the peptide linker is any of about 1 amino acid to about 10 amino acids, about 1 amino acid to about 20 amino acids, about 1 amino acid to about 30 amino acids, about 5 amino acids to about 15 amino acids, about 10 amino acids to about 25 amino acids, about 5 amino acids to about 30 amino acids, about 10 amino acids to about 30 amino acids, about 30 amino acids to about 50 amino acids, about 50 amino acids to about 100 amino acids, or about 1 amino acid to about 100 amino acids.

In certain embodiments, the peptide linker has a length of about one to forty (such as one to thirty-five, one to thirty, one to twenty-five, one to twenty, four to twenty, or four to sixteen) amino acids.

In certain embodiments, the first linker and/or the second linker is/are a non-peptide linker.

Other linker considerations include the effect on physical or pharmacokinetic properties of the resulting compound, such as solubility, lipophilicity, hydrophilicity, hydrophobicity, stability (more or less stable as well as planned degradation), rigidity, flexibility, immunogenicity, modulation of antibody binding, and the ability to be incorporated into a micelle or liposome.

1. Peptide Linkers

The peptide linker may have a naturally occurring sequence or a non-naturally occurring sequence. For example, a sequence derived from the hinge region of heavy chain only antibodies may be used as a linker. See, for example, WO 1996/34103.

The peptide linker can be of any suitable length. In certain embodiments, the peptide linker is at least about any of 1, 2, 3, 4, 5, 6, 7, 8, 9, 10, 11, 12, 13, 14, 15, 16, 17, 18, 19, 20, 25, 30, 35, 40, 50, 75, 100 or more amino acids long. In certain embodiments, the peptide linker is no more than about any of 100, 75, 50, 40, 35, 30, 25, 20, 19, 18, 17, 16, 15, 14, 13, 12, 11, 10, 9, 8, 7, 6, 5 or fewer amino acids long. In certain embodiments, the length of the peptide linker is any of about 1 amino acid to about 10 amino acids, about 1 amino acids to about 20 amino acids, about 1 amino acid to about 30 amino acids, about 5 amino acids to about 15 amino acids, about 10 amino acids to about 25 amino acids, about 5 amino acids to about 30 amino acids, about 10 amino acids to about 30 amino acids, about 30 amino acids to about 50 amino acids, about 50 amino acids to about 100 amino acids, or about 1 amino acid to about 100 amino acids.

An essential technical feature of such a peptide linker is that said peptide linker does not comprise any polymerization activity. The characteristics of a peptide linker, which comprises the absence of the promotion of secondary structures, are known in the art and described, e.g., in Dall'Acqua et al., *Biochem.* 37:9266-9273 (1998); Cheadle et al., *Mol. Immunol.* 29:21-30 (1992); and Raag and Whitlow, *FASEB* 9:73-80 (1995). A particularly preferred amino acid in context of the "peptide linker" is Gly. Furthermore, peptide linkers that also do not promote any secondary structures are preferred. The linkage of the domains to each other can be provided by, e.g., genetic engineering. Methods for preparing fused and operatively linked fusion protein components and expressing them in mammalian cells or bacteria are well-known in the art. See, e.g., WO 99/54440; Ausubel, Current Protocols in Molecular Biology, Green Publishing Associates and Wiley Interscience, N. Y. 1989 and 1994 or Sambrook et al., Molecular Cloning: A Laboratory Manual, Cold Spring Harbor Laboratory Press, Cold Spring Harbor, N. Y., 2001.

The peptide linker can be a stable linker, which is not cleavable by a protease, especially by matrix metalloproteinases (MMPs). In certain embodiments, the linker is selected from the group consisting of GSG and SEQ IDs: 58-72.

In certain embodiments, the linker is cleavable. In certain embodiments, the linker is a matrix metalloprotease, legumain, matriptase, or urokinase sensitive. In certain embodiments, the linker is selected from the group consisting of SEQ ID NOs: 73-91.

The linker can also be a flexible linker. Exemplary flexible linkers include glycine polymers $(G)_n$, glycine-serine polymers (including, for example, $(GS)_n$, $(GSGS)_n$ (SEQ ID NO: 65), $(GGSG)_n$ (SEQ ID NO: 66), $(GGGGS)_n$ (SEQ ID NO: 60), where n is an integer of at least one), glycine-alanine polymers, alanine-serine polymers, and other flexible linkers known in the art. Glycine and glycine-serine polymers are relatively unstructured, and therefore may be able to serve as a neutral tether between components. Glycine accesses significantly more phi-psi space than even alanine and is much less restricted than residues with longer side chains (see Scheraga, *Rev. Computational Chem.* 11:173-142 (1992)). The ordinarily skilled artisan will recognize that design of an antibody fusion protein can include linkers that are all or partially flexible, such that the linker can include a flexible linker portion as well as one or more portions that confer less flexible structure to provide a desired antibody fusion protein structure.

2. Non-Peptide Linkers

Coupling of the components described above may be accomplished by any chemical reaction that will bind the two molecules so long as both components retain their respective activities, i.e., binding to cytokine receptor, albumin, or the target antigen, respectively. This linkage can include many chemical mechanisms, for instance covalent binding, affinity binding, intercalation, coordinate binding, and complexation. In certain embodiments, the binding is covalent binding. Covalent binding can be achieved either by direct condensation of existing side chains or by the incorporation of external bridging molecules. Many bivalent or polyvalent linking agents may be useful in coupling protein molecules in this context. For example, representative coupling agents can include organic compounds such as thioesters, carbodimide, succinimide esters, diisocyanate, glutaraldehyde, diazobenzenes, and hexamethylene diamines. This listing is not intended to be exhaustive of the various classes of coupling agents known in the art but, rather, is exemplary of the more common coupling agents. See, e.g., Killen and Lindstrom, *J. Immunol.* 133:2549-2553 (1984); Jansen et al., *Immunol. Rev.* 62:185-216 (1982); and Vitetta et al., Science 238:1098-1104 (1987).

Linkers that can be applied in the present disclosure are described in the literature (see, for example, Ramakrishnan et al., *Cancer Res.* 44:201-208 (1984) describing use of MBS (M-maleimidobenzoyl-N-hydroxysuccinimide ester). In certain embodiments, non-peptide linkers used herein include: (i) EDC (1-ethyl-3-(3-dimethylamino-propyl) carbodiimide hydrochloride; (ii) SMPT (4-succinimidyloxycarbonyl-alpha-methyl-alpha-(2-pridyl-dithio)-toluene (Pierce Chem. Co., Cat. (21558G); (iii) SPDP (succinimidyl-6 [3-(2-pyridyldithio) propionamido] hexanoate (Pierce Chem. Co., Cat #21651G); (iv) sulfo-LC-SPDP (sulfosuccinimidyl 6 [3-(2-pyridyldithio)-propianamide] hexanoate (Pierce Chem. Co. Cat. #2165-G); and (v) sulfo-NHS (N-hydroxysulfo-succinimide: Pierce Chem. Co., Cat. #24510) conjugated to EDC.

The linkers described above contain components that have different attributes, thus may lead to fusion proteins with differing physio-chemical properties. For example, sulfo-NHS esters of alkyl carboxylates are more stable than sulfo-NHS esters of aromatic carboxylates. NHS-ester containing linkers are less soluble than sulfo-NHS esters. Further, the linker SMPT contains a sterically hindered disulfide bond, and can form antibody fusion protein with increased stability. Disulfide linkages, are in general, less stable than other linkages because the disulfide linkage is cleaved in vitro, resulting in less antibody fusion protein available. Sulfo-NHS, in particular, can enhance the stability of carbodimide couplings. Carbodimide couplings (such as EDC) when used in conjunction with sulfo-NHS, forms esters that are more resistant to hydrolysis than the carbodimide coupling reaction alone.

C. Anti-Albumin Construct Variants

In certain embodiments, amino acid sequence variants of the anti-albumin constructs provided herein are contemplated. For example, it may be desirable to improve the binding affinity and/or other biological properties of the anti-albumin construct in a whole or any component(s) of the anti-albumin construct. Amino acid sequence variants of an anti-albumin construct may be prepared by introducing appropriate modifications into the nucleic acid sequence encoding the anti-albumin construct or by peptide synthesis. Such modifications include, for example, deletions from, and/or insertions into and/or substitutions of residues within the amino acid sequences of the anti-albumin construct. Any combination of deletion, insertion, and substitution can be made to arrive at the final construct, provided that the final construct possesses the desired characteristics.

1. Substitution, Insertion, Deletion and Variants

In certain embodiments, anti-albumin construct variants having one or more amino acid substitutions are provided. Sites of interest for substitutional mutagenesis include the HVRs and FRs of an albumin-binding molecule and/or an antigen binding moiety. Conservative substitutions are shown in Table 3. More substantial changes are provided under the heading of "exemplary substitutions," and as further described below in reference to amino acid side chain classes. Amino acid substitutions may be introduced into the component of the anti-albumin construct and the products screened for a desired activity, e.g., retained/improved antigen binding, decreased immunogenicity, or improved ADCC or CDC.

affinity matured antibody, which may be conveniently generated, e.g., using phage display-based affinity maturation techniques, such as those described herein. Briefly, one or more HVR residues are mutated and the variant antibodies displayed on phage and screened for a particular biological activity (e.g., binding affinity).

Alterations (e.g., substitutions) may be made in HVRs, e.g., to improve antibody affinity. Such alterations may be made in HVR "hotspots," i.e., residues encoded by codons that undergo mutation at high frequency during the somatic maturation process (see, e.g., Chowdhury, *Methods Mol. Biol.* 207:179-196 (2008)), and/or SDRs (a-CDRs), with the resulting variant VH or VL being tested for binding affinity. Affinity maturation by constructing and reselecting from secondary libraries has been described, e.g., in Hoogenboom et al. in *Methods Mol. Biol.* 178:1-37 (2001). In certain embodiments of affinity maturation, diversity is introduced into the variable genes chosen for maturation by any of a variety of methods (e.g., error-prone PCR, chain shuffling, or oligonucleotide-directed mutagenesis). A secondary library is then created. The library is then screened to identify any antibody variants with the desired affinity. Another method to introduce diversity involves HVR-di-

TABLE 3

Amino Acid Substitutions

| Original Residue | Exemplary Substitutions | Preferred Substitutions |
|---|---|---|
| Ala (A) | Val; Leu; Ile | Val |
| Arg (R) | Lys; Gln; Asn | Lys |
| Asn (N) | Gln; His; Asp, Lys; Arg | Gln |
| Asp (D) | Glu; Asn | Glu |
| Cys (C) | Ser; Ala | Ser |
| Gln (Q) | Asn; Glu | Asn |
| Glu (E) | Asp; Gln | Asp |
| Gly (G) | Ala | Ala |
| His (H) | Asn; Gln; Lys; Arg | Arg |
| Ile (I) | Leu; Val; Met; Ala; Phe; Norleucine | Leu |
| Leu (L) | Norleucine; Ile; Val; Met; Ala; Phe | Ile |
| Lys (K) | Arg; Gln; Asn | Arg |
| Met (M) | Leu; Phe; Ile | Leu |
| Phe (F) | Trp; Leu; Val; Ile; Ala; Tyr | Tyr |
| Pro (P) | Ala | Ala |
| Ser (S) | Thr | Thr |
| Thr (T) | Val; Ser | Ser |
| Trp (W) | Tyr; Phe | Tyr |
| Tyr (Y) | Trp; Phe; Thr; Ser | Phe |
| Val (V) | Ile; Leu; Met; Phe; Ala; Norleucine | Leu |

Amino acids may be grouped according to common side-chain properties:
(1) hydrophobic: Norleucine, Met, Ala, Val, Leu, and Ile;
(2) neutral hydrophilic: Cys, Ser, Thr, Asn, and Gln;
(3) acidic: Asp and Glu;
(4) basic: His, Lys, and Arg;
(5) residues that influence chain orientation: Gly and Pro; and
(6) aromatic: Trp, Tyr, and Phe.

Non-conservative substitutions will entail exchanging a member of one of these classes for another class.

One type of a substitutional variant involves substituting one or more hypervariable region residues of a parent antibody (e.g., a humanized or human antibody). Generally, the resulting variant(s) selected for further study will have modifications (e.g., improvements) in certain biological properties (e.g., increased affinity and/or reduced immunogenicity) relative to the parent antibody and/or will have substantially retained certain biological properties of the parent antibody. An exemplary substitutional variant is an rected approaches, in which several HVR residues (e.g., 4-6 residues at a time) are randomized. HVR residues involved in antigen binding may be specifically identified, e.g., using alanine scanning mutagenesis or modeling. CDR-H3 and CDR-L3 in particular are often targeted.

In certain embodiments, substitutions, insertions, or deletions may occur within one or more HVRs so long as such alterations do not substantially reduce the ability of the antibody to bind antigen. For example, conservative alterations (e.g., conservative substitutions as provided herein) that do not substantially reduce binding affinity may be made in HVRs. Such alterations may be outside of HVR "hotspots" or CDRs.

A useful method for identification of residues or regions of an antibody that may be targeted for mutagenesis is called "alanine scanning mutagenesis" as described by Cunningham and Wells. *Science*, 244:1081-1085 (1989). In this method, a residue or group of target residues (e.g., charged residues, such as Arg, Asp, His, Lys, and Glu) are identified and replaced by a neutral or negatively charged amino acid (e.g., alanine or polyalanine) to determine whether the interaction of the antibody with antigen is affected. Further substitutions may be introduced at the amino acid locations demonstrating functional sensitivity to the initial substitutions. Alternatively, or additionally, a crystal structure of an antigen-antibody complex to identify contact points between the antibody and antigen. Such contact residues and neighboring residues may be targeted or eliminated as candidates for substitution. Variants may be screened to determine whether they contain the desired properties.

Amino acid sequence insertions include amino- and/or carboxyl-terminal fusions ranging in length from one residue to polypeptides containing a hundred or more residues, as well as intrasequence insertions of single or multiple amino acid residues. Examples of terminal insertions include an antibody with an N-terminal methionyl residue. Other insertional variants of the antibody molecule include the fusion to the N- or C-terminus of the antibody to an enzyme (e.g., for ADEPT) or a polypeptide which increases the serum half-life of the antibody.

2. Derivatives

In certain embodiments, an anti-albumin construct provided herein may be further modified to contain additional non-proteinaceous moieties that are known in the art and readily available. The moieties suitable for derivatization of the anti-albumin construct include, but are not limited to, water soluble polymers. Non-limiting examples of water soluble polymers include, but are not limited to, polyethylene glycol (PEG), copolymers of ethylene glycol/propylene glycol, carboxymethylcellulose, dextran, polyvinyl alcohol, polyvinyl pyrrolidone, poly-1,3-dioxolane, poly-1,3,6-trioxane, ethylene/maleic anhydride copolymer, polyaminoacids (either homopolymers or random copolymers), dextran or poly(n-vinyl pyrrolidone)polyethylene glycol, propropylene glycol homopolymers, polypropylene oxide/ethylene oxide co-polymers, polyoxyethylated polyols (e.g., glycerol), polyvinyl alcohol, and mixtures thereof. Polyethylene glycol propionaldehyde may have advantages in manufacturing due to its stability in water. The polymer may be of any molecular weight and may be branched or unbranched. The number of polymers attached to the anti-albumin construct may vary, and if more than one polymer is attached, they can be the same or different molecules. In general, the number and/or type of polymers used for derivatization can be determined based on considerations including, but not limited to, the particular properties or functions of the anti-albumin construct to be improved, whether the anti-albumin construct derivative will be used in a therapy under defined conditions.

In certain embodiments, conjugates of an anti-albumin construct and nonproteinaceous moiety that may be selectively heated by exposure to radiation are provided. In certain embodiments, the nonproteinaceous moiety is a carbon nanotube. Kam et al., *Proc. Natl. Acad. Sci. U.S.A.* 102:11600-11605 (2005). The radiation may be of any wavelength, and includes, but is not limited to, wavelengths that do not harm ordinary cells, but which heat the nonproteinaceous moiety to a temperature at which cells proximal to the anti-albumin construct nonproteinaceous moiety are killed.

III. Pharmaceutical Compositions

Further provided by the present disclosure are pharmaceutical compositions comprising any one of anti-albumin constructs described herein, and optionally a pharmaceutically acceptable carrier. Pharmaceutical compositions can be prepared by mixing an anti-albumin construct described herein having the desired degree of purity with optional pharmaceutically acceptable carriers, excipients, or stabilizers (Remington's Pharmaceutical Sciences 16th edition, Osol, A. Ed. (1980)), in the form of lyophilized formulations or aqueous solutions.

The pharmaceutical composition is preferably to be stable, in which the anti-albumin construct described herein essentially retains its physical and chemical stability and integrity upon storage. Various analytical techniques for measuring protein stability are available in the art and are reviewed in *Peptide and Protein Drug Delivery*, 247-301, Lee Ed., Marcel Dekker, Inc., New York, N.Y., Pubs. (1991), and Jones, *Adv. Drug Delivery Rev.* 10: 29-90 (1993). Stability can be measured at a selected temperature for a selected time period. For rapid screening, the formulation may be kept at 40° C. for 2 weeks to 1 month, at which time stability is measured. Where the formulation is to be stored at 2-8° C., generally the formulation should be stable at 30° C. or 40° C. for at least 1 month, and/or stable at 2-8° C. for at least 2 years. Where the formulation is to be stored at 30° C., generally the formulation should be stable for at least 2 years at 30° C., and/or stable at 40° C. for at least 6 months. For example, the extent of aggregation during storage can be used as an indicator of protein stability. In certain embodiments, the stable formulation of anti-albumin constructs described herein may comprise less than about 10% (preferably less than about 5%) of the anti-albumin construct present as an aggregate in the formulation.

Acceptable carriers, excipients, or stabilizers are nontoxic to recipients at the dosages and concentrations employed, and include buffers; antioxidants including ascorbic acid, methionine, Vitamin E, sodium metabisulfite; preservatives; isotonicifiers (e.g., sodium chloride); stabilizers; metal complexes (e.g., Zn-protein complexes); chelating agents such as EDTA; and/or non-ionic surfactants.

Examples of physiologically acceptable carriers include buffers such as phosphate, citrate, and other organic acids; antioxidants including ascorbic acid and methionine; preservatives (such as octadecyldimethylbenzyl ammonium chloride; hexamethonium chloride; benzalkonium chloride or benzethonium chloride; phenol, butyl or benzyl alcohol; alkyl parabens such as methyl or propyl paraben; catechol; resorcinol; cyclohexanol; 3-pentanol; and m-cresol); low molecular weight (less than about 10 residues) polypeptide; proteins, such as serum albumin, gelatin, or immunoglobulins; hydrophilic polymers, such as polyvinylpyrrolidone; amino acids such as glycine, glutamine, asparagine, arginine or lysine; monosaccharides, disaccharides, and other carbohydrates including glucose, mannose, or dextrins; chelating agents such as EDTA; sugars such as sucrose, mannitol, trehalose or sorbitol; salt-forming counterions such as sodium; metal complexes (e.g., Zn-protein complexes); and/or nonionic surfactants such as TWEEN™, polyethylene glycol (PEG), and PLURONICS™ or polyethylene glycol (PEG).

Buffers are used to control the pH in a range, which optimizes the therapeutic effectiveness, especially if stability is pH dependent. Buffers are preferably present at concentrations ranging from about 50 mM to about 250 mM. Suitable buffering agents for use in the present disclosure include both organic and inorganic acids and salts thereof, for example, citrate, phosphate, succinate, tartrate, fumarate, gluconate, oxalate, lactate, and acetate. Additionally, buffers may comprise histidine and trimethylamine salts, such as Tris.

Preservatives are added to retard microbial growth and are typically present in a range from 0.2%-1.0% (w/v). The addition of a preservative may, for example, facilitate the production of a multi-use (multiple-dose) formulation. Suitable preservatives for use in the present disclosure include octadecyldimethylbenzyl ammonium chloride; hexamethonium chloride; benzalkonium halides (e.g., chloride, bromide, iodide); benzethonium chloride; thimerosal; phenol; butyl or benzyl alcohol; alkyl parabens, such as methyl or propyl paraben; catechol; resorcinol; cyclohexanol; 3-pentanol; and m-cresol.

Tonicity agents, sometimes known as "stabilizers" are present to adjust or maintain the tonicity of a liquid in a composition. When used with large, charged biomolecules, such as proteins and antibodies, they are often termed "stabilizers" because they can interact with the charged groups of the amino acid side chains, thereby lessening the potential for inter and intra-molecular interactions. Tonicity agents can be present in any amount between 0.1% to 25% by weight, preferably 1% to 5%, taking into account the relative amounts of the other ingredients. Preferred tonicity agents include polyhydric sugar alcohols, preferably trihydric or higher sugar alcohols, such as glycerin, erythritol, arabitol, xylitol, sorbitol, and mannitol.

Additional excipients include agents which can serve as one or more of the following: (1) bulking agents, (2) solubility enhancers, (3) stabilizers, and (4) agents preventing denaturation or adherence to the container wall. Such excipients include: polyhydric sugar alcohols (enumerated above); amino acids, such as alanine, glycine, glutamine, asparagine, histidine, arginine, lysine, ornithine, leucine, 2-phenylalanine, glutamic acid, and threonine; organic sugars or sugar alcohols, such as sucrose, lactose, lactitol, trehalose, stachyose, mannose, sorbose, xylose, ribose, ribitol, myoinisitose, myoinisitol, galactose, galactitol, glycerol, cyclitols (e.g., inositol), and polyethylene glycol; sulfur containing reducing agents, such as urea, glutathione, thioctic acid, sodium thioglycolate, thioglycerol, α-monothioglycerol, and sodium thio sulfate; low molecular weight proteins, such as human serum albumin, bovine serum albumin, gelatin or other immunoglobulins; hydrophilic polymers, such as polyvinylpyrrolidone; monosaccharides (e.g., xylose, mannose, fructose, and glucose); disaccharides (e.g., lactose, maltose, and sucrose); trisaccharides, such as raffinose; and polysaccharides, such as dextrin or dextran.

Non-ionic surfactants or detergents (also known as "wetting agents") are present to help solubilize the therapeutic agent as well as to protect the therapeutic protein against agitation-induced aggregation, which also permits the formulation to be exposed to shear surface stress without causing denaturation of the active therapeutic protein or antibody. Non-ionic surfactants are present in a range of about 0.05 mg/mL to about 1 mg/mL, preferably about 0.07 mg/mL to about 0.2 mg/mL.

Suitable non-ionic surfactants include polysorbates (20, 40, 60, 65, or 80), polyoxamers (184 or 188), PLURONIC® polyols, TRITON®, polyoxyethylene sorbitan monoethers (TWEEN®-20 or TWEEN®-80), lauromacrogol 400, polyoxyl 40 stearate, polyoxyethylene hydrogenated castor oil 10, 50, or 60, glycerol monostearate, sucrose fatty acid ester, methyl celluose, and carboxymethyl cellulose. Anionic detergents that can be used include sodium lauryl sulfate, dioctyl sodium sulfosuccinate, and dioctyl sodium sulfonate. Cationic detergents include benzalkonium chloride or benzethonium chloride.

In order for the pharmaceutical compositions to be used for in vivo administration, they must be sterile. The pharmaceutical composition may be rendered sterile by filtration through sterile filtration membranes. The pharmaceutical compositions herein generally are placed into a container having a sterile access port, for example, an intravenous solution bag or vial having a stopper pierceable by a hypodermic injection needle.

The route of administration is in accordance with known and accepted methods, such as by single or multiple bolus or infusion over a long period of time in a suitable manner, e.g., injection or infusion by subcutaneous, intravenous, intraperitoneal, intramuscular, intra-arterial, intralesional, or intraarticular routes, topical administration, or inhalation by sustained release or extended-release means. In certain embodiments, the pharmaceutical composition is administered locally, such as intratumorally or intravitreally.

Sustained-release preparations may be prepared. Suitable examples of sustained-release preparations include semipermeable matrices of solid hydrophobic polymers containing the antagonist, which matrices are in the form of shaped articles, e.g., films, or microcapsules. Examples of sustained-release matrices include polyesters, hydrogels (for example, poly(2-hydroxyethyl-methacrylate), or poly(vinylalcohol)), polylactides (U.S. Pat. No. 3,773,919), copolymers of L-glutamic acid and ethyl-L-glutamate, non-degradable ethylene-vinyl acetate, degradable lactic acid-glycolic acid copolymers such as the LUPRON DEPOT™ (injectable microspheres composed of lactic acid-glycolic acid copolymer and leuprolide acetate), and poly-D-(–)-3-hydroxybutyric acid.

The pharmaceutical compositions herein may also contain more than one active compound as necessary for the particular indication being treated, preferably those with complementary activities that do not adversely affect each other. Alternatively, or in addition, the composition may comprise a cytotoxic agent, chemotherapeutic agent, cytokine, immunosuppressive agent, or growth inhibitory agent. Such molecules are suitably present in combination in amounts that are effective for the purpose intended.

The active ingredients may also be entrapped in microcapsules prepared, for example, by coacervation techniques or by interfacial polymerization, for example, hydroxymethylcellulose or gelatin-microcapsules and poly-(methylmethacylate) microcapsules, respectively, in colloidal drug delivery systems (for example, liposomes, albumin microspheres, microemulsions, or nano-particles and nanocapsules) or in macroemulsions. Such techniques are disclosed in *Remington's Pharmaceutical Sciences* 18th edition.

The anti-albumin construct disclosed herein can be formulated as immunoliposomes. Liposomes containing the anti-albumin construct are prepared by methods known in the art, such as those described in Epstein et al., *Proc. Natl. Acad. Sci. U.S.A.* 82:3688-3692 (1985); Hwang et al., *Proc. Natl Acad. Sci. U.S.A.,* 77:4030-4034 (1980); and U.S. Pat. Nos. 4,485,045 and 4,544,545. Liposomes with an enhanced circulation time are disclosed in U.S. Pat. No. 5,013,556.

Particularly useful liposomes can be generated by a reverse-phase evaporation method with a lipid composition comprising phosphatidylcholine, cholesterol, and PEG-derivatized phosphatidylethanolamine (PEG-PE). Liposomes are extruded through filters of defined pore size to yield liposomes with the desired diameter.

In certain embodiments, the pharmaceutical composition is contained in a single-use vial, such as a single-use sealed vial. In certain embodiments, the pharmaceutical composition is contained in a multi-use vial. In certain embodiments, the pharmaceutical composition is contained in bulk in a container. In certain embodiments, the pharmaceutical composition is cryopreserved.

IV. Methods of Treatments

One aspect of the present disclosure provides methods of treating a disease or condition in an individual using the anti-albumin constructs or pharmaceutical compositions described herein.

In certain embodiments, there is provided a method of treating a disease or condition in an individual, comprising administering to the individual an effective amount of the construct or pharmaceutical composition as described herein. In certain embodiments, there is provided a method of treating a disease or condition in an individual, comprising administering to the individual an effective amount of an anti-albumin construct comprising a first polypeptide comprising an anti-albumin sdAb moiety and a second polypeptide, wherein the second polypeptide comprises a therapeutic agent. In certain embodiments, the therapeutic agent comprises an antigen-binding moiety (such as an antibody or fragment thereof that binds to a tumor antigen). In certain embodiments, the antigen is a tumor antigen. In certain embodiments, the tumor is a solid tumor. In certain embodiments, the tumor is a liquid tumor. In certain embodiments, the tumor antigen is selected from the group consisting of mesothelin ("MSLN"), GPA33, Her-2, EGFR, CD20, CEA, MUC16, MUC1, AFP, EPCAM, CD19, CD21, CD22, CD30, CD33, CD37, CD45, PSMA, and BCMA. In certain embodiments, the agent is an immune checkpoint protein. In certain embodiments, the therapeutic agent comprises a cytokine. In certain embodiments, the cytokine is selected from the group consisting of IL-21, IL-7, IL-15, IL-15 bound to IL-15Rα or fragment thereof, IL-33, and IL-22.

Disease or Disorder

The methods described herein can be used to treat a disease or disorder. In certain embodiments, the disease or condition is a cancer, an inflammatory condition, or an infection.

In certain embodiments, the disease or condition is an inflammatory disease. In certain embodiments, the disease is selected from the group consisting of ulcerative colitis, Crohn's disease, or ulcerative ileitis, and intestinal graft vs host disease.

In certain embodiments, the disease or condition is a cancer. In certain embodiments, the cancer is a solid tumor. In certain embodiments, the cancer is a liquid tumor. In certain embodiments, the cancer is selected from the group consisting of mesothelioma, lung cancer, breast cancer, ovarian cancer, pancreatic cancer, lymphoma (non-Hodgkin's lymphoma), leukemia (such as acute myeloid leukemia), head and neck cancer, liver cancer, renal cancer, kidney cancer, esophageal cancer, gastric cancer, and colorectal cancer. In certain embodiments, the cancer is selected from the group consisting of mesothelioma, lung cancer, ovarian cancer, and gastric cancer.

Combination Therapy

In certain embodiments, the method further comprises administering a second agent. In certain embodiments, the second agent comprises a therapeutic antibody, an immune checkpoint inhibitor, a second cytokine, a chemotherapeutic agent, a tyrosine kinase inhibitor, or an immune cell.

In certain embodiments, the second agent is a therapeutic antibody. In certain embodiments, the therapeutic antibody binds to a tumor antigen. In certain embodiments, the tumor antigen is selected from the group consisting of mesothelin, GPA33, Her-2, EGFR, and CD20. In certain embodiments, the tumor antigen is selected from the group consisting of CEA, MUC16, MUC1, AFP, EPCAM, CD19, CD21, CD22, CD30, CD33, CD37, CD45, PSMA, and BCMA.

In certain embodiments, the tumor antigen is mesothelin. In certain embodiments, the second agent is an anti-mesothelin antibody or fragment thereof. In certain embodiments, the anti-mesothelin antibody or fragment thereof comprises a single chain antibody comprising an anti-mesothelin heavy chain variable region (anti-MSLN VH), wherein the anti-MSLN VH comprises a CDR1, a CDR2, and a CDR3, wherein: a) the CDR1 comprising the amino acid sequence of SEQ ID NO: 92, the CDR2 comprising the amino acid sequence of SEQ ID NO: 93, and the CDR3 comprising the amino acid sequence of SEQ ID: NO: 94, or a variant thereof comprising up to a total of 3, 2, or 1 amino acid substitutions in the CDRs; orb) the CDR1 comprising the amino acid sequence of SEQ ID NO: 95, the CDR2 comprising the amino acid sequence of SEQ ID NO: 96, and the CDR3 comprising the amino acid sequence of GRY, or a variant thereof comprising up to a total of 3, 2, or 1 amino acid substitutions in the CDRs.

In certain embodiments, the second agent is an immune checkpoint modulator. In certain embodiments, the immune checkpoint modulator is an inhibitor of an immune checkpoint protein selected from the group consisting of PD-L1, CTLA4, PD-L2, PD-1, CD47, albumin, GITR, TIM3, LAGS, CD27 and B7H4.

In certain embodiments, the immune checkpoint protein is PD-1. In certain embodiments, the second agent is an anti-PD-1 antibody or fragment thereof.

In certain embodiments, the second agent is a second cytokine. In certain embodiments, the cytokine in the anti-albumin construct is IL-21, and wherein the second cytokine is selected from the group consisting of IL-7. IL-15, and IL-15 bound to IL-15Rα or half-life extended variants thereof.

In certain embodiments, the second agent is an immune cell. In certain embodiments, the immune cell comprises T cells or NK cells. In certain embodiments, the immune cell comprises T cells expressing a chimeric antigen receptor (CAR), T cells expressing a modified T cell receptor (TCR), or T cells isolated from a tumor.

In certain embodiments, the second agent is a tyrosine kinase inhibitor.

In certain embodiments, the second agent is a chemotherapeutic agent (such as sorafenib).

Dosing Regimen

The anti-albumin constructs and/or second agents may be administered to the individual using any suitable dosage and routes of administration. In certain embodiments, the anti-albumin construct and/or the second agent is administered parenterally into the individual. The route of administration is in accordance with known and accepted methods, such as by single or multiple bolus or infusion over a period of time in a suitable manner, e.g., injection or infusion by subcutaneous, intravenous, intraperitoneal, intramuscular, intra-arterial, intralesional, intraarticular, intratumoral, or oral routes.

In certain embodiments, the anti-albumin construct and the second agent are administered simultaneously, concurrently, or sequentially into the individual.

The determination of the appropriate dosage or route of administration is well within the skill of an ordinary artisan. Animal experiments provide reliable guidance for the determination of effective doses for human diagnostic applications. Interspecies scaling of effective doses can be performed following the principles laid down by Mordenti and Chappell, "The Use of Interspecies Scaling in Toxicokinetics," In *Toxicokinetics and New Drug Development*, Yacobi et al., Eds, Pergamon Press, New York 1989, pp. 42-46.

In certain embodiments, the anti-albumin construct is administered about once every three weeks to about twice a week (such as about once every three weeks to about once every two weeks, about once every two weeks to about once every week, or about once every week to about twice a week). In certain embodiments, the anti-albumin construct is administered no less than about once every three weeks, about once every two weeks, about once every week, or about twice a week. In certain embodiments, the anti-albumin construct is administered no more than about once every three weeks, about once every two weeks, about once every week, or about twice a week. In certain embodiments, the anti-albumin construct is administered about once every three weeks, about once every two weeks, about once every week, or about twice a week.

In certain embodiments, the anti-albumin construct is administered for at least about one week to six months (such as one week to two, three, or four weeks, one week to one, two, three, four, five, or six months, one month to two, three, four, five, or six months, three month to four, five, or six month) for each treatment cycle.

In certain embodiments, the amount of anti-albumin construct for each administration is about 100 ng/kg to about 10 mg/kg (for example, about 100 ng/kg to about 500 ng/kg, about 500 ng/kg to about 1 µg/kg, about 1 µg/kg to about 5 µg/kg, about 5 µg/kg to about 10 µg/kg, about 10 µg/kg to about 50 µg/kg, about 50 µg/kg to about 100 µg/kg, about 100 µg/kg to about 500 µg/kg, about 500 µg/kg to about 1 mg/kg, about 1 mg/kg to about 5 mg/kg, or about 5 mg/kg to about 10 mg/kg).

In certain embodiments, the second agent (such as a therapeutic antibody that binds to mesothelin or an inhibitor of PD-1) is administered about once per month to about twice per week (such as about once per month to twice, three times or four times a month, about once every two weeks, about once every three weeks, about once every week, or twice each week).

In certain embodiments, the amount of the second agent (such as a therapeutic antibody that binds to mesothelin or an inhibitor of PD-1) for each administration is about 100 ng/kg to about 100 mg/kg (for example, about 100 ng/kg to about 500 ng/kg, about 500 ng/kg to about 1 µg/kg, about 1 µg/kg to about 5 µg/kg, about 5 µg/kg to about 10 µg/kg, about 10 µg/kg to about 50 µg/kg, about 50 µg/kg to about 100 µg/kg, about 100 µg/kg to about 500 µg/kg, about 500 µg/kg to about 1 mg/kg, about 1 mg/kg to about 5 mg/kg, about 5 mg/kg to about 10 mg/kg, about 10 mg/kg to about 50 mg/kg, or about 50 mg/kg to about 100 mg/kg).

VI. Methods of Preparation

The anti-albumin construct described herein may be prepared using any methods known in the art or as described herein. See, e.g., Examples 1-5. In certain embodiments, there is provided a method of producing an anti-albumin construct, comprising: (a) culturing a host cell comprising an isolated nucleic acid or vector encoding the anti-albumin construct described herein under conditions effective to express the encoded anti-albumin construct; and (b) obtaining the expressed anti-albumin construct from said host cell. In certain embodiments, the method of step (a) further comprises producing a host cell comprising the isolated nucleic acid or vector encoding the anti-albumin construct described herein.

Methods of preparing sdAbs have been described. See, e.g., Els Pardon et al., *Nat. Protoc.* 9:674-693 (2014). SdAbs (such as $V_H$Hs) may be obtained using methods known in the art such as by immunizing a camelid species (such as camel or llama) and obtaining hybridomas therefrom, or by cloning a library of single-domain antibodies using molecular biology techniques known in the art and subsequent selection by ELISA with individual clones of unselected libraries or by using phage display.

For recombinant production of the sdAbs, the nucleic acids encoding the single-domain antibodies are isolated and inserted into a replicable vector for further cloning (amplification of the DNA) or for expression. DNA encoding the single-domain antibody is readily isolated and sequenced using conventional procedures (e.g., by using oligonucleotide probes that are capable of binding specifically to genes encoding the heavy and light chains of the antibody). Many vectors are available. The choice of vector depends in part on the host cell to be used. Generally, preferred host cells are of either a prokaryotic or eukaryotic (generally mammalian) origin. In certain embodiments, the isolated nucleic acid encoding the anti-albumin construct described herein comprises the nucleic acid sequence encoding any one of SEQ ID NOs: 1-9, 45-53, 99-101, 103-115, 149, and 150. In certain embodiments, the isolated nucleic acid encoding the anti-albumin construct described herein comprises the nucleic acid sequence encoding any one of SEQ ID NOs: 1-9, 45-53, 99-101, 103-115, 149, and 150.

1. Recombinant Production in Prokaryotic Cells a) Vector Construction

Polynucleic acid sequences encoding the antibodies of the present disclosure can be obtained using standard recombinant techniques. Desired polynucleic acid sequences may be isolated and sequenced from antibody producing cells such as hybridoma cells. Alternatively, polynucleotides can be synthesized using a nucleotide synthesizer or PCR techniques. Once obtained, sequences encoding the polypeptides are inserted into a recombinant vector capable of replicating and expressing heterologous polynucleotides in prokaryotic hosts. Many vectors that are available and known in the art can be used for the purpose of the present disclosure. Selection of an appropriate vector will depend mainly on the size of the nucleic acids to be inserted into the vector and the particular host cell to be transformed with the vector. Each vector contains various components, depending on its function (amplification and/or expression of heterologous polynucleotide) and its compatibility with the particular host cell in which it resides. The vector components generally include, but are not limited to, an origin of replication, a selection marker gene, a promoter, a ribosome binding site (RBS), a signal sequence, the heterologous nucleic acid insert, and a transcription termination sequence.

In general, plasmid vectors containing replicon and control sequences which are derived from species compatible with the host cell are used in connection with these hosts. The vector ordinarily carries a replication site, as well as marking sequences that are capable of providing phenotypic selection in transformed cells.

In addition, phage vectors containing replicon and control sequences that are compatible with the host microorganism can be used as transforming vectors in connection with these hosts. For example, bacteriophage such as GEM™-11 may be utilized in making a recombinant vector, which can be used to transform susceptible host cells such as *E. coli* LE392.

The expression vector of the present disclosure may comprise two or more promoter-cistron pairs, encoding each of the polypeptide components. A promoter is an untranslated regulatory sequence located upstream (5') to a cistron that modulates its expression. Prokaryotic promoters typically fall into two classes, inducible and constitutive. Inducible promoter is a promoter that initiates increased levels of transcription of the cistron under its control in response to changes in the culture condition, e.g., the presence or absence of a nutrient or a change in temperature.

A large number of promoters recognized by a variety of potential host cells are well known. The selected promoter can be operably linked to cistron DNA encoding the light or heavy chain by removing the promoter from the source DNA via restriction enzyme digestion and inserting the isolated promoter sequence into the vector of the present disclosure. Both the native promoter sequence and many heterologous promoters may be used to direct amplification and/or expression of the target genes. In certain embodiments, heterologous promoters are utilized, as they generally permit greater transcription and higher yields of an expressed target gene as compared to the native target polypeptide promoter.

Promoters suitable for use with prokaryotic hosts include the PhoA promoter, the galactamase and lactose promoter systems, a tryptophan (trp) promoter system, and hybrid promoters such as the tac or the trc promoter. However, other promoters that are functional in bacteria (such as other known bacterial or phage promoters) are suitable as well. Their nucleic acid sequences have been published, thereby enabling a skilled worker operably to ligate them to cistrons encoding the target light and heavy chains using linkers or adaptors to supply any required restriction sites. Siebenlist et al., *Cell* 20:269-281 (1980).

In one aspect, each cistron within the recombinant vector comprises a secretion signal sequence component that directs translocation of the expressed polypeptides across a membrane. In general, the signal sequence may be a component of the vector, or it may be a part of the target polypeptide DNA that is inserted into the vector. The signal sequence selected for the purpose of this disclosure should be one that is recognized and processed (i.e., cleaved by a signal peptidase) by the host cell. For prokaryotic host cells that do not recognize and process the signal sequences native to the heterologous polypeptides, the signal sequence is substituted by a prokaryotic signal sequence selected, for example, from the group consisting of the alkaline phosphatase, penicillinase, Ipp, or heat-stable enterotoxin II (STII) leaders, LamB, PhoE, PeiB, OmpA, and MBP. In certain embodiments of the present disclosure, the signal sequences used in both cistrons of the expression system are STII signal sequences or variants thereof.

In certain embodiments, the production of the anti-albumin construct according to the present disclosure can occur in the cytoplasm of the host cell, and therefore does not require the presence of secretion signal sequences within each cistron. In certain embodiments, polypeptide components, such as the polypeptide encoding the $V_H$ domain of the second antigen binding portion optionally fused to the first antigen binding portion, and the polypeptide encoding the $V_L$ domain of the second antigen binding portion optionally fused to the first antigen binding portion, are expressed, folded, and assembled to form functional antibodies within the cytoplasm. Certain host strains (e.g., the *E. coli* trxB⁻ strains) provide cytoplasm conditions that are favorable for disulfide bond formation, thereby permitting proper folding and assembly of expressed protein subunits. Proba and Pluckthun, *Gene* 159:203-207 (1995).

The present disclosure provides an expression system in which the quantitative ratio of expressed polypeptide components can be modulated in order to maximize the yield of secreted and properly assembled antibodies of the present disclosure. Such modulation is accomplished at least in part by simultaneously modulating translational strengths for the polypeptide components. One technique for modulating translational strength is disclosed in U.S. Pat. No. 5,840,523. It utilizes variants of the translational initiation region (TIR) within a cistron. For a given TIR, a series of amino acid or nucleic acid sequence variants can be created with a range of translational strengths, thereby providing a convenient means by which to adjust this factor for the desired expression level of the specific chain. TIR variants can be generated by conventional mutagenesis techniques that result in codon changes which can alter the amino acid sequence, although silent changes in the nucleic acid sequence are preferred. Alterations in the TIR can include, for example, alterations in the number or spacing of Shine-Dalgarno sequences, along with alterations in the signal sequence. One method for generating mutant signal sequences is the generation of a "codon bank" at the beginning of a coding sequence that does not change the amino acid sequence of the signal sequence (i.e., the changes are silent). This can be accomplished by changing the third nucleotide position of each codon; additionally, some amino acids, such as leucine, serine, and arginine, have multiple first and second positions that can add complexity in making the bank.

Preferably, a set of vectors is generated with a range of TIR strengths for each cistron therein. This limited set provides a comparison of expression levels of each chain as well as the yield of the desired protein products under various TIR strength combinations. TIR strengths can be determined by quantifying the expression level of a reporter gene as described in detail in U.S. Pat. No. 5,840,523. Based on the translational strength comparison, the desired individual TIRs are selected to be combined in the expression vector constructs of the present disclosure.

b) Prokaryotic Host Cells

Prokaryotic host cells suitable for expressing the antibodies of the present disclosure include Archaebacteria and Eubacteria, such as gram-negative or gram-positive organisms. Examples of useful bacteria include *Escherichia* (e.g., *E. coli*), Bacilli (e.g., *B. subtilis*), Enterobacteria, *Pseudomonas* species (e.g., *P. aeruginosa*), *Salmonella typhimurium*, *Serratia marcescans*, *Klebsiella*, *Proteus*, *Shigella*, *Rhizobia*, *Vitreoscilla*, or *Paracoccus*. In certain embodiments, gram-negative cells are used. In certain embodiments, *E. coli* cells are used as hosts. Examples of *E. coli* strains include strain W3110 and derivatives thereof, including strain 33D3 having genotype W3110 AfhuA (AtonA) ptr3 lac Iq lacL8 AompT A(nmpc-fepE) degP41 kan$^R$ (U.S. Pat. No. 5,639,635). Other strains and derivatives thereof, such as *E. coli* 294 (ATCC 31,446), *E. coli* B, *E. coli* 1776 (ATCC 31,537), and *E. coli* RV308 (ATCC 31,608) are also suitable. These examples are illustrative rather than limiting. It is generally necessary to select the appropriate bacteria taking into consideration replicability of the replicon in the cells of a bacterium. For example, *E. coli*, *Serratia*, or *Salmonella* species can be suitably used as the host when well-known plasmids such as pBR322, pBR325, pACYC177, or pKN410 are used to supply the replicon.

Typically, the host cell should secrete minimal amounts of proteolytic enzymes, and additional protease inhibitors may desirably be incorporated in the cell culture.

c) Protein Production

Host cells are transformed with the above-described expression vectors and cultured in conventional nutrient media modified as appropriate for inducing promoters, selecting transformants, or amplifying the genes encoding the desired sequences. Transformation means introducing DNA into the prokaryotic host so that the DNA is replicable, either as an extrachromosomal element or by chromosomal integrant. Depending on the host cell used, transformation is done using standard techniques appropriate to such cells. The calcium treatment employing calcium chloride is generally used for bacterial cells that contain substantial cell-wall barriers. Another method for transformation employs polyethylene glycol/DMSO. Yet another technique used is electroporation.

Prokaryotic cells used to produce the antibodies of the present disclosure are grown in media known in the art and suitable for culture of the selected host cells. Examples of suitable media include luria broth (LB) plus necessary nutrient supplements. In certain embodiments, the media also contains a selection agent, chosen based on the construction of the expression vector, to selectively permit growth of prokaryotic cells containing the expression vector. For example, ampicillin is added to media for growth of cells expressing ampicillin resistant gene.

Any necessary supplements besides carbon, nitrogen, and inorganic phosphate sources may also be included at appropriate concentrations introduced alone or as a mixture with another supplement or medium such as a complex nitrogen source. Optionally the culture medium may contain one or more reducing agents selected from the group consisting of glutathione, cysteine, cystamine, thioglycollate, dithioerythritol, and dithiothreitol. The prokaryotic host cells are cultured at suitable temperatures. For *E. coli* growth, for example, the preferred temperature ranges from about 20° C. to about 39° C., more preferably from about 25° C. to about 37° C., even more preferably at about 30° C. The pH of the medium may be any pH ranging from about 5 to about 9, depending mainly on the host organism. For *E. coli*, the pH is preferably from about 6.8 to about 7.4, and more preferably about 7.0.

If an inducible promoter is used in the expression vector of the present disclosure, protein expression is induced under conditions suitable for the activation of the promoter. In one aspect of the present disclosure, PhoA promoters are used for controlling transcription of the polypeptides. Accordingly, the transformed host cells are cultured in a phosphate-limiting medium for induction. Preferably, the phosphate-limiting medium is the C.R.A.P medium. A variety of other inducers may be used, according to the vector construct employed, as is known in the art.

The expressed anti-albumin construct of the present disclosure is secreted into and recovered from the periplasm of the host cells. Protein recovery typically involves disrupting the microorganism, generally by such means as osmotic shock, sonication or lysis. Once cells are disrupted, cell debris or whole cells may be removed by centrifugation or filtration. The proteins may be further purified, for example, by affinity resin chromatography. Alternatively, proteins can be transported into the culture media and isolated therein. Cells may be removed from the culture and the culture supernatant being filtered and concentrated for further purification of the proteins produced. The expressed polypeptides can be further isolated and identified using commonly known methods such as polyacrylamide gel electrophoresis (PAGE) and Western blot assay.

Alternatively, protein production is conducted in large quantity by a fermentation process. Various large-scale fed-batch fermentation procedures are available for production of recombinant proteins. Large-scale fermentations have at least 1,000 liters of capacity, preferably about 1,000 to 100,000 liters of capacity. These fermentors use agitator impellers to distribute oxygen and nutrients, especially glucose (the preferred carbon/energy source). Small scale fermentation refers generally to fermentation in a fermentor that is no more than approximately 100 liters in volumetric capacity and can range from about 1 liter to about 100 liters.

During the fermentation process, induction of protein expression is typically initiated after the cells have been grown under suitable conditions to a desired density, e.g., an $OD_{550}$ of about 180-220, at which stage the cells are in the early stationary phase. A variety of inducers may be used, according to the vector construct employed, as is known in the art and described above. Cells may be grown for shorter periods prior to induction. Cells are usually induced for about 12-50 hours, although longer or shorter induction time may be used.

To improve the production yield and quality of the antibodies of the present disclosure, various fermentation conditions can be modified. For example, to improve the proper assembly and folding of the secreted polypeptides, additional vectors overexpressing chaperone proteins, such as Dsb proteins (DsbA, DsbB, DsbC, DsbD, and/or DsbG) or FkpA (a peptidylprolyl cis,trans-isomerase with chaperone activity) can be used to co-transform the host prokaryotic cells. The chaperone proteins have been demonstrated to facilitate the proper folding and solubility of heterologous proteins produced in bacterial host cells.

To minimize proteolysis of expressed heterologous proteins (especially those that are proteolytically sensitive), certain host strains deficient for proteolytic enzymes can be used for the present invention. For example, host cell strains may be modified to effect genetic mutation(s) in the genes encoding known bacterial proteases such as Protease III, OmpT, DegP, Tsp, Protease I, Protease Mi, Protease V, Protease VI, and combinations thereof.

*E. coli* strains deficient for proteolytic enzymes and transformed with plasmids overexpressing one or more chaperone proteins may be used as host cells in the expression system encoding the antibodies of the present disclosure.

d) Protein Purification

The anti-albumin construct produced herein are further purified to obtain preparations that are substantially homogeneous for further assays and uses. Standard protein purification methods known in the art can be employed. The following procedures are exemplary of suitable purification procedures: fractionation on immunoaffinity or ion-exchange columns, ethanol precipitation, reverse phase HPLC, chromatography on silica or on a cation-exchange resin such as DEAE, chromatofocusing, SDS-PAGE, ammonium sulfate precipitation, and gel filtration using, for example, Sephadex G-75.

In certain embodiments, protein A immobilized on a solid phase is used for immunoaffinity purification of the antibodies comprising an Fc region of the present disclosure. Protein A is a 411 (D cell wall protein from *Staphylococcus aureas* which binds with a high affinity to the Fc region of antibodies. Lindmark et al., *J. Immunol. Meth.* 62:1-13 (1983). The solid phase to which protein A is immobilized is preferably a column comprising a glass or silica surface, more preferably a controlled pore glass column or a silicic acid column. In some applications, the column has been coated with a reagent, such as glycerol, in an attempt to prevent nonspecific adherence of contaminants. The solid phase is then washed to remove contaminants non-specifically bound to the solid phase. Finally, the antibodies of interest are recovered from the solid phase by elution.

2. Recombinant Production in Eukaryotic Cells

For eukaryotic expression, the vector components generally include, but are not limited to, one or more of the following, a signal sequence, an origin of replication, one or more marker genes, and enhancer element, a promoter, and a transcription termination sequence.

a) Signal Sequence Component

A vector for use in a eukaryotic host may also be an insert that encodes a signal sequence or other polypeptide having a specific cleavage site at the N-terminus of the mature protein or polypeptide. The heterologous signal sequence selected preferably is one that is recognized and processed (i.e., cleaved by a signal peptidase) by the host cell. In mammalian cell expression, mammalian signal sequences as well as viral secretory leaders, for example, the herpes simplex gD signal, are available.

The DNA for such a precursor region is ligated in reading frame to the DNA encoding the antibodies of the present disclosure.

b) Origin of Replication

Generally, the origin of a replication component is not needed for mammalian expression vectors (the SV40 origin may typically be used only because it contains the early promoter).

c) Selection Gene Component

Expression and cloning vectors may contain a selection gene, also termed a selectable marker. Typical selection genes encode proteins that (a) confer resistance to antibiotics or other toxins, e.g., ampicillin, neomycin, methotrexate, or tetracycline; (b) complement auxotrophic deficiencies; or (c) supply critical nutrients not available from complex media, e.g., the gene encoding D-alanine racemase for Bacilli.

One example of a selection scheme utilizes a drug to arrest growth of a host cell. Those cells that are successfully transformed with a heterologous gene produce a protein conferring drug resistance and thus survive the selection regimen. Examples of such dominant selection use the drugs neomycin, mycophenolic acid, and hygromycin.

Another example of suitable selectable markers for mammalian cells are those that enable the identification of cells competent to take up nucleic acid encoding the antibodies of the present disclosure, such as DHFR, thymidine kinase, metallothionein-I and -II, preferably primate metallothionein genes, adenosine deaminase, or ornithine decarboxylase.

For example, cells transformed with the DHFR selection gene are first identified by culturing all the transformants in a culture medium that contains methotrexate (Mtx), a competitive antagonist of DHFR. An appropriate host cell when wild-type DHFR is employed is the Chinese hamster ovary (CHO) cell line deficient in DHFR activity (e.g., ATCC CRL-9096).

Alternatively, host cells (particularly wild-type hosts that contain endogenous DHFR) transformed or co-transformed with the polypeptide encoding-DNA sequences, wild-type DHFR protein, and another selectable marker such as aminoglycoside 3'-phosphotransferase (APH) can be selected by cell growth in medium containing a selection agent for the selectable marker such as an aminoglycosidic antibiotic, e.g., kanamycin, neomycin, or G418.

d) Promoter Component

Expression and cloning vectors usually contain a promoter that is recognized by the host organism and is operably linked to the nucleic acid encoding the desired polypeptide sequences. Virtually all eukaryotic genes have an AT-rich region located approximately 25 to 30 based upstream from the site where transcription is initiated. Another sequence found 70 to 80 bases upstream from the start of the transcription of many genes is a CNCAAT region, where N may be any nucleotide. At the 3' end of most eukaryotic is an AATAAA sequence that may be the signal for addition of the poly A tail to the 3' end of the coding sequence. All these sequences may be inserted into eukaryotic expression vectors.

Other promoters suitable for use with prokaryotic hosts include the phoA promoter, lactamase and lactose promoter systems, alkaline phosphatase promoter, a tryptophan (trp) promoter system, and hybrid promoters such as the tac promoter. However, other known bacterial promoters are suitable. Promoters for use in bacterial systems also will contain a Shine-Dalgarno (S.D.) sequence operably linked to the DNA encoding the antibodies.

Polypeptide transcription from vectors in mammalian host cells is controlled, for example, by promoters obtained from the genomes of viruses such as polyoma virus, fowlpox virus, adenovirus (such as Adenovirus 2), bovine papilloma virus, avian sarcoma virus, cytomegalovirus, a retrovirus, hepatitis-B virus, and most preferably Simian Virus 40 (SV40), from heterologous mammalian promoters, e.g., the actin promoter or an immunoglobulin promoter, from heat-shock promoters, provided such promoters are compatible with the host cell systems.

The early and late promoters of the SV40 virus are conveniently obtained as an SV40 restriction fragment that also contains the SV40 viral origin of replication. The immediate early promoter of the human cytomegalovirus is conveniently obtained as a HindIII E restriction fragment. A system for expressing DNA in mammalian hosts using the bovine papilloma virus as a vector is disclosed in U.S. Pat. No. 4,419,446. A modification of this system is described in U.S. Pat. No. 4,601,978. Also see Reyes et al., Nature 297:598-601 (1982) on expression of human-interferon cDNA in mouse cells under the control of a thymidine kinase promoter from herpes simplex virus. Alternatively, the Rous Sarcoma virus long terminal repeat can be used as a promoter.

e) Enhancer Element Component

Transcription of a DNA encoding the antibodies of the present disclosure by higher eukaryotes is often increased by inserting an enhancer sequence into the vector. Many enhancer sequences are now known from mammalian genes (globin, elastase, albumin, α-fetoprotein, and insulin). Typically, however, one will use an enhancer from a eukaryotic cell virus. Examples include the SV40 enhancer on the late side of the replication origin (100-270 bp), the cytomegalovirus early promoter enhancer, the polyoma enhancer on the late side of the replication origin, and adenovirus enhancers. The enhancer may be spliced into the vector at a position 5' or 3' to the polypeptide encoding sequence but is preferably located at a site 5' from the promoter.

f) Transcription Termination Component

Expression vectors used in eukaryotic host cells (yeast, fungi, insect, plant, animal, human, or nucleated cells from other multicellular organisms) will also contain sequences necessary for the termination of transcription and for stabilizing the mRNA. Such sequences are commonly available from the 5' and, occasionally 3', untranslated regions of eukaryotic or viral DNAs or cDNAs. These regions contain nucleotide segments transcribed as polyadenylated fragments in the untranslated portion of the polypeptide-encoding mRNA. One useful transcription termination component is the bovine growth hormone polyadenylation region. See WO94/11026 and the expression vector disclosed therein.

g) Selection and Transformation of Host Cells

Suitable host cells for cloning or expressing the DNA in the vectors herein include higher eukaryote cells described herein, including vertebrate host cells. Propagation of vertebrate cells in culture (tissue culture) has become a routine procedure. Examples of useful mammalian host cell lines are monkey kidney CV1 line transformed by SV40 (COS-7, ATCC CRL 1651); human embryonic kidney line (293 or 293 cells subcloned for growth in suspension culture, Graham et al., *J. Gen. Virol.* 36:59-74 (1977)); baby hamster kidney cells (BHK, ATCC CCL 10); Chinese hamster ovary cells/-DHFR (CHO, Urlaub et al., *Proc. Natl. Acad. Sci. U.S.A.* 77:4216-4620 (1980)); mouse sertoli cells (TM4, Mather, *Biol. Reprod.* 23:243-252 (1980)); monkey kidney cells (CV1 ATCC CCL 70); African green monkey kidney cells (VERO-76, ATCC CRL-1587); human cervical carcinoma cells (HELA, ATCC CCL 2); canine kidney cells (MDCK, ATCC CCL 34); buffalo rat liver cells (BRL 3A, ATCC CRL 1442); human lung cells (W138, ATCC CCL 75); human liver cells (Hep G2, HB 8065); mouse mammary tumor (MMT 060562, ATCC CCL51); TR1 cells (Mather et al., *Ann. N.Y. Acad. Sci.* 383:44-68 (1982)); MRC 5 cells; FS4 cells; and a human hepatoma line (Hep G2).

Host cells are transformed with the above-described expression or cloning vectors for antibodies production and cultured in conventional nutrient media modified as appropriate for inducing promoters, selecting transformants, or amplifying the genes encoding the desired sequences.

h) Culturing the Host Cells

The host cells used to produce the antibodies of the present disclosure may be cultured in a variety of media. Commercially available media such as Ham's F10 (Sigma), Minimal Essential Medium ((MEM), (Sigma), RPMI-1640 (Sigma), and Dulbecco's Modified Eagle's Medium ((DMEM), Sigma) are suitable for culturing the host cells. The media may be supplemented as necessary with hormones and/or other growth factors (such as insulin, transferrin, or epidermal growth factor), salts (such as sodium chloride, calcium, magnesium, and phosphate), buffers (such as HEPES), nucleotides (such as adenosine and thymidine), antibiotics (such as GENTAMYCIN™ drug), trace elements (defined as inorganic compounds usually present at final concentrations in the micromolar range), and glucose or an equivalent energy source. Any other necessary supplements may also be included at appropriate concentrations that would be known to those skilled in the art. The culture conditions, such as temperature and pH, are those previously used with the host cell selected for expression and will be apparent to the ordinarily skilled artisan.

i) Protein Purification

When using recombinant techniques, the antibodies can be produced intracellularly, in the periplasmic space, or directly secreted into the medium. If the antibody is produced intracellularly, as a first step, the particulate debris, either host cells or lysed fragments, are removed, for example, by centrifugation or ultrafiltration. Carter et al., *Biotechnology* (N.Y.) 10:163-167 (1992) describe a procedure for isolating antibodies, which are secreted to the periplasmic space of *E. coli*. Briefly, cell paste is thawed in the presence of sodium acetate (pH 3.5), EDTA, and phenylmethylsulfonylfluoride (PMSF) over about 30 min. Cell debris can be removed by centrifugation. Where the antibody is secreted into the medium, supernatants from such expression systems are generally first concentrated using a commercially available protein concentration filter, for example, an Amicon or Millipore Pellicon ultrafiltration unit. A protease inhibitor such as PMSF may be included in any of the foregoing steps to inhibit proteolysis and antibiotics may be included to prevent the growth of adventitious contaminants.

The protein composition prepared from the cells can be purified using, for example, hydroxylapatite chromatography, gel electrophoresis, dialysis, and affinity chromatography, with affinity chromatography being the preferred purification technique. The suitability of protein A as an affinity ligand depends on the species and isotype of any immunoglobulin Fc domain that is present in the antibody. Protein A can be used to purify the antibodies that are based on human immunoglobulins containing 1, 2, or 4 heavy chains. Protein G is recommended for all mouse isotypes and for human 3. The matrix to which the affinity ligand is attached is most often agarose, but other matrices are available. Mechanically stable matrices such as controlled pore glass or poly(styrenedivinyl)benzene allow for faster flow rates and shorter processing times than can be achieved with agarose. Where the antibody comprises a $C_H3$ domain, the Bakerbond ABX™ resin (J. T. Baker, Phillipsburg, N.J.) is useful for purification. Other techniques for protein purification such as fractionation on an ion-exchange column, ethanol precipitation, reverse phase HPLC, chromatography on silica, chromatography on heparin SEPHAROSE™ chromatography on an anion or cation exchange resin (such as a polyaspartic acid column), chromatofocusing, SDS-PAGE, and ammonium sulfate precipitation are also available depending on the antibody to be recovered.

Following any preliminary purification step(s), the mixture comprising the antibody of interest and contaminants may be subjected to low pH hydrophobic interaction chromatography using an elution buffer at a pH between about 2.5-4.5, preferably performed at low salt concentrations (e.g., from about 0-0.25 M salt).

3. Polyclonal Antibodies

Polyclonal antibodies are generally raised in animals by multiple subcutaneous (s.c.) or intraperitoneal (i.p.) injections of the relevant antigen and an adjuvant. It may be useful to conjugate the relevant antigen to a protein that is immunogenic in the species to be immunized, e.g., keyhole limpet hemocyanin (KLH), serum albumin, bovine thyroglobulin, or soybean trypsin inhibitor, using a bifunctional or derivatizing agent, e.g., maleimidobenzoyl sulfosuccinimide ester (conjugation through cysteine residues), N-hydroxysuccinimide (through lysine residues), glutaraldehyde, succinic anhydride, $SOCl_2$, or $R^1N=C=NR$, where R and $R^1$ are independently lower alkyl groups. Examples of adjuvants which may be employed include Freund's complete adjuvant and MPL-TDM adjuvant (monophosphoryl Lipid A, synthetic trehalose dicorynomycolate). The immunization protocol may be selected by one skilled in the art without undue experimentation.

The animals are immunized against the antigen, immunogenic conjugates, or derivatives by combining, e.g., 100 µg or 5 µg of the protein or conjugate (for rabbits or mice, respectively) with 3 volumes of Freund's complete adjuvant and injecting the solution intradermally at multiple sites. One month later, the animals are boosted with ⅕ to ⅒ of the original amount of the peptide or conjugate in Freund's complete adjuvant by subcutaneous injection at multiple sites. Seven to fourteen days later, the animals are bled and the serum is assayed for antibody titer. Animals are boosted until the titer plateaus. Conjugates also can be made in recombinant cell culture as protein fusions. Also, aggregating agents such as alum are suitable to enhance the immune response. Also see Example 1 for immunization in camels.

4. Monoclonal Antibodies

Monoclonal antibodies are obtained from a population of substantially homogeneous antibodies, i.e., the individual antibodies comprising the population are identical except for possible naturally occurring mutations and/or post-translational modifications (e.g., isomerizations, amidations) that may be present in minor amounts. Thus, the modifier "monoclonal" indicates the character of the antibody as not being a mixture of discrete antibodies. For example, the monoclonal antibodies may be made using the hybridoma method first described by Kohler et al., Nature 256:495-497 (1975), or may be made by recombinant DNA methods (U.S. Pat. No. 4,816,567). In the hybridoma method, a mouse or other appropriate host animal, such as a hamster or a llama, is immunized as hereinabove described to elicit lymphocytes that produce or are capable of producing antibodies that will specifically bind the protein used for immunization. Alternatively, lymphocytes may be immunized in vitro. Lymphocytes then are fused with myeloma cells using a suitable fusing agent, such as polyethylene glycol, to form a hybridoma cell (Goding, *Monoclonal Antibodies: Principles and Practice*, pp. 59-103 (Academic Press, 1986)). Also see Example 1 for immunization in camels.

The immunizing agent will typically include the antigenic protein or a fusion variant thereof. Generally, either peripheral blood lymphocytes ("PBLs") are used if cells of human origin are desired, or spleen cells or lymph node cells are used if non-human mammalian sources are desired. The lymphocytes are then fused with an immortalized cell line using a suitable fusing agent, such as polyethylene glycol, to form a hybridoma cell. Goding, *Monoclonal Antibodies: Principles and Practice*, Academic Press (1986), pp. 59-103.

Immortalized cell lines are usually transformed mammalian cells, particularly myeloma cells of rodent, bovine and human origin. Usually, rat or mouse myeloma cell lines are employed. The hybridoma cells thus prepared are seeded and grown in a suitable culture medium that preferably contains one or more substances that inhibit the growth or survival of the unfused, parental myeloma cells. For example, if the parental myeloma cells lack the enzyme hypoxanthine guanine phosphoribosyl transferase (HGPRT or HPRT), the culture medium for the hybridomas typically will include hypoxanthine, aminopterin, and thymidine (HAT medium), which are substances that prevent the growth of HGPRT-deficient cells.

Preferred immortalized myeloma cells are those that fuse efficiently, support stable high-level production of antibody by the selected antibody-producing cells, and are sensitive to a medium such as HAT medium. Among these, preferred are murine myeloma lines, such as those derived from MOPC-21 and MPC-11 mouse tumors available from the Salk Institute Cell Distribution Center, San Diego, Calif. USA, and SP-2 cells (and derivatives thereof, e.g., X63-Ag8-653) available from the American Type Culture Collection, Manassas, Va. USA.

Culture medium in which hybridoma cells are growing is assayed for production of monoclonal antibodies directed against the antigen. Preferably, the binding specificity of monoclonal antibodies produced by hybridoma cells is determined by immunoprecipitation or by an in vitro binding assay, such as radioimmunoassay (RIA) or enzyme-linked immunosorbent assay (ELISA).

The culture medium in which the hybridoma cells are cultured can be assayed for the presence of monoclonal antibodies directed against the desired antigen. Preferably, the binding affinity and specificity of the monoclonal antibody can be determined by immunoprecipitation or by an in vitro binding assay, such as radioimmunoassay (RIA) or enzyme-linked assay (ELISA). Such techniques and assays are known in the in art. For example, binding affinity may be determined by the Scatchard analysis of Munson et al., *Anal. Biochem.* 107:220-239 (1980).

After hybridoma cells are identified that produce antibodies of the desired specificity, affinity, and/or activity, the clones may be subcloned by limiting dilution procedures and grown by standard methods (Goding, supra). Suitable culture media for this purpose include, for example, D-MEM or RPMI-1640 medium. In addition, the hybridoma cells may be grown in vivo as tumors in a mammal.

The monoclonal antibodies secreted by the subclones are suitably separated from the culture medium, ascites fluid, or serum by conventional immunoglobulin purification procedures such as, for example, protein A-Sepharose, hydroxylapatite chromatography, gel electrophoresis, dialysis, or affinity chromatography.

Monoclonal antibodies may also be made by recombinant DNA methods. DNA encoding the monoclonal antibodies is readily isolated and sequenced using conventional procedures (e.g., by using oligonucleotide probes that are capable of binding specifically to genes encoding the heavy and light chains of murine antibodies). The hybridoma cells serve as a preferred source of such DNA. Once isolated, the DNA may be placed into expression vectors, which are then transfected into host cells such as *E. coli* cells, simian COS cells, Chinese hamster ovary (CHO) cells, or myeloma cells that do not otherwise produce immunoglobulin protein, in order to synthesize monoclonal antibodies in such recombinant host cells.

In a further embodiment, antibodies can be isolated from antibody phage libraries generated using the techniques described in McCafferty et al., *Nature* 348:552-554 (1990). Clackson et al., *Nature* 352:624-628 (1991) and Marks et al., *J. Mol. Biol.* 222:581-597 (1991) describe the isolation of murine and human antibodies, respectively, using phage libraries. Subsequent publications describe the production of high affinity (nM range) human antibodies by chain shuffling (Marks et al., *Biotechnology* (N.Y.) 10:779-783 (1992)), as well as combinatorial infection and in vivo recombination as a strategy for constructing very large phage libraries (Waterhouse et al., *Nucl. Acids Res.* 21:2265-2266 (1993)). Thus, these techniques are viable alternatives to traditional monoclonal antibody hybridoma techniques for isolation of monoclonal antibodies.

The DNA also may be modified, for example, by substituting the coding sequence for human heavy- and light-chain constant domains in place of the homologous murine sequences (U.S. Pat. No. 4,816,567; Morrison, et al., Proc. Natl Acad. Sci. U.S.A. 81:6851-6855 (1984)), or by covalently joining to the immunoglobulin coding sequence all or part of the coding sequence for a non-immunoglobulin polypeptide. Typically such non-immunoglobulin polypeptides are substituted for the constant domains of an antibody, or they are substituted for the variable domains of one antigen-combining site of an antibody to create a chimeric bivalent antibody comprising one antigen-combining site having specificity for an antigen and another antigen-combining site having specificity for a different antigen.

The monoclonal antibodies described herein may by monovalent, the preparation of which is well known in the art. For example, one method involves recombinant expression of immunoglobulin light chain and a modified heavy chain. The heavy chain is truncated generally at any point in the Fc region so as to prevent heavy chain crosslinking. Alternatively, the relevant cysteine residues may be substituted with another amino acid residue or are deleted so as to prevent crosslinking. In vitro methods are also suitable for preparing monovalent antibodies. Digestion of antibodies to produce fragments thereof, particularly Fab fragments, can be accomplished using routine techniques known in the art.

Chimeric or hybrid antibodies also may be prepared in vitro using known methods in synthetic protein chemistry, including those involving crosslinking agents. For example, immunotoxins may be constructed using a disulfide-exchange reaction or by forming a thioether bond. Examples of suitable reagents for this purpose include iminothiolate and methyl-4-mercaptobutyrimidate.

Also see Example 1 for monoclonal sdAb production.

5. Humanized Antibodies

Humanized forms of non-human (e.g., murine) antibodies are chimeric immunoglobulins, immunoglobulin chains, or fragments thereof (such as Fv, Fab, Fab', F(ab')$_2$ or other antigen-binding subsequences of antibodies), which contain a minimal sequence derived from a non-human immunoglobulin. Humanized antibodies include human immunoglobulins (a recipient antibody), in which residues from a CDR of the recipient are replaced by residues from a CDR of a non-human species (donor antibody) such as mouse, rat, rabbit, camelid, or llama having the desired specificity, affinity, and capacity. In some instances, Fv framework residues of the human immunoglobulin are replaced by corresponding non-human residues. Humanized antibodies can also comprise residues that are found neither in the recipient antibody nor in the imported CDR or framework sequences. In general, the humanized antibody can comprise substantially all of at least one, and typically two, variable domains, in which all or substantially all of the CDR regions correspond to those of a non-human immunoglobulin, and all or substantially all of the FR regions are those of a human immunoglobulin consensus sequence. In certain embodiments, the humanized antibody will comprise at least a portion of an immunoglobulin constant region (Fc), typically that of a human immunoglobulin. See, e.g., Jones et al., *Nature* 321:522-525 (1986); Riechmann et al., *Nature* 332: 323-329 (1988); Presta, *Curr. Op. Struct. Biol.* 2:593-596 (1992).

Methods for humanizing non-human antibodies are well known in the art. Generally, a humanized antibody has one or more amino acid residues introduced into it from a non-human source. These non-human amino acid residues are often referred to as "import" residues, which are typically taken from an "import" variable domain. Humanization can be essentially performed following the method of Winter and co-workers, Jones et al., *Nature* 321:522-525 (1986); Riechmann et al., *Nature* 332:323-327 (1988); Verhoeyen et al., *Science* 239:1534-1536 (1988), or through substituting rodent CDRs or CDR sequences for the corresponding sequences of a human antibody. Accordingly, such "humanized" antibodies are chimeric antibodies (U.S. Pat. No. 4,816,567), wherein substantially less than an intact human variable domain has been substituted by the corresponding sequence from a non-human species. In practice, humanized antibodies are typically human antibodies in which some CDR residues and possibly some FR residues are substituted by residues from analogous sites in rodent antibodies.

The choice of human variable domains, both light and heavy, to be used in making the humanized antibodies is very important to reduce antigenicity. According to the so-called "best-fit" method, the sequence of the variable domain of a rodent antibody is screened against the entire library of known human variable-domain sequences. The human sequence that is closest to that of the rodent is then accepted as the human framework (FR) for the humanized antibody. Sims et al., *J. Immunol.* 151:2296-2308 (1993); Chothia et al., *J. Mol. Biol.* 196:901-917 (1987). Another method uses a particular framework derived from the consensus sequence of all human antibodies of a particular subgroup of light or heavy chains. The same framework may be used for several different humanized antibodies.

It is further important that antibodies be humanized with retention of high affinity for the antigen and other favorable biological properties. To achieve this goal, according to a preferred method, humanized antibodies are prepared by a process of analysis of the parental sequences and various conceptual humanized products using three-dimensional models of the parental and humanized sequences. Three-dimensional immunoglobulin models are commonly available and are familiar to those skilled in the art. Computer programs are available which illustrate and display probable three-dimensional conformational structures of selected candidate immunoglobulin sequences. Inspection of these displays permits analysis of the likely role of the residues in the functioning of the candidate immunoglobulin sequence, i.e., the analysis of residues that influence the ability of the candidate immunoglobulin to bind its antigen. In this way, FR residues can be selected and combined from the recipient and import sequences so that the desired antibody characteristic, such as increased affinity for the target antigen(s), is achieved. In general, the CDR residues are directly and most substantially involved in influencing antigen binding.

In certain embodiments, the sdAbs are modified, such as humanized, without diminishing the native affinity of the domain for the antigen and while reducing its immunogenicity with respect to a heterologous species. For example, the amino acid residues of the antibody variable domain ($V_H$H) of a llama antibody can be determined, and one or more of the camelidae amino acids, for example, in the framework regions, are replaced by their human counterpart as found in the human consensus sequence, without that polypeptide losing its typical character, i.e., the humanization does not significantly affect the antigen binding capacity of the resulting polypeptide. Humanization of camelidae sdAbs requires the introduction and mutagenesis of a limited amount of amino acids in a single polypeptide chain. This is contrast to humanization of scFv, Fab', (Fab')2 and IgG, which requires the introduction of amino acid changes in two chains, the light and the heavy chain and the preservation of the assembly of both chains.

6. Human Antibodies

As an alternative to humanization, human antibodies can be generated. For example, it is now possible to produce transgenic animals (e.g., mice) that are capable, upon immunization, of producing a full repertoire of human antibodies in the absence of endogenous immunoglobulin production. For example, it has been described that the homozygous deletion of the antibody heavy-chain joining region ($J_H$) gene in chimeric and germ-line mutant mice results in complete inhibition of endogenous antibody production. Transfer of the human germ-line immunoglobulin gene array into such germ-line mutant mice results in the production of human antibodies upon antigen challenge.

Alternatively, phage display technology can be used to produce human antibodies and antibody fragments in vitro, from immunoglobulin variable (V) domain gene repertoires from unimmunized donors. McCafferty et al., *Nature* 348: 552-553 (1990); Hoogenboom and Winter, *J. Mol. Biol.* 227:381-388 (1992). According to this technique, antibody V domain genes are cloned in-frame into either a major or minor coat protein gene of a filamentous bacteriophage, such as M13 or fd, and displayed as functional antibody fragments on the surface of the phage particle. Because the filamentous particle contains a single-stranded DNA copy of the phage genome, selections based on the functional properties of the antibody also result in selection of the gene encoding the antibody exhibiting those properties. Thus, the phage mimics some of the properties of the B-cell. Phage display can be performed in a variety of formats. Several sources of V-gene segments can be used for phage display. Clackson et al., *Nature* 352:624-628 (1991). A repertoire of V genes from unimmunized human donors can be constructed and antibodies to a diverse array of antigens (including self-antigens) can be isolated essentially following the techniques described by Marks et al., *J. Mol. Biol.* 222:581-597 (1991) or Griffith et al., *EMBO J.* 12:725-734 (1993). Also see U.S. Pat. Nos. 5,565,332 and 5,573,905.

The techniques of Cole et al. (*Monoclonal Antibodies and Cancer Therapy*, Alan R. Liss, p. 77 (1985)) and Boerner et al. (*J. Immunol.* 147:86-95 (1991)) are also available for the preparation of human monoclonal antibodies. Similarly, human antibodies can be made by introducing human immunoglobulin loci into transgenic animals, e.g., mice in which the endogenous immunoglobulin genes have been partially or completely inactivated. Upon challenge, human antibody production is observed that closely resembles that seen in humans in all respects, including gene rearrangement, assembly, and antibody repertoire. This approach is described, for example, in U.S. Pat. Nos. 5,545,807; 5,545,806; 5,569,825; 5,625,126; 5,633,425; and 5,661,016; and Marks et al., *Biotechnology* (N.Y.) 10:779-783 (1992); Lonberg et al., Nature 368:856-859 (1994); Morrison, *Nature* 368:812-813 (1994); Fishwild et al., *Nat. Biotechnol.* 14:845-851 (1996); Neuberger, *Nat. Biotechnol.* 14:826 (1996); Lonberg and Huszar, *Intern. Rev. Immunol.* 13:65-93 (1995). For example, in certain embodiments, human antibodies (e.g., human DAbs) can be generated by immunization of human HCAb mice. For example, HCAb (e.g., sdAb-Fc fusion proteins) can be produced by immunizing a transgenic mouse, in which endogenous murine antibody expression has been eliminated and human transgenes have been introduced. HCAb mice are disclosed in U.S. Pat. Nos. 8,883,150; 8,921,524; 8,921,522; 8,507,748; 8,502,014; US 2014/0356908; US 2014/0033335; US 2014/0037616; US 2014/0356908; US 2013/0344057; US 2013/0323235; US 2011/0118444; and US 2009/0307787; all of which are incorporated herein by reference for all they disclose regarding heavy chain only antibodies and their production in transgenic mice. The HCAb mice are immunized and the resulting primed spleen cells fused with a murine myeloma cells to form hybridomas. The resultant HCAb can then be made fully human by replacing the murine CH2 and CH3 regions with human sequences.

Finally, human antibodies may also be generated by in vitro activated B cells (see U.S. Pat. Nos. 5,567,610 and 5,229,275) or by using various techniques known in the art, including phage display libraries (Hoogenboom and Winter, J. Mol. Biol. 227:381-388 (1992); Marks et al., J. Mol. Biol. 222:581-597 (1991)).

VII. Articles of Manufacture and Kits

In certain embodiments, there is provided an article of manufacture containing materials useful for the treatment of a disease or condition in an individual, for administering an anti-albumin construct into the individual. The article of manufacture can comprise a container and a label or package insert on or associated with the container. Suitable containers include, for example, bottles, vials, and syringes. The containers may be formed from a variety of materials such as glass or plastic. Generally, the container holds a composition that is effective for treating a disease or disorder described herein, and may have a sterile access port (for example, the container may be an intravenous solution bag or a vial having a stopper pierceable by a hypodermic injection needle). At least one active agent in the composition is an anti-albumin construct described herein. The label or package insert indicates that the composition is used for treating a particular condition. The label or package insert further comprises instructions for administering the anti-albumin construct to the patient. Articles of manufacture and kits comprising combinatorial therapies described herein are also contemplated.

A package insert refers to instructions customarily included in commercial packages of therapeutic products that contain information about the indications, usage, dosage, administration, contraindications, and/or warnings concerning the use of such therapeutic products. In certain embodiments, the package insert indicates that the composition is used for treating a disease or condition (such as a cancer or an inflammatory disease).

Additionally, the article of manufacture may further comprise a second container comprising a pharmaceutically acceptable buffer, such as bacteriostatic water for injection (BWFI), phosphate-buffered saline, Ringer's solution and dextrose solution. It may further include other materials desirable from a commercial and user standpoint, including other buffers, diluents, filters, needles, and syringes.

Kits are also provided that are useful for various purposes, e.g., for treatment of a disease or condition (such as a cancer or an inflammatory disease) described herein, for administering an anti-albumin construct into an individual, optionally in combination with the articles of manufacture. Kits of the disclosure include one or more containers comprising an anti-albumin construct composition (or unit dosage form and/or article of manufacture), and in certain embodiments, further comprise another agent (such as the agents described herein) and/or instructions for use in accordance with any of the methods described herein. The kit may further comprise a description of selection of individuals suitable for treatment. Instructions supplied in the kits of the disclosure are typically written instructions on a label or package insert (e.g., a paper sheet included in the kit), but machine-readable instructions (e.g., instructions carried on a magnetic or optical storage disk) are also acceptable.

For example, in certain embodiments, the kit comprises a composition comprising an anti-albumin construct. In certain embodiments, the kit comprises a) a composition comprising an anti-albumin construct, and b) an effective amount of at least one other agent as described herein. In certain embodiments, the kit comprises a) a composition comprising an anti-albumin construct, and b) instructions for administering the anti-albumin construct composition to an individual for treatment. In certain embodiments, the kit comprises a) a composition comprising an anti-albumin construct, b) an effective amount of at least one other agent as described herein, and c) instructions for administering the anti-albumin construct composition and the other agent(s) to an individual for treatment. The anti-albumin construct and the other agent(s) can be present in separate containers or in a single container. For example, the kit may comprise one distinct composition or two or more compositions wherein one composition comprises an anti-albumin construct and another composition comprises another agent.

The kits of the invention are in suitable packaging. Suitable packaging includes, but is not limited to, vials, bottles, jars, and flexible packaging (e.g., sealed Mylar or plastic bags). Kits may optionally provide additional components, such as buffers and interpretative information. The present disclosure thus also provides articles of manufacture, which include vials (such as sealed vials), bottles, jars, and flexible packaging.

The instructions relating to the use of the anti-albumin construct compositions generally include information as to dosage, dosing schedule, and route of administration for the intended treatment. The containers may be unit doses, bulk packages (e.g., multi-dose packages) or sub-unit doses. For example, kits may be provided that contain sufficient dosages of an anti-albumin construct as disclosed herein to provide effective treatment of an individual for an extended period, such as any of a week, 8 days, 9 days, 10 days, 11 days, 12 days, 13 days, 2 weeks, 3 weeks, 4 weeks, 6 weeks, 8 weeks, 3 months, 4 months, 5 months, 7 months, 8 months, 9 months, or more. Kits may also include multiple unit doses of the anti-albumin construct and pharmaceutical compositions and instructions for use and packaged in quantities sufficient for storage and use in pharmacies, for example, hospital pharmacies and compounding pharmacies.

Those skilled in the art will recognize that several embodiments are possible within the scope and spirit of this disclosure. The disclosure will now be described in greater detail by reference to the following non-limiting examples. The following examples further illustrate the disclosure but, of course, should not be construed as in any way limiting its scope.

EXAMPLES

The examples below are intended to be exemplary of the disclosure and should therefore not be considered to limit the scope of the disclosure in any way.

Example 1. Generation of Anti-HSA Single Domain Antibodies

A human serum albumin (HSA) expressed from rice (Sigma, #A9731) was used to immunize a llama to produce anti-HSA single domain antibodies ($V_HH$ antibodies). After immunization, peripheral mononuclear cells (PBMCs) were isolated for RNA extraction. $V_HH$ antibody phage display libraries were constructed with mRNA/cDNA that encodes the antibody genes. The constructed phage display libraries were screened through multiple rounds of affinity bindings with an antigen. Positive clones were identified through OCTET® affinity measurements (OCTET® RED96). Antibody genes of the positive clones were sequenced and cloned into an UCOE® vector (EMD Millipore, #CS221284) for Chinese Hamster Ovary (CHO) cell expression.

Table 4 lists exemplary anti-HSA single domain (e.g., $V_HH$) antibodies (e.g., antibodies A1 to A18) generated according to the method described above. The CDR sequences of these exemplary $V_HH$ antibodies are listed in Table 5. Among these antibodies, antibody A8 interacts with human, cynomolgus monkey, and mouse serum albumins. Antibodies A1 to A7 and A9 interact with both human and cynomolgus monkey serum albumins.

TABLE 4

Amino Acid Sequences of Anti-HSA $V_HH$ Antibodies

| Ab No. | SEQ ID NO: | Amino Acid Sequence |
|---|---|---|
| A1 | 1 | QVQLVESGGGLVQPGGSLRLSCAASGRIFSTYAMGWFRQPPGKEREFVASINRGDSTYYADSVKGRFTISRDNAKNTGYLQMSSLKPEDTAVYYCAADSDGIGWFNSFEYDYWGRGTQVTVSS |
| A2 | 2 | QVQLVESGGGLVQAGGSLRLSCAASGRSVSLYHVGWFRHTPGKEREFVAATAWHDGSTSYADSVKGRFTISRNNAKNTVYLQMNSLQPEDTAVYYCAGEAKLGGIYSRWRDYEYWGQGTQVTVSS |
| A3 | 3 | QVQLVESGGGLVQAGGSLRLSCAASGRTFSIYDMGWFRQAPGKEREFVAATNLRGVSTRYADSVKGRFTISGDNAKNTVSLQMNSLIPEDTAVYYCAAAVSNWLAKDPSAYSYWGQGTQVTVSS |
| A4 | 4 | QVQLVESGGGLVQPGGSLRLSCAASGRIFSTYAMGWFRQPGKEREFVASINRSGDSTYYADSVKGRFTISRDDAKNMGYLQMSSLKPEDTAVYYCAADSDGIGWFNSFEYDYWGRGTQVTVSS |
| A5 | 5 | QVQLVESGGGLVQPGGSLRLSCAASGPIFSTYAMGWFRQPPGKEREFVAINRSGDSTYYADSVKGRFTISRDNAKNTGYLQMSSLKPEDTAVYYCAADSDGIGWFNSFEYDYWGRGTQVTVSS |
| A6 | 6 | QVQLVESGGGLVQAGGSLRLSCAASGRSVSLYHVGWFRHTPGKEREFVAATAWHDGSTSYADSVKGRFTISRNNAKNTVYLQMNSLQPEDTAVYYCAGEAKLGGIYSRWRDYEYWGQGTQVTVSS |
| A7 | 7 | QVQLVESGGGLVQAGGSLRLSCAASGRSVSLYHVGWFRHTPGKEREFVAATAWHDGSTSYADSVKGRFTISRDSAKNTVFLQMSSLQPEDTAVYYCAADPGGSSWSQPWYDYWGQGTQVTVSS |
| A8 | 8 | QVQLVESGGGLVQPGGSLRLSCAASGSTWSINTLAWYRQAPGKQRDLVARISSGGSTHYADSVKGRFTVSRDNAENTLVLQMNSLKPEDTAVYYCYAQSTWYPPSWGQGTQVTVSS |
| A9 | 9 | QVQLVESGGGLVQAGGSLRLSCAASGRTFSNDAMGWFRQAPGKERVFVATISWKSSTYYADSVKGRTFTISRDHAKNTVYLQMNNLKPEDTAVYYCVADPYGLGFNPSDYDYWGQGTQVTVSS |

TABLE 4-continued

Amino Acid Sequences of Anti-HSA V$_H$H Antibodies

| Ab No. | SEQ ID NO: | Amino Acid Sequence |
|---|---|---|
| A10 | 105 | QVQLVESGGGLVQAGGSLRLSCLASGGTFSSYAMGWFRQAPGKEREFVAAISWKSSTYYTDSVKGRFTISRDNAKNTVYLQMNSLTPEDTAVYYCAADPTGSYDQPWYDYWGQGTQVTVSS |
| A11 | 106 | QVQVVESGGGLVQPGGSLRLSCAASGMSSANVMGWYRQVPGNQRELVARITSSGRTMYSDSVLGRFTISRGGAGNTADLQMNMLKPEDTAIYICNIRILGSFDPDSGYWGQGTQVTVSS |
| A12 | 107 | EVQLVESGGGLVQPGGSLRLSCAASGFTFRGFGMSWVRRAPGKEFEWVSSINGGEDTRYSDSVKGRFTISRDNARNTLYLQMNSLKPEDSAVYYCAIGGPGATPSGPGTQVTVSS |
| A13 | 108 | QVQLVESGGGSVQPGGSLRLSCAASGRNFNPMGWFRQAPGKQRESVAAIGTDGSTKYADSVKGRFTISRDNGKNTVYLQMNSLKSEDTAVYYCNVGGWGISWFPWGRGTQVSVSS |
| A14 | 109 | QVQLVESGGGLVQPGGSLRLSCAASGFTFRGFGMSWVRQAPGKGFEWVSSINSGGEDTRYSDSVKGRFTISRDNARNTLYLQMNSLKPEDTAVYYCAIGGAGATPSGQGTQVTVSS |
| A15 | 110 | QVQLVESGGGLVQPGGSLRLSCAASGFAFRGFGMSWVRQAPGKGFEWVSSINNGGSDTRYADSVKGRFTISRDNARNTLYLQMNSLKPEDTAVYYCAIGGPGASPSGQGTQVTVSS |
| A16 | 111 | QVQLVESGGGLVQAGGTLRLSCTASGSTFRGNGMAWHRQAPGKEREFVAYMGMTDRITYAESVKGRFTLSRDDAKNRVYLHMNNLEVE |
| A17 | 112 | QVQLVESGGELVQAGGSLRLSCVVSGRTFRTRTMGWFRQAPGKEREYVAHISANGPITDYSDSVKGRFAISRDNAKNTVNLQMNSLKPEDTAVYYCALGNGIGVRTVPSQYDSWGQGTQVTVSS |
| A18 | 113 | QEQLVESGGGLVQAGGSLRLSCAASTRTINIYAMAWFRQAPGKEREFVAAVTWSGLTRDYADSVKGRFTISRDNPKNTLYLQMNSLQPEDTAVYYCAAGRYSTGTHDYDYWGQGTQVTVSS |
| A19 | 114 | EVQLVESGGGLVQPGGSLRLSCAASGSTWSINTLAWYRQAPGKQRDLVARISSGGSTYYADSVKGRFTISRDNSKNTLYLQMNSLRAEDTAVYYCYAQSTWYPPSWGQGTLVTVSS |
| A20 | 115 | QVQLVESGGGVVQPGGSLRLSCAASGFAFRGFGMSWVRQAPGKGLEWVSSINNGGSDTYYADSVKGRFTISRNSKNTLYQMNSLRAEDDTAVYYCAIGGPGASPSGQGTVQTVSS |

TABLE 5

CDR Sequences of Anti-HSA V$_H$H Antibodies

| Ab No. | CDR1 (IMGT®) | CDR2 (IMGT®) | CDR3 (IMGT®) |
|---|---|---|---|
| A1 | GRIFSTYA (SEQ ID NO: 10) | INRSGDST (SEQ ID NO: 11) | AADSDGIGWFNSFEYDY (SEQ ID NO: 12) |
| A2 | GRSVSLYH (SEQ ID NO: 13) | TAWHDGST (SEQ ID NO: 14) | AGEAKLGGIYSRWRDYEY (SEQ ID NO: 15) |
| A3 | GRTFSIYD (SEQ ID NO: 16) | TNLRGVST (SEQ ID NO: 17) | AAAVSNWLAKDPSAYS (SEQ ID NO: 18) |
| A4 | GRIFSTYA (SEQ ID NO: 19) | INRSGDST (SEQ ID NO: 20) | AADSDGIGWFNSFEYDY (SEQ ID NO: 21) |
| A5 | GPIFSTYA (SEQ ID NO: 22) | INRSGDST (SEQ ID NO: 23) | AADSDGIGWFNSFEYDY (SEQ ID NO: 24) |
| A6 | GRSVSLYH (SEQ ID NO: 25) | TAWHDGST (SEQ ID NO: 26) | AGEAKLGGIYSRWRDYE (SEQ ID NO: 27) |
| A7 | GRSVSLYH (SEQ ID NO: 28) | TAWHDGST (SEQ ID NO: 29) | AADPGGSSWSQPWYD (SEQ ID NO: 30) |
| A8 | GSTWSINT (SEQ ID NO: 31) | ISSGGST (SEQ ID NO: 32) | YAQSTWYPPS (SEQ ID NO: 33) |
| A9 | GRTFSNDA (SEQ ID NO: 34) | ISWKSST (SEQ ID NO: 35) | VADPYGLGFNPSDYD (SEQ ID NO: 36) |
| A10 | GGTFSSYA (SEQ ID NO: 116) | ISWKSST (SEQ ID NO: 35) | AADPTGSYDQPWYDY (SEQ ID NO: 117) |
| A11 | GMSSANV (SEQ ID NO: 118) | ITSSGRT (SEQ ID NO: 119) | NIRILGSFDPDSGY (SEQ ID NO: 120) |

TABLE 5-continued

CDR Sequences of Anti-HSA V$_H$H Antibodies

| Ab No. | CDR1 (IMGT®) | CDR2 (IMGT®) | CDR3 (IMGT®) |
|---|---|---|---|
| A12 | GFTFRGFG (SEQ ID NO: 121) | INGGGEDT (SEQ ID NO: 122) | AIGGPGATP (SEQ ID NO: 123) |
| A13 | GRNFNP (SEQ ID NO: 124) | IGTDGST (SEQ ID NO: 125) | NVGGWGISWFP (SEQ ID NO: 126) |
| A14 | GFTFRGFG (SEQ ID NO: 121) | INSGGEDT (SEQ ID NO: 127) | AIGGAGATP (SEQ ID NO: 128) |
| A15 | GFAFRGFG (SEQ ID NO: 129) | INNGGSDT (SEQ ID NO: 130) | AIGGPGASP (SEQ ID NO: 131) |
| A16 | GSTFRGNG (SEQ ID NO: 132) | MGMTDRI (SEQ ID NO: 133) | TAFGS (SEQ ID NO: 134) |
| A17 | GRTFRTRT (SEQ ID NO: 135) | ISANGPIT (SEQ ID NO: 136) | ALHNGIGVRTVPSQYDS (SEQ ID NO: 137) |
| A18 | TRTINIYA (SEQ ID NO: 138) | VTWSGLTR (SEQ ID NO: 139) | AAGRYSTGTHDYDY (SEQ ID NO: 140) |
| A19 | GRTFSNDA (SEQ ID NO: 34) | ISWKSST (SEQ ID NO: 35) | VADPYGLGFNPSDYD (SEQ ID NO: 36) |
| A20 | GFAFRGFG (SEQ ID NO: 129) | INNGGSDT (SEQ ID NO: 130) | AIGGPGASP (SEQ ID NO: 131) |

Example 2. Generation of Humanized Anti-HSA Single Domain Antibodies

Each llama sequence of the anti-HSA single domain antibodies (sdAbs) was blasted against the IMGT® database to identify the best matched human IGHV3 germ lines. When multiple germ lines have similar homology, the similarity of the amino acid at position 52 of FR2 in the IGMT® numbering system was used to determine which germ line was adopted as the humanization scaffold. FR1 and FR3 from the chosen germ line were then adopted as "humanized" FR1 and FR3. For FR2, most of human sequences were adopted except positions 42 and 52, where the respective llama sequences were retained. Table 6 shows the exemplary human FR region sequences for each of the anti-HSA antibodies. For human FR4, humanized antibodies A1-A9, A19, and A20 each independently have the amino acid sequence of WGQGTQVTVSS (SEQ ID NO: 145), WGQGTLVTVSS (SEQ ID NO: 146), or SGQGTQVTVSS (SEQ ID NO: 147). In one embodiment, for human FR4, humanized antibodies A1-A9 each have the amino acid sequence of WGQGTQVTVSS (SEQ ID NO: 145). In another embodiment, for human FR4, humanized antibody A19 has the amino acid sequence of WGQGTLVTVSS (SEQ ID NO: 146). In yet another embodiment, for human FR4, humanized antibody A20 has the amino acid sequence of SGQGTQVTVSS (SEQ ID NO: 147).

TABLE 6

Framework Region of Humanized Anti-HSA V$_H$H Antibodies

| Ab No. | Matched Human Germ Line | Human FR1 | Human FR2 | Human FR3 |
|---|---|---|---|---|
| A1 | IGHV3-23*04 | EVQLVESGGG LVQPGGSLRL SCAASG (SEQ ID NO: 37) | MSWVRQAPG KGLEWVSA (SEQ ID NO: 40) | YYADSVKGRF TISRDNSKNT LYLQMNSLRA EDTAVYYCA (SEQ ID NO: 43) |
| A2 | IGHV3-64*04 | QVQLVESGGG LVQPGGSLRL SCSAS (SEQ ID NO: 38) | MHWVRQAPG KGLEYVSA (SEQ ID NO: 41) | YYADSVKGRF TISRDNSKNT LYLQMNSLRA EDTAVYYCA (SEQ ID NO: 43) |
| A3 | IGHV3-64*04 | QVQLVESGGG LVQPGGSLRL SCSAS (SEQ ID NO: 38) | MHWVRQAPG KGLEYVSA (SEQ ID NO: 41) | YYADSVKGRF TISRDNSKNT LYLQMNSLRA EDTAVYYCA (SEQ ID NO: 43) |
| A4 | IGHV3-23*04 | EVQLVESGGG LVQPGGSLRL SCAASG (SEQ ID NO: 37) | MSWVRQAPG KGLEWVSA (SEQ ID NO: 40) | YYADSVKGRF TISRDNSKNT LYLQMNSLRA EDTAVYYCA (SEQ ID NO: 43) |
| A5 | IGHV3-23*04 | EVQLVESGGG LVQPGGSLRL SCAASG (SEQ ID NO: 37) | MSWVRQAPG KGLEWVSA (SEQ ID NO: 40) | YYADSVKGRF TISRDNSKNT LYLQMNSLRA EDTAVYYCA (SEQ ID NO: 43) |
| A6 | IGHV3-64*04 | QVQLVESGGG LVQPGGSLRL SCSAS (SEQ ID NO: 38) | MHWVRQAPG KGLEYVSA (SEQ ID NO: 41) | YYADSVKGRF TISRDNSKNT LYLQMNSLRA EDTAVYYCA (SEQ ID NO: 43) |
| A7 | IGHV3-64*04 | QVQLVESGGG LVQPGGSLRL SCSAS (SEQ ID NO: 38) | MHWVRQAPG KGLEYVSA (SEQ ID NO: 41) | YYADSVKGRF TISRDNSKNT LYLQMNSLRA EDTAVYYCA (SEQ ID NO: 43) |
| A8 | IGHV3-66*01 | EVQLVESGGG LVQPGGSLRL SCAAS (SEQ ID NO: 39) | MSWVRQAPG KGLEWVSV (SEQ ID NO: 42) | YYADSVKGRF TISRDNSKNT LYLQMNSLRA EDT (SEQ ID NO: 44) |
| A9 | IGHV3-23*04 | EVQLVESGGG LVQPGGSLRL SCAASG (SEQ ID NO: 37) | MSWVRQAPG KGLEWVSA (SEQ ID NO: 40) | YYADSVKGRF TISRDNSKNT LYLQMNSLRA EDTAVYYCA (SEQ ID NO: 43) |
| A19 | | EVQLVESGGG LVQPGGSLRL | LAWYRQAPG KQRDLVAR | YYADSVKGRF TISRDNSKNT |

TABLE 6-continued

Framework Region of Humanized Anti-HSA $V_HH$ Antibodies

| Ab No. | Matched Human Germ Line | Human FR1 | Human FR2 | Human FR3 |
|---|---|---|---|---|
| | | SCAAS (SEQ ID NO: 39) | (SEQ ID NO: 142) | LYLQMNSLRA EDTAVYYC (SEQ ID NO: 144) |
| A20 | | QVQLVESGGG VVQPGGSLRL SCAAS (SEQ ID NO: 141) | MSWVRQAPG KGLEWVSS (SEQ ID NO: 143) | YYADSVKGRF TISRDNSKNT LYLQMNSLRA EDTAVYYC (SEQ ID NO: 144) |

Example 3. Dissociation Constants ($K_D$) of Anti-Albumin Antibodies

The $V_HH$ anti-albumin antibodies were evaluated for their ability to interact with human, monkey, and mouse serum albumins at different pH values, e.g., pH 7.4 or pH 5.5 to simulate the pH of an acidified endosome. Briefly, a $V_HH$ anti-albumin antibody was fused onto a human IgG1-Fc. The expressed protein was then loaded onto a protein A biosensor (OCTET® RED96). The biosensor was in turn dipped into a solution containing a human, monkey, or mouse serum at three or more different concentrations, e.g., 50, 100, or 200 nM, or 100, 200, or 400 nM. Primary experimental data was analyzed with global fitting to determine a dissociation constant ($K_D$). The results are summarized in Table 7 (pH 5.5) and Table 8 (pH 7.4), wherein A represents a value no greater than 10 nM, B represents a value greater than 10 nM but no greater than 100 nM, and C represents a value greater than 100 nM but no greater than 500 nM.

TABLE 7

Dissociation Constants ($K_D$) of Anti-albumin Antibodies Towards Human and Monkey Serum Albumins at pH 5.5

| Ab No. | Human | Monkey |
|---|---|---|
| A8 | A | B |
| A10 | B | B |
| A20 | B | B |

TABLE 8

Dissociation Constants ($K_D$) of Anti-albumin Antibodies Towards Human, Monkey, and Mouse Serum Albumin at pH 7.4

| Ab No. | Human | Monkey | Mouse |
|---|---|---|---|
| A1 | A | A | NA |
| A2 | A | A | NA |
| A3 | A | B | NA |
| A4 | B | A | NA |
| A6 | A | A | NA |
| A7 | C | C | NA |
| A8 | B | B | B |
| A9 | A | B | NA |
| A10 | B | B | NA |
| A11 | NA | NA | NA |
| A12 | B | B | NA |

TABLE 8-continued

Dissociation Constants ($K_D$) of Anti-albumin Antibodies Towards Human, Monkey, and Mouse Serum Albumin at pH 7.4

| Ab No. | Human | Monkey | Mouse |
|---|---|---|---|
| A13 | B | B | NA |
| A14 | B | B | NA |
| A15 | B | B | NA |
| A16 | B | NA | NA |
| A17 | B | NA | NA |
| A18 | NA | NA | NA |
| A19 | B | A | B |
| A20 | B | B | NA |

NA-No binding detected

The results in Table 8 shows that antibody A19, a humanized anti-albumin antibody of antibody A8, retains its bindings to human, monkey, and mouse serum albumins. The results in Tables 7 and 8 also show that the anti-albumin antibodies maintain their bindings to human and monkey serum albumins at low pH, indicating that such antibodies are suitable for use in an acidic environment (e.g., an acidified endosome).

Example 4. Molecular Cloning of IL-21-anti-HSA Constructs

Construction of an IL-21-anti-HSA construct expression vector is exemplified herein. cDNA sequences encoding a human IL-21 full length (SEQ ID NO: 97) were obtained by gene synthesis using GENEART® Gene Synthesis (ThermoFisher Scientific). The codon usage of these genes was optimized for expression in Chinese hamster ovary (CHO) cells. The C-terminus of the human IL-21 was fused to the N-terminus of an anti-HSA $V_HH$ antibody via a peptide linker. The DNA sequences encoding the human IL-21, peptide linker, and anti-HSA $V_HH$ antibody were seamlessly assembled together by assembly cloning (New England BioLabs, #E5520S) or a similar in vitro recombination method. Oligonucleosides of the IL-21-anti-HSA fusion protein were inserted into UCOE® expression vector CET1019-AS-Puro (EMD Millipore, #CS221284) for CHO cell expression. Table 9 lists the sequences of human IL-21. Table 10 lists exemplary peptide linkers that are suitable for use in an IL-21-anti-HSA construct.

TABLE 9

Interleukin-21 (IL-21)

| Name | SEQ ID NO: | Amino Acid Sequence |
|---|---|---|
| Human IL-21 full length | 97 | QGQDRHMTRMRQLIDIVDQL KNYVNDLVPEFLPAPEDVET NCEWSAFSCFQKAQLKSANT GNNERIINVSIKKLKRKPPS TNAGRRQKHRLTCPSCDSYE KKPPKEFLERFKSLLQKMIH QHLSSRTHGSEDS |
| Human IL-21 truncated | 98 | QGQDRHMIRMRQLIDIVDQL KNYVNDLVPEFLPAPEDVET NCEWSAFSCFQKAQLKSANT GNNERIINVSIKKLKRKPPS TNAGRRQKHRLTCPSCDSYE KKPPKEFLERFKSLLQKMIH QHL |

TABLE 10

Peptide Linkers

| Linker | SEQ ID NO: | Amino Acid Sequence | |
|---|---|---|---|
| GSG Linker (n = 1, 2, 3, or 4) | 58 | (GSG)n | Non-cleavable |
| G3S Linker (n = 1, 2, 3, or 4) | 59 | (G3S)n | |
| G4S Linker (n = 1, 2, 3, or 4) | 60 | (G4S)n | |
| EAAAK Linker (n = 1, 2, 3, or 4) | 61 | (EAAAK)n | |
| PAPAP Linker (n = 1, 2, 3, or 4) | 62 | (PAPAP)n | |
| VLVH Linker | 63 | IKRTVAAP | |
| SIRPα Linker | 64 | RAKPS | |
| UPA Linker | 74 | SGRSA | Cleavable |
| MMP Linker | 75 | PVGLIG | |

Example 5. Expression and Purification of an IL-21-Anti-Albumin Construct

A DNA sequence encoding an IL-21-anti-albumin construct was transiently expressed in EXPICHO-S™ cells (GIBCO™, #A29127). Briefly, on Day −1, the EXPICHO-S™ were seeded at 3-4×10$^6$ cells/mL with an EXPICHO™ expression medium (GIBCO™, #A2910001) in a vented Erlenmeyer shake flask and placed on a 125-rpm orbital shaker in a 37° C. incubator with 8% $CO_2$. On Day 0, a plasmid DNA was mixed with AN EXPIFECTAMINE™ CHO reagent. The mixture was then slowly added to the cells. After 16 hrs, the cells were transferred to a 32° C. incubator with 5% $CO_2$. The cells were fed twice on Days 1 and 5 with an EXPICHO™ feed (GIBCO™, #A29129). The CHO cells were harvested on Day 8-12 for purification over affinity column.

Example 6. IL-21-Anti-HSA Constructs: IL-21 Signaling Potency Similar to Recombinant Human IL-21

Pfeiffer cells were maintained in RPMI-1640 containing 10% fetal bovine serum and penicillin/streptomycin. The Pfeiffer cells (100,000) were treated with the indicated concentrations of a recombinant human IL-21 (rhIL-21) (SEQ ID NO: 97), mouse IL-21-anti-HSA construct C1 (SEQ ID NO: 99), or human IL-21-anti-HSA construct C2 (SEQ ID NO: 100) for 30 min at 37° C. and 5% $CO_2$ in Hanks' balanced salt solution containing 10 mM HEPES. Phospho-STAT3 was measured using a phospho-STAT3 (Tyr705) homogeneous time resolved fluorescence (HTRF) assay (Cisbio) according to the manufacturer's instructions. The signal ratio of 665 nm/620 nm was multiplied by 1,000, plotted, and fit using a dose response curve (Graphpad Prism) to calculated $EC_{50}$ s. The results are summarized in Table 11, indicating that IL-21-anti-HSA constructs C1 and C2 as well as recombinant hIL-21 have similar potency. In Table 11, construct C1 is a mouse IL-21-anti-HSA fusion protein comprising a mouse IL-21 (mIL-21) moiety of SEQ ID NO: 148, an anti-HSA antibody moiety of SEQ ID NO: 8, and a peptide linker of (GSG)$_4$ (SEQ ID NO: 58); wherein the C-terminus of the mIL-21 is connected to the N-terminus of the anti-HSA antibody via the peptide linker. Construct C2 (SEQ ID NO: 100) is a human IL-21-anti-HSA fusion protein comprising a human IL-21 (hIL-21) moiety of SEQ ID NO: 97; an anti-HSA antibody moiety of SEQ ID NO: 8; and a peptide linker of (GSG)$_4$ (SEQ ID NO: 58); wherein the C-terminus of the hIL-21 is connected to the N-terminus of the anti-HSA antibody via the peptide linker.

TABLE 11

$EC_{50}$ of Different IL-21 Variants

| Protein | $EC_{50}$ (pM) |
|---|---|
| rhIL-21 | 150 |
| C1 | 88 |
| C2 | 111 |

Example 7. ADCC Activities

NCI-N87 and NCI-H226 cancer cell lines were maintained in RPMI-1640 containing 10% fetal bovine serum and penicillin/streptomycin. On Day 0, NCI-N87 cells (10,000 per well) and NCI-H226 cells (5,000 per well) were plated in a culture medium in a 96-well flat bottom plate. On Day 1, NK cells were isolated from a human buffy coat using a ROSETTESEP™ NK isolation kit (Stemcell Technologies). The NK cells (100,000 per well) were then added to the cancer cells together with the indicated treatment.

After the NCI-N87 and NCH-H226 cells were incubated for 24 hrs or 48 hrs at 37° C. and 5% $CO_2$, respectively, the cells were fixed with 4% paraformaldehyde and nuclei stained with SYTOX™ orange. The number of remaining cancer cells was calculated by counting the number of cancer cell nuclei remaining in each well using CYTATION™ 1 (Biotek). Lower cell counts indicated better NK mediated cell killing.

Figure 2:
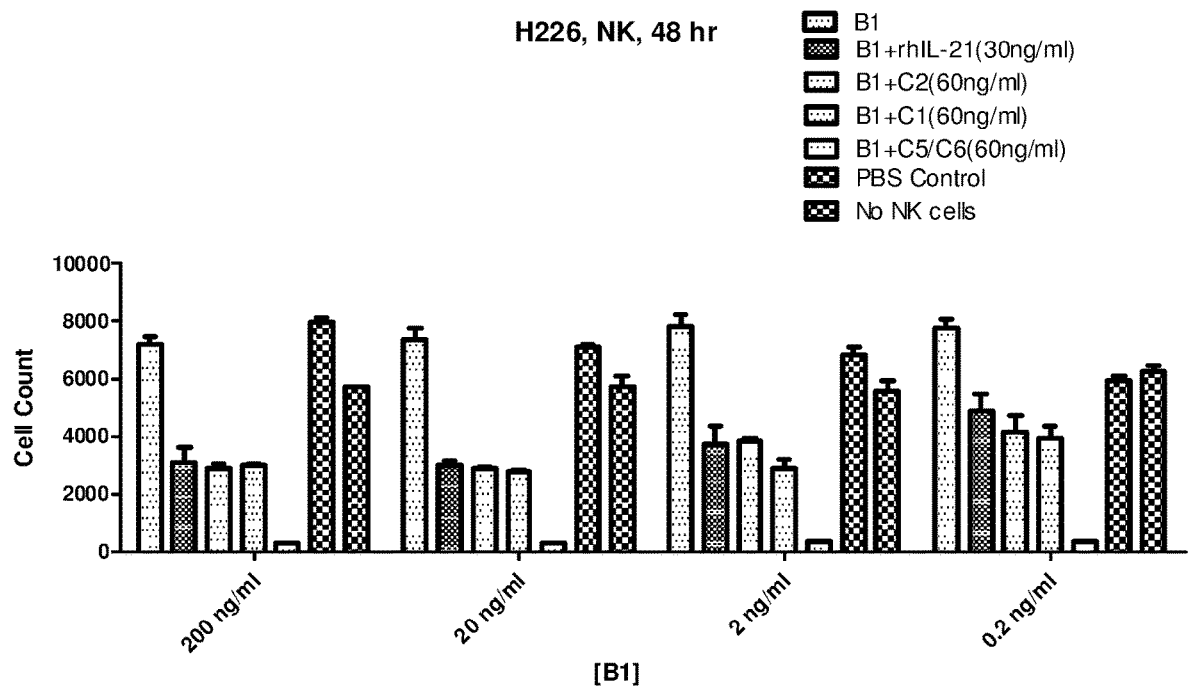
FIG. 2 shows ADCC activities of NK cells against H226 cells in the presence of (i) rhIL-21 (30 ng/mL); (ii) mIL-21-anti-HSA construct C1 (60 ng/mL); (iii) hIL-21-anti-HSA construct C2 (60 ng/mL); or (iv) rhIL-15 C5/hIL-15Rα-anti-HSA construct C6 combination (60 ng/mL); and in the presence of anti-mesothelin antibody B1 at 0.2, 2, 20, or 200 ng/mL.

As shown in FIGS. 1 and 2, mIL-21-anti-HSA construct C1 (SEQ ID NO: 99) and hIL-21-anti-HSA construct C2 (SEQ ID NO: 100) enhanced NK cell ADCC activity when combined with anti-MSLN B1. The magnitude of enhanced ADCC was similar between IL-21-anti-HSA constructs C1 and C2 and rhIL-21. In FIGS. 1 and 2, anti-MSLN B1, a single domain anti-MSLN antibody, comprises a CDR1 of SEQ ID NO: 92, a CDR2 of SEQ ID NO: 93, and a CDR3 of SEQ ID NO: 94. C5 represents a human IL-15 of SEQ ID NO: 102. Construct C6 (SEQ ID NO: 103) represents an IL-15Rα-anti-HSA construct comprising a fragment of a human IL-15Rα (hIL-15Rα) (SEQ ID NO: 102) and an anti-HSA antibody moiety of SEQ ID NO: 8; and a peptide linker of (G4S)$_4$ (SEQ ID NO: 60).

Figure 3:
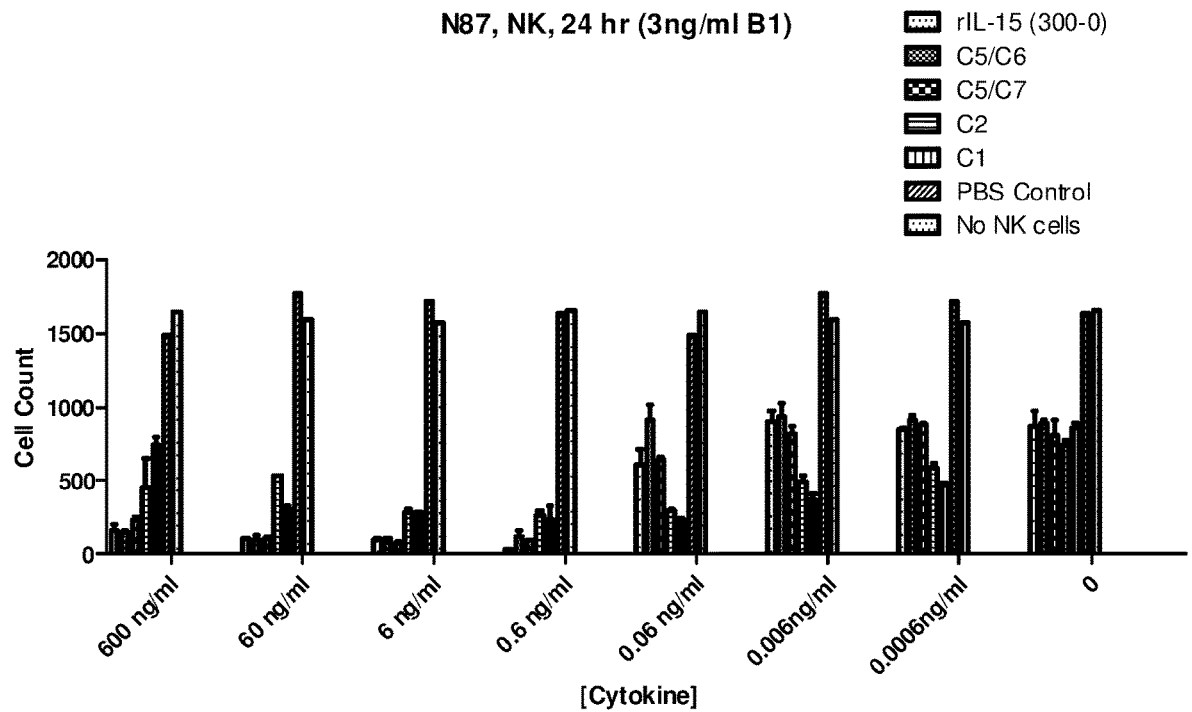
FIG. 3 shows ADCC activities of NK cells against N87 cells in the presence of various concentrations of (i) recombinant human IL-15 (rhIL-15); (ii) mIL-21-anti-HSA construct C1; (iii) hIL-21-anti-HSA construct C2; (iv) rhIL-15 C5/hIL-15Rα-anti-HSA construct C6 combination; or (v) rhIL-15 C5/hIL-15Rα-anti-HSA construct C7 (SEQ ID NO: 104) combination; and in the presence of anti-mesothelin antibody B1 at 3 ng/mL.
Figure 4:
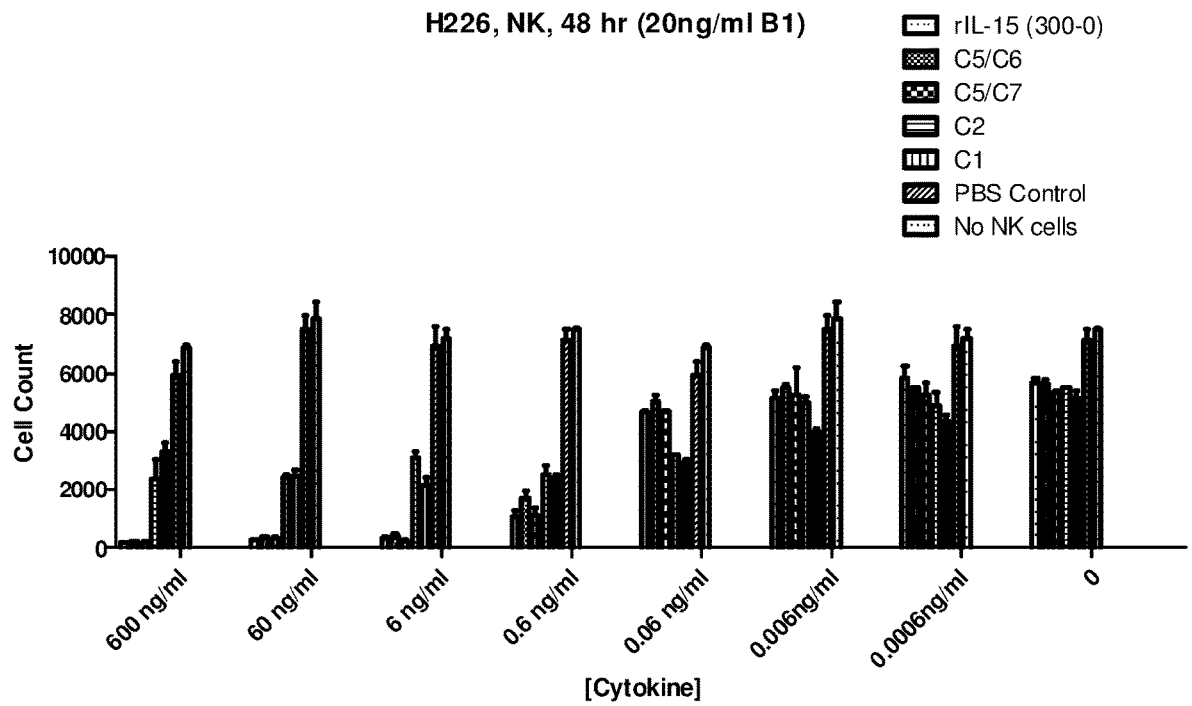
FIG. 4 shows ADCC activities of NK cells against H226 cells in the presence of various concentrations of (i) rhIL-15 (rhIL-15); (ii) mIL-21-anti-HSA construct C1; (iii) hIL-21-anti-HSA construct C2; (iv) rhIL-15 C5/hIL-15Rα-anti-HSA construct C6 combination; or (v) rhIL-15 C5/hIL-15Rα-anti-HSA construct C7 (SEQ ID NO: 104) combination; and in the presence of anti-mesothelin antibody B1 at 20 ng/mL.

As shown in FIGS. 3 and 4, IL-21-anti-HSA constructs (i) C1, (ii) C2, (iii) rhIL-15 C5/hIL-15Rα-anti-HSA construct C6 combination, and (iv) rhIL-15 C5/hIL-15Rα-anti-HSA construct C7 combination show full ADCC efficacy down to 0.6 ng/mL or lower when combined with anti-MSLN B1. Construct C7 (SEQ ID NO: 104) represents an IL-15Rα-anti-HSA construct comprising a fragment of a human IL-15Rα and an anti-HSA antibody moiety of SEQ ID NO: 8; and a peptide linker of (G4S)$_4$ (SEQ ID NO: 60).

Example 8. In Vivo Antitumor Activity in Syngeneic Mouse Model

MC38 murine colon cancer cells ($3 \times 10^6$ cells) were implanted subcutaneously into the flanks of C57BL/6 mice on Day 0. On Days 4, 8, 12, and 16, the mice were treated with either PBS, an anti-mPD-1 (100 µg), mIL-21-anti-HSA construct C1 (25 µg), the anti-mPD-1 (100 µg) and mIL-21-anti-HSA construct C1 (25 µg), or the anti-mPD-1 (100 µg) and mIL-21-anti-HSA construct C1 (5 µg). Tumor sizes were measured using calipers on the indicated days and tumor volumes were then calculated.

Figure 5:
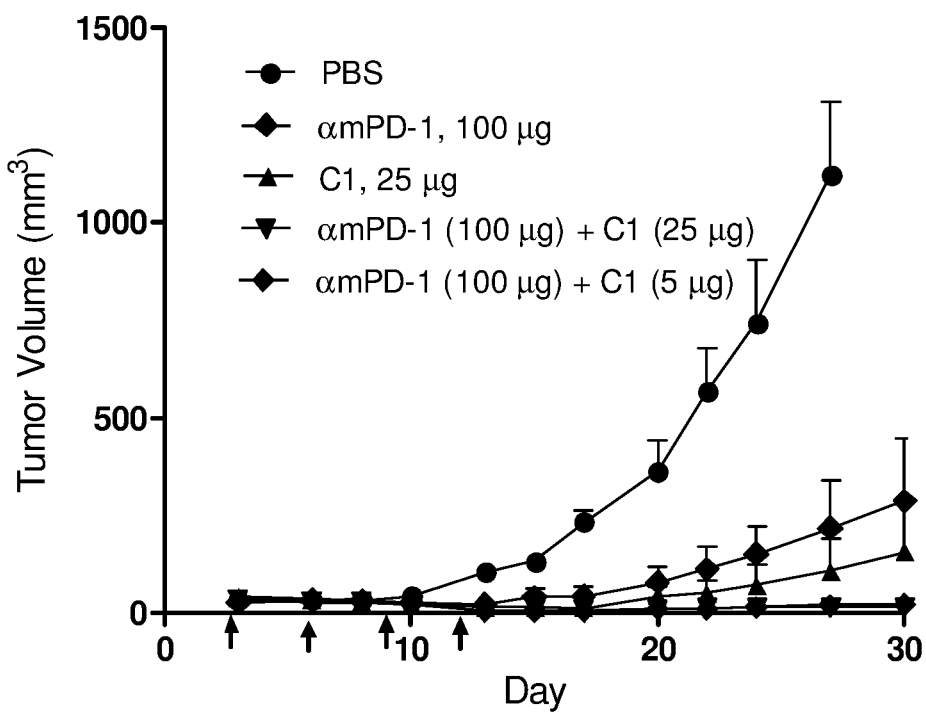
FIG. 5 shows anti-tumor activity of mIL-21-anti-HSA construct C1 in the presence or absence of an anti-mouse PD-1 antibody in an MC38 syngeneic mouse model.

As shown in FIG. 5, mIL-21-anti-HSA construct C1 monotherapy significantly slows tumor growth. Combination of mIL-21-anti-HSA construct C1 and anti-mPD-1 eliminates or shrinks tumors in all mice.

Example 9. Mouse PK Study for hIL-21-Anti-HSA Construct C2

Figure 6:
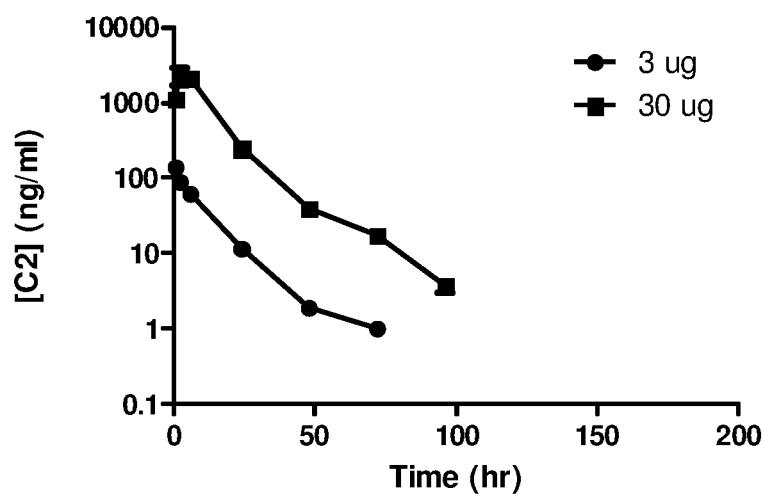
FIG. 6 shows pharmacokinetic profiles of hIL-21-anti-HSA construct C2 in mice.
Figure 7:
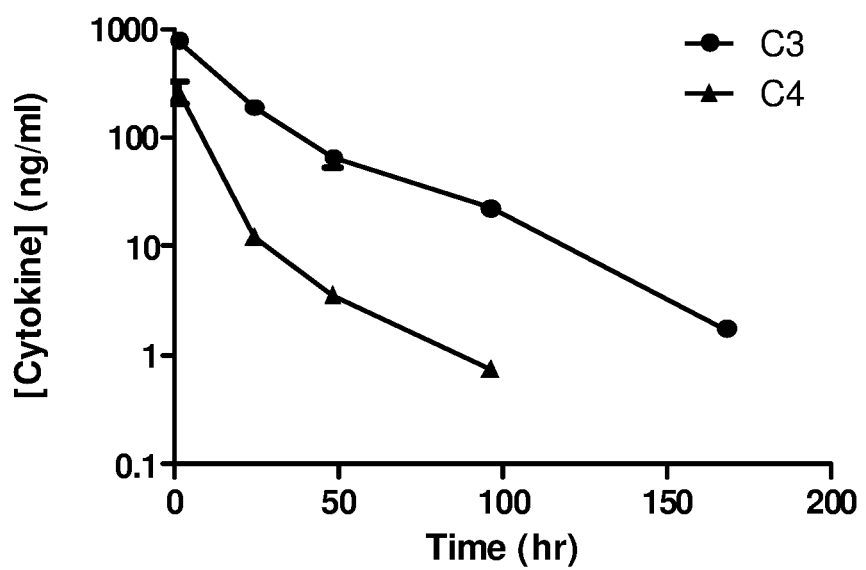
FIG. 7 shows pharmacokinetic profiles of hIL-21-anti-HSA construct C3 (SEQ ID NO: 149) and hIL-21-anti-HSA construct C4 (SEQ ID NO: 150).

Balb/c mice were injected intraperitoneally with hIL-21-anti-HSA construct C2 at time 0. At the indicated timepoints, blood (100 µL) was collected via the saphenous vein. Blood was placed into EDTA blood collection tubes, placed on ice, and centrifuged. Plasma was then transferred into a 1.5 mL tube, frozen, and stored at −80° C. To measure hIL-21 concentrations, plasma samples were thawed and tested using a human IL-21 ELISA (Invitrogen) according to the manufacturer instructions. As shown in FIG. 6, IL-21 concentrations considered efficacious based on in vitro dose response data were maintained for at least 3-4 days. PK parameters for hIL-21-anti-HSA construct C2 at 3 and 30 µs per dose were determined and summarized in Table 12.

TABLE 12

PK Parameters of hIL-21-anti-HSA Construct C2 in Mice

| | hIL-21-anti-HSA Construct C2 | |
|---|---|---|
| | 3 µg Dose | 30 µg Dose |
| $C_{max}$ (ng/mL) | 142 | 2,300 |
| $T_{1/2}$ (h) | 14 | 12 |
| AUC (ng·h/mL) | 1,400 | 37,000 |

Example 10. PK Study of IL-21-Anti-HSA Constructs in Transgenic Mice

Genetically modified mice with transgenic expression of a human serum albumin and human neonatal Fc receptor and knock-out of the mouse albumin and mouse neonatal Fc receptor (Genoway) were dosed with hIL-21-anti-HSA construct C3 (SEQ ID NO: 149) (3 pig) or hIL-21-anti-HSA construct C4 (SEQ ID NO: 150) (3 µg). After 1, 24, 48, 96, 168, and 336 hrs, blood was collected from the mice and processed into plasma using EDTA as an anti-coagulant. Samples were analyzed for IL-21 concentrations using a commercial ELISA kit (Thermo Fisher). PK parameters for hIL-21-anti-HSA constructs C3 and C4 at 3 µg per dose were determined and summarized in Table 13. The $C_{max}$ and $t_{1/2}$ of IL-21 were greater when conjugated to anti-HSA A20 compared to anti-HSA A19.

TABLE 13

PK Parameters of IL-21-anti-HSA Constructs C3 and C4 in Transgenic Mice

| | Construct C3 | Construct C4 |
|---|---|---|
| $C_{max}$ (ng/mL) | 770 | 270 |
| $T_{1/2}$ (h) | 22 | 18 |
| AUC (ng·h/mL) | 17,000 | 3,500 |

Sequences described herein are provided in the sequence table below.

SEQUENCE TABLE

| SEQ ID NO: | Description | Amino Acid Sequence |
|---|---|---|
| 1 | Ab A1 | QVQLVESGGGLVQPGGSL RLSCAASGRIFSTYAMGW FRQPPGKEREFVASINRS GDSTYYADSVKGRFTISR DNAKNTGYLQMSSLKPED TAVYYCAADSDGIGWFNS FEYDYWGRGTQVTVSS |
| 2 | Ab A2 | QVQLVESGGGLVQAGGSL RLSCAASGRSVSLYHVGW FRHTPGKEREFVAATAWH DGSTSYADSVKGRFTISR NNAKNTVYLQMNSLQPED TAVYYCAGEAKLGGIYSR WRDYEYWGQGTQVTVSS |
| 3 | Ab A3 | QVQLVESGGGLVQAGGSL RLSCAASGRTFSIYDMGW FRQAPGKEREFVAATNLR GVSTRYADSVKGRFTISG DNAKNTVSLQMNSLIPED TAVYYCAAAVSNWLAKDP SAYSYWGQGTQVTVSS |
| 4 | Ab A4 | QVQLVESGGGLVQPGGSL RLSCAASGRIFSTYAMGW FRQPPGKEREFVASINRS GDSTYYADSVKGRFTISR DDAKNMGYLQMSSLKPED TAVYYCAADSDGIGWFNS FEYDYWGRGTQVTVSS |
| 5 | Ab A5 | QVQLVESGGGLVQPGGSL RLSCAASGPIFSTYAMGW FRQPPGKEREFVASINRS GDSTYYADSVKGRFTISR DNAKNTGYLQMSSLKPED TAVYYCAADSDGIGWFNS FEYDYWGRGTQVTVSS |
| 6 | Ab A6 | QVQLVESGGGLVQAGGSL RLSCAASGRSVSLYHVGW FRHTPGKEREFVAATAWH DGSTSYADSVKGRFTISR NNAKNTVYLQMNSLQPED TAVYYCAGEAKLGGIYSR WRDYEYWGQGTQVTVSS |
| 7 | Ab A7 | QVQLVESGGGLVQAGGSL RLSCAASGRSVSLYHVGW FRHTPGKEREFVAATAWH DGSTSYADSVKGRFTISR DSAKNTVFLQMSSLQPED TAVYYCAADPGGSSWSQP WYDYWGQGTQVTVss |
| 8 | Ab A8 | QVQLVESGGGLVQPGGSL RLSCAASGSTWSINTLAW YRQAPGKQRDLVARISSG |

| SEQ ID NO: | Description | Amino Acid Sequence |
|---|---|---|
|  |  | GSTHYADSVKGRFTVSRDNAENTLVLQMNSLKPEDTAVYYCYAQSTWYPPSWGQGTQVTVSS |
| 9 | Ab A9 | QVQLVESGGGLVQAGGSLRLSCAASGRTFSNDAMGWFRQAPGKERVFVATISWKSSTYYADSVKGRFTISRDHAKNTVYLQMNNLKPEDTAVYYCVADPYGLGFNPSDYDYWGQGTQVTVSS |
| 10 | Ab A1 CDR1 | GRIFSTYA |
| 11 | Ab A1 CDR2 | INRSGDST |
| 12 | Ab A1 CDR3 | AADSDGIGWFNSFEYDY |
| 13 | Ab A2 CDR1 | GRSVSLYH |
| 14 | Ab A2 CDR2 | TAWHDGST |
| 15 | Ab A2 CDR3 | AGEAKLGGIYSRWRDYEY |
| 16 | Ab A3 CDR1 | GRTFSIYD |
| 17 | Ab A3 CDR2 | TNLRGVST |
| 18 | Ab A3 CDR3 | AAAVSNWLAKDPSAYS |
| 19 | Ab A4 CDR1 | GRIFSTYA |
| 20 | Ab A4 CDR2 | INRSGDST |
| 21 | Ab A4 CDR3 | AADSDGIGWFNSFEYDY |
| 22 | Ab A5 CDR1 | GPIFSTYA |
| 23 | Ab A5 CDR2 | INRSGDST |
| 24 | Ab A5 CDR3 | AADSDGIGWFNSFEYDY |
| 25 | Ab A6 CDR1 | GRSVSLYH |
| 26 | Ab A6 CDR2 | TAWHDGST |
| 27 | Ab A6 CDR3 | AGEAKLGGIYSRWRDYE |
| 28 | Ab A7 CDR1 | GRSVSLYH |
| 29 | Ab A7 CDR2 | TAWHDGST |
| 30 | Ab A7 CDR3 | AADPGGSSWSQPWYD |
| 31 | Ab A8 CDR1 | GSTWSINT |
| 32 | Ab A8 CDR2 | ISSGGST |
| 33 | Ab A8 CDR3 | YAQSTWYPPS |
| 34 | Ab A9 CDR1 | GRTFSNDA |
| 35 | Ab A9 CDR2 | ISWKSST |
| 36 | Ab A9 CDR3 | VADPYGLGFNPSDYD |
| 37 | Human FR1 | EVQLVESGGGLVQPGGSLRLSCAASG |
| 38 | Human FR1 | QVQLVESGGGLVQPGGSLRLSCSAS |
| 39 | Human FR1 | EVQLVESGGGLVQPGGSLRLSCAAS |
| 40 | Human FR2 | MSWVRQAPGKGLEWVSA |
| 41 | Human FR2 | MHWVRQAPGKGLEYVSA |
| 42 | Human FR2 | MSWVRQAPGKGLEWVSV |
| 43 | Human FR3 | YYADSVKGRFTISRDNSKNTLYLQMNSLRAEDTAVYCA |
| 44 | Human FR3 | YYADSVKGRFTISRDNSKNTLYLQMNSLRAEDT |
| 45 | Humanized A1 | EVQLVESGGGLVQPGGSLRLSCAASGRIFSTYAMSWVRQAPGKGLEWVSAINRSGDSTYYADSVKGRFTISRDNSKNTLYLQMNSLRAEDTAVYYCAADSDGIGWFNSFEYDYWGRGTQVTVSS |
| 46 | Humanized A2 | QVQLVESGGGLVQPGGSLRLSCSASGRSVSLYHMHWVRQAPGKGLEYVSATAWHDGSTYYADSVKGRFTISRDNSKNTLYLQMNSLRAEDTAVYYCAGEAKLGGIYSRWRDYEYWGQGTQVTVSS |
| 47 | Humanized A3 | QVQLVESGGGLVQPGGSLRLSCSASGRTFSIYDYIHWVRQAPGKGLEYVSATNLRGVSTYYADSVKGRFTISRDNSKNTLYLQMNSLRAEDTAVYYCAAAVSNWLAKDPSAYSYWGQGTQVTVSS |
| 48 | Humanized A4 | EVQLVESGGGLVQPGGSLRLSCAASGRIFSTYAMSWVRQAPGKGLEWVSAINR |

SEQUENCE TABLE

| SEQ ID NO: | Description | Amino Acid Sequence |
|---|---|---|
| | | SGDSTYYADSVKGRFTIS RDNSKNTLYLQMNSLRAE DTAVYYCAAADSDIGWF NSFEYDYWGRGTQVTVSS |
| 49 | Humanized A5 | EVQLVESGGGLVQPGGSL RLSCAASGGPIFSTYAMS WVRQAPGKGLEWVSAINR SGDSTYYADSVKGRFTIS RDNSKNTLYLQMNSLRAE DTAVYYCAAADSDIGWF NSFEYDYWGRGTQVTVSS |
| 50 | Humanized A6 | EVQLVESGGGLVQPGGSL RLSCAASGGGRIFSTYAMS WVRQAPGKGLEWVSAINR SGDSTYYADSVKGRFTIS RDNSKNTLYLQMNSLRAE DTAVYYCAGEAKLGGIY SRWRDYEYWGQGTQVTVS S |
| 51 | Humanized A7 | EVQLVESGGGLVQPGGSL RLSCAASGGGRIFSTYAMS WVRQAPGKGLEWVSAINR SGDSTYYADSVKGRFTIS RDNSKNTLYLQMNSLRAE DTAVYYCAADPGGSSWS QPWYDYWGQGTQVTVSS |
| 52 | Humanized A8 | EVQLVESGGGLVQPGGSL RLSCAASGSTWSINTMSW VRQAPGKGLEWVSVISSG GSTYYADSVKGRFTISRD NSKNTLYLQMNSLRAEDT YAQSTWYPPSWGQGTQVT VSS |
| 53 | Humanized A9 | EVQLVESGGGLVQPGGSL RLSCAASGGGRIFSTYAMS WVRQAPGKGLEWVSAINR SGDSTYYADSVKGRFTIS RDNSKNTLYLQMNSLRAE DTAVYYCAAADSDIGWF NSFEYDYWGQGTQVTVSS |
| 54 | HSA isoform 1 | MKWVTFISLLFLFSSAYS RGVFRRDAHKSEVAHRFK DLGEENFKALVLIAFAQY LQQCPFEDHVKLVNEVTE FAKTCVADESAENCDKSL HTLFGDKLCTVATLRETY GEMADCCAKQEPERNECF LQHKDDNPNLPRLVRPEV DVMCTAFHDNEETFLKKY LYEIARRHPYFYAPELLF FAKRYKAAFTECCQAADK AACLLPKLDELRDEGKAS SAKQRLKCASLQKFGERA FKAWAVARLSQRFPKAEF AEVSKLVTDLTKVHTECC HGDLLECADDRADLAKYI CENQDSISSKLKECCEKP LLEKSHCIAEVENDEMPA DLPSLAADFVESKDVCKN YAEAKDVFLGMFLYEYAR RHPDYSVVLLLRLAKTYE TTLEKCCAAADPHECYAK VFDEFKPLVEEPQNLIKQ NCELFEQLGEYKFQNALL VRYTKKVPQVSTPTLVEV SRNLGKVGSKCCKHPEAK RMPCAEDYLSVVLNQLCV LHEKTPVSDRVTKCCTES LVNRRPCFSALEVDETYV PKEFNAETFTFHADICTL SEKERQIKKQTALVELVK HKPKATKEQLKAVMDDFA AFVEKCCKADDKETCFAE EGKKLVAASQAALGL |
| 55 | HSA isoform 2 | MKWVTFISLLFLFSSAYS RGVFRRDAHKSEVAHRFK DLGEENFKAWAVARLSQR FPKAEFAEVSKLVTDLTK VHTECCHGDLLECADDRA DLAKYICENQDSISSKLK ECCEKPLLEKSHCIA EVENDEMPADLPSLAADF VESKDVCKNYAEAKDVFL GMFLYEYARRHPDYSVVL LLRLAKTYETTLEKCCAA ADPHECYAKVFDEFKPLV EEPQNLIKQNCELFEQLG EYKFQNALLVRYTKKVPQ VSTPTLVEVSRNLGKVGS KCCKHPEAKRMPCAEDYL SVVLNQLCVLHEKTPVSD RVTKCCTESLVNRRPCFS ALEVDETYVPKEFNAETF TFHADICTLSEKERQIKK QTALVELVKHKPKATKEQ LKAVMDDPAAFVEKCCKA DDKETCFAEEGKKLVAAS QAALGL |
| 56 | HSA isoform 3 | MKWVTFISLLFLFSSAYS RGVFRRDAHKSEVAHRFK DLGEENFKALVLIAFAQY LQQCPFEDHVKLVNEVTE FAKTCVADESAENCDKSL HTLFGDKLCTVATLRETY GEMADCCAKQEPERNECF LQHKDDNPNLPRLVRPEV DVMCTAFHDNEETFLKKY LYETTLEKCCAAADPHEC YAKVFDEFKPLVEEPQNL IKQNCELFEQLGEYKFQN ALLVRYTKKVPQVSTPTL VEVSRNLGKVGSKCCKHP EAKRMPCAEDYLSVVLNQ LCVLHEKTPVSDRVTKCC TESLVNRRPCFSALEVDE TYVPKEFNAETFTFHADI CTLSEKERQIKKQTALVE LVKHKPKATKEQLKAVMD DFAAFVEKCCKADDKETC FAEEGKKLVAASQAALGL |
| 57 | Mature HSA | DAHKSEVAHRFKDLGEEN FKALVLIAFAQYLQQCPF EDHVKLVNEVTEFAKTCV ADESAENCDKSLHTLFGD KLCTVATLRETYGEMADC CAKQEPERNECFLQHKDD NPNLPRLVRPEVDVMCTA FHDNEETFLKKYLYEIAR RHPYFYAPELLFFAKRYK AAFTECCQAADKAACLLP KLDELRDEGKASSAKQGL KCASLQKFGERAFKAWAV ARLSQRFPKAEFAEVSKL VTDLTKVHTECCHGDLLE CADDRADLAKYICENQDS ISSKLKECCEKPLLEKSH CIAEVENDEMPADLPSLA |

| SEQ ID NO: | Description | Amino Acid Sequence |
|---|---|---|
| | | ADFVGSKDVCKNYAEAKD VFLGMFLYEYARRHPDYS VVLLLRLAKTYETTLEKC CAAADPHECYAKVFDEFK PLVEEPQNLIKQNCELFE QLGEYKFQNALLVRYTKK VPQVSTPTLVEVSRNLGK VGSKCCKHPEAKRMPCAE DCLSVFLNQLCVLHEKTP VSDRVTKCCTESLVNGRP CFSALEVDETYVPKEFNA ETFTFHADICTLSEKERQ IKKQTALVELVKHKPKAT KEQLKAVMDDFAAFVEKC CKADDKETCFAEEGKKLV AASQAALGL |
| 58 | GSG Linker | (GSG)$_n$ (n = 2, 3, 4, 5, or 6) |
| 59 | G3S Linker | (GGGS)$_n$ (n = 1, 2, 3, 4, 5, or 6) |
| 60 | G4S Linker | (GGGGS)$_n$ (n = 1, 2, 3, 4, 5, or 6) |
| 61 | EAAAK Linker | (EAAAK)$_n$ (n = 1, 2, 3, 4, 5, or 6) |
| 62 | PAPAP Linker | (PAPAP)$_n$ (n = 1, 2, 3, 4, 5, or 6) |
| 63 | VLVH. Linker | IKRTVAAP |
| 64 | SIRPa Linker | RAKPS |
| 65 | GSGS Linker | (GSGS)$_n$ (n= 1, 2, 3, or 4) |
| 66 | GGSG Linker | (GGSG)$_n$ (n= 1, 2, 3, or 4) |
| 67 | PAPA Linker | (PAPA)$_n$ (n = 1, 2, or 3) |
| 68 | PQPQ Linker | (PQPQ)$_n$ (n= 1, 2, or 3) |
| 69 | VL-CL Native Linker | IKRADAAP |
| 70 | Helix-forming Linker | AEAAAKEAAAKA |
| 71 | Dromedary IgG3 Hinge | GTNEVCKCPKCP |
| 72 | Dromedary IgG2a Hinge | EPKIPQPQPKPQPQPQPQ PKPQPKPEPECTCPKCP |
| 73 | F2A (Cleavable) | RRKRAPVKQTLNFDLLKL AGDVESNPGP |
| 74 | UPA Linker (Cleavable) | SGRSA |
| 75 | MMP Linker (Cleavable) | PVGLIG |
| 76 | Cleavable Linker | KGPQGIAGQ |
| 77 | Cleavable Linker | FGPQGLAGQ |
| 78 | Cleavable Linker | RGPQGIFGQ |
| 79 | Cleavable Linker | IGPQGIWGQ |
| 80 | Cleavable Linker | MGPQGILGQ |
| 81 | Cleavable Linker | KGPQSIAGQ |
| 82 | Cleavable Linker | FGPQSLAGQ |
| 83 | Cleavable Linker | RGPQSIFGQ |
| 84 | Cleavable Linker | IGPQSIWGQ |
| 85 | Cleavable Linker | MGPQSILGQ |
| 86 | Cleavable Linker | KGPRTIAGQ |
| 87 | Cleavable Linker | FGPQTLAGQ |
| 88 | Cleavable Linker | RGPQTIFGQ |
| 89 | Cleavable Linker | IGPRTIWGQ |
| 90 | Cleavable Linker | FRPRSHGQ |
| 91 | Cleavable Linker | MGPQTILGQ |
| 92 | Anti-MSLNBI CDR1 | GUFPVNA |
| 93 | Anti-MSLN B1 CDR2 | ISAGGTT |
| 94 | Anti-MSLN B1 CDR3 | QRRIGMLRDY |
| 95 | Anti-MSLN B2 CDR1 | GRTLESYV |
| 96 | Anti-MSLN B2 CDR2 | INWSSGRL |
| 97 | Human IL-21 (Full length) | QGQDRHMIRMRQLIDIVD QLKNYVNDLVPEFLPAPE DVETNCEWSAFSCFQKAQ LKSANTGNNERIINVSIK |

| SEQ ID NO: | Description | Amino Acid Sequence |
|---|---|---|
| | | KLKRKPPSTNAGRRQKHR LTCPSCDSYEKKPPKEFL ERFKSLLQKMIHQHLSSR THGSEDS |
| 98 | Human IL-21 (Truncated) | QGQDRHMIRMRQLIDIVD QLKNYVNDLVPEFLPAPE DVETNCEWSAFSCFQKAQ LKSANTGNNERIINVSIK KLKRKPPSTNAGRRQKHR LTCPSCDSYEKKPPKEFL ERFKSLLQKMIHQHL |
| 99 | Construct C1 (mIL-21-anti-HSA V$_H$H) | QGPDRLLIRLRHLIDIVE QLKIYENDLDPELLSAPQ DVKGHCEHAAFACFQKAK LKPSNPGNNKTFIIDLVA QLRRRLPARRGGKKQKHI AKCPSCDSYEKRTPKEFL ERLKWLLQKMIHQHLS GSGGSGGSGGSGQVQLVE SGGGLVQPGGSLRLSCAA SGSTWSINTLAWYRQAPG KQRDLVARISSGGSTHYA DSVKGRFTVSRDNAENTL VLQMNSLKPEDTAVYYCY AQSTWYPPSWGQGTQVTV SS |
| 100 | Construct C2 (hIL-21-anti-HSA V$_H$H) | QGQDRHMIRMRQLIDIVD QLKNYVNDLVPEFLPAPE DVETNCEWSAFSCFQKAQ LKSANTGNNERIINVSIK KLKRKPPSTNAGRRQKHR LTCPSCDSYEKKPPKEFL ERFKSLLQKMIHQHLSSR THGSEDSGSGGSGGSGGS GQVQLVESGGGLVQPGGS LRLSCAASGSTWSINTLA WYRQAPGKQRDLVARISS GGSTHYADSVKGRFTVSR DNAENTLVLQMNSLKPED TAVYYCYAQSTWYPPSWG QGTQVTVSS |
| 101 | Anti-HAS V$_H$H-hIL-15R sushi-human IL-15 | QVQLVESGGGLVQPGGSL RLSCAASGSTWSINTLAW YRQAPGKQRDLVARISSG GSTHYADSVKGRFTVSRD NAENTLVLQMNSLKPEDT AVYYCYAQSTWYPPSWGQ GTQVTVSSGGGGSGGGGS GGGGSGGGGSITCPPPMS VEHADIWVKSYSLYSRER YICNSGFKRKAGTSSLTE CVLNKATNVAHWTTPSLK CIRDPALVHQRPAPPRRK RAPVKQTLNFDLLKLAGD VESNPGPNWVNVISDLKK IEDLIQSMHIDATLYTES DVHPSCKVTAMKCFLLEL QVISLESGDASIHDTVEN LIILANNSLSSNGNVTES GCKECEELEEKNIKEFLQ SFVHIVQMFINTS |
| 102 | Human IL-15Rα | MGWSLILLFLVAVATRVH SNWVNVISDLKKIEDLIQ SMHIDATLYTESDVHPSC KVTAMKCFLLELQVISLE SGDASIHDTVENLIILAN NSLSSNGNVTESGCKECE ELEEKNIKEFLQSFVHIV QMFINTS |
| 103 | Construct C6 (hIL-15Rα anti-HSA V$_H$H) | MGWSLILLFLVAVATRVH SQVQLVESGGGLVQPGGS LRLSCAASGSTWSINTLA WYRQAPGKQRDLVARISS GGSTHYADSVKGRFTVSR DNAENTLVLQMNSLKPED TAVYYCYAQSTWYPPSWG QGTQVTVSSGGGGSGGGG SGGGGSGGGGSITCPPPM SVEHADIWVKSYSLYSRE RYICNSGFKRKAGTSSLT ECVLNKATNVAHWTTPSL KCIR |
| 104 | Construct C7 (hIL-15Rα anti-HSA V$_H$H) | MGWSLILLFLVAVATRVH SQVQLVESGGGLVQPGGS LRLSCAASGSTWSINTLA WYRQAPGKQRDLVARISS GGSTHYADSVKGRFTVSR DNAENTLVLQMNSLKPED TAVYYCYAQSTWYPPSWG QGTQVTVSSGGGGSGGGG SGGGGSGGGGSITCPPPM SVEHADTWVKSYSLYSRE RYICNSGFKRKAGTSSLT ECVLNKATNVAHWTTPSL KCIRDPALVHQRPAPP |
| 105 | Ab A10 | QVQLVESGGGLVQAGGSL RLSCLASGGTFSSYAMGW FRQAPGKEREFVAAISWK SSTYYTDSVKGRFTISRD NAKNTVYLQMNSLTPEDT AVYYCAADPTGSYDQPWY DYWGQGTQVTVSS |
| 106 | Ab A11 | QVQVVESGGGLVQPGGSL RLSCAASGMSSANVMGWY RQVPGNQRELVARITSSG RTMYSDSVLGRFTISRGG AGNTADLQMNMLKPEDTA IYICNIRILGSFDPDSGY WGQGTQVTVSS |
| 107 | Ab A12 | EVQLVESGGGLVQPGGSL RLSCAASGFTFRGFGMSW VRRAPGKEFEWVSSINGG GEDTRYSDSVKGRFTISR DNARNTLYLQMNSLKPED SAVYYCAIGGPGATPSGP GTQVTVSS |
| 108 | Ab A13 | QVQLVESGGGSVQPGGSL RLSCAASGRNFNPMGWFR QAPGKQRESVAAIGTDGS TKYADSVKGRFTISRDNG KNTVYLQMNSLKSEDTAV YYCNVGGWGISWFPWGRG TQVSVSS |
| 109 | Ab A14 | QVQLVESGGGLVQPGGSL RLSCAASGFTFRGFGMSW VRQAPGKGFEWVSSINSG GEDTRYSDVKGRFTISR DNARNTLYLQMNSLKPED TAVYYCAIGGAGATPSGQ GTQVTVSS |
| 110 | Ab A15 | QVQLVESGGGLVQPGGSL RLSCAASGFAFRGFGMSW |

-continued

| SEQ ID NO: | Description | Amino Acid Sequence |
|---|---|---|
| | | VRQAPGKGFEWVSSINNG GSDTRYADSVKGRFTISR DNARNTLYLQMNSLKPED TAVYYCAIGGPGASPSGQ GTQVTVSS |
| 111 | Ab A16 | QVQLVESGGGLVQAGGTL RLSCTASGSTFRGNGMAW HRQAPGKEREFVAYMGMT DRITYAESVKGRFTLSRD DAKNRVYLHMNNLEVEDT AVYYCTAFGSWGQGTQVT VSS |
| 112 | Ab A17 | QVQLVESGGELVQAGGSL RLSCVVSGRTFRTRTMGW FRQAPGKEREYVAHISAN GPITDYSDSVKGRFAISR DNAKNTVNLQMNSLKPED TAVYYCALHNGIGVRTVP SQYDSWGQGTQVTVSS |
| 113 | Ab A18 | QEQLVESGGGLVQAGGSL RLSCAASTRTINIYAMAW FRQAPGKEREFVAAVTWS GLTRDYADSVKGRFTISR DNPKNTLYLQMNSLQPED TAVYYCAAGRYSTGTHDY DYWGQGTQVTVSS |
| 114 | Ab A19 | EVQLVESGGGLVQPGGSL RLSCAASGSTWSINTLAW YRQAPGKQRDLVARISSG GSTYYADSVKGRFTISRD NSKNTLYLQMNSLRAEDT AVYYCYAQSTWYPPSWGQ GTLVTVSS |
| 115 | Ab A20 | QVQLVESGGGVVQPGGSL RLSCAASGFAFRGFGMSW VRQAPGKGLEWVSSINNG GSDTYYADSVKGRFTISR DNSKNTLYLQMNSLRAED TAVYYCAIGGPGASPSGQ GTQVTVSS |
| 116 | Ab A10 CDR1 | GGTFSSYA |
| 117 | Ab A10 CDR3 | AADPTGSYDQPWYDY |
| 118 | Ab A11 CDR1 | GMSSANV |
| 119 | Ab A11 CDR2 | ITSSGRT |
| 120 | Ab A11 CDR3 | NIRILGSFDPDSGY |
| 121 | Ab A12 CDR1 | GFTFRGFG |
| 122 | Ab A12 CDR2 | INGGGEDT |
| 123 | Ab A12 CDR3 | AIGGPGATP |
| 124 | Ab A13 CDR1 | GRNFNP |
| 125 | Ab A13 CDR2 | IGTDGST |
| 126 | Ab A13 CDR3 | NVGGWGISWFP |
| 127 | Ab A14 CDR2 | INSGGEDT |
| 128 | Ab A14 CDR3 | AIGGAGATP |
| 129 | Ab A15 CDR1 | GFAFRGFG |
| 130 | Ab A15 CDR2 | INNGGSDT |
| 131 | Ab A15 CDR3 | AIGGPGASP |
| 132 | Ab A16 CDR1 | GSTFRGNG |
| 133 | Ab A16 CDR2 | MGMTDRI |
| 134 | Ab A16 CDR3 | TAFGS |
| 135 | Ab A17 CDR1 | GRTFRTRT |
| 136 | Ab A17 CDR2 | ISANGPIT |
| 137 | Ab A17 CDR3 | ALHNGIGVRTVPSQYDS |
| 138 | Ab A18 CDR1 | TRTINIYA |
| 139 | Ab A18 CDR2 | VTWSGLTR |
| 140 | Ab A18 CDR3 | AAGRYSTGTHDYDY |
| 141 | Human FR1 | QVQLVESGGGVVQPGGSL RLSCAAS |
| 142 | Human FR2 | LAWYRQAPGKQRDLVAR |
| 143 | Human FR2 | MSWVRQAPGKGLEWVSS |
| 144 | Human FR3 | YYADSVKGRFTISRDNSK NTLYLQMNSLRAEDTAVY YC |
| 145 | Human FR4 | WGQGTQVTVSS |
| 146 | Human FR4 | WGQGTLVTVSS |
| 147 | Human FR4 | SGQGTQVTVSS |
| 148 | Mouse IL-21 | QGPDRLLIRLRHLIDIVE QLKIYENDLDPELLSAPQ DVKGHCEHAAFACFQKAK |

| SEQ ID NO: | Description | Amino Acid Sequence |
|---|---|---|
| | | LKPSNPGNNKTFIIDLVA QLRRRLPARRGGKKQKHI AKCPSCDSYEKRTPKEFL ERLKWLLQKMIHQHLS |
| 149 | Construct C3 (hIL-21-anti-HSA $V_HH$) | QGQDRHMIRMRQLIDIVD QLKNYVNDLVPEFLPAPE DVETNCEWSAFSCFQKAQ LKSANTGNNERIINVSIK KLKRKPPSTNAGRRQKHR LTCPSCDSYEKKPPKEFL ERFKSLLQKMIHQHLSSR THGSEDSGSGGSGGSGGS GQVQLVESGGGVVQPGGS LRLSCAASGFAFRGFGMS WVRQAPGKGLEWVSSINN GGSDTYYADSVKGRFTIS RDNSKNTLYLQMNSLRAE DTAVYYCAIGGPGASPSG QGTQVTVSS |
| 150 | Construct C4 (hIL-21-anti-HSA $V_HH$) | QGQDRHMIRMRQLIDIVD QLKNYVNDLVPEFLPAPE DVETNCEWSAFSCFQKAQ LKSANTGNNERIINVSIK KLKRKPPSTNAGRRQKHR LTCPSCDSYEKKPPKEFL ERFKSLLQKMIHQHLSSR THGSEDSGSGGSGGSGGS GEVQLVESGGGLVQPGGS LRLSCAASGSTWSINTLA WYRQAPGKQRDLVARISS GGSTYYADSVKGRFTISR DNSKNTLYLQMNSLRAED TAVYYCYAQSTWYPPSWG QGTLVTVSS |
| 151 | hIL-21 mutein (R5E) | QGQDEHMIRMRQLIDIVD QLKNYVNDLVPEFLPAPE DVETNCEWSAFSCFQKAQ LKSANTGNNERIINVSIK KLKRKPPSTNAGRRQKHR LTCPSCDSYEKKPPKEFL ERFKSLLQKMIHQHLS SRTHGSEDS |
| 152 | hIL-21 mutein (R9E) | QGQDRHMIEMRQLIDIVD QLKNYVNDLVPEFLPAPE DVETNCEWSAFSCFQKAQ LKSANTGNNERIINVSIK KLKRKPPSTNAGRRQKHR LTCPSCDSYEKKPPKEFL ERFKSLLQKMIHQHLSSR THGSEDS |
| 153 | hIL-21 mutein (K73E) | QGQDRHMIRMRQLIDIVD QLKNYVNDLVPEFLPAPE DVETNCEWSAFSCFQKAQ LKSANTGNNERIINVSIK ELKRKPPSTNAGRRQKHR LTCPSCDSYEKKPPKEFL ERFKSLLQKMIHQHLSSR THGSEDS |
| 154 | hIL-21 mutein (R76E) | QGQDRHMIRMRQLIDIVD QLKNYVNDLVPEFLPAPE DVETNCEWSAFSCFQKAQ LKSANTGNNERIINVSIK KLKEKPPSTNAGRRQKHR LTCPSCDSYEKKPPKEFL ERFKSLLQKMIHQHLSSR THGSEDS |
| 155 | hIL-21 mutein (R5) | QGQD$X^5$HMIRMRQLIDIV DQLKNYVNDLVPEFLPAP EDVETNCEWSAFSCFQKA QLKSANTGNNERIINVSI KKLKRKPPSTNAGRRQKH RLTCPSCDSYEKKPPKEF LERFKSLLQKMIHQHL SSRTHGSEDS ($X^5$ is A, C, D, E, F, G, H, I, K, L, M, N, P, Q, S, T, V, W, or Y) |
| 156 | hIL-21 mutein (R9) | QGQDRHMI$X^9$MRQLIDIV DQLKNYVNDLVPEFLPAP EDVETNCEWSAFSCFQKA QLKSANTGNNERIINVSI KKLKRKPPSTNAGRRQKH RLTCPSCDSYEKKPPKEF LERFKSLLQKMIHQHLSS RTHGSEDS ($X^9$ is A, C, D, E, F, G, H, I, K, L, M, N, P, Q, S, T, V, W, or Y) |
| 157 | hIL-21 mutein (K73) | QGQDRHMIRMRQLIDIVD QLKNYVNDLVPEFLPAPE DVETNCEWSAFSCFQKAQ LKSANTGNNERIINVSIK $X^{73}$LKRKPPSTNAGRRQK HRLTCPSCDSYEKKPPKE FLERFKSLLQKMIHQHLS SRTHGSEDS ($X^{73}$ is A, C, D, E, F, G, H, I, L, M, N, P, Q, R, S, T, V, W, or Y) |
| 158 | hIL-21 mutein (R76) | QGQDRHMIRMRQLIDIVD QLKNYVNDLVPEFLPAPE DVETNCEWSAFSCFQKAQ LKSANTGNNERIINVSIK KLK$X^{76}$KPPSTNAGRRQK HRLTCPSCDSYEKKPPKE FLERFKSLLQKMIHQHLS SRTHGSEDS ($X^{76}$ is A, C, D, E, F, G, H, I, K, L, M, N, P, Q, S, T, V, W, or Y) |
| 159 | hIL-21 mutein (R5, R9, K73, R76) | QGQD$X^5$HMI$X^9$MRQLIDI VDQLKNYVNDLVPEFLPA PEDVETNCEWSAFSCFQK AQLKSANTGNNERIINVS IK$X^{73}$LK$X^{76}$KPPSTNAG RRQKHRLTCPSCDSYEKK PPKEFLERFKSLLQKVII HQHLSSRTHGSEDS ($X^5$ is independently A, C, D, E, F, G, H, I, K, L, M, N, P, Q, S, T, V, W, or Y; $X^9$ is independently A, C, D, E, F, G, H, I, K, L, M, N, P, Q, S, |

SEQUENCE TABLE

| SEQ ID NO: | Description | Amino Acid Sequence |
|---|---|---|
| | | T, V, W, or Y; $X^{73}$ is independently A, C, D, E, F, G, H, I, L, M, N, P, Q, R, S, T, V, W, or Y; and $X^{76}$ is independently A, C, D, E, F, G, H, I, K, L, M, N, P, Q, S, T, V, W, or Y) |
| 160 | hIL-21 mutein (R5N, M7T) | QGQDNHTIRMRQLIDIVD QLKNYVNDLVPEFLPAPE DVETNCEWSAFSCFQKAQ LKSANTGNNERIINVSIK KLKRKPPSTNAGRRQKHR LTCPSCDSYEKKPPKEFL ERFKSLLQKMIHQHLSSR THGSEDS |
| 161 | hIL-21 mutein (R5N, M7S) | QGQDNHSIRMRQLIDIVD QLKNYVNDLVPEFLPAPE DVETNCEWSAFSCFQKAQ LKSANTGNNERIINVSIK KLKRKPPSTNAGRRQKHR LTCPSCDSYEKKPPKEFL ERFKSLLQKMIHQHLSSR THGSEDS |
| 162 | hIL-21 mutein (R9N, R11T) | QGQDRHMINMTQLIDIVD QLKNYVNDLVPEFLPAPE DVETNCEWSAFSCFQKAQ LKSANTGNNERIINVSIK KLKRKPPSTNAGRRQKHR LTCPSCDSYEKKPPKEFL ERFKSLLQKMIHQHLSSR THGSEDS |
| 163 | hIL-21 mutein (R9N, R11S) | QGQDRHMINMSQLIDIVD QLKNYVNDLVPEFLPAPE DVETNCEWSAFSCFQKAQ LKSANTGNNERIINVSIK KLKRKPPSTNAGRRQKHR LTCPSCDSYEKKPPKEFL ERFKSLLQKMIHQHLSSR THGSEDS |
| 164 | hIL-21 mutein (K73N, K75T) | QGQDRHMIRMRQLIDIVD QLKNYVNDLVPEFLPAPE DVETNCEWSAFSCFQKAQ LKSANTGNNERIINVSIK NLTRKPPSTNAGRRQKHR LTCPSCDSYEKKPPKEFL ERFKSLLQKMIHQHLSSR THGSEDS |
| 165 | hIL-21 mutein (K73N, K75S) | QGQDRHMIRMRQLIDIVD QLKNYVNDLVPEFLPAPE DVETNCEWSAFSCFQKAQ LKSANTGNNERIINVSIK NLSRKPPSTNAGRRQKHR LTCPSCDSYEKKPPKEFL ERFKSLLQKMIHQHLSSR THGSEDS |
| 166 | hIL-21 mutein (R76N, P78T) | QGQDRHMIRMRQLIDIVD QLKNYVNDLVPEFLPAPE DVETNCEWSAFSCFQKAQ LKSANTGNNERIINVSIK .KLKNKTPSTNAGRRQKH RLTCPSCDSYEKKPPKEF LERFKSLLQKMIHQHLSS RTHGSEDS |
| 167 | hIL-21 mutein (R76N, P78S) | QGQDRHMIRMRQLIDIVD QLKNYVNDLVPEFLPAPE DVETNCEWSAFSCFQKAQ LKSANTGNNERIINVSIK KLKNKSPSTNAGRRQKHR LTCPSCDSYEKKPPKEFL ERFKSLLQKIVIIHQLS SRTHGSEDS |
| 168 | hIL-21Rα | CPDLVCYTDYLQTVICIL EMWNLHPSTLTLTWQDQY EELKDEATSCSLHRSAHN ATHATYTCHMDVFHFMAD DIFSVNITDQSGNYSQEC GSFLLAESIKPAPPFNVT VTFSGQYNISWRSDYE DPAFYMLKGKLQYELQYR NRGDPWAVSPRRKLIS VDSRSVSLLPLEFRKDSS YELQVRAGPMPGSSYQGT WSEWSDPVIFQTQS |

The examples set forth above are provided to give those of ordinary skill in the art with a complete disclosure and description of how to make and use the claimed embodiments, and are not intended to limit the scope of what is disclosed herein. Modifications that are obvious to persons of skill in the art are intended to be within the scope of the following claims. All publications, patents, and patent applications cited in this specification are incorporated herein by reference as if each such publication, patent or patent application were specifically and individually indicated to be incorporated herein by reference.

What is claimed is:

1. An isolated anti-albumin construct comprising a single-domain antibody (sdAb) moiety that comprises a heavy chain variable domain having the amino acid sequence of any one of SEQ ID NOs: 45 to 47 and 49 to 53; wherein the anti-albumin construct binds to an albumin.

2. The anti-albumin construct of claim 1, wherein the albumin is a human serum albumin.

3. The anti-albumin construct of claim 2, wherein the human serum albumin has the amino acid sequence of SEQ ID NO: 54, 55, 56, or 57.

4. The anti-albumin construct of claim 1, wherein the sdAb moiety comprises a heavy chain variable domain having the amino acid sequence of SEQ ID NO: 45.

5. The anti-albumin construct of claim 1, wherein the sdAb moiety comprises a heavy chain variable domain having the amino acid sequence of SEQ ID NO: 46.

6. The anti-albumin construct of claim 1, wherein the sdAb moiety comprises a heavy chain variable domain having the amino acid sequence of SEQ ID NO: 47.

7. The anti-albumin construct of claim 1, wherein the sdAb moiety comprises a heavy chain variable domain having the amino acid sequence of SEQ ID NO: 49.

8. The anti-albumin construct of claim 1, wherein the sdAb moiety comprises a heavy chain variable domain having the amino acid sequence of SEQ ID NO: 50.

9. The anti-albumin construct of claim 1, wherein the sdAb moiety comprises a heavy chain variable domain having the amino acid sequence of SEQ ID NO: 51.

10. The anti-albumin construct of claim 1, wherein the sdAb moiety comprises a heavy chain variable domain having the amino acid sequence of SEQ ID NO: 52.

11. The anti-albumin construct of claim 1, wherein the sdAb moiety comprises a heavy chain variable domain having the amino acid sequence of SEQ ID NO: 53.

12. The anti-albumin construct of claim 1, further comprising a second polypeptide moiety.

13. The anti-albumin construct of claim 12, wherein the second polypeptide moiety comprises an antigen binding moiety.

14. The anti-albumin construct of claim 13, wherein the anti-albumin construct binds to a tumor antigen via the antigen binding moiety.

15. The anti-albumin construct of claim 14, wherein the tumor antigen is mesothelin, GPA33, Her-2, EGFR, or CD20.

16. The anti-albumin construct of claim 14, wherein the antigen binding moiety comprises a single-domain antibody moiety that comprises a CDR1 comprising the amino acid sequence of SEQ ID NO: 92 or 95; a CDR2 comprising the amino acid sequence of SEQ ID NO: 93 or 96; and a CDR3 comprising the amino acid sequence of SEQ ID NO: 94 or GRY.

17. The anti-albumin construct of claim 12, wherein the second polypeptide moiety comprises an amino acid sequence of a cytokine or a fragment thereof.

18. The anti-albumin construct of claim 17, wherein the cytokine is an IL-7, IL-15, IL-21, IL-22, or IL-33; or a fragment thereof.

19. The anti-albumin construct of claim 17, wherein the cytokine is an IL-21.

20. The anti-albumin construct of claim 12, wherein the second polypeptide moiety comprises an amino acid sequence of a cytokine receptor or a fragment thereof.

21. The anti-albumin construct of claim 20, wherein the cytokine receptor is an IL-15Rα.

22. The anti-albumin construct of claim 19, wherein the sdAb moiety comprises a heavy chain variable domain having the amino acid sequence of SEQ ID NO: 149.

23. The anti-albumin construct of claim 12, wherein the C-terminus of the second polypeptide moiety is fused to the N-terminus of the sdAb moiety.

24. The anti-albumin construct of claim 12, wherein the N-terminus of the second polypeptide moiety is fused to the C-terminus of the sdAb moiety.

25. The anti-albumin construct of claim 12, wherein the second polypeptide moiety is fused to the sdAb moiety via a peptide linker.

26. The anti-albumin construct of claim 25, wherein the peptide linker is cleavable.

27. The anti-albumin construct of claim 25, wherein the peptide linker is non-cleavable.

28. The anti-albumin construct of claim 25, wherein the peptide linker comprises the amino acid sequence of any one of SEQ ID NOs: 58 to 91.

29. A pharmaceutical composition comprising the anti-albumin construct of claim 1 and a pharmaceutically acceptable excipient.

30. A method for treating or ameliorating one or more symptoms of cancer in a subject, comprising administering to the subject a therapeutically effective amount of the anti-albumin construct of claim 1.

* * * * *

SEQUENCE LISTING

<160> NUMBER OF SEQ ID NOS: 168

<210> SEQ ID NO 1
<211> LENGTH: 124
<212> TYPE: PRT
<213> ORGANISM: Artificial Sequence
<220> FEATURE:
<223> OTHER INFORMATION: Based on llima sequence

<400> SEQUENCE: 1

Gln Val Gln Leu Val Glu Ser Gly Gly Gly Leu Val Gln Pro Gly Gly

```
                1               5                  10                 15
Ser Leu Arg Leu Ser Cys Ala Ala Ser Gly Arg Ile Phe Ser Thr Tyr
                20                  25                 30

Ala Met Gly Trp Phe Arg Gln Pro Pro Gly Lys Glu Arg Glu Phe Val
                35                  40                 45

Ala Ser Ile Asn Arg Ser Gly Asp Ser Thr Tyr Tyr Ala Asp Ser Val
                50                  55                 60

Lys Gly Arg Phe Thr Ile Ser Arg Asp Asn Ala Lys Asn Thr Gly Tyr
 65                 70                  75                     80

Leu Gln Met Ser Ser Leu Lys Pro Glu Asp Thr Ala Val Tyr Tyr Cys
                85                  90                 95

Ala Ala Asp Ser Asp Gly Ile Gly Trp Phe Asn Ser Phe Glu Tyr Asp
                100                 105                110

Tyr Trp Gly Arg Gly Thr Gln Val Thr Val Ser Ser
                115                 120
```

<210> SEQ ID NO 2
<211> LENGTH: 125
<212> TYPE: PRT
<213> ORGANISM: Artificial Sequence
<220> FEATURE:
<223> OTHER INFORMATION: Based on llima sequence

<400> SEQUENCE: 2

```
Gln Val Gln Leu Val Glu Ser Gly Gly Gly Leu Val Gln Ala Gly Gly
 1               5                  10                 15

Ser Leu Arg Leu Ser Cys Ala Ala Ser Gly Arg Ser Val Ser Leu Tyr
                20                  25                 30

His Val Gly Trp Phe Arg His Thr Pro Gly Lys Glu Arg Glu Phe Val
                35                  40                 45

Ala Ala Thr Ala Trp His Asp Gly Ser Thr Ser Tyr Ala Asp Ser Val
                50                  55                 60

Lys Gly Arg Phe Thr Ile Ser Arg Asn Asn Ala Lys Asn Thr Val Tyr
 65                 70                  75                     80

Leu Gln Met Asn Ser Leu Gln Pro Glu Asp Thr Ala Val Tyr Tyr Cys
                85                  90                 95

Ala Gly Glu Ala Lys Leu Gly Gly Ile Tyr Ser Arg Trp Arg Asp Tyr
                100                 105                110

Glu Tyr Trp Gly Gln Gly Thr Gln Val Thr Val Ser Ser
                115                 120                125
```

<210> SEQ ID NO 3
<211> LENGTH: 124
<212> TYPE: PRT
<213> ORGANISM: Artificial Sequence
<220> FEATURE:
<223> OTHER INFORMATION: Based on llima sequence

<400> SEQUENCE: 3

```
Gln Val Gln Leu Val Glu Ser Gly Gly Gly Leu Val Gln Ala Gly Gly
 1               5                  10                 15

Ser Leu Arg Leu Ser Cys Ala Ala Ser Gly Arg Thr Phe Ser Ile Tyr
                20                  25                 30

Asp Met Gly Trp Phe Arg Gln Ala Pro Gly Lys Glu Arg Glu Phe Val
                35                  40                 45

Ala Ala Thr Asn Leu Arg Gly Val Ser Thr Arg Tyr Ala Asp Ser Val
                50                  55                 60
```

-continued

```
Lys Gly Arg Phe Thr Ile Ser Gly Asp Asn Ala Lys Asn Thr Val Ser
 65                  70                  75                  80

Leu Gln Met Asn Ser Leu Ile Pro Glu Asp Thr Ala Val Tyr Tyr Cys
                 85                  90                  95

Ala Ala Ala Val Ser Asn Trp Leu Ala Lys Asp Pro Ser Ala Tyr Ser
            100                 105                 110

Tyr Trp Gly Gln Gly Thr Gln Val Thr Val Ser Ser
            115                 120
```

<210> SEQ ID NO 4
<211> LENGTH: 124
<212> TYPE: PRT
<213> ORGANISM: Artificial Sequence
<220> FEATURE:
<223> OTHER INFORMATION: Based on llima sequence

<400> SEQUENCE: 4

```
Gln Val Gln Leu Val Glu Ser Gly Gly Gly Leu Val Gln Pro Gly Gly
  1               5                  10                  15

Ser Leu Arg Leu Ser Cys Ala Ala Ser Gly Arg Ile Phe Ser Thr Tyr
                 20                  25                  30

Ala Met Gly Trp Phe Arg Gln Pro Pro Gly Lys Glu Arg Glu Phe Val
             35                  40                  45

Ala Ser Ile Asn Arg Ser Gly Asp Ser Thr Tyr Tyr Ala Asp Ser Val
         50                  55                  60

Lys Gly Arg Phe Thr Ile Ser Arg Asp Asp Ala Lys Asn Met Gly Tyr
 65                  70                  75                  80

Leu Gln Met Ser Ser Leu Lys Pro Glu Asp Thr Ala Val Tyr Tyr Cys
                 85                  90                  95

Ala Ala Asp Ser Asp Gly Ile Gly Trp Phe Asn Ser Phe Glu Tyr Asp
            100                 105                 110

Tyr Trp Gly Arg Gly Thr Gln Val Thr Val Ser Ser
            115                 120
```

<210> SEQ ID NO 5
<211> LENGTH: 124
<212> TYPE: PRT
<213> ORGANISM: Artificial Sequence
<220> FEATURE:
<223> OTHER INFORMATION: Based on llima sequence

<400> SEQUENCE: 5

```
Gln Val Gln Leu Val Glu Ser Gly Gly Gly Leu Val Gln Pro Gly Gly
  1               5                  10                  15

Ser Leu Arg Leu Ser Cys Ala Ala Ser Gly Pro Ile Phe Ser Thr Tyr
                 20                  25                  30

Ala Met Gly Trp Phe Arg Gln Pro Pro Gly Lys Glu Arg Glu Phe Val
             35                  40                  45

Ala Ser Ile Asn Arg Ser Gly Asp Ser Thr Tyr Tyr Ala Asp Ser Val
         50                  55                  60

Lys Gly Arg Phe Thr Ile Ser Arg Asp Asn Ala Lys Asn Thr Gly Tyr
 65                  70                  75                  80

Leu Gln Met Ser Ser Leu Lys Pro Glu Asp Thr Ala Val Tyr Tyr Cys
                 85                  90                  95

Ala Ala Asp Ser Asp Gly Ile Gly Trp Phe Asn Ser Phe Glu Tyr Asp
            100                 105                 110

Tyr Trp Gly Arg Gly Thr Gln Val Thr Val Ser Ser
            115                 120
```

<210> SEQ ID NO 6
<211> LENGTH: 125
<212> TYPE: PRT
<213> ORGANISM: Artificial Sequence
<220> FEATURE:
<223> OTHER INFORMATION: Based on llima sequence

<400> SEQUENCE: 6

```
Gln Val Gln Leu Val Glu Ser Gly Gly Gly Leu Val Gln Ala Gly Gly
1               5                   10                  15

Ser Leu Arg Leu Ser Cys Ala Ala Ser Gly Arg Ser Val Ser Leu Tyr
            20                  25                  30

His Val Gly Trp Phe Arg His Thr Pro Gly Lys Glu Arg Glu Phe Val
        35                  40                  45

Ala Ala Thr Ala Trp His Asp Gly Ser Thr Ser Tyr Ala Asp Ser Val
    50                  55                  60

Lys Gly Arg Phe Thr Ile Ser Arg Asn Asn Ala Lys Asn Thr Val Tyr
65                  70                  75                  80

Leu Gln Met Asn Ser Leu Gln Pro Glu Asp Thr Ala Val Tyr Tyr Cys
                85                  90                  95

Ala Gly Glu Ala Lys Leu Gly Gly Ile Tyr Ser Arg Trp Arg Asp Tyr
            100                 105                 110

Glu Tyr Trp Gly Gln Gly Thr Gln Val Thr Val Ser Ser
        115                 120                 125
```

<210> SEQ ID NO 7
<211> LENGTH: 123
<212> TYPE: PRT
<213> ORGANISM: Artificial Sequence
<220> FEATURE:
<223> OTHER INFORMATION: Based on llima sequence

<400> SEQUENCE: 7

```
Gln Val Gln Leu Val Glu Ser Gly Gly Gly Leu Val Gln Ala Gly Gly
1               5                   10                  15

Ser Leu Arg Leu Ser Cys Ala Ala Ser Gly Arg Ser Val Ser Leu Tyr
            20                  25                  30

His Val Gly Trp Phe Arg His Thr Pro Gly Lys Glu Arg Glu Phe Val
        35                  40                  45

Ala Ala Thr Ala Trp His Asp Gly Ser Thr Ser Tyr Ala Asp Ser Val
    50                  55                  60

Lys Gly Arg Phe Thr Ile Ser Arg Asp Ser Ala Lys Asn Thr Val Phe
65                  70                  75                  80

Leu Gln Met Ser Ser Leu Gln Pro Glu Asp Thr Ala Val Tyr Tyr Cys
                85                  90                  95

Ala Ala Asp Pro Gly Gly Ser Ser Trp Ser Gln Pro Trp Tyr Asp Tyr
            100                 105                 110

Trp Gly Gln Gly Thr Gln Val Thr Val Ser Ser
        115                 120
```

<210> SEQ ID NO 8
<211> LENGTH: 116
<212> TYPE: PRT
<213> ORGANISM: Artificial Sequence
<220> FEATURE:
<223> OTHER INFORMATION: Based on llima sequence

<400> SEQUENCE: 8

```
Gln Val Gln Leu Val Glu Ser Gly Gly Leu Val Gln Pro Gly Gly
1               5                   10                  15

Ser Leu Arg Leu Ser Cys Ala Ala Ser Gly Ser Thr Trp Ser Ile Asn
            20                  25                  30

Thr Leu Ala Trp Tyr Arg Gln Ala Pro Gly Lys Gln Arg Asp Leu Val
        35                  40                  45

Ala Arg Ile Ser Ser Gly Gly Ser Thr His Tyr Ala Asp Ser Val Lys
    50                  55                  60

Gly Arg Phe Thr Val Ser Arg Asp Asn Ala Glu Asn Thr Leu Val Leu
65                  70                  75                  80

Gln Met Asn Ser Leu Lys Pro Glu Asp Thr Ala Val Tyr Tyr Cys Tyr
                85                  90                  95

Ala Gln Ser Thr Trp Tyr Pro Pro Ser Trp Gly Gln Gly Thr Gln Val
            100                 105                 110

Thr Val Ser Ser
            115
```

<210> SEQ ID NO 9
<211> LENGTH: 122
<212> TYPE: PRT
<213> ORGANISM: Artificial Sequence
<220> FEATURE:
<223> OTHER INFORMATION: Based on llima sequence

<400> SEQUENCE: 9

```
Gln Val Gln Leu Val Glu Ser Gly Gly Leu Val Gln Ala Gly Gly
1               5                   10                  15

Ser Leu Arg Leu Ser Cys Ala Ala Ser Gly Arg Thr Phe Ser Asn Asp
            20                  25                  30

Ala Met Gly Trp Phe Arg Gln Ala Pro Gly Lys Glu Arg Val Phe Val
        35                  40                  45

Ala Thr Ile Ser Trp Lys Ser Ser Thr Tyr Tyr Ala Asp Ser Val Lys
    50                  55                  60

Gly Arg Phe Thr Ile Ser Arg Asp His Ala Lys Asn Thr Val Tyr Leu
65                  70                  75                  80

Gln Met Asn Asn Leu Lys Pro Glu Asp Thr Ala Val Tyr Tyr Cys Val
                85                  90                  95

Ala Asp Pro Tyr Gly Leu Gly Phe Asn Pro Ser Asp Tyr Asp Tyr Trp
            100                 105                 110

Gly Gln Gly Thr Gln Val Thr Val Ser Ser
            115                 120
```

<210> SEQ ID NO 10
<211> LENGTH: 8
<212> TYPE: PRT
<213> ORGANISM: Artificial Sequence
<220> FEATURE:
<223> OTHER INFORMATION: Based on llima sequence

<400> SEQUENCE: 10

```
Gly Arg Ile Phe Ser Thr Tyr Ala
1               5
```

<210> SEQ ID NO 11
<211> LENGTH: 8
<212> TYPE: PRT
<213> ORGANISM: Artificial Sequence
<220> FEATURE:
<223> OTHER INFORMATION: Based on llima sequence

```
<400> SEQUENCE: 11

Ile Asn Arg Ser Gly Asp Ser Thr
1               5

<210> SEQ ID NO 12
<211> LENGTH: 17
<212> TYPE: PRT
<213> ORGANISM: Artificial Sequence
<220> FEATURE:
<223> OTHER INFORMATION: Based on llima sequence

<400> SEQUENCE: 12

Ala Ala Asp Ser Asp Gly Ile Gly Trp Phe Asn Ser Phe Glu Tyr Asp
1               5                   10                  15

Tyr

<210> SEQ ID NO 13
<211> LENGTH: 8
<212> TYPE: PRT
<213> ORGANISM: Artificial Sequence
<220> FEATURE:
<223> OTHER INFORMATION: Based on llima sequence

<400> SEQUENCE: 13

Gly Arg Ser Val Ser Leu Tyr His
1               5

<210> SEQ ID NO 14
<211> LENGTH: 8
<212> TYPE: PRT
<213> ORGANISM: Artificial Sequence
<220> FEATURE:
<223> OTHER INFORMATION: Based on llima sequence

<400> SEQUENCE: 14

Thr Ala Trp His Asp Gly Ser Thr
1               5

<210> SEQ ID NO 15
<211> LENGTH: 18
<212> TYPE: PRT
<213> ORGANISM: Artificial Sequence
<220> FEATURE:
<223> OTHER INFORMATION: Based on llima sequence

<400> SEQUENCE: 15

Ala Gly Glu Ala Lys Leu Gly Gly Ile Tyr Ser Arg Trp Arg Asp Tyr
1               5                   10                  15

Glu Tyr

<210> SEQ ID NO 16
<211> LENGTH: 8
<212> TYPE: PRT
<213> ORGANISM: Artificial Sequence
<220> FEATURE:
<223> OTHER INFORMATION: Based on llima sequence

<400> SEQUENCE: 16

Gly Arg Thr Phe Ser Ile Tyr Asp
1               5

<210> SEQ ID NO 17
<211> LENGTH: 8
<212> TYPE: PRT
<213> ORGANISM: Artificial Sequence
```

```
<220> FEATURE:
<223> OTHER INFORMATION: Based on llima sequence

<400> SEQUENCE: 17

Thr Asn Leu Arg Gly Val Ser Thr
1               5

<210> SEQ ID NO 18
<211> LENGTH: 16
<212> TYPE: PRT
<213> ORGANISM: Artificial Sequence
<220> FEATURE:
<223> OTHER INFORMATION: Based on llima sequence

<400> SEQUENCE: 18

Ala Ala Ala Val Ser Asn Trp Leu Ala Lys Asp Pro Ser Ala Tyr Ser
1               5                   10                  15

<210> SEQ ID NO 19
<211> LENGTH: 8
<212> TYPE: PRT
<213> ORGANISM: Artificial Sequence
<220> FEATURE:
<223> OTHER INFORMATION: Based on llima sequence

<400> SEQUENCE: 19

Gly Arg Ile Phe Ser Thr Tyr Ala
1               5

<210> SEQ ID NO 20
<211> LENGTH: 8
<212> TYPE: PRT
<213> ORGANISM: Artificial Sequence
<220> FEATURE:
<223> OTHER INFORMATION: Based on llima sequence

<400> SEQUENCE: 20

Ile Asn Arg Ser Gly Asp Ser Thr
1               5

<210> SEQ ID NO 21
<211> LENGTH: 17
<212> TYPE: PRT
<213> ORGANISM: Artificial Sequence
<220> FEATURE:
<223> OTHER INFORMATION: Based on llima sequence

<400> SEQUENCE: 21

Ala Ala Asp Ser Asp Gly Ile Gly Trp Phe Asn Ser Phe Glu Tyr Asp
1               5                   10                  15

Tyr

<210> SEQ ID NO 22
<211> LENGTH: 8
<212> TYPE: PRT
<213> ORGANISM: Artificial Sequence
<220> FEATURE:
<223> OTHER INFORMATION: Based on llima sequence

<400> SEQUENCE: 22

Gly Pro Ile Phe Ser Thr Tyr Ala
1               5

<210> SEQ ID NO 23
<211> LENGTH: 8
<212> TYPE: PRT
```

```
<213> ORGANISM: Artificial Sequence
<220> FEATURE:
<223> OTHER INFORMATION: Based on llima sequence

<400> SEQUENCE: 23

Ile Asn Arg Ser Gly Asp Ser Thr
1               5

<210> SEQ ID NO 24
<211> LENGTH: 17
<212> TYPE: PRT
<213> ORGANISM: Artificial Sequence
<220> FEATURE:
<223> OTHER INFORMATION: Based on llima sequence

<400> SEQUENCE: 24

Ala Ala Asp Ser Asp Gly Ile Gly Trp Phe Asn Ser Phe Glu Tyr Asp
1               5                   10                  15

Tyr

<210> SEQ ID NO 25
<211> LENGTH: 8
<212> TYPE: PRT
<213> ORGANISM: Artificial Sequence
<220> FEATURE:
<223> OTHER INFORMATION: Based on llima sequence

<400> SEQUENCE: 25

Gly Arg Ser Val Ser Leu Tyr His
1               5

<210> SEQ ID NO 26
<211> LENGTH: 8
<212> TYPE: PRT
<213> ORGANISM: Artificial Sequence
<220> FEATURE:
<223> OTHER INFORMATION: Based on llima sequence

<400> SEQUENCE: 26

Thr Ala Trp His Asp Gly Ser Thr
1               5

<210> SEQ ID NO 27
<211> LENGTH: 17
<212> TYPE: PRT
<213> ORGANISM: Artificial Sequence
<220> FEATURE:
<223> OTHER INFORMATION: Based on llima sequence

<400> SEQUENCE: 27

Ala Gly Glu Ala Lys Leu Gly Gly Ile Tyr Ser Arg Trp Arg Asp Tyr
1               5                   10                  15

Glu

<210> SEQ ID NO 28
<211> LENGTH: 8
<212> TYPE: PRT
<213> ORGANISM: Artificial Sequence
<220> FEATURE:
<223> OTHER INFORMATION: Based on llima sequence

<400> SEQUENCE: 28

Gly Arg Ser Val Ser Leu Tyr His
1               5
```

```
<210> SEQ ID NO 29
<211> LENGTH: 8
<212> TYPE: PRT
<213> ORGANISM: Artificial Sequence
<220> FEATURE:
<223> OTHER INFORMATION: Based on llima sequence

<400> SEQUENCE: 29

Thr Ala Trp His Asp Gly Ser Thr
1               5

<210> SEQ ID NO 30
<211> LENGTH: 15
<212> TYPE: PRT
<213> ORGANISM: Artificial Sequence
<220> FEATURE:
<223> OTHER INFORMATION: Based on llima sequence

<400> SEQUENCE: 30

Ala Ala Asp Pro Gly Gly Ser Ser Trp Ser Gln Pro Trp Tyr Asp
1               5                   10                  15

<210> SEQ ID NO 31
<211> LENGTH: 8
<212> TYPE: PRT
<213> ORGANISM: Artificial Sequence
<220> FEATURE:
<223> OTHER INFORMATION: Based on llima sequence

<400> SEQUENCE: 31

Gly Ser Thr Trp Ser Ile Asn Thr
1               5

<210> SEQ ID NO 32
<211> LENGTH: 7
<212> TYPE: PRT
<213> ORGANISM: Artificial Sequence
<220> FEATURE:
<223> OTHER INFORMATION: Based on llima sequence

<400> SEQUENCE: 32

Ile Ser Ser Gly Gly Ser Thr
1               5

<210> SEQ ID NO 33
<211> LENGTH: 10
<212> TYPE: PRT
<213> ORGANISM: Artificial Sequence
<220> FEATURE:
<223> OTHER INFORMATION: Based on llima sequence

<400> SEQUENCE: 33

Tyr Ala Gln Ser Thr Trp Tyr Pro Pro Ser
1               5                   10

<210> SEQ ID NO 34
<211> LENGTH: 8
<212> TYPE: PRT
<213> ORGANISM: Artificial Sequence
<220> FEATURE:
<223> OTHER INFORMATION: Based on llima sequence

<400> SEQUENCE: 34

Gly Arg Thr Phe Ser Asn Asp Ala
1               5

<210> SEQ ID NO 35
```

```
<211> LENGTH: 7
<212> TYPE: PRT
<213> ORGANISM: Artificial Sequence
<220> FEATURE:
<223> OTHER INFORMATION: Based on llima sequence

<400> SEQUENCE: 35

Ile Ser Trp Lys Ser Ser Thr
1               5

<210> SEQ ID NO 36
<211> LENGTH: 15
<212> TYPE: PRT
<213> ORGANISM: Artificial Sequence
<220> FEATURE:
<223> OTHER INFORMATION: Based on llima sequence

<400> SEQUENCE: 36

Val Ala Asp Pro Tyr Gly Leu Gly Phe Asn Pro Ser Asp Tyr Asp
1               5                   10                  15

<210> SEQ ID NO 37
<211> LENGTH: 26
<212> TYPE: PRT
<213> ORGANISM: Homo sapiens

<400> SEQUENCE: 37

Glu Val Gln Leu Val Glu Ser Gly Gly Gly Leu Val Gln Pro Gly Gly
1               5                   10                  15

Ser Leu Arg Leu Ser Cys Ala Ala Ser Gly
            20                  25

<210> SEQ ID NO 38
<211> LENGTH: 25
<212> TYPE: PRT
<213> ORGANISM: Homo sapiens

<400> SEQUENCE: 38

Gln Val Gln Leu Val Glu Ser Gly Gly Gly Leu Val Gln Pro Gly Gly
1               5                   10                  15

Ser Leu Arg Leu Ser Cys Ser Ala Ser
            20                  25

<210> SEQ ID NO 39
<211> LENGTH: 25
<212> TYPE: PRT
<213> ORGANISM: Homo sapiens

<400> SEQUENCE: 39

Glu Val Gln Leu Val Glu Ser Gly Gly Gly Leu Val Gln Pro Gly Gly
1               5                   10                  15

Ser Leu Arg Leu Ser Cys Ala Ala Ser
            20                  25

<210> SEQ ID NO 40
<211> LENGTH: 17
<212> TYPE: PRT
<213> ORGANISM: Homo sapiens

<400> SEQUENCE: 40

Met Ser Trp Val Arg Gln Ala Pro Gly Lys Gly Leu Glu Trp Val Ser
1               5                   10                  15

Ala
```

<210> SEQ ID NO 41
<211> LENGTH: 17
<212> TYPE: PRT
<213> ORGANISM: Homo sapiens

<400> SEQUENCE: 41

Met His Trp Val Arg Gln Ala Pro Gly Lys Gly Leu Glu Tyr Val Ser
1               5                   10                  15

Ala

<210> SEQ ID NO 42
<211> LENGTH: 17
<212> TYPE: PRT
<213> ORGANISM: Homo sapiens

<400> SEQUENCE: 42

Met Ser Trp Val Arg Gln Ala Pro Gly Lys Gly Leu Glu Trp Val Ser
1               5                   10                  15

Val

<210> SEQ ID NO 43
<211> LENGTH: 39
<212> TYPE: PRT
<213> ORGANISM: Homo sapiens

<400> SEQUENCE: 43

Tyr Tyr Ala Asp Ser Val Lys Gly Arg Phe Thr Ile Ser Arg Asp Asn
1               5                   10                  15

Ser Lys Asn Thr Leu Tyr Leu Gln Met Asn Ser Leu Arg Ala Glu Asp
            20                  25                  30

Thr Ala Val Tyr Tyr Cys Ala
        35

<210> SEQ ID NO 44
<211> LENGTH: 33
<212> TYPE: PRT
<213> ORGANISM: Homo sapiens

<400> SEQUENCE: 44

Tyr Tyr Ala Asp Ser Val Lys Gly Arg Phe Thr Ile Ser Arg Asp Asn
1               5                   10                  15

Ser Lys Asn Thr Leu Tyr Leu Gln Met Asn Ser Leu Arg Ala Glu Asp
            20                  25                  30

Thr

<210> SEQ ID NO 45
<211> LENGTH: 126
<212> TYPE: PRT
<213> ORGANISM: Artificial Sequence
<220> FEATURE:
<223> OTHER INFORMATION: Based on llima sequence

<400> SEQUENCE: 45

Glu Val Gln Leu Val Glu Ser Gly Gly Gly Leu Val Gln Pro Gly Gly
1               5                   10                  15

Ser Leu Arg Leu Ser Cys Ala Ala Ser Gly Gly Arg Ile Phe Ser Thr
            20                  25                  30

Tyr Ala Met Ser Trp Val Arg Gln Ala Pro Gly Lys Gly Leu Glu Trp
        35                  40                  45

Val Ser Ala Ile Asn Arg Ser Gly Asp Ser Thr Tyr Tyr Ala Asp Ser

```
                    50                  55                  60
Val Lys Gly Arg Phe Thr Ile Ser Arg Asp Asn Ser Lys Asn Thr Leu
 65                  70                  75                  80

Tyr Leu Gln Met Asn Ser Leu Arg Ala Glu Asp Thr Ala Val Tyr Tyr
                     85                  90                  95

Cys Ala Ala Ala Asp Ser Asp Gly Ile Gly Trp Phe Asn Ser Phe Glu
                    100                 105                 110

Tyr Asp Tyr Trp Gly Arg Gly Thr Gln Val Thr Val Ser Ser
                115                 120                 125

<210> SEQ ID NO 46
<211> LENGTH: 126
<212> TYPE: PRT
<213> ORGANISM: Artificial Sequence
<220> FEATURE:
<223> OTHER INFORMATION: Based on llima sequence

<400> SEQUENCE: 46

Gln Val Gln Leu Val Glu Ser Gly Gly Gly Leu Val Gln Pro Gly Gly
  1               5                  10                  15

Ser Leu Arg Leu Ser Cys Ser Ala Ser Gly Arg Ser Val Ser Leu Tyr
                 20                  25                  30

His Met His Trp Val Arg Gln Ala Pro Gly Lys Gly Leu Glu Tyr Val
                 35                  40                  45

Ser Ala Thr Ala Trp His Asp Gly Ser Thr Tyr Tyr Ala Asp Ser Val
             50                  55                  60

Lys Gly Arg Phe Thr Ile Ser Arg Asp Asn Ser Lys Asn Thr Leu Tyr
 65                  70                  75                  80

Leu Gln Met Asn Ser Leu Arg Ala Glu Asp Thr Ala Val Tyr Tyr Cys
                 85                  90                  95

Ala Ala Gly Glu Ala Lys Leu Gly Gly Ile Tyr Ser Arg Trp Arg Asp
                100                 105                 110

Tyr Glu Tyr Trp Gly Gln Gly Thr Gln Val Thr Val Ser Ser
                115                 120                 125

<210> SEQ ID NO 47
<211> LENGTH: 125
<212> TYPE: PRT
<213> ORGANISM: Artificial Sequence
<220> FEATURE:
<223> OTHER INFORMATION: Based on llima sequence

<400> SEQUENCE: 47

Gln Val Gln Leu Val Glu Ser Gly Gly Gly Leu Val Gln Pro Gly Gly
  1               5                  10                  15

Ser Leu Arg Leu Ser Cys Ser Ala Ser Gly Arg Thr Phe Ser Ile Tyr
                 20                  25                  30

Asp Met His Trp Val Arg Gln Ala Pro Gly Lys Gly Leu Glu Tyr Val
                 35                  40                  45

Ser Ala Thr Asn Leu Arg Gly Val Ser Thr Tyr Tyr Ala Asp Ser Val
             50                  55                  60

Lys Gly Arg Phe Thr Ile Ser Arg Asp Asn Ser Lys Asn Thr Leu Tyr
 65                  70                  75                  80

Leu Gln Met Asn Ser Leu Arg Ala Glu Asp Thr Ala Val Tyr Tyr Cys
                 85                  90                  95

Ala Ala Ala Ala Val Ser Asn Trp Leu Ala Lys Asp Pro Ser Ala Tyr
                100                 105                 110
```

```
Ser Tyr Trp Gly Gln Gly Thr Gln Val Thr Val Ser Ser
        115                 120                 125
```

<210> SEQ ID NO 48
<211> LENGTH: 126
<212> TYPE: PRT
<213> ORGANISM: Artificial Sequence
<220> FEATURE:
<223> OTHER INFORMATION: Based on llima sequence

<400> SEQUENCE: 48

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Gly Arg Ile Phe Ser Thr
            20                  25                  30

Tyr Ala Met Ser Trp Val Arg Gln Ala Pro Gly Lys Gly Leu Glu Trp
        35                  40                  45

Val Ser Ala Ile Asn Arg Ser Gly Asp Ser Tyr Tyr Ala Asp Ser
    50                  55                  60

Val Lys Gly Arg Phe Thr Ile Ser Arg Asp Asn Ser Lys Asn Thr Leu
65                  70                  75                  80

Tyr Leu Gln Met Asn Ser Leu Arg Ala Glu Asp Thr Ala Val Tyr Tyr
                85                  90                  95

Cys Ala Ala Ala Asp Ser Asp Gly Ile Gly Trp Phe Asn Ser Phe Glu
            100                 105                 110

Tyr Asp Tyr Trp Gly Arg Gly Thr Gln Val Thr Val Ser Ser
        115                 120                 125
```

<210> SEQ ID NO 49
<211> LENGTH: 126
<212> TYPE: PRT
<213> ORGANISM: Artificial Sequence
<220> FEATURE:
<223> OTHER INFORMATION: Based on llima sequence

<400> SEQUENCE: 49

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Gly Pro Ile Phe Ser Thr
            20                  25                  30

Tyr Ala Met Ser Trp Val Arg Gln Ala Pro Gly Lys Gly Leu Glu Trp
        35                  40                  45

Val Ser Ala Ile Asn Arg Ser Gly Asp Ser Tyr Tyr Ala Asp Ser
    50                  55                  60

Val Lys Gly Arg Phe Thr Ile Ser Arg Asp Asn Ser Lys Asn Thr Leu
65                  70                  75                  80

Tyr Leu Gln Met Asn Ser Leu Arg Ala Glu Asp Thr Ala Val Tyr Tyr
                85                  90                  95

Cys Ala Ala Ala Asp Ser Asp Gly Ile Gly Trp Phe Asn Ser Phe Glu
            100                 105                 110

Tyr Asp Tyr Trp Gly Arg Gly Thr Gln Val Thr Val Ser Ser
        115                 120                 125
```

<210> SEQ ID NO 50
<211> LENGTH: 127
<212> TYPE: PRT
<213> ORGANISM: Artificial Sequence
<220> FEATURE:
<223> OTHER INFORMATION: Based on llima sequence

<400> SEQUENCE: 50

Glu Val Gln Leu Val Glu Ser Gly Gly Gly Leu Val Gln Pro Gly Gly
1               5                   10                  15

Ser Leu Arg Leu Ser Cys Ala Ala Ser Gly Gly Arg Ile Phe Ser Thr
            20                  25                  30

Tyr Ala Met Ser Trp Val Arg Gln Ala Pro Gly Lys Gly Leu Glu Trp
        35                  40                  45

Val Ser Ala Ile Asn Arg Ser Gly Asp Ser Thr Tyr Tyr Ala Asp Ser
    50                  55                  60

Val Lys Gly Arg Phe Thr Ile Ser Arg Asp Asn Ser Lys Asn Thr Leu
65                  70                  75                  80

Tyr Leu Gln Met Asn Ser Leu Arg Ala Glu Asp Thr Ala Val Tyr Tyr
                85                  90                  95

Cys Ala Ala Gly Glu Ala Lys Leu Gly Gly Ile Tyr Ser Arg Trp Arg
            100                 105                 110

Asp Tyr Glu Tyr Trp Gly Gln Gly Thr Gln Val Thr Val Ser Ser
        115                 120                 125

<210> SEQ ID NO 51
<211> LENGTH: 125
<212> TYPE: PRT
<213> ORGANISM: Artificial Sequence
<220> FEATURE:
<223> OTHER INFORMATION: Based on llima sequence

<400> SEQUENCE: 51

Glu Val Gln Leu Val Glu Ser Gly Gly Gly Leu Val Gln Pro Gly Gly
1               5                   10                  15

Ser Leu Arg Leu Ser Cys Ala Ala Ser Gly Gly Arg Ile Phe Ser Thr
            20                  25                  30

Tyr Ala Met Ser Trp Val Arg Gln Ala Pro Gly Lys Gly Leu Glu Trp
        35                  40                  45

Val Ser Ala Ile Asn Arg Ser Gly Asp Ser Thr Tyr Tyr Ala Asp Ser
    50                  55                  60

Val Lys Gly Arg Phe Thr Ile Ser Arg Asp Asn Ser Lys Asn Thr Leu
65                  70                  75                  80

Tyr Leu Gln Met Asn Ser Leu Arg Ala Glu Asp Thr Ala Val Tyr Tyr
                85                  90                  95

Cys Ala Ala Ala Asp Pro Gly Gly Ser Ser Trp Ser Gln Pro Trp Tyr
            100                 105                 110

Asp Tyr Trp Gly Gln Gly Thr Gln Val Thr Val Ser Ser
        115                 120                 125

<210> SEQ ID NO 52
<211> LENGTH: 111
<212> TYPE: PRT
<213> ORGANISM: Artificial Sequence
<220> FEATURE:
<223> OTHER INFORMATION: Based on llima sequence

<400> SEQUENCE: 52

Glu Val Gln Leu Val Glu Ser Gly Gly Gly Leu Val Gln Pro Gly Gly
1               5                   10                  15

Ser Leu Arg Leu Ser Cys Ala Ala Ser Gly Ser Thr Trp Ser Ile Asn
            20                  25                  30

Thr Met Ser Trp Val Arg Gln Ala Pro Gly Lys Gly Leu Glu Trp Val
        35                  40                  45

```
Ser Val Ile Ser Ser Gly Gly Ser Thr Tyr Tyr Ala Asp Ser Val Lys
 50                  55                  60
Gly Arg Phe Thr Ile Ser Arg Asp Asn Ser Lys Asn Thr Leu Tyr Leu
 65                  70                  75                  80
Gln Met Asn Ser Leu Arg Ala Glu Asp Thr Tyr Ala Gln Ser Thr Trp
                 85                  90                  95
Tyr Pro Pro Ser Trp Gly Gln Gly Thr Gln Val Thr Val Ser Ser
                100                 105                 110
```

<210> SEQ ID NO 53
<211> LENGTH: 126
<212> TYPE: PRT
<213> ORGANISM: Artificial Sequence
<220> FEATURE:
<223> OTHER INFORMATION: Based on llima sequence

<400> SEQUENCE: 53

```
Glu Val Gln Leu Val Glu Ser Gly Gly Gly Leu Val Gln Pro Gly Gly
 1               5                  10                  15
Ser Leu Arg Leu Ser Cys Ala Ala Ser Gly Gly Arg Ile Phe Ser Thr
                20                  25                  30
Tyr Ala Met Ser Trp Val Arg Gln Ala Pro Gly Lys Gly Leu Glu Trp
             35                  40                  45
Val Ser Ala Ile Asn Arg Ser Gly Asp Ser Thr Tyr Tyr Ala Asp Ser
 50                  55                  60
Val Lys Gly Arg Phe Thr Ile Ser Arg Asp Asn Ser Lys Asn Thr Leu
 65                  70                  75                  80
Tyr Leu Gln Met Asn Ser Leu Arg Ala Glu Asp Thr Ala Val Tyr Tyr
                 85                  90                  95
Cys Ala Ala Asp Ser Asp Gly Ile Gly Trp Phe Asn Ser Phe Glu
                100                 105                 110
Tyr Asp Tyr Trp Gly Gln Gly Thr Gln Val Thr Val Ser Ser
            115                 120                 125
```

<210> SEQ ID NO 54
<211> LENGTH: 609
<212> TYPE: PRT
<213> ORGANISM: Homo sapiens

<400> SEQUENCE: 54

```
Met Lys Trp Val Thr Phe Ile Ser Leu Leu Phe Leu Phe Ser Ser Ala
 1               5                  10                  15
Tyr Ser Arg Gly Val Phe Arg Arg Asp Ala His Lys Ser Glu Val Ala
                20                  25                  30
His Arg Phe Lys Asp Leu Gly Glu Glu Asn Phe Lys Ala Leu Val Leu
             35                  40                  45
Ile Ala Phe Ala Gln Tyr Leu Gln Gln Cys Pro Phe Glu Asp His Val
 50                  55                  60
Lys Leu Val Asn Glu Val Thr Glu Phe Ala Lys Thr Cys Val Ala Asp
 65                  70                  75                  80
Glu Ser Ala Glu Asn Cys Asp Lys Ser Leu His Thr Leu Phe Gly Asp
                 85                  90                  95
Lys Leu Cys Thr Val Ala Thr Leu Arg Glu Thr Tyr Gly Glu Met Ala
                100                 105                 110
Asp Cys Cys Ala Lys Gln Glu Pro Glu Arg Asn Glu Cys Phe Leu Gln
            115                 120                 125
His Lys Asp Asp Asn Pro Asn Leu Pro Arg Leu Val Arg Pro Glu Val
```

```
            130             135             140
Asp Val Met Cys Thr Ala Phe His Asp Asn Glu Glu Thr Phe Leu Lys
145             150             155             160
Lys Tyr Leu Tyr Glu Ile Ala Arg Arg His Pro Tyr Phe Tyr Ala Pro
                165             170             175
Glu Leu Leu Phe Phe Ala Lys Arg Tyr Lys Ala Ala Phe Thr Glu Cys
            180             185             190
Cys Gln Ala Ala Asp Lys Ala Ala Cys Leu Leu Pro Lys Leu Asp Glu
            195             200             205
Leu Arg Asp Glu Gly Lys Ala Ser Ser Ala Lys Gln Arg Leu Lys Cys
        210             215             220
Ala Ser Leu Gln Lys Phe Gly Glu Arg Ala Phe Lys Ala Trp Ala Val
225             230             235             240
Ala Arg Leu Ser Gln Arg Phe Pro Lys Ala Glu Phe Ala Glu Val Ser
                245             250             255
Lys Leu Val Thr Asp Leu Thr Lys Val His Thr Glu Cys Cys His Gly
            260             265             270
Asp Leu Leu Glu Cys Ala Asp Asp Arg Ala Asp Leu Ala Lys Tyr Ile
        275             280             285
Cys Glu Asn Gln Asp Ser Ile Ser Ser Lys Leu Lys Glu Cys Cys Glu
        290             295             300
Lys Pro Leu Leu Glu Lys Ser His Cys Ile Ala Glu Val Glu Asn Asp
305             310             315             320
Glu Met Pro Ala Asp Leu Pro Ser Leu Ala Ala Asp Phe Val Glu Ser
                325             330             335
Lys Asp Val Cys Lys Asn Tyr Ala Glu Ala Lys Asp Val Phe Leu Gly
            340             345             350
Met Phe Leu Tyr Glu Tyr Ala Arg Arg His Pro Asp Tyr Ser Val Val
            355             360             365
Leu Leu Leu Arg Leu Ala Lys Thr Tyr Glu Thr Thr Leu Glu Lys Cys
        370             375             380
Cys Ala Ala Ala Asp Pro His Glu Cys Tyr Ala Lys Val Phe Asp Glu
385             390             395             400
Phe Lys Pro Leu Val Glu Glu Pro Gln Asn Leu Ile Lys Gln Asn Cys
                405             410             415
Glu Leu Phe Glu Gln Leu Gly Glu Tyr Lys Phe Gln Asn Ala Leu Leu
            420             425             430
Val Arg Tyr Thr Lys Lys Val Pro Gln Val Ser Thr Pro Thr Leu Val
            435             440             445
Glu Val Ser Arg Asn Leu Gly Lys Val Gly Ser Lys Cys Cys Lys His
        450             455             460
Pro Glu Ala Lys Arg Met Pro Cys Ala Glu Asp Tyr Leu Ser Val Val
465             470             475             480
Leu Asn Gln Leu Cys Val Leu His Glu Lys Thr Pro Val Ser Asp Arg
            485             490             495
Val Thr Lys Cys Cys Thr Glu Ser Leu Val Asn Arg Arg Pro Cys Phe
            500             505             510
Ser Ala Leu Glu Val Asp Glu Thr Tyr Val Pro Lys Glu Phe Asn Ala
            515             520             525
Glu Thr Phe Thr Phe His Ala Asp Ile Cys Thr Leu Ser Glu Lys Glu
        530             535             540
Arg Gln Ile Lys Lys Gln Thr Ala Leu Val Glu Leu Val Lys His Lys
545             550             555             560
```

```
Pro Lys Ala Thr Lys Glu Gln Leu Lys Ala Val Met Asp Asp Phe Ala
            565                 570                 575

Ala Phe Val Glu Lys Cys Cys Lys Ala Asp Asp Lys Glu Thr Cys Phe
        580                 585                 590

Ala Glu Glu Gly Lys Lys Leu Val Ala Ala Ser Gln Ala Ala Leu Gly
        595                 600                 605

Leu

<210> SEQ ID NO 55
<211> LENGTH: 417
<212> TYPE: PRT
<213> ORGANISM: Homo sapiens

<400> SEQUENCE: 55

Met Lys Trp Val Thr Phe Ile Ser Leu Leu Phe Leu Phe Ser Ser Ala
1               5                   10                  15

Tyr Ser Arg Gly Val Phe Arg Arg Asp Ala His Lys Ser Glu Val Ala
            20                  25                  30

His Arg Phe Lys Asp Leu Gly Glu Glu Asn Phe Lys Ala Trp Ala Val
        35                  40                  45

Ala Arg Leu Ser Gln Arg Phe Pro Lys Ala Glu Phe Ala Glu Val Ser
    50                  55                  60

Lys Leu Val Thr Asp Leu Thr Lys Val His Thr Glu Cys Cys His Gly
65                  70                  75                  80

Asp Leu Leu Glu Cys Ala Asp Asp Arg Ala Asp Leu Ala Lys Tyr Ile
                85                  90                  95

Cys Glu Asn Gln Asp Ser Ile Ser Ser Lys Leu Lys Glu Cys Cys Glu
            100                 105                 110

Lys Pro Leu Leu Glu Lys Ser His Cys Ile Ala Glu Val Glu Asn Asp
        115                 120                 125

Glu Met Pro Ala Asp Leu Pro Ser Leu Ala Ala Asp Phe Val Glu Ser
    130                 135                 140

Lys Asp Val Cys Lys Asn Tyr Ala Glu Ala Lys Asp Val Phe Leu Gly
145                 150                 155                 160

Met Phe Leu Tyr Glu Tyr Ala Arg Arg His Pro Asp Tyr Ser Val Val
                165                 170                 175

Leu Leu Leu Arg Leu Ala Lys Thr Tyr Glu Thr Thr Leu Glu Lys Cys
            180                 185                 190

Cys Ala Ala Ala Asp Pro His Glu Cys Tyr Ala Lys Val Phe Asp Glu
        195                 200                 205

Phe Lys Pro Leu Val Glu Glu Pro Gln Asn Leu Ile Lys Gln Asn Cys
    210                 215                 220

Glu Leu Phe Glu Gln Leu Gly Glu Tyr Lys Phe Gln Asn Ala Leu Leu
225                 230                 235                 240

Val Arg Tyr Thr Lys Lys Val Pro Gln Val Ser Thr Pro Thr Leu Val
                245                 250                 255

Glu Val Ser Arg Asn Leu Gly Lys Val Gly Ser Lys Cys Cys Lys His
            260                 265                 270

Pro Glu Ala Lys Arg Met Pro Cys Ala Glu Asp Tyr Leu Ser Val Val
        275                 280                 285

Leu Asn Gln Leu Cys Val Leu His Glu Lys Thr Pro Val Ser Asp Arg
    290                 295                 300

Val Thr Lys Cys Cys Thr Glu Ser Leu Val Asn Arg Arg Pro Cys Phe
305                 310                 315                 320
```

```
Ser Ala Leu Glu Val Asp Glu Thr Tyr Val Pro Lys Glu Phe Asn Ala
            325                 330                 335

Glu Thr Phe Thr Phe His Ala Asp Ile Cys Thr Leu Ser Glu Lys Glu
        340                 345                 350

Arg Gln Ile Lys Lys Gln Thr Ala Leu Val Glu Leu Val Lys His Lys
            355                 360                 365

Pro Lys Ala Thr Lys Glu Gln Leu Lys Ala Val Met Asp Asp Phe Ala
370                 375                 380

Ala Phe Val Glu Lys Cys Cys Lys Ala Asp Asp Lys Glu Thr Cys Phe
385                 390                 395                 400

Ala Glu Glu Gly Lys Lys Leu Val Ala Ala Ser Gln Ala Ala Leu Gly
            405                 410                 415

Leu

<210> SEQ ID NO 56
<211> LENGTH: 396
<212> TYPE: PRT
<213> ORGANISM: Homo sapiens

<400> SEQUENCE: 56

Met Lys Trp Val Thr Phe Ile Ser Leu Leu Phe Leu Phe Ser Ser Ala
1               5                   10                  15

Tyr Ser Arg Gly Val Phe Arg Arg Asp Ala His Lys Ser Glu Val Ala
            20                  25                  30

His Arg Phe Lys Asp Leu Gly Glu Glu Asn Phe Lys Ala Leu Val Leu
        35                  40                  45

Ile Ala Phe Ala Gln Tyr Leu Gln Gln Cys Pro Phe Glu Asp His Val
    50                  55                  60

Lys Leu Val Asn Glu Val Thr Glu Phe Ala Lys Thr Cys Val Ala Asp
65                  70                  75                  80

Glu Ser Ala Glu Asn Cys Asp Lys Ser Leu His Thr Leu Phe Gly Asp
                85                  90                  95

Lys Leu Cys Thr Val Ala Thr Leu Arg Glu Thr Tyr Gly Glu Met Ala
            100                 105                 110

Asp Cys Cys Ala Lys Gln Glu Pro Glu Arg Asn Glu Cys Phe Leu Gln
        115                 120                 125

His Lys Asp Asp Asn Pro Asn Leu Pro Arg Leu Val Arg Pro Glu Val
    130                 135                 140

Asp Val Met Cys Thr Ala Phe His Asp Asn Glu Glu Thr Phe Leu Lys
145                 150                 155                 160

Lys Tyr Leu Tyr Glu Thr Thr Leu Glu Lys Cys Cys Ala Ala Ala Asp
                165                 170                 175

Pro His Glu Cys Tyr Ala Lys Val Phe Asp Glu Phe Lys Pro Leu Val
            180                 185                 190

Glu Glu Pro Gln Asn Leu Ile Lys Gln Asn Cys Glu Leu Phe Glu Gln
        195                 200                 205

Leu Gly Glu Tyr Lys Phe Gln Asn Ala Leu Leu Val Arg Tyr Thr Lys
    210                 215                 220

Lys Val Pro Gln Val Ser Thr Pro Thr Leu Val Glu Val Ser Arg Asn
225                 230                 235                 240

Leu Gly Lys Val Gly Ser Lys Cys Cys Lys His Pro Glu Ala Lys Arg
                245                 250                 255

Met Pro Cys Ala Glu Asp Tyr Leu Ser Val Val Leu Asn Gln Leu Cys
            260                 265                 270
```

-continued

```
Val Leu His Glu Lys Thr Pro Val Ser Asp Arg Val Thr Lys Cys Cys
            275                 280                 285

Thr Glu Ser Leu Val Asn Arg Arg Pro Cys Phe Ser Ala Leu Glu Val
        290                 295                 300

Asp Glu Thr Tyr Val Pro Lys Glu Phe Asn Ala Glu Thr Phe Thr Phe
305                 310                 315                 320

His Ala Asp Ile Cys Thr Leu Ser Glu Lys Glu Arg Gln Ile Lys Lys
                325                 330                 335

Gln Thr Ala Leu Val Glu Leu Val Lys His Lys Pro Lys Ala Thr Lys
            340                 345                 350

Glu Gln Leu Lys Ala Val Met Asp Asp Phe Ala Ala Phe Val Glu Lys
            355                 360                 365

Cys Cys Lys Ala Asp Asp Lys Glu Thr Cys Phe Ala Glu Glu Gly Lys
        370                 375                 380

Lys Leu Val Ala Ala Ser Gln Ala Ala Leu Gly Leu
385                 390                 395

<210> SEQ ID NO 57
<211> LENGTH: 585
<212> TYPE: PRT
<213> ORGANISM: Homo sapiens

<400> SEQUENCE: 57

Asp Ala His Lys Ser Glu Val Ala His Arg Phe Lys Asp Leu Gly Glu
1               5                   10                  15

Glu Asn Phe Lys Ala Leu Val Leu Ile Ala Phe Ala Gln Tyr Leu Gln
            20                  25                  30

Gln Cys Pro Phe Glu Asp His Val Lys Leu Val Asn Glu Val Thr Glu
        35                  40                  45

Phe Ala Lys Thr Cys Val Ala Asp Glu Ser Ala Glu Asn Cys Asp Lys
50                  55                  60

Ser Leu His Thr Leu Phe Gly Asp Lys Leu Cys Thr Val Ala Thr Leu
65                  70                  75                  80

Arg Glu Thr Tyr Gly Glu Met Ala Asp Cys Cys Ala Lys Gln Glu Pro
                85                  90                  95

Glu Arg Asn Glu Cys Phe Leu Gln His Lys Asp Asp Asn Pro Asn Leu
            100                 105                 110

Pro Arg Leu Val Arg Pro Glu Val Asp Val Met Cys Thr Ala Phe His
        115                 120                 125

Asp Asn Glu Glu Thr Phe Leu Lys Lys Tyr Leu Tyr Glu Ile Ala Arg
130                 135                 140

Arg His Pro Tyr Phe Tyr Ala Pro Glu Leu Leu Phe Phe Ala Lys Arg
145                 150                 155                 160

Tyr Lys Ala Ala Phe Thr Glu Cys Cys Gln Ala Ala Asp Lys Ala Ala
                165                 170                 175

Cys Leu Leu Pro Lys Leu Asp Glu Leu Arg Asp Glu Gly Lys Ala Ser
            180                 185                 190

Ser Ala Lys Gln Gly Leu Lys Cys Ala Ser Leu Gln Lys Phe Gly Glu
        195                 200                 205

Arg Ala Phe Lys Ala Trp Ala Val Ala Arg Leu Ser Gln Arg Phe Pro
    210                 215                 220

Lys Ala Glu Phe Ala Glu Val Ser Lys Leu Val Thr Asp Leu Thr Lys
225                 230                 235                 240

Val His Thr Glu Cys Cys His Gly Asp Leu Leu Glu Cys Ala Asp Asp
```

245                 250                 255

Arg Ala Asp Leu Ala Lys Tyr Ile Cys Glu Asn Gln Asp Ser Ile Ser
            260                 265                 270

Ser Lys Leu Lys Glu Cys Cys Glu Lys Pro Leu Leu Glu Lys Ser His
        275                 280                 285

Cys Ile Ala Glu Val Glu Asn Asp Glu Met Pro Ala Asp Leu Pro Ser
    290                 295                 300

Leu Ala Ala Asp Phe Val Gly Ser Lys Asp Val Cys Lys Asn Tyr Ala
305                 310                 315                 320

Glu Ala Lys Asp Val Phe Leu Gly Met Phe Leu Tyr Glu Tyr Ala Arg
                325                 330                 335

Arg His Pro Asp Tyr Ser Val Val Leu Leu Leu Arg Leu Ala Lys Thr
            340                 345                 350

Tyr Glu Thr Thr Leu Glu Lys Cys Cys Ala Ala Ala Asp Pro His Glu
        355                 360                 365

Cys Tyr Ala Lys Val Phe Asp Glu Phe Lys Pro Leu Val Glu Glu Pro
    370                 375                 380

Gln Asn Leu Ile Lys Gln Asn Cys Glu Leu Phe Glu Gln Leu Gly Glu
385                 390                 395                 400

Tyr Lys Phe Gln Asn Ala Leu Leu Val Arg Tyr Thr Lys Lys Val Pro
                405                 410                 415

Gln Val Ser Thr Pro Thr Leu Val Glu Val Ser Arg Asn Leu Gly Lys
            420                 425                 430

Val Gly Ser Lys Cys Cys Lys His Pro Glu Ala Lys Arg Met Pro Cys
        435                 440                 445

Ala Glu Asp Cys Leu Ser Val Phe Leu Asn Gln Leu Cys Val Leu His
    450                 455                 460

Glu Lys Thr Pro Val Ser Asp Arg Val Thr Lys Cys Cys Thr Glu Ser
465                 470                 475                 480

Leu Val Asn Gly Arg Pro Cys Phe Ser Ala Leu Glu Val Asp Glu Thr
                485                 490                 495

Tyr Val Pro Lys Glu Phe Asn Ala Glu Thr Phe Thr Phe His Ala Asp
            500                 505                 510

Ile Cys Thr Leu Ser Glu Lys Glu Arg Gln Ile Lys Lys Gln Thr Ala
        515                 520                 525

Leu Val Glu Leu Val Lys His Lys Pro Lys Ala Thr Lys Glu Gln Leu
    530                 535                 540

Lys Ala Val Met Asp Asp Phe Ala Ala Phe Val Glu Lys Cys Cys Lys
545                 550                 555                 560

Ala Asp Asp Lys Glu Thr Cys Phe Ala Glu Glu Gly Lys Lys Leu Val
                565                 570                 575

Ala Ala Ser Gln Ala Ala Leu Gly Leu
            580                 585

<210> SEQ ID NO 58
<211> LENGTH: 6
<212> TYPE: PRT
<213> ORGANISM: Artificial Sequence
<220> FEATURE:
<223> OTHER INFORMATION: Linker
<220> FEATURE:
<221> NAME/KEY: REPEAT
<222> LOCATION: (4)..(6)
<223> OTHER INFORMATION: The sequence is repeated 1, 2, 3, 4, or 5 times

<400> SEQUENCE: 58

Gly Ser Gly Gly Ser Gly
1               5

<210> SEQ ID NO 59
<211> LENGTH: 4
<212> TYPE: PRT
<213> ORGANISM: Artificial Sequence
<220> FEATURE:
<223> OTHER INFORMATION: Linker
<220> FEATURE:
<221> NAME/KEY: REPEAT
<222> LOCATION: (1)..(4)
<223> OTHER INFORMATION: The sequence is repeated 1, 2, 3, 4, 5, or 6
      times

<400> SEQUENCE: 59

Gly Gly Gly Ser
1

<210> SEQ ID NO 60
<211> LENGTH: 5
<212> TYPE: PRT
<213> ORGANISM: Artificial Sequence
<220> FEATURE:
<223> OTHER INFORMATION: Linker
<220> FEATURE:
<221> NAME/KEY: REPEAT
<222> LOCATION: (1)..(5)
<223> OTHER INFORMATION: The sequence is repeated 1, 2, 3, 4, 5, or 6
      times

<400> SEQUENCE: 60

Gly Gly Gly Gly Ser
1               5

<210> SEQ ID NO 61
<211> LENGTH: 5
<212> TYPE: PRT
<213> ORGANISM: Artificial Sequence
<220> FEATURE:
<223> OTHER INFORMATION: Linker
<220> FEATURE:
<221> NAME/KEY: REPEAT
<222> LOCATION: (1)..(5)
<223> OTHER INFORMATION: The sequence is repeated 1, 2, 3, 4, 5, or 6
      times

<400> SEQUENCE: 61

Glu Ala Ala Ala Lys
1               5

<210> SEQ ID NO 62
<211> LENGTH: 5
<212> TYPE: PRT
<213> ORGANISM: Artificial Sequence
<220> FEATURE:
<223> OTHER INFORMATION: Liner
<220> FEATURE:
<221> NAME/KEY: REPEAT
<222> LOCATION: (1)..(5)
<223> OTHER INFORMATION: The sequence is repeated 1, 2, 3, 4, 5, or 6
      times

<400> SEQUENCE: 62

Pro Ala Pro Ala Pro
1               5

<210> SEQ ID NO 63
<211> LENGTH: 8
<212> TYPE: PRT

```
<213> ORGANISM: Artificial Sequence
<220> FEATURE:
<223> OTHER INFORMATION: Linker

<400> SEQUENCE: 63

Ile Lys Arg Thr Val Ala Ala Pro
1               5

<210> SEQ ID NO 64
<211> LENGTH: 5
<212> TYPE: PRT
<213> ORGANISM: Artificial Sequence
<220> FEATURE:
<223> OTHER INFORMATION: Linker

<400> SEQUENCE: 64

Arg Ala Lys Pro Ser
1               5

<210> SEQ ID NO 65
<211> LENGTH: 4
<212> TYPE: PRT
<213> ORGANISM: Artificial Sequence
<220> FEATURE:
<223> OTHER INFORMATION: Linker
<220> FEATURE:
<221> NAME/KEY: REPEAT
<222> LOCATION: (1)..(4)
<223> OTHER INFORMATION: The sequence is repeated 1, 2, 3, or 4 times

<400> SEQUENCE: 65

Gly Ser Gly Ser
1

<210> SEQ ID NO 66
<211> LENGTH: 4
<212> TYPE: PRT
<213> ORGANISM: Artificial Sequence
<220> FEATURE:
<223> OTHER INFORMATION: Linker
<220> FEATURE:
<221> NAME/KEY: REPEAT
<222> LOCATION: (1)..(4)
<223> OTHER INFORMATION: The sequence is repeated 1, 2, 3, or 4 times

<400> SEQUENCE: 66

Gly Gly Ser Gly
1

<210> SEQ ID NO 67
<211> LENGTH: 4
<212> TYPE: PRT
<213> ORGANISM: Artificial Sequence
<220> FEATURE:
<223> OTHER INFORMATION: Linker
<220> FEATURE:
<221> NAME/KEY: REPEAT
<222> LOCATION: (1)..(4)
<223> OTHER INFORMATION: The sequence is repeated 1, 2, or 3 times

<400> SEQUENCE: 67

Pro Ala Pro Ala
1

<210> SEQ ID NO 68
<211> LENGTH: 4
<212> TYPE: PRT
<213> ORGANISM: Artificial Sequence
<220> FEATURE:
```

```
<223> OTHER INFORMATION: Linker
<220> FEATURE:
<221> NAME/KEY: REPEAT
<222> LOCATION: (1)..(4)
<223> OTHER INFORMATION: The sequence is repeated 1, 2, or 3 times

<400> SEQUENCE: 68

Pro Gln Pro Gln
1

<210> SEQ ID NO 69
<211> LENGTH: 8
<212> TYPE: PRT
<213> ORGANISM: Artificial Sequence
<220> FEATURE:
<223> OTHER INFORMATION: LInker

<400> SEQUENCE: 69

Ile Lys Arg Ala Asp Ala Ala Pro
1               5

<210> SEQ ID NO 70
<211> LENGTH: 12
<212> TYPE: PRT
<213> ORGANISM: Artificial Sequence
<220> FEATURE:
<223> OTHER INFORMATION: Linker

<400> SEQUENCE: 70

Ala Glu Ala Ala Ala Lys Glu Ala Ala Ala Lys Ala
1               5                   10

<210> SEQ ID NO 71
<211> LENGTH: 12
<212> TYPE: PRT
<213> ORGANISM: Artificial Sequence
<220> FEATURE:
<223> OTHER INFORMATION: Linker

<400> SEQUENCE: 71

Gly Thr Asn Glu Val Cys Lys Cys Pro Lys Cys Pro
1               5                   10

<210> SEQ ID NO 72
<211> LENGTH: 35
<212> TYPE: PRT
<213> ORGANISM: Artificial Sequence
<220> FEATURE:
<223> OTHER INFORMATION: Linker

<400> SEQUENCE: 72

Glu Pro Lys Ile Pro Gln Pro Gln Pro Lys Pro Gln Pro Gln Pro Gln
1               5                   10                  15

Pro Gln Pro Lys Pro Gln Pro Lys Pro Glu Pro Glu Cys Thr Cys Pro
                20                  25                  30

Lys Cys Pro
        35

<210> SEQ ID NO 73
<211> LENGTH: 28
<212> TYPE: PRT
<213> ORGANISM: Artificial Sequence
<220> FEATURE:
<223> OTHER INFORMATION: Linker

<400> SEQUENCE: 73
```

```
Arg Arg Lys Arg Ala Pro Val Lys Gln Thr Leu Asn Phe Asp Leu Leu
1               5                   10                  15

Lys Leu Ala Gly Asp Val Glu Ser Asn Pro Gly Pro
            20                  25
```

<210> SEQ ID NO 74
<211> LENGTH: 5
<212> TYPE: PRT
<213> ORGANISM: Artificial Sequence
<220> FEATURE:
<223> OTHER INFORMATION: Linker

<400> SEQUENCE: 74

```
Ser Gly Arg Ser Ala
1               5
```

<210> SEQ ID NO 75
<211> LENGTH: 6
<212> TYPE: PRT
<213> ORGANISM: Artificial Sequence
<220> FEATURE:
<223> OTHER INFORMATION: Linker

<400> SEQUENCE: 75

```
Pro Val Gly Leu Ile Gly
1               5
```

<210> SEQ ID NO 76
<211> LENGTH: 9
<212> TYPE: PRT
<213> ORGANISM: Artificial Sequence
<220> FEATURE:
<223> OTHER INFORMATION: Linker

<400> SEQUENCE: 76

```
Lys Gly Pro Gln Gly Ile Ala Gly Gln
1               5
```

<210> SEQ ID NO 77
<211> LENGTH: 9
<212> TYPE: PRT
<213> ORGANISM: Artificial Sequence
<220> FEATURE:
<223> OTHER INFORMATION: Linker

<400> SEQUENCE: 77

```
Phe Gly Pro Gln Gly Leu Ala Gly Gln
1               5
```

<210> SEQ ID NO 78
<211> LENGTH: 9
<212> TYPE: PRT
<213> ORGANISM: Artificial Sequence
<220> FEATURE:
<223> OTHER INFORMATION: Linker

<400> SEQUENCE: 78

```
Arg Gly Pro Gln Gly Ile Phe Gly Gln
1               5
```

<210> SEQ ID NO 79
<211> LENGTH: 9
<212> TYPE: PRT
<213> ORGANISM: Artificial Sequence
<220> FEATURE:
<223> OTHER INFORMATION: Linker

```
<400> SEQUENCE: 79

Ile Gly Pro Gln Gly Ile Trp Gly Gln
1               5

<210> SEQ ID NO 80
<211> LENGTH: 9
<212> TYPE: PRT
<213> ORGANISM: Artificial Sequence
<220> FEATURE:
<223> OTHER INFORMATION: Linker

<400> SEQUENCE: 80

Met Gly Pro Gln Gly Ile Leu Gly Gln
1               5

<210> SEQ ID NO 81
<211> LENGTH: 8
<212> TYPE: PRT
<213> ORGANISM: Artificial Sequence
<220> FEATURE:
<223> OTHER INFORMATION: Linker

<400> SEQUENCE: 81

Lys Pro Gln Ser Ile Ala Gly Gln
1               5

<210> SEQ ID NO 82
<211> LENGTH: 9
<212> TYPE: PRT
<213> ORGANISM: Artificial Sequence
<220> FEATURE:
<223> OTHER INFORMATION: Linker

<400> SEQUENCE: 82

Phe Gly Pro Gln Ser Leu Ala Gly Gln
1               5

<210> SEQ ID NO 83
<211> LENGTH: 9
<212> TYPE: PRT
<213> ORGANISM: Artificial Sequence
<220> FEATURE:
<223> OTHER INFORMATION: Linker

<400> SEQUENCE: 83

Arg Gly Pro Gln Ser Ile Phe Gly Gln
1               5

<210> SEQ ID NO 84
<211> LENGTH: 8
<212> TYPE: PRT
<213> ORGANISM: Artificial Sequence
<220> FEATURE:
<223> OTHER INFORMATION: Linker

<400> SEQUENCE: 84

Gly Pro Gln Ser Ile Trp Gly Gln
1               5

<210> SEQ ID NO 85
<211> LENGTH: 9
<212> TYPE: PRT
<213> ORGANISM: Artificial Sequence
<220> FEATURE:
<223> OTHER INFORMATION: Linker

<400> SEQUENCE: 85
```

```
Met Gly Pro Gln Ser Ile Leu Gly Gln
1               5

<210> SEQ ID NO 86
<211> LENGTH: 9
<212> TYPE: PRT
<213> ORGANISM: Artificial Sequence
<220> FEATURE:
<223> OTHER INFORMATION: Linker

<400> SEQUENCE: 86

Lys Gly Pro Gln Thr Ile Ala Gly Gln
1               5

<210> SEQ ID NO 87
<211> LENGTH: 9
<212> TYPE: PRT
<213> ORGANISM: Artificial Sequence
<220> FEATURE:
<223> OTHER INFORMATION: Linker

<400> SEQUENCE: 87

Phe Gly Pro Gln Thr Leu Ala Gly Gln
1               5

<210> SEQ ID NO 88
<211> LENGTH: 9
<212> TYPE: PRT
<213> ORGANISM: Artificial Sequence
<220> FEATURE:
<223> OTHER INFORMATION: Linker

<400> SEQUENCE: 88

Arg Gly Pro Gln Thr Ile Phe Gly Gln
1               5

<210> SEQ ID NO 89
<211> LENGTH: 9
<212> TYPE: PRT
<213> ORGANISM: Artificial Sequence
<220> FEATURE:
<223> OTHER INFORMATION: Linker

<400> SEQUENCE: 89

Ile Gly Pro Gln Thr Ile Trp Gly Gln
1               5

<210> SEQ ID NO 90
<211> LENGTH: 9
<212> TYPE: PRT
<213> ORGANISM: Artificial Sequence
<220> FEATURE:
<223> OTHER INFORMATION: Linker

<400> SEQUENCE: 90

Phe Arg Pro Arg Ser Ile Thr Gly Gln
1               5

<210> SEQ ID NO 91
<211> LENGTH: 9
<212> TYPE: PRT
<213> ORGANISM: Artificial Sequence
<220> FEATURE:
<223> OTHER INFORMATION: Linker

<400> SEQUENCE: 91
```

```
Met Gly Pro Gln Thr Ile Leu Gly Gln
1               5
```

<210> SEQ ID NO 92
<211> LENGTH: 8
<212> TYPE: PRT
<213> ORGANISM: Artificial Sequence
<220> FEATURE:
<223> OTHER INFORMATION: Based on l1ima sequence

<400> SEQUENCE: 92

```
Gly Ile Thr Phe Pro Val Asn Ala
1               5
```

<210> SEQ ID NO 93
<211> LENGTH: 7
<212> TYPE: PRT
<213> ORGANISM: Artificial Sequence
<220> FEATURE:
<223> OTHER INFORMATION: Based on l1ima sequence

<400> SEQUENCE: 93

```
Ile Ser Ala Gly Gly Thr Thr
1               5
```

<210> SEQ ID NO 94
<211> LENGTH: 10
<212> TYPE: PRT
<213> ORGANISM: Artificial Sequence
<220> FEATURE:
<223> OTHER INFORMATION: Based on l1ima sequence

<400> SEQUENCE: 94

```
Gln Arg Arg Ile Gly Met Leu Arg Asp Tyr
1               5                   10
```

<210> SEQ ID NO 95
<211> LENGTH: 8
<212> TYPE: PRT
<213> ORGANISM: Artificial Sequence
<220> FEATURE:
<223> OTHER INFORMATION: Based on l1ima sequence

<400> SEQUENCE: 95

```
Gly Arg Thr Leu Glu Ser Tyr Val
1               5
```

<210> SEQ ID NO 96
<211> LENGTH: 8
<212> TYPE: PRT
<213> ORGANISM: Artificial Sequence
<220> FEATURE:
<223> OTHER INFORMATION: Based on l1ima sequence

<400> SEQUENCE: 96

```
Ile Asn Trp Ser Ser Gly Arg Leu
1               5
```

<210> SEQ ID NO 97
<211> LENGTH: 133
<212> TYPE: PRT
<213> ORGANISM: Homo sapiens

<400> SEQUENCE: 97

```
Gln Gly Gln Asp Arg His Met Ile Arg Met Arg Gln Leu Ile Asp Ile
1               5                   10                  15
```

Val Asp Gln Leu Lys Asn Tyr Val Asn Asp Leu Val Pro Glu Phe Leu
            20                  25                  30

Pro Ala Pro Glu Asp Val Glu Thr Asn Cys Glu Trp Ser Ala Phe Ser
        35                  40                  45

Cys Phe Gln Lys Ala Gln Leu Lys Ser Ala Asn Thr Gly Asn Asn Glu
 50                  55                  60

Arg Ile Ile Asn Val Ser Ile Lys Lys Leu Lys Arg Lys Pro Pro Ser
 65                  70                  75                  80

Thr Asn Ala Gly Arg Arg Gln Lys His Arg Leu Thr Cys Pro Ser Cys
                85                  90                  95

Asp Ser Tyr Glu Lys Lys Pro Pro Lys Glu Phe Leu Glu Arg Phe Lys
            100                 105                 110

Ser Leu Leu Gln Lys Met Ile His Gln His Leu Ser Ser Arg Thr His
            115                 120                 125

Gly Ser Glu Asp Ser
    130

<210> SEQ ID NO 98
<211> LENGTH: 123
<212> TYPE: PRT
<213> ORGANISM: Homo sapiens

<400> SEQUENCE: 98

Gln Gly Gln Asp Arg His Met Ile Arg Met Arg Gln Leu Ile Asp Ile
 1               5                  10                  15

Val Asp Gln Leu Lys Asn Tyr Val Asn Asp Leu Val Pro Glu Phe Leu
            20                  25                  30

Pro Ala Pro Glu Asp Val Glu Thr Asn Cys Glu Trp Ser Ala Phe Ser
        35                  40                  45

Cys Phe Gln Lys Ala Gln Leu Lys Ser Ala Asn Thr Gly Asn Asn Glu
 50                  55                  60

Arg Ile Ile Asn Val Ser Ile Lys Lys Leu Lys Arg Lys Pro Pro Ser
 65                  70                  75                  80

Thr Asn Ala Gly Arg Arg Gln Lys His Arg Leu Thr Cys Pro Ser Cys
                85                  90                  95

Asp Ser Tyr Glu Lys Lys Pro Pro Lys Glu Phe Leu Glu Arg Phe Lys
            100                 105                 110

Ser Leu Leu Gln Lys Met Ile His Gln His Leu
            115                 120

<210> SEQ ID NO 99
<211> LENGTH: 252
<212> TYPE: PRT
<213> ORGANISM: Artificial Sequence
<220> FEATURE:
<223> OTHER INFORMATION: Based on llima sequence

<400> SEQUENCE: 99

Gln Gly Pro Asp Arg Leu Leu Ile Arg Leu Arg His Leu Ile Asp Ile
 1               5                  10                  15

Val Glu Gln Leu Lys Ile Tyr Glu Asn Asp Leu Asp Pro Glu Leu Leu
            20                  25                  30

Ser Ala Pro Gln Asp Val Lys Gly His Cys Glu His Ala Ala Phe Ala
        35                  40                  45

Cys Phe Gln Lys Ala Lys Leu Lys Pro Ser Asn Pro Gly Asn Asn Lys
 50                  55                  60

Thr Phe Ile Ile Asp Leu Val Ala Gln Leu Arg Arg Arg Leu Pro Ala

```
                65                  70                  75                  80
Arg Arg Gly Gly Lys Lys Gln Lys His Ile Ala Lys Cys Pro Ser Cys
                    85                  90                  95

Asp Ser Tyr Glu Lys Arg Thr Pro Lys Glu Phe Leu Glu Arg Leu Lys
                    100                 105                 110

Trp Leu Leu Gln Lys Met Ile His Gln His Leu Ser Gly Ser Gly Gly
                    115                 120                 125

Ser Gly Gly Ser Gly Gly Ser Gly Gln Val Gln Leu Val Glu Ser Gly
                130                 135                 140

Gly Gly Leu Val Gln Pro Gly Gly Ser Leu Arg Leu Ser Cys Ala Ala
145                 150                 155                 160

Ser Gly Ser Thr Trp Ser Ile Asn Thr Leu Ala Trp Tyr Arg Gln Ala
                    165                 170                 175

Pro Gly Lys Gln Arg Asp Leu Val Ala Arg Ile Ser Ser Gly Gly Ser
                    180                 185                 190

Thr His Tyr Ala Asp Ser Val Lys Gly Arg Phe Thr Val Ser Arg Asp
                    195                 200                 205

Asn Ala Glu Asn Thr Leu Val Leu Gln Met Asn Ser Leu Lys Pro Glu
                    210                 215                 220

Asp Thr Ala Val Tyr Tyr Cys Tyr Ala Gln Ser Thr Trp Tyr Pro Pro
225                 230                 235                 240

Ser Trp Gly Gln Gly Thr Gln Val Thr Val Ser Ser
                    245                 250

<210> SEQ ID NO 100
<211> LENGTH: 261
<212> TYPE: PRT
<213> ORGANISM: Artificial Sequence
<220> FEATURE:
<223> OTHER INFORMATION: Based on llima sequence

<400> SEQUENCE: 100

Gln Gly Gln Asp Arg His Met Ile Arg Met Arg Gln Leu Ile Asp Ile
1               5                   10                  15

Val Asp Gln Leu Lys Asn Tyr Val Asn Asp Leu Val Pro Glu Phe Leu
                20                  25                  30

Pro Ala Pro Glu Asp Val Glu Thr Asn Cys Glu Trp Ser Ala Phe Ser
                35                  40                  45

Cys Phe Gln Lys Ala Gln Leu Lys Ser Ala Asn Thr Gly Asn Asn Glu
            50                  55                  60

Arg Ile Ile Asn Val Ser Ile Lys Lys Leu Lys Arg Lys Pro Pro Ser
65                  70                  75                  80

Thr Asn Ala Gly Arg Arg Gln Lys His Arg Leu Thr Cys Pro Ser Cys
                    85                  90                  95

Asp Ser Tyr Glu Lys Lys Pro Pro Lys Glu Phe Leu Glu Arg Phe Lys
                    100                 105                 110

Ser Leu Leu Gln Lys Met Ile His Gln His Leu Ser Ser Arg Thr His
                    115                 120                 125

Gly Ser Glu Asp Ser Gly Ser Gly Gly Ser Gly Gly Ser Gly Gly Ser
                130                 135                 140

Gly Gln Val Gln Leu Val Glu Ser Gly Gly Leu Val Gln Pro Gly
145                 150                 155                 160

Gly Ser Leu Arg Leu Ser Cys Ala Ala Ser Gly Ser Thr Trp Ser Ile
                    165                 170                 175

Asn Thr Leu Ala Trp Tyr Arg Gln Ala Pro Gly Lys Gln Arg Asp Leu
```

180                 185                 190
Val Ala Arg Ile Ser Ser Gly Gly Ser Thr His Tyr Ala Asp Ser Val
            195                 200                 205

Lys Gly Arg Phe Thr Val Ser Arg Asp Asn Ala Glu Asn Thr Leu Val
210                 215                 220

Leu Gln Met Asn Ser Leu Lys Pro Glu Asp Thr Ala Val Tyr Tyr Cys
225                 230                 235                 240

Tyr Ala Gln Ser Thr Trp Tyr Pro Pro Ser Trp Gly Gln Gly Thr Gln
            245                 250                 255

Val Thr Val Ser Ser
            260

<210> SEQ ID NO 101
<211> LENGTH: 355
<212> TYPE: PRT
<213> ORGANISM: Artificial Sequence
<220> FEATURE:
<223> OTHER INFORMATION: Based on llima sequence

<400> SEQUENCE: 101

Gln Val Gln Leu Val Glu Ser Gly Gly Gly Leu Val Gln Pro Gly Gly
1               5                   10                  15

Ser Leu Arg Leu Ser Cys Ala Ala Ser Gly Ser Thr Trp Ser Ile Asn
            20                  25                  30

Thr Leu Ala Trp Tyr Arg Gln Ala Pro Gly Lys Gln Arg Asp Leu Val
        35                  40                  45

Ala Arg Ile Ser Ser Gly Gly Ser Thr His Tyr Ala Asp Ser Val Lys
50                  55                  60

Gly Arg Phe Thr Val Ser Arg Asp Asn Ala Glu Asn Thr Leu Val Leu
65                  70                  75                  80

Gln Met Asn Ser Leu Lys Pro Glu Asp Thr Ala Val Tyr Tyr Cys Tyr
            85                  90                  95

Ala Gln Ser Thr Trp Tyr Pro Pro Ser Trp Gly Gln Gly Thr Gln Val
        100                 105                 110

Thr Val Ser Ser Gly Gly Gly Gly Ser Gly Gly Gly Ser Gly Gly
            115                 120                 125

Gly Gly Ser Gly Gly Gly Gly Ser Ile Thr Cys Pro Pro Met Ser
        130                 135                 140

Val Glu His Ala Asp Ile Trp Val Lys Ser Tyr Ser Leu Tyr Ser Arg
145                 150                 155                 160

Glu Arg Tyr Ile Cys Asn Ser Gly Phe Lys Arg Lys Ala Gly Thr Ser
            165                 170                 175

Ser Leu Thr Glu Cys Val Leu Asn Lys Ala Thr Asn Val Ala His Trp
        180                 185                 190

Thr Thr Pro Ser Leu Lys Cys Ile Arg Asp Pro Ala Leu Val His Gln
        195                 200                 205

Arg Pro Ala Pro Pro Arg Arg Lys Arg Ala Pro Val Lys Gln Thr Leu
210                 215                 220

Asn Phe Asp Leu Leu Lys Leu Ala Gly Asp Val Glu Ser Asn Pro Gly
225                 230                 235                 240

Pro Asn Trp Val Asn Val Ile Ser Asp Leu Lys Lys Ile Glu Asp Leu
            245                 250                 255

Ile Gln Ser Met His Ile Asp Ala Thr Leu Tyr Thr Glu Ser Asp Val
        260                 265                 270

His Pro Ser Cys Lys Val Thr Ala Met Lys Cys Phe Leu Leu Glu Leu

```
                275                 280                 285
Gln Val Ile Ser Leu Glu Ser Gly Asp Ala Ser Ile His Asp Thr Val
    290                 295                 300
Glu Asn Leu Ile Ile Leu Ala Asn Asn Ser Leu Ser Ser Asn Gly Asn
305                 310                 315                 320
Val Thr Glu Ser Gly Cys Lys Glu Cys Glu Glu Leu Glu Glu Lys Asn
                325                 330                 335
Ile Lys Glu Phe Leu Gln Ser Phe Val His Ile Val Gln Met Phe Ile
            340                 345                 350
Asn Thr Ser
        355

<210> SEQ ID NO 102
<211> LENGTH: 133
<212> TYPE: PRT
<213> ORGANISM: Artificial Sequence
<220> FEATURE:
<223> OTHER INFORMATION: Based on llima sequence

<400> SEQUENCE: 102

Met Gly Trp Ser Leu Ile Leu Leu Phe Leu Val Ala Val Ala Thr Arg
1               5                   10                  15
Val His Ser Asn Trp Val Asn Val Ile Ser Asp Leu Lys Lys Ile Glu
            20                  25                  30
Asp Leu Ile Gln Ser Met His Ile Asp Ala Thr Leu Tyr Thr Glu Ser
        35                  40                  45
Asp Val His Pro Ser Cys Lys Val Thr Ala Met Lys Cys Phe Leu Leu
    50                  55                  60
Glu Leu Gln Val Ile Ser Leu Glu Ser Gly Asp Ala Ser Ile His Asp
65                  70                  75                  80
Thr Val Glu Asn Leu Ile Ile Leu Ala Asn Asn Ser Leu Ser Ser Asn
                85                  90                  95
Gly Asn Val Thr Glu Ser Gly Cys Lys Glu Cys Glu Glu Leu Glu Glu
            100                 105                 110
Lys Asn Ile Lys Glu Phe Leu Gln Ser Phe Val His Ile Val Gln Met
        115                 120                 125
Phe Ile Asn Thr Ser
    130

<210> SEQ ID NO 103
<211> LENGTH: 220
<212> TYPE: PRT
<213> ORGANISM: Artificial Sequence
<220> FEATURE:
<223> OTHER INFORMATION: Based on llima sequence

<400> SEQUENCE: 103

Met Gly Trp Ser Leu Ile Leu Leu Phe Leu Val Ala Val Ala Thr Arg
1               5                   10                  15
Val His Ser Gln Val Gln Leu Val Glu Ser Gly Gly Gly Leu Val Gln
            20                  25                  30
Pro Gly Gly Ser Leu Arg Leu Ser Cys Ala Ala Ser Gly Ser Thr Trp
        35                  40                  45
Ser Ile Asn Thr Leu Ala Trp Tyr Arg Gln Ala Pro Gly Lys Gln Arg
    50                  55                  60
Asp Leu Val Ala Arg Ile Ser Ser Gly Gly Ser Thr His Tyr Ala Asp
65                  70                  75                  80
```

Ser Val Lys Gly Arg Phe Thr Val Ser Arg Asp Asn Ala Glu Asn Thr
            85                  90                  95

Leu Val Leu Gln Met Asn Ser Leu Lys Pro Glu Asp Thr Ala Val Tyr
            100                 105                 110

Tyr Cys Tyr Ala Gln Ser Thr Trp Tyr Pro Pro Ser Trp Gly Gln Gly
            115                 120                 125

Thr Gln Val Thr Val Ser Ser Gly Gly Gly Ser Gly Gly Gly
            130                 135                 140

Ser Gly Gly Gly Gly Ser Gly Gly Gly Ser Ile Thr Cys Pro Pro
145                 150                 155                 160

Pro Met Ser Val Glu His Ala Asp Ile Trp Val Lys Ser Tyr Ser Leu
            165                 170                 175

Tyr Ser Arg Glu Arg Tyr Ile Cys Asn Ser Gly Phe Lys Arg Lys Ala
            180                 185                 190

Gly Thr Ser Ser Leu Thr Glu Cys Val Leu Asn Lys Ala Thr Asn Val
            195                 200                 205

Ala His Trp Thr Thr Pro Ser Leu Lys Cys Ile Arg
            210                 215                 220

<210> SEQ ID NO 104
<211> LENGTH: 232
<212> TYPE: PRT
<213> ORGANISM: Artificial Sequence
<220> FEATURE:
<223> OTHER INFORMATION: Based on llima sequence

<400> SEQUENCE: 104

Met Gly Trp Ser Leu Ile Leu Leu Phe Leu Val Ala Val Ala Thr Arg
1               5                   10                  15

Val His Ser Gln Val Gln Leu Val Glu Ser Gly Gly Gly Leu Val Gln
            20                  25                  30

Pro Gly Gly Ser Leu Arg Leu Ser Cys Ala Ala Ser Gly Ser Thr Trp
            35                  40                  45

Ser Ile Asn Thr Leu Ala Trp Tyr Arg Gln Ala Pro Gly Lys Gln Arg
50                  55                  60

Asp Leu Val Ala Arg Ile Ser Ser Gly Gly Ser Thr His Tyr Ala Asp
65                  70                  75                  80

Ser Val Lys Gly Arg Phe Thr Val Ser Arg Asp Asn Ala Glu Asn Thr
            85                  90                  95

Leu Val Leu Gln Met Asn Ser Leu Lys Pro Glu Asp Thr Ala Val Tyr
            100                 105                 110

Tyr Cys Tyr Ala Gln Ser Thr Trp Tyr Pro Pro Ser Trp Gly Gln Gly
            115                 120                 125

Thr Gln Val Thr Val Ser Ser Gly Gly Gly Ser Gly Gly Gly Gly
            130                 135                 140

Ser Gly Gly Gly Gly Ser Gly Gly Gly Ser Ile Thr Cys Pro Pro
145                 150                 155                 160

Pro Met Ser Val Glu His Ala Asp Ile Trp Val Lys Ser Tyr Ser Leu
            165                 170                 175

Tyr Ser Arg Glu Arg Tyr Ile Cys Asn Ser Gly Phe Lys Arg Lys Ala
            180                 185                 190

Gly Thr Ser Ser Leu Thr Glu Cys Val Leu Asn Lys Ala Thr Asn Val
            195                 200                 205

Ala His Trp Thr Thr Pro Ser Leu Lys Cys Ile Arg Asp Pro Ala Leu
            210                 215                 220

```
Val His Gln Arg Pro Ala Pro Pro
225                 230
```

<210> SEQ ID NO 105
<211> LENGTH: 121
<212> TYPE: PRT
<213> ORGANISM: Artificial Sequence
<220> FEATURE:
<223> OTHER INFORMATION: Based on llima sequence

<400> SEQUENCE: 105

```
Gln Val Gln Leu Val Glu Ser Gly Gly Gly Leu Val Gln Ala Gly Gly
1               5                   10                  15

Ser Leu Arg Leu Ser Cys Leu Ala Ser Gly Gly Thr Phe Ser Ser Tyr
            20                  25                  30

Ala Met Gly Trp Phe Arg Gln Ala Pro Gly Lys Glu Arg Glu Phe Val
        35                  40                  45

Ala Ala Ile Ser Trp Lys Ser Ser Thr Tyr Tyr Thr Asp Ser Val Lys
    50                  55                  60

Gly Arg Phe Thr Ile Ser Arg Asp Asn Ala Lys Asn Thr Val Tyr Leu
65                  70                  75                  80

Gln Met Asn Ser Leu Thr Pro Glu Asp Thr Ala Val Tyr Tyr Cys Ala
                85                  90                  95

Ala Asp Pro Thr Gly Ser Tyr Asp Gln Pro Trp Tyr Asp Tyr Trp Gly
            100                 105                 110

Gln Gly Thr Gln Val Thr Val Ser Ser
        115                 120
```

<210> SEQ ID NO 106
<211> LENGTH: 119
<212> TYPE: PRT
<213> ORGANISM: Artificial Sequence
<220> FEATURE:
<223> OTHER INFORMATION: Based on llima sequence

<400> SEQUENCE: 106

```
Gln Val Gln Val Val Glu Ser Gly Gly Gly Leu Val Gln Pro Gly Gly
1               5                   10                  15

Ser Leu Arg Leu Ser Cys Ala Ala Ser Gly Met Ser Ser Ala Asn Val
            20                  25                  30

Met Gly Trp Tyr Arg Gln Val Pro Gly Asn Gln Arg Glu Leu Val Ala
        35                  40                  45

Arg Ile Thr Ser Ser Gly Arg Thr Met Tyr Ser Asp Ser Val Leu Gly
    50                  55                  60

Arg Phe Thr Ile Ser Arg Gly Gly Ala Gly Asn Thr Ala Asp Leu Gln
65                  70                  75                  80

Met Asn Met Leu Lys Pro Glu Asp Thr Ala Ile Tyr Ile Cys Asn Ile
                85                  90                  95

Arg Ile Leu Gly Ser Phe Asp Pro Asp Ser Gly Tyr Trp Gly Gln Gly
            100                 105                 110

Thr Gln Val Thr Val Ser Ser
        115
```

<210> SEQ ID NO 107
<211> LENGTH: 116
<212> TYPE: PRT
<213> ORGANISM: Artificial Sequence
<220> FEATURE:
<223> OTHER INFORMATION: Based on llima sequence

```
<400> SEQUENCE: 107

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Arg Gly Phe
            20                  25                  30

Gly Met Ser Trp Val Arg Ala Pro Gly Lys Glu Phe Glu Trp Val
        35                  40                  45

Ser Ser Ile Asn Gly Gly Glu Asp Thr Arg Tyr Ser Asp Ser Val
50                      55                  60

Lys Gly Arg Phe Thr Ile Ser Arg Asp Asn Ala Arg Asn Thr Leu Tyr
65                  70                  75                  80

Leu Gln Met Asn Ser Leu Lys Pro Glu Asp Ser Ala Val Tyr Tyr Cys
                85                  90                  95

Ala Ile Gly Gly Pro Gly Ala Thr Pro Ser Gly Pro Thr Gln Val
                100                 105                 110

Thr Val Ser Ser
        115

<210> SEQ ID NO 108
<211> LENGTH: 115
<212> TYPE: PRT
<213> ORGANISM: Artificial Sequence
<220> FEATURE:
<223> OTHER INFORMATION: Based on llima sequence

<400> SEQUENCE: 108

Gln Val Gln Leu Val Glu Ser Gly Gly Gly Ser Val Gln Pro Gly Gly
1               5                   10                  15

Ser Leu Arg Leu Ser Cys Ala Ala Ser Gly Arg Asn Phe Asn Pro Met
            20                  25                  30

Gly Trp Phe Arg Gln Ala Pro Gly Lys Gln Arg Glu Ser Val Ala Ala
        35                  40                  45

Ile Gly Thr Asp Gly Ser Thr Lys Tyr Ala Asp Ser Val Lys Gly Arg
    50                  55                  60

Phe Thr Ile Ser Arg Asp Asn Gly Lys Asn Thr Val Tyr Leu Gln Met
65                  70                  75                  80

Asn Ser Leu Lys Ser Glu Asp Thr Ala Val Tyr Tyr Cys Asn Val Gly
                85                  90                  95

Gly Trp Gly Ile Ser Trp Phe Pro Trp Gly Arg Gly Thr Gln Val Ser
                100                 105                 110

Val Ser Ser
        115

<210> SEQ ID NO 109
<211> LENGTH: 116
<212> TYPE: PRT
<213> ORGANISM: Artificial Sequence
<220> FEATURE:
<223> OTHER INFORMATION: Based on llima sequence

<400> SEQUENCE: 109

Gln Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Arg Gly Phe
            20                  25                  30

Gly Met Ser Trp Val Arg Gln Ala Pro Gly Lys Gly Phe Glu Trp Val
        35                  40                  45
```

```
Ser Ser Ile Asn Ser Gly Gly Glu Asp Thr Arg Tyr Ser Asp Ser Val
        50                  55                  60

Lys Gly Arg Phe Thr Ile Ser Arg Asp Asn Ala Arg Asn Thr Leu Tyr
 65                  70                  75                  80

Leu Gln Met Asn Ser Leu Lys Pro Glu Asp Thr Ala Val Tyr Tyr Cys
                85                  90                  95

Ala Ile Gly Gly Ala Gly Ala Thr Pro Ser Gly Gln Gly Thr Gln Val
                100                 105                 110

Thr Val Ser Ser
        115

<210> SEQ ID NO 110
<211> LENGTH: 116
<212> TYPE: PRT
<213> ORGANISM: Artificial Sequence
<220> FEATURE:
<223> OTHER INFORMATION: Based on llima sequence

<400> SEQUENCE: 110

Gln Val Gln Leu Val Glu Ser Gly Gly Gly Leu Val Gln Pro Gly Gly
 1               5                   10                  15

Ser Leu Arg Leu Ser Cys Ala Ala Ser Gly Phe Ala Phe Arg Gly Phe
                20                  25                  30

Gly Met Ser Trp Val Arg Gln Ala Pro Gly Lys Gly Phe Glu Trp Val
                35                  40                  45

Ser Ser Ile Asn Asn Gly Gly Ser Asp Thr Arg Tyr Ala Asp Ser Val
        50                  55                  60

Lys Gly Arg Phe Thr Ile Ser Arg Asp Asn Ala Arg Asn Thr Leu Tyr
 65                  70                  75                  80

Leu Gln Met Asn Ser Leu Lys Pro Glu Asp Thr Ala Val Tyr Tyr Cys
                85                  90                  95

Ala Ile Gly Gly Pro Gly Ala Ser Pro Ser Gly Gln Gly Thr Gln Val
                100                 105                 110

Thr Val Ser Ser
        115

<210> SEQ ID NO 111
<211> LENGTH: 111
<212> TYPE: PRT
<213> ORGANISM: Artificial Sequence
<220> FEATURE:
<223> OTHER INFORMATION: Based on llima sequence

<400> SEQUENCE: 111

Gln Val Gln Leu Val Glu Ser Gly Gly Gly Leu Val Gln Ala Gly Gly
 1               5                   10                  15

Thr Leu Arg Leu Ser Cys Thr Ala Ser Gly Ser Thr Phe Arg Gly Asn
                20                  25                  30

Gly Met Ala Trp His Arg Gln Ala Pro Gly Lys Glu Arg Glu Phe Val
                35                  40                  45

Ala Tyr Met Gly Met Thr Asp Arg Ile Thr Tyr Ala Glu Ser Val Lys
        50                  55                  60

Gly Arg Phe Thr Leu Ser Arg Asp Asp Ala Lys Asn Arg Val Tyr Leu
 65                  70                  75                  80

His Met Asn Asn Leu Glu Val Glu Asp Thr Ala Val Tyr Tyr Cys Thr
                85                  90                  95

Ala Phe Gly Ser Trp Gly Gln Gly Thr Gln Val Thr Val Ser Ser
                100                 105                 110
```

<210> SEQ ID NO 112
<211> LENGTH: 124
<212> TYPE: PRT
<213> ORGANISM: Artificial Sequence
<220> FEATURE:
<223> OTHER INFORMATION: Based on llima sequence

<400> SEQUENCE: 112

Gln Val Gln Leu Val Glu Ser Gly Gly Glu Leu Val Gln Ala Gly Gly
1               5                   10                  15

Ser Leu Arg Leu Ser Cys Val Val Ser Gly Arg Thr Phe Arg Thr Arg
            20                  25                  30

Thr Met Gly Trp Phe Arg Gln Ala Pro Gly Lys Glu Arg Glu Tyr Val
        35                  40                  45

Ala His Ile Ser Ala Asn Gly Pro Ile Thr Asp Tyr Ser Asp Ser Val
    50                  55                  60

Lys Gly Arg Phe Ala Ile Ser Arg Asp Asn Ala Lys Asn Thr Val Asn
65                  70                  75                  80

Leu Gln Met Asn Ser Leu Lys Pro Glu Asp Thr Ala Val Tyr Tyr Cys
                85                  90                  95

Ala Leu His Asn Gly Ile Gly Val Arg Thr Val Pro Ser Gln Tyr Asp
            100                 105                 110

Ser Trp Gly Gln Gly Thr Gln Val Thr Val Ser Ser
        115                 120

<210> SEQ ID NO 113
<211> LENGTH: 121
<212> TYPE: PRT
<213> ORGANISM: Artificial Sequence
<220> FEATURE:
<223> OTHER INFORMATION: Based on llima sequence

<400> SEQUENCE: 113

Gln Glu Gln Leu Val Glu Ser Gly Gly Gly Leu Val Gln Ala Gly Gly
1               5                   10                  15

Ser Leu Arg Leu Ser Cys Ala Ala Ser Thr Arg Thr Ile Asn Ile Tyr
            20                  25                  30

Ala Met Ala Trp Phe Arg Gln Ala Pro Gly Lys Glu Arg Glu Phe Val
        35                  40                  45

Ala Ala Val Thr Trp Ser Gly Leu Thr Arg Asp Tyr Ala Asp Ser Val
    50                  55                  60

Lys Gly Arg Phe Thr Ile Ser Arg Asp Asn Pro Lys Asn Thr Leu Tyr
65                  70                  75                  80

Leu Gln Met Asn Ser Leu Gln Pro Glu Asp Thr Ala Val Tyr Tyr Cys
                85                  90                  95

Ala Ala Gly Arg Tyr Ser Thr Gly Thr His Asp Tyr Asp Tyr Trp Gly
            100                 105                 110

Gln Gly Thr Gln Val Thr Val Ser Ser
        115                 120

<210> SEQ ID NO 114
<211> LENGTH: 116
<212> TYPE: PRT
<213> ORGANISM: Artificial Sequence
<220> FEATURE:
<223> OTHER INFORMATION: Based on llima sequence

<400> SEQUENCE: 114

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Ser Thr Trp Ser Ile Asn
            20                  25                  30

Thr Leu Ala Trp Tyr Arg Gln Ala Pro Gly Lys Gln Arg Asp Leu Val
        35                  40                  45

Ala Arg Ile Ser Ser Gly Gly Ser Thr Tyr Tyr Ala Asp Ser Val Lys
    50                  55                  60

Gly Arg Phe Thr Ile Ser Arg Asp Asn Ser Lys Asn Thr Leu Tyr Leu
65                  70                  75                  80

Gln Met Asn Ser Leu Arg Ala Glu Asp Thr Ala Val Tyr Tyr Cys Tyr
                85                  90                  95

Ala Gln Ser Thr Trp Tyr Pro Pro Ser Trp Gly Gln Gly Thr Leu Val
            100                 105                 110

Thr Val Ser Ser
        115
```

<210> SEQ ID NO 115
<211> LENGTH: 116
<212> TYPE: PRT
<213> ORGANISM: Artificial Sequence
<220> FEATURE:
<223> OTHER INFORMATION: Based on llima sequence

<400> SEQUENCE: 115

```
Gln Val Gln Leu Val Glu Ser Gly Gly Gly Val Val Gln Pro Gly Gly
1               5                   10                  15

Ser Leu Arg Leu Ser Cys Ala Ala Ser Gly Phe Ala Phe Arg Gly Phe
            20                  25                  30

Gly Met Ser Trp Val Arg Gln Ala Pro Gly Lys Gly Leu Glu Trp Val
        35                  40                  45

Ser Ser Ile Asn Asn Gly Gly Ser Asp Thr Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Ile Gly Gly Pro Gly Ala Ser Pro Ser Gly Gln Gly Thr Gln Val
            100                 105                 110

Thr Val Ser Ser
        115
```

<210> SEQ ID NO 116
<211> LENGTH: 8
<212> TYPE: PRT
<213> ORGANISM: Artificial Sequence
<220> FEATURE:
<223> OTHER INFORMATION: Based on llima sequence

<400> SEQUENCE: 116

```
Gly Gly Thr Phe Ser Ser Tyr Ala
1               5
```

<210> SEQ ID NO 117
<211> LENGTH: 15
<212> TYPE: PRT
<213> ORGANISM: Artificial Sequence
<220> FEATURE:
<223> OTHER INFORMATION: Based on llima sequence

<400> SEQUENCE: 117

Ala Ala Asp Pro Thr Gly Ser Tyr Asp Gln Pro Trp Tyr Asp Tyr
1               5                   10                  15

<210> SEQ ID NO 118
<211> LENGTH: 7
<212> TYPE: PRT
<213> ORGANISM: Artificial Sequence
<220> FEATURE:
<223> OTHER INFORMATION: Based on llima sequence

<400> SEQUENCE: 118

Gly Met Ser Ser Ala Asn Val
1               5

<210> SEQ ID NO 119
<211> LENGTH: 7
<212> TYPE: PRT
<213> ORGANISM: Artificial Sequence
<220> FEATURE:
<223> OTHER INFORMATION: Based on llima sequence

<400> SEQUENCE: 119

Ile Thr Ser Ser Gly Arg Thr
1               5

<210> SEQ ID NO 120
<211> LENGTH: 14
<212> TYPE: PRT
<213> ORGANISM: Artificial Sequence
<220> FEATURE:
<223> OTHER INFORMATION: Based on llima sequence

<400> SEQUENCE: 120

Asn Ile Arg Ile Leu Gly Ser Phe Asp Pro Asp Ser Gly Tyr
1               5                   10

<210> SEQ ID NO 121
<211> LENGTH: 8
<212> TYPE: PRT
<213> ORGANISM: Artificial Sequence
<220> FEATURE:
<223> OTHER INFORMATION: Based on llima sequence

<400> SEQUENCE: 121

Gly Phe Thr Phe Arg Gly Phe Gly
1               5

<210> SEQ ID NO 122
<211> LENGTH: 8
<212> TYPE: PRT
<213> ORGANISM: Artificial Sequence
<220> FEATURE:
<223> OTHER INFORMATION: Based on llima sequence

<400> SEQUENCE: 122

Ile Asn Gly Gly Gly Glu Asp Thr
1               5

<210> SEQ ID NO 123
<211> LENGTH: 9
<212> TYPE: PRT
<213> ORGANISM: Artificial Sequence
<220> FEATURE:
<223> OTHER INFORMATION: Based on llima sequence

<400> SEQUENCE: 123

```
Ala Ile Gly Gly Pro Gly Ala Thr Pro
1               5

<210> SEQ ID NO 124
<211> LENGTH: 6
<212> TYPE: PRT
<213> ORGANISM: Artificial Sequence
<220> FEATURE:
<223> OTHER INFORMATION: Based on llima sequence

<400> SEQUENCE: 124

Gly Arg Asn Phe Asn Pro
1               5

<210> SEQ ID NO 125
<211> LENGTH: 7
<212> TYPE: PRT
<213> ORGANISM: Artificial Sequence
<220> FEATURE:
<223> OTHER INFORMATION: Based on llima sequence

<400> SEQUENCE: 125

Ile Gly Thr Asp Gly Ser Thr
1               5

<210> SEQ ID NO 126
<211> LENGTH: 11
<212> TYPE: PRT
<213> ORGANISM: Artificial Sequence
<220> FEATURE:
<223> OTHER INFORMATION: Based on llima sequence

<400> SEQUENCE: 126

Asn Val Gly Gly Trp Gly Ile Ser Trp Phe Pro
1               5                   10

<210> SEQ ID NO 127
<211> LENGTH: 8
<212> TYPE: PRT
<213> ORGANISM: Artificial Sequence
<220> FEATURE:
<223> OTHER INFORMATION: Based on llima sequence

<400> SEQUENCE: 127

Ile Asn Ser Gly Gly Glu Asp Thr
1               5

<210> SEQ ID NO 128
<211> LENGTH: 9
<212> TYPE: PRT
<213> ORGANISM: Artificial Sequence
<220> FEATURE:
<223> OTHER INFORMATION: Based on llima sequence

<400> SEQUENCE: 128

Ala Ile Gly Gly Ala Gly Ala Thr Pro
1               5

<210> SEQ ID NO 129
<211> LENGTH: 8
<212> TYPE: PRT
<213> ORGANISM: Artificial Sequence
<220> FEATURE:
<223> OTHER INFORMATION: Based on llima sequence

<400> SEQUENCE: 129
```

-continued

Gly Phe Ala Phe Arg Gly Phe Gly
1               5

<210> SEQ ID NO 130
<211> LENGTH: 8
<212> TYPE: PRT
<213> ORGANISM: Artificial Sequence
<220> FEATURE:
<223> OTHER INFORMATION: Based on llima sequence

<400> SEQUENCE: 130

Ile Asn Asn Gly Gly Ser Asp Thr
1               5

<210> SEQ ID NO 131
<211> LENGTH: 9
<212> TYPE: PRT
<213> ORGANISM: Artificial Sequence
<220> FEATURE:
<223> OTHER INFORMATION: Based on llima sequence

<400> SEQUENCE: 131

Ala Ile Gly Gly Pro Gly Ala Ser Pro
1               5

<210> SEQ ID NO 132
<211> LENGTH: 8
<212> TYPE: PRT
<213> ORGANISM: Artificial Sequence
<220> FEATURE:
<223> OTHER INFORMATION: Based on llima sequence

<400> SEQUENCE: 132

Gly Ser Thr Phe Arg Gly Asn Gly
1               5

<210> SEQ ID NO 133
<211> LENGTH: 7
<212> TYPE: PRT
<213> ORGANISM: Artificial Sequence
<220> FEATURE:
<223> OTHER INFORMATION: Based on llima sequence

<400> SEQUENCE: 133

Met Gly Met Thr Asp Arg Ile
1               5

<210> SEQ ID NO 134
<211> LENGTH: 5
<212> TYPE: PRT
<213> ORGANISM: Artificial Sequence
<220> FEATURE:
<223> OTHER INFORMATION: Based on llima sequence

<400> SEQUENCE: 134

Thr Ala Phe Gly Ser
1               5

<210> SEQ ID NO 135
<211> LENGTH: 8
<212> TYPE: PRT
<213> ORGANISM: Artificial Sequence
<220> FEATURE:
<223> OTHER INFORMATION: Based on llima sequence

<400> SEQUENCE: 135

Gly Arg Thr Phe Arg Thr Arg Thr

```
<210> SEQ ID NO 136
<211> LENGTH: 8
<212> TYPE: PRT
<213> ORGANISM: Artificial Sequence
<220> FEATURE:
<223> OTHER INFORMATION: Based on llima sequence

<400> SEQUENCE: 136

Ile Ser Ala Asn Gly Pro Ile Thr
1               5

<210> SEQ ID NO 137
<211> LENGTH: 17
<212> TYPE: PRT
<213> ORGANISM: Artificial Sequence
<220> FEATURE:
<223> OTHER INFORMATION: Based on llima sequence

<400> SEQUENCE: 137

Ala Leu His Asn Gly Ile Gly Val Arg Thr Val Pro Ser Gln Tyr Asp
1               5                   10                  15

Ser

<210> SEQ ID NO 138
<211> LENGTH: 8
<212> TYPE: PRT
<213> ORGANISM: Artificial Sequence
<220> FEATURE:
<223> OTHER INFORMATION: Based on llima sequence

<400> SEQUENCE: 138

Thr Arg Thr Ile Asn Ile Tyr Ala
1               5

<210> SEQ ID NO 139
<211> LENGTH: 8
<212> TYPE: PRT
<213> ORGANISM: Artificial Sequence
<220> FEATURE:
<223> OTHER INFORMATION: Based on llima sequence

<400> SEQUENCE: 139

Val Thr Trp Ser Gly Leu Thr Arg
1               5

<210> SEQ ID NO 140
<211> LENGTH: 14
<212> TYPE: PRT
<213> ORGANISM: Artificial Sequence
<220> FEATURE:
<223> OTHER INFORMATION: Based on llima sequence

<400> SEQUENCE: 140

Ala Ala Gly Arg Tyr Ser Thr Gly Thr His Asp Tyr Asp Tyr
1               5                   10

<210> SEQ ID NO 141
<211> LENGTH: 25
<212> TYPE: PRT
<213> ORGANISM: Homo sapiens

<400> SEQUENCE: 141

Gln Val Gln Leu Val Glu Ser Gly Gly Gly Val Val Gln Pro Gly Gly
1               5                   10                  15
```

Ser Leu Arg Leu Ser Cys Ala Ala Ser
            20                  25

<210> SEQ ID NO 142
<211> LENGTH: 17
<212> TYPE: PRT
<213> ORGANISM: Homo sapiens

<400> SEQUENCE: 142

Leu Ala Trp Tyr Arg Gln Ala Pro Gly Lys Gln Arg Asp Leu Val Ala
1               5                   10                  15

Arg

<210> SEQ ID NO 143
<211> LENGTH: 17
<212> TYPE: PRT
<213> ORGANISM: Homo sapiens

<400> SEQUENCE: 143

Met Ser Trp Val Arg Gln Ala Pro Gly Lys Gly Leu Glu Trp Val Ser
1               5                   10                  15

Ser

<210> SEQ ID NO 144
<211> LENGTH: 38
<212> TYPE: PRT
<213> ORGANISM: Homo sapiens

<400> SEQUENCE: 144

Tyr Tyr Ala Asp Ser Val Lys Gly Arg Phe Thr Ile Ser Arg Asp Asn
1               5                   10                  15

Ser Lys Asn Thr Leu Tyr Leu Gln Met Asn Ser Leu Arg Ala Glu Asp
            20                  25                  30

Thr Ala Val Tyr Tyr Cys
        35

<210> SEQ ID NO 145
<211> LENGTH: 11
<212> TYPE: PRT
<213> ORGANISM: Homo sapiens

<400> SEQUENCE: 145

Trp Gly Gln Gly Thr Gln Val Thr Val Ser Ser
1               5                   10

<210> SEQ ID NO 146
<211> LENGTH: 11
<212> TYPE: PRT
<213> ORGANISM: Homo sapiens

<400> SEQUENCE: 146

Trp Gly Gln Gly Thr Leu Val Thr Val Ser Ser
1               5                   10

<210> SEQ ID NO 147
<211> LENGTH: 11
<212> TYPE: PRT
<213> ORGANISM: Homo sapiens

<400> SEQUENCE: 147

Ser Gly Gln Gly Thr Gln Val Thr Val Ser Ser
1               5                   10

<210> SEQ ID NO 148
<211> LENGTH: 124
<212> TYPE: PRT
<213> ORGANISM: Mus musculus

<400> SEQUENCE: 148

Gln Gly Pro Asp Arg Leu Leu Ile Arg Leu Arg His Leu Ile Asp Ile
1               5                   10                  15

Val Glu Gln Leu Lys Ile Tyr Glu Asn Asp Leu Asp Pro Glu Leu Leu
            20                  25                  30

Ser Ala Pro Gln Asp Val Lys Gly His Cys Glu His Ala Ala Phe Ala
        35                  40                  45

Cys Phe Gln Lys Ala Lys Leu Lys Pro Ser Asn Pro Gly Asn Asn Lys
    50                  55                  60

Thr Phe Ile Ile Asp Leu Val Ala Gln Leu Arg Arg Leu Pro Ala
65                  70                  75                  80

Arg Arg Gly Gly Lys Lys Gln Lys His Ile Ala Lys Cys Pro Ser Cys
                85                  90                  95

Asp Ser Tyr Glu Lys Arg Thr Pro Lys Glu Phe Leu Glu Arg Leu Lys
            100                 105                 110

Trp Leu Leu Gln Lys Met Ile His Gln His Leu Ser
        115                 120

<210> SEQ ID NO 149
<211> LENGTH: 261
<212> TYPE: PRT
<213> ORGANISM: Artificial Sequence
<220> FEATURE:
<223> OTHER INFORMATION: Based on llima sequence

<400> SEQUENCE: 149

Gln Gly Gln Asp Arg His Met Ile Arg Met Arg Gln Leu Ile Asp Ile
1               5                   10                  15

Val Asp Gln Leu Lys Asn Tyr Val Asn Asp Leu Val Pro Glu Phe Leu
            20                  25                  30

Pro Ala Pro Glu Asp Val Glu Thr Asn Cys Glu Trp Ser Ala Phe Ser
        35                  40                  45

Cys Phe Gln Lys Ala Gln Leu Lys Ser Ala Asn Thr Gly Asn Asn Glu
    50                  55                  60

Arg Ile Ile Asn Val Ser Ile Lys Lys Leu Lys Arg Lys Pro Pro Ser
65                  70                  75                  80

Thr Asn Ala Gly Arg Arg Gln Lys His Arg Leu Thr Cys Pro Ser Cys
                85                  90                  95

Asp Ser Tyr Glu Lys Lys Pro Pro Lys Glu Phe Leu Glu Arg Phe Lys
            100                 105                 110

Ser Leu Leu Gln Lys Met Ile His Gln His Leu Ser Ser Arg Thr His
        115                 120                 125

Gly Ser Glu Asp Ser Gly Ser Gly Gly Ser Gly Gly Ser Gly Gly Ser
    130                 135                 140

Gly Gln Val Gln Leu Val Glu Ser Gly Gly Val Val Gln Pro Gly
145                 150                 155                 160

Gly Ser Leu Arg Leu Ser Cys Ala Ala Ser Gly Phe Ala Phe Arg Gly
                165                 170                 175

Phe Gly Met Ser Trp Val Arg Gln Ala Pro Gly Lys Gly Leu Glu Trp
            180                 185                 190

```
Val Ser Ser Ile Asn Asn Gly Gly Ser Asp Thr Tyr Tyr Ala Asp Ser
        195                 200                 205

Val Lys Gly Arg Phe Thr Ile Ser Arg Asp Asn Ser Lys Asn Thr Leu
    210                 215                 220

Tyr Leu Gln Met Asn Ser Leu Arg Ala Glu Asp Thr Ala Val Tyr Tyr
225                 230                 235                 240

Cys Ala Ile Gly Gly Pro Gly Ala Ser Pro Ser Gly Gln Gly Thr Gln
                245                 250                 255

Val Thr Val Ser Ser
            260

<210> SEQ ID NO 150
<211> LENGTH: 261
<212> TYPE: PRT
<213> ORGANISM: Artificial Sequence
<220> FEATURE:
<223> OTHER INFORMATION: Based on llima sequence

<400> SEQUENCE: 150

Gln Gly Gln Asp Arg His Met Ile Arg Met Arg Gln Leu Ile Asp Ile
1               5                   10                  15

Val Asp Gln Leu Lys Asn Tyr Val Asn Asp Leu Val Pro Glu Phe Leu
            20                  25                  30

Pro Ala Pro Glu Asp Val Glu Thr Asn Cys Glu Trp Ser Ala Phe Ser
        35                  40                  45

Cys Phe Gln Lys Ala Gln Leu Lys Ser Ala Asn Thr Gly Asn Asn Glu
    50                  55                  60

Arg Ile Ile Asn Val Ser Ile Lys Lys Leu Lys Arg Lys Pro Pro Ser
65                  70                  75                  80

Thr Asn Ala Gly Arg Arg Gln Lys His Arg Leu Thr Cys Pro Ser Cys
                85                  90                  95

Asp Ser Tyr Glu Lys Lys Pro Pro Lys Glu Phe Leu Glu Arg Phe Lys
            100                 105                 110

Ser Leu Leu Gln Lys Met Ile His Gln His Leu Ser Ser Arg Thr His
        115                 120                 125

Gly Ser Glu Asp Ser Gly Ser Gly Gly Ser Gly Gly Ser Gly Gly Ser
    130                 135                 140

Gly Glu Val Gln Leu Val Glu Ser Gly Gly Gly Leu Val Gln Pro Gly
145                 150                 155                 160

Gly Ser Leu Arg Leu Ser Cys Ala Ala Ser Gly Ser Thr Trp Ser Ile
                165                 170                 175

Asn Thr Leu Ala Trp Tyr Arg Gln Ala Pro Gly Lys Gln Arg Asp Leu
            180                 185                 190

Val Ala Arg Ile Ser Ser Gly Ser Thr Tyr Tyr Ala Asp Ser Val
        195                 200                 205

Lys Gly Arg Phe Thr Ile Ser Arg Asp Asn Ser Lys Asn Thr Leu Tyr
    210                 215                 220

Leu Gln Met Asn Ser Leu Arg Ala Glu Asp Thr Ala Val Tyr Tyr Cys
225                 230                 235                 240

Tyr Ala Gln Ser Thr Trp Tyr Pro Pro Ser Trp Gly Gln Gly Thr Leu
                245                 250                 255

Val Thr Val Ser Ser
            260

<210> SEQ ID NO 151
<211> LENGTH: 133
```

```
<212> TYPE: PRT
<213> ORGANISM: Homo sapiens

<400> SEQUENCE: 151

Gln Gly Gln Asp Glu His Met Ile Arg Met Arg Gln Leu Ile Asp Ile
1               5                   10                  15

Val Asp Gln Leu Lys Asn Tyr Val Asn Asp Leu Val Pro Glu Phe Leu
            20                  25                  30

Pro Ala Pro Glu Asp Val Glu Thr Asn Cys Glu Trp Ser Ala Phe Ser
        35                  40                  45

Cys Phe Gln Lys Ala Gln Leu Lys Ser Ala Asn Thr Gly Asn Asn Glu
    50                  55                  60

Arg Ile Ile Asn Val Ser Ile Lys Lys Leu Lys Arg Lys Pro Pro Ser
65                  70                  75                  80

Thr Asn Ala Gly Arg Arg Gln Lys His Arg Leu Thr Cys Pro Ser Cys
                85                  90                  95

Asp Ser Tyr Glu Lys Lys Pro Pro Lys Glu Phe Leu Glu Arg Phe Lys
            100                 105                 110

Ser Leu Leu Gln Lys Met Ile His Gln His Leu Ser Ser Arg Thr His
        115                 120                 125

Gly Ser Glu Asp Ser
    130

<210> SEQ ID NO 152
<211> LENGTH: 133
<212> TYPE: PRT
<213> ORGANISM: Homo sapiens

<400> SEQUENCE: 152

Gln Gly Gln Asp Arg His Met Ile Glu Met Arg Gln Leu Ile Asp Ile
1               5                   10                  15

Val Asp Gln Leu Lys Asn Tyr Val Asn Asp Leu Val Pro Glu Phe Leu
            20                  25                  30

Pro Ala Pro Glu Asp Val Glu Thr Asn Cys Glu Trp Ser Ala Phe Ser
        35                  40                  45

Cys Phe Gln Lys Ala Gln Leu Lys Ser Ala Asn Thr Gly Asn Asn Glu
    50                  55                  60

Arg Ile Ile Asn Val Ser Ile Lys Lys Leu Lys Arg Lys Pro Pro Ser
65                  70                  75                  80

Thr Asn Ala Gly Arg Arg Gln Lys His Arg Leu Thr Cys Pro Ser Cys
                85                  90                  95

Asp Ser Tyr Glu Lys Lys Pro Pro Lys Glu Phe Leu Glu Arg Phe Lys
            100                 105                 110

Ser Leu Leu Gln Lys Met Ile His Gln His Leu Ser Ser Arg Thr His
        115                 120                 125

Gly Ser Glu Asp Ser
    130

<210> SEQ ID NO 153
<211> LENGTH: 133
<212> TYPE: PRT
<213> ORGANISM: Homo sapiens

<400> SEQUENCE: 153

Gln Gly Gln Asp Arg His Met Ile Arg Met Arg Gln Leu Ile Asp Ile
1               5                   10                  15

Val Asp Gln Leu Lys Asn Tyr Val Asn Asp Leu Val Pro Glu Phe Leu
```

```
            20                  25                  30
Pro Ala Pro Glu Asp Val Glu Thr Asn Cys Glu Trp Ser Ala Phe Ser
        35                  40                  45
Cys Phe Gln Lys Ala Gln Leu Lys Ser Ala Asn Thr Gly Asn Asn Glu
    50                  55                  60
Arg Ile Ile Asn Val Ser Ile Lys Glu Leu Lys Arg Lys Pro Pro Ser
65                  70                  75                  80
Thr Asn Ala Gly Arg Arg Gln Lys His Arg Leu Thr Cys Pro Ser Cys
                85                  90                  95
Asp Ser Tyr Glu Lys Lys Pro Pro Lys Glu Phe Leu Glu Arg Phe Lys
            100                 105                 110
Ser Leu Leu Gln Lys Met Ile His Gln His Leu Ser Ser Arg Thr His
        115                 120                 125
Gly Ser Glu Asp Ser
        130

<210> SEQ ID NO 154
<211> LENGTH: 133
<212> TYPE: PRT
<213> ORGANISM: Homo sapiens

<400> SEQUENCE: 154

Gln Gly Gln Asp Arg His Met Ile Arg Met Arg Gln Leu Ile Asp Ile
1               5                   10                  15
Val Asp Gln Leu Lys Asn Tyr Val Asn Asp Leu Val Pro Glu Phe Leu
            20                  25                  30
Pro Ala Pro Glu Asp Val Glu Thr Asn Cys Glu Trp Ser Ala Phe Ser
        35                  40                  45
Cys Phe Gln Lys Ala Gln Leu Lys Ser Ala Asn Thr Gly Asn Asn Glu
    50                  55                  60
Arg Ile Ile Asn Val Ser Ile Lys Lys Leu Lys Glu Lys Pro Pro Ser
65                  70                  75                  80
Thr Asn Ala Gly Arg Arg Gln Lys His Arg Leu Thr Cys Pro Ser Cys
                85                  90                  95
Asp Ser Tyr Glu Lys Lys Pro Pro Lys Glu Phe Leu Glu Arg Phe Lys
            100                 105                 110
Ser Leu Leu Gln Lys Met Ile His Gln His Leu Ser Ser Arg Thr His
        115                 120                 125
Gly Ser Glu Asp Ser
        130

<210> SEQ ID NO 155
<211> LENGTH: 133
<212> TYPE: PRT
<213> ORGANISM: Homo sapiens
<220> FEATURE:
<221> NAME/KEY: MISC_FEATURE
<222> LOCATION: (5)..(5)
<223> OTHER INFORMATION: X is A or E

<400> SEQUENCE: 155

Gln Gly Gln Asp Xaa His Met Ile Arg Met Arg Gln Leu Ile Asp Ile
1               5                   10                  15
Val Asp Gln Leu Lys Asn Tyr Val Asn Asp Leu Val Pro Glu Phe Leu
            20                  25                  30
Pro Ala Pro Glu Asp Val Glu Thr Asn Cys Glu Trp Ser Ala Phe Ser
        35                  40                  45
```

```
Cys Phe Gln Lys Ala Gln Leu Lys Ser Ala Asn Thr Gly Asn Asn Glu
 50                  55                  60

Arg Ile Ile Asn Val Ser Ile Lys Lys Leu Lys Arg Lys Pro Pro Ser
 65                  70                  75                  80

Thr Asn Ala Gly Arg Arg Gln Lys His Arg Leu Thr Cys Pro Ser Cys
                 85                  90                  95

Asp Ser Tyr Glu Lys Lys Pro Pro Lys Glu Phe Leu Glu Arg Phe Lys
                100                 105                 110

Ser Leu Leu Gln Lys Met Ile His Gln His Leu Ser Ser Arg Thr His
                115                 120                 125

Gly Ser Glu Asp Ser
                130

<210> SEQ ID NO 156
<211> LENGTH: 133
<212> TYPE: PRT
<213> ORGANISM: Homo sapiens
<220> FEATURE:
<221> NAME/KEY: MISC_FEATURE
<222> LOCATION: (9)..(9)
<223> OTHER INFORMATION: X is A or E

<400> SEQUENCE: 156

Gln Gly Gln Asp Arg His Met Ile Xaa Met Arg Gln Leu Ile Asp Ile
 1               5                  10                  15

Val Asp Gln Leu Lys Asn Tyr Val Asn Asp Leu Val Pro Glu Phe Leu
                 20                  25                  30

Pro Ala Pro Glu Asp Val Glu Thr Asn Cys Glu Trp Ser Ala Phe Ser
                 35                  40                  45

Cys Phe Gln Lys Ala Gln Leu Lys Ser Ala Asn Thr Gly Asn Asn Glu
 50                  55                  60

Arg Ile Ile Asn Val Ser Ile Lys Lys Leu Lys Arg Lys Pro Pro Ser
 65                  70                  75                  80

Thr Asn Ala Gly Arg Arg Gln Lys His Arg Leu Thr Cys Pro Ser Cys
                 85                  90                  95

Asp Ser Tyr Glu Lys Lys Pro Pro Lys Glu Phe Leu Glu Arg Phe Lys
                100                 105                 110

Ser Leu Leu Gln Lys Met Ile His Gln His Leu Ser Ser Arg Thr His
                115                 120                 125

Gly Ser Glu Asp Ser
                130

<210> SEQ ID NO 157
<211> LENGTH: 133
<212> TYPE: PRT
<213> ORGANISM: Homo sapiens
<220> FEATURE:
<221> NAME/KEY: MISC_FEATURE
<222> LOCATION: (73)..(73)
<223> OTHER INFORMATION: X is A or E

<400> SEQUENCE: 157

Gln Gly Gln Asp Arg His Met Ile Arg Met Arg Gln Leu Ile Asp Ile
 1               5                  10                  15

Val Asp Gln Leu Lys Asn Tyr Val Asn Asp Leu Val Pro Glu Phe Leu
                 20                  25                  30

Pro Ala Pro Glu Asp Val Glu Thr Asn Cys Glu Trp Ser Ala Phe Ser
                 35                  40                  45

Cys Phe Gln Lys Ala Gln Leu Lys Ser Ala Asn Thr Gly Asn Asn Glu
```

```
                   50                  55                  60
Arg Ile Ile Asn Val Ser Ile Lys Xaa Leu Lys Arg Lys Pro Pro Ser
 65                  70                  75                  80

Thr Asn Ala Gly Arg Arg Gln Lys His Arg Leu Thr Cys Pro Ser Cys
                 85                  90                  95

Asp Ser Tyr Glu Lys Lys Pro Pro Lys Glu Phe Leu Glu Arg Phe Lys
                100                 105                 110

Ser Leu Leu Gln Lys Met Ile His Gln His Leu Ser Ser Arg Thr His
            115                 120                 125

Gly Ser Glu Asp Ser
        130

<210> SEQ ID NO 158
<211> LENGTH: 133
<212> TYPE: PRT
<213> ORGANISM: Homo sapiens
<220> FEATURE:
<221> NAME/KEY: MISC_FEATURE
<222> LOCATION: (76)..(76)
<223> OTHER INFORMATION: X is A or E

<400> SEQUENCE: 158

Gln Gly Gln Asp Arg His Met Ile Arg Met Arg Gln Leu Ile Asp Ile
 1               5                  10                  15

Val Asp Gln Leu Lys Asn Tyr Val Asn Asp Leu Val Pro Glu Phe Leu
                20                  25                  30

Pro Ala Pro Glu Asp Val Glu Thr Asn Cys Glu Trp Ser Ala Phe Ser
            35                  40                  45

Cys Phe Gln Lys Ala Gln Leu Lys Ser Ala Asn Thr Gly Asn Asn Glu
 50                  55                  60

Arg Ile Ile Asn Val Ser Ile Lys Leu Lys Xaa Lys Pro Pro Ser
 65                  70                  75                  80

Thr Asn Ala Gly Arg Arg Gln Lys His Arg Leu Thr Cys Pro Ser Cys
                 85                  90                  95

Asp Ser Tyr Glu Lys Lys Pro Pro Lys Glu Phe Leu Glu Arg Phe Lys
                100                 105                 110

Ser Leu Leu Gln Lys Met Ile His Gln His Leu Ser Ser Arg Thr His
            115                 120                 125

Gly Ser Glu Asp Ser
        130

<210> SEQ ID NO 159
<211> LENGTH: 133
<212> TYPE: PRT
<213> ORGANISM: Homo sapiens
<220> FEATURE:
<221> NAME/KEY: MISC_FEATURE
<222> LOCATION: (5)..(5)
<223> OTHER INFORMATION: X is R, A, or E
<220> FEATURE:
<221> NAME/KEY: MISC_FEATURE
<222> LOCATION: (9)..(9)
<223> OTHER INFORMATION: X is R, A, or E
<220> FEATURE:
<221> NAME/KEY: MISC_FEATURE
<222> LOCATION: (73)..(73)
<223> OTHER INFORMATION: X is K, A, or E
<220> FEATURE:
<221> NAME/KEY: MISC_FEATURE
<222> LOCATION: (76)..(76)
<223> OTHER INFORMATION: X is R, A, or E

<400> SEQUENCE: 159
```

Gln Gly Gln Asp Xaa His Met Ile Xaa Met Arg Gln Leu Ile Asp Ile
1               5                   10                  15

Val Asp Gln Leu Lys Asn Tyr Val Asn Asp Leu Val Pro Glu Phe Leu
            20                  25                  30

Pro Ala Pro Glu Asp Val Glu Thr Asn Cys Glu Trp Ser Ala Phe Ser
        35                  40                  45

Cys Phe Gln Lys Ala Gln Leu Lys Ser Ala Asn Thr Gly Asn Asn Glu
    50                  55                  60

Arg Ile Ile Asn Val Ser Ile Lys Xaa Leu Lys Xaa Lys Pro Pro Ser
65                  70                  75                  80

Thr Asn Ala Gly Arg Arg Gln Lys His Arg Leu Thr Cys Pro Ser Cys
            85                  90                  95

Asp Ser Tyr Glu Lys Lys Pro Pro Lys Glu Phe Leu Glu Arg Phe Lys
            100                 105                 110

Ser Leu Leu Gln Lys Met Ile His Gln His Leu Ser Ser Arg Thr His
            115                 120                 125

Gly Ser Glu Asp Ser
        130

<210> SEQ ID NO 160
<211> LENGTH: 133
<212> TYPE: PRT
<213> ORGANISM: Homo sapiens

<400> SEQUENCE: 160

Gln Gly Gln Asp Asn His Thr Ile Arg Met Arg Gln Leu Ile Asp Ile
1               5                   10                  15

Val Asp Gln Leu Lys Asn Tyr Val Asn Asp Leu Val Pro Glu Phe Leu
            20                  25                  30

Pro Ala Pro Glu Asp Val Glu Thr Asn Cys Glu Trp Ser Ala Phe Ser
        35                  40                  45

Cys Phe Gln Lys Ala Gln Leu Lys Ser Ala Asn Thr Gly Asn Asn Glu
    50                  55                  60

Arg Ile Ile Asn Val Ser Ile Lys Lys Leu Lys Arg Lys Pro Pro Ser
65                  70                  75                  80

Thr Asn Ala Gly Arg Arg Gln Lys His Arg Leu Thr Cys Pro Ser Cys
            85                  90                  95

Asp Ser Tyr Glu Lys Lys Pro Pro Lys Glu Phe Leu Glu Arg Phe Lys
            100                 105                 110

Ser Leu Leu Gln Lys Met Ile His Gln His Leu Ser Ser Arg Thr His
            115                 120                 125

Gly Ser Glu Asp Ser
        130

<210> SEQ ID NO 161
<211> LENGTH: 133
<212> TYPE: PRT
<213> ORGANISM: Homo sapiens

<400> SEQUENCE: 161

Gln Gly Gln Asp Asn His Ser Ile Arg Met Arg Gln Leu Ile Asp Ile
1               5                   10                  15

Val Asp Gln Leu Lys Asn Tyr Val Asn Asp Leu Val Pro Glu Phe Leu
            20                  25                  30

Pro Ala Pro Glu Asp Val Glu Thr Asn Cys Glu Trp Ser Ala Phe Ser
        35                  40                  45

```
Cys Phe Gln Lys Ala Gln Leu Lys Ser Ala Asn Thr Gly Asn Asn Glu
         50                  55                  60

Arg Ile Ile Asn Val Ser Ile Lys Lys Leu Lys Arg Lys Pro Pro Ser
 65                  70                  75                  80

Thr Asn Ala Gly Arg Arg Gln Lys His Arg Leu Thr Cys Pro Ser Cys
                 85                  90                  95

Asp Ser Tyr Glu Lys Lys Pro Pro Lys Glu Phe Leu Glu Arg Phe Lys
                100                 105                 110

Ser Leu Leu Gln Lys Met Ile His Gln His Leu Ser Ser Arg Thr His
            115                 120                 125

Gly Ser Glu Asp Ser
            130

<210> SEQ ID NO 162
<211> LENGTH: 133
<212> TYPE: PRT
<213> ORGANISM: Homo sapiens

<400> SEQUENCE: 162

Gln Gly Gln Asp Arg His Met Ile Asn Met Thr Gln Leu Ile Asp Ile
  1               5                  10                  15

Val Asp Gln Leu Lys Asn Tyr Val Asn Asp Leu Val Pro Glu Phe Leu
             20                  25                  30

Pro Ala Pro Glu Asp Val Glu Thr Asn Cys Glu Trp Ser Ala Phe Ser
             35                  40                  45

Cys Phe Gln Lys Ala Gln Leu Lys Ser Ala Asn Thr Gly Asn Asn Glu
         50                  55                  60

Arg Ile Ile Asn Val Ser Ile Lys Lys Leu Lys Arg Lys Pro Pro Ser
 65                  70                  75                  80

Thr Asn Ala Gly Arg Arg Gln Lys His Arg Leu Thr Cys Pro Ser Cys
                 85                  90                  95

Asp Ser Tyr Glu Lys Lys Pro Pro Lys Glu Phe Leu Glu Arg Phe Lys
                100                 105                 110

Ser Leu Leu Gln Lys Met Ile His Gln His Leu Ser Ser Arg Thr His
            115                 120                 125

Gly Ser Glu Asp Ser
            130

<210> SEQ ID NO 163
<211> LENGTH: 133
<212> TYPE: PRT
<213> ORGANISM: Homo sapiens

<400> SEQUENCE: 163

Gln Gly Gln Asp Arg His Met Ile Asn Met Ser Gln Leu Ile Asp Ile
  1               5                  10                  15

Val Asp Gln Leu Lys Asn Tyr Val Asn Asp Leu Val Pro Glu Phe Leu
             20                  25                  30

Pro Ala Pro Glu Asp Val Glu Thr Asn Cys Glu Trp Ser Ala Phe Ser
             35                  40                  45

Cys Phe Gln Lys Ala Gln Leu Lys Ser Ala Asn Thr Gly Asn Asn Glu
         50                  55                  60

Arg Ile Ile Asn Val Ser Ile Lys Lys Leu Lys Arg Lys Pro Pro Ser
 65                  70                  75                  80

Thr Asn Ala Gly Arg Arg Gln Lys His Arg Leu Thr Cys Pro Ser Cys
                 85                  90                  95
```

Asp Ser Tyr Glu Lys Lys Pro Pro Lys Glu Phe Leu Glu Arg Phe Lys
                100                 105                 110

Ser Leu Leu Gln Lys Met Ile His Gln His Leu Ser Ser Arg Thr His
            115                 120                 125

Gly Ser Glu Asp Ser
        130

<210> SEQ ID NO 164
<211> LENGTH: 133
<212> TYPE: PRT
<213> ORGANISM: Homo sapiens

<400> SEQUENCE: 164

Gln Gly Gln Asp Arg His Met Ile Arg Met Arg Gln Leu Ile Asp Ile
1               5                   10                  15

Val Asp Gln Leu Lys Asn Tyr Val Asn Asp Leu Val Pro Glu Phe Leu
            20                  25                  30

Pro Ala Pro Glu Asp Val Glu Thr Asn Cys Glu Trp Ser Ala Phe Ser
        35                  40                  45

Cys Phe Gln Lys Ala Gln Leu Lys Ser Ala Asn Thr Gly Asn Asn Glu
50                  55                  60

Arg Ile Ile Asn Val Ser Ile Lys Asn Leu Thr Arg Lys Pro Pro Ser
65                  70                  75                  80

Thr Asn Ala Gly Arg Arg Gln Lys His Arg Leu Thr Cys Pro Ser Cys
                85                  90                  95

Asp Ser Tyr Glu Lys Lys Pro Pro Lys Glu Phe Leu Glu Arg Phe Lys
                100                 105                 110

Ser Leu Leu Gln Lys Met Ile His Gln His Leu Ser Ser Arg Thr His
            115                 120                 125

Gly Ser Glu Asp Ser
        130

<210> SEQ ID NO 165
<211> LENGTH: 133
<212> TYPE: PRT
<213> ORGANISM: Homo sapiens

<400> SEQUENCE: 165

Gln Gly Gln Asp Arg His Met Ile Arg Met Arg Gln Leu Ile Asp Ile
1               5                   10                  15

Val Asp Gln Leu Lys Asn Tyr Val Asn Asp Leu Val Pro Glu Phe Leu
            20                  25                  30

Pro Ala Pro Glu Asp Val Glu Thr Asn Cys Glu Trp Ser Ala Phe Ser
        35                  40                  45

Cys Phe Gln Lys Ala Gln Leu Lys Ser Ala Asn Thr Gly Asn Asn Glu
50                  55                  60

Arg Ile Ile Asn Val Ser Ile Lys Asn Leu Ser Arg Lys Pro Pro Ser
65                  70                  75                  80

Thr Asn Ala Gly Arg Arg Gln Lys His Arg Leu Thr Cys Pro Ser Cys
                85                  90                  95

Asp Ser Tyr Glu Lys Lys Pro Pro Lys Glu Phe Leu Glu Arg Phe Lys
                100                 105                 110

Ser Leu Leu Gln Lys Met Ile His Gln His Leu Ser Ser Arg Thr His
            115                 120                 125

Gly Ser Glu Asp Ser
        130

<210> SEQ ID NO 166
<211> LENGTH: 133
<212> TYPE: PRT
<213> ORGANISM: Homo sapiens

<400> SEQUENCE: 166

Gln Gly Gln Asp Arg His Met Ile Arg Met Arg Gln Leu Ile Asp Ile
1               5                   10                  15

Val Asp Gln Leu Lys Asn Tyr Val Asn Asp Leu Val Pro Glu Phe Leu
            20                  25                  30

Pro Ala Pro Glu Asp Val Glu Thr Asn Cys Glu Trp Ser Ala Phe Ser
        35                  40                  45

Cys Phe Gln Lys Ala Gln Leu Lys Ser Ala Asn Thr Gly Asn Asn Glu
    50                  55                  60

Arg Ile Ile Asn Val Ser Ile Lys Lys Leu Lys Asn Lys Thr Pro Ser
65                  70                  75                  80

Thr Asn Ala Gly Arg Arg Gln Lys His Arg Leu Thr Cys Pro Ser Cys
                85                  90                  95

Asp Ser Tyr Glu Lys Lys Pro Pro Lys Glu Phe Leu Glu Arg Phe Lys
            100                 105                 110

Ser Leu Leu Gln Lys Met Ile His Gln His Leu Ser Ser Arg Thr His
        115                 120                 125

Gly Ser Glu Asp Ser
    130

<210> SEQ ID NO 167
<211> LENGTH: 133
<212> TYPE: PRT
<213> ORGANISM: Homo sapiens

<400> SEQUENCE: 167

Gln Gly Gln Asp Arg His Met Ile Arg Met Arg Gln Leu Ile Asp Ile
1               5                   10                  15

Val Asp Gln Leu Lys Asn Tyr Val Asn Asp Leu Val Pro Glu Phe Leu
            20                  25                  30

Pro Ala Pro Glu Asp Val Glu Thr Asn Cys Glu Trp Ser Ala Phe Ser
        35                  40                  45

Cys Phe Gln Lys Ala Gln Leu Lys Ser Ala Asn Thr Gly Asn Asn Glu
    50                  55                  60

Arg Ile Ile Asn Val Ser Ile Lys Lys Leu Lys Asn Lys Ser Pro Ser
65                  70                  75                  80

Thr Asn Ala Gly Arg Arg Gln Lys His Arg Leu Thr Cys Pro Ser Cys
                85                  90                  95

Asp Ser Tyr Glu Lys Lys Pro Pro Lys Glu Phe Leu Glu Arg Phe Lys
            100                 105                 110

Ser Leu Leu Gln Lys Met Ile His Gln His Leu Ser Ser Arg Thr His
        115                 120                 125

Gly Ser Glu Asp Ser
    130

<210> SEQ ID NO 168
<211> LENGTH: 208
<212> TYPE: PRT
<213> ORGANISM: Homo sapiens

<400> SEQUENCE: 168

-continued

```
Cys Pro Asp Leu Val Cys Tyr Thr Asp Tyr Leu Gln Thr Val Ile Cys
1               5                   10                  15

Ile Leu Glu Met Trp Asn Leu His Pro Ser Thr Leu Thr Leu Thr Trp
            20                  25                  30

Gln Asp Gln Tyr Glu Glu Leu Lys Asp Glu Ala Thr Ser Cys Ser Leu
            35                  40                  45

His Arg Ser Ala His Asn Ala Thr His Ala Thr Tyr Thr Cys His Met
        50                  55                  60

Asp Val Phe His Phe Met Ala Asp Ile Phe Ser Val Asn Ile Thr
65                  70                  75                  80

Asp Gln Ser Gly Asn Tyr Ser Gln Glu Cys Gly Ser Phe Leu Leu Ala
                85                  90                  95

Glu Ser Ile Lys Pro Ala Pro Pro Phe Asn Val Thr Val Thr Phe Ser
            100                 105                 110

Gly Gln Tyr Asn Ile Ser Trp Arg Ser Asp Tyr Glu Asp Pro Ala Phe
            115                 120                 125

Tyr Met Leu Lys Gly Lys Leu Gln Tyr Glu Leu Gln Tyr Arg Asn Arg
        130                 135                 140

Gly Asp Pro Trp Ala Val Ser Pro Arg Arg Lys Leu Ile Ser Val Asp
145                 150                 155                 160

Ser Arg Ser Val Ser Leu Leu Pro Leu Glu Phe Arg Lys Asp Ser Ser
                165                 170                 175

Tyr Glu Leu Gln Val Arg Ala Gly Pro Met Pro Gly Ser Ser Tyr Gln
            180                 185                 190

Gly Thr Trp Ser Glu Trp Ser Asp Pro Val Ile Phe Gln Thr Gln Ser
            195                 200                 205
```